United States Patent
Ootani et al.

(10) Patent No.: US 7,556,116 B2
(45) Date of Patent: Jul. 7, 2009

(54) VEHICLE PASSENGER RESTRAINING SYSTEM

(75) Inventors: Ryuuji Ootani, Yokosuka (JP); Chinmoy Pal, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 261 days.

(21) Appl. No.: 11/267,292

(22) Filed: Nov. 7, 2005

(65) Prior Publication Data

US 2006/0102413 A1    May 18, 2006

(30) Foreign Application Priority Data

Nov. 18, 2004 (JP) ............... 2004-334801
Nov. 18, 2004 (JP) ............... 2004-334830

(51) Int. Cl.
    B60K 28/10    (2006.01)
(52) U.S. Cl. ................................... 180/274
(58) Field of Classification Search ........ 280/735, 280/730.1, 730.2, 756, 781, 794; 180/274, 180/282; 296/190.03, 210
    See application file for complete search history.

(56) References Cited

U.S. PATENT DOCUMENTS

| 1,706,527 | A | * | 3/1929 | Hawkes | 296/210 |
| 2,185,345 | A | * | 1/1940 | Krogh | 296/210 |
| 3,427,068 | A | * | 2/1969 | Keahn et al. | 296/210 |
| 3,712,664 | A | * | 1/1973 | May | 296/102 |
| 4,207,967 | A | * | 6/1980 | Stedman | 187/226 |
| 5,167,481 | A | * | 12/1992 | Gotz | 414/635 |
| 5,602,734 | A | * | 2/1997 | Kithil | 701/45 |
| 5,775,726 | A | * | 7/1998 | Timothy et al. | 280/730.1 |
| 6,169,479 | B1 | * | 1/2001 | Boran et al. | 340/436 |
| 6,650,981 | B2 | | 11/2003 | Sekizuka et al. | |
| 6,727,823 | B2 | * | 4/2004 | Ando et al. | 340/666 |
| 6,929,282 | B1 | * | 8/2005 | Zoratti et al. | 280/735 |
| 2004/0129479 | A1 | | 7/2004 | Ozaki | |
| 2005/0156411 | A1 | * | 7/2005 | Steffens et al. | 280/729 |

FOREIGN PATENT DOCUMENTS

| EP | 1426252 A1 | 6/2004 |
| FR | 2818214 A1 | 6/2002 |
| JP | 2002-200962 A | 7/2002 |
| WO | WO-90/03040 A | 3/1990 |
| WO | WO-01/87673 A | 11/2001 |

* cited by examiner

*Primary Examiner*—Paul N. Dickson
*Assistant Examiner*—Robert A. Coker
(74) *Attorney, Agent, or Firm*—Global IP Counselors, LLP

(57) ABSTRACT

A vehicle passenger restraining system is basically comprises a plurality of passenger restraining devices, a deformation detecting device and a passenger restraining device operating unit. The passenger restraining devices are configured and arranged to restrain a passenger inside a vehicle. The deformation detecting device is coupled to a vehicle body of the vehicle with the deformation detecting device being configured and arranged to detect a deformation condition of the vehicle body. The passenger restraining device operating unit is configured to obtain impact information of the vehicle based on the deformation condition detected by the deformation detecting device, and to selectively operate at least one of the passenger restraining devices in accordance with the impact information.

18 Claims, 95 Drawing Sheets

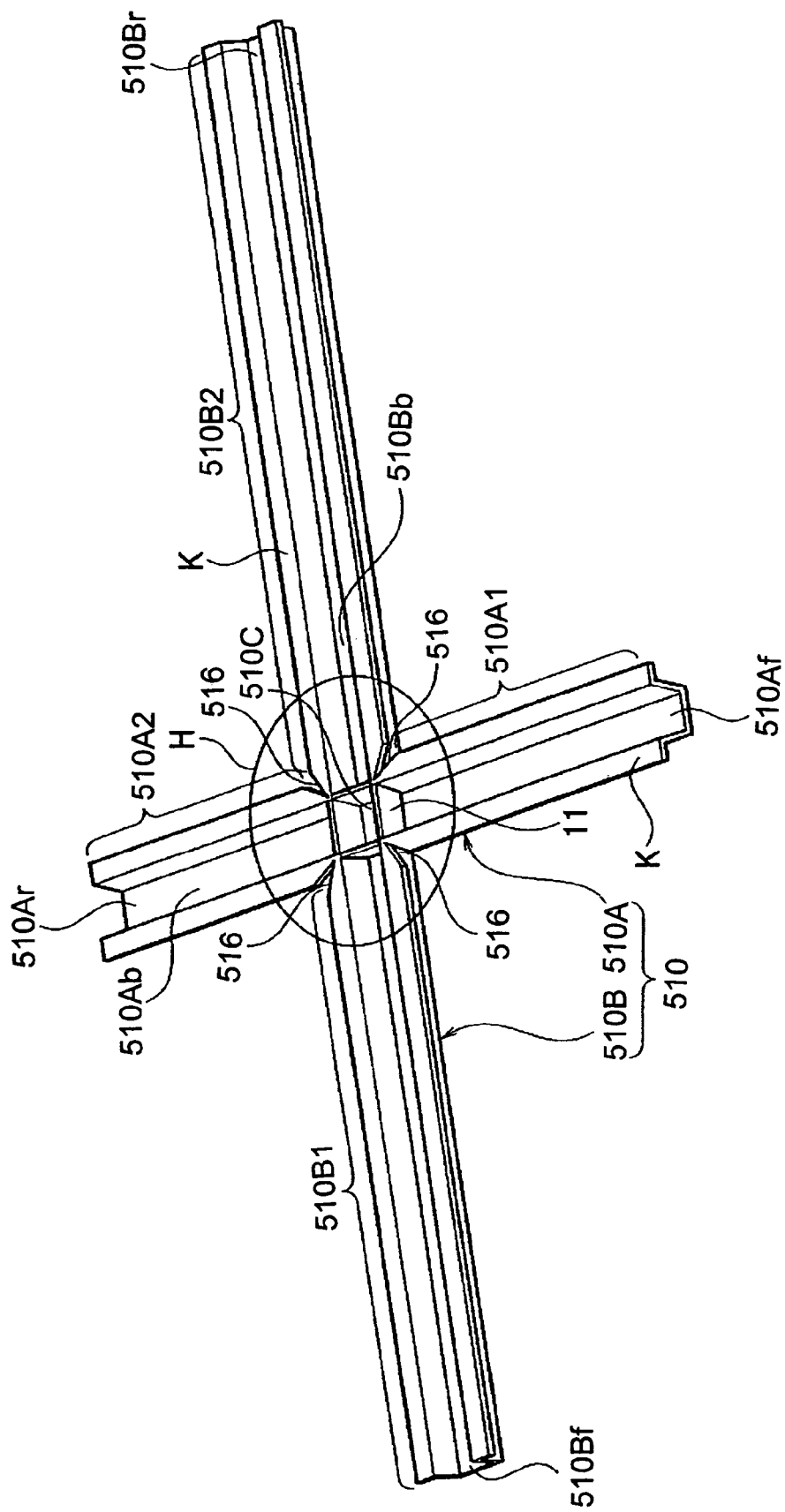

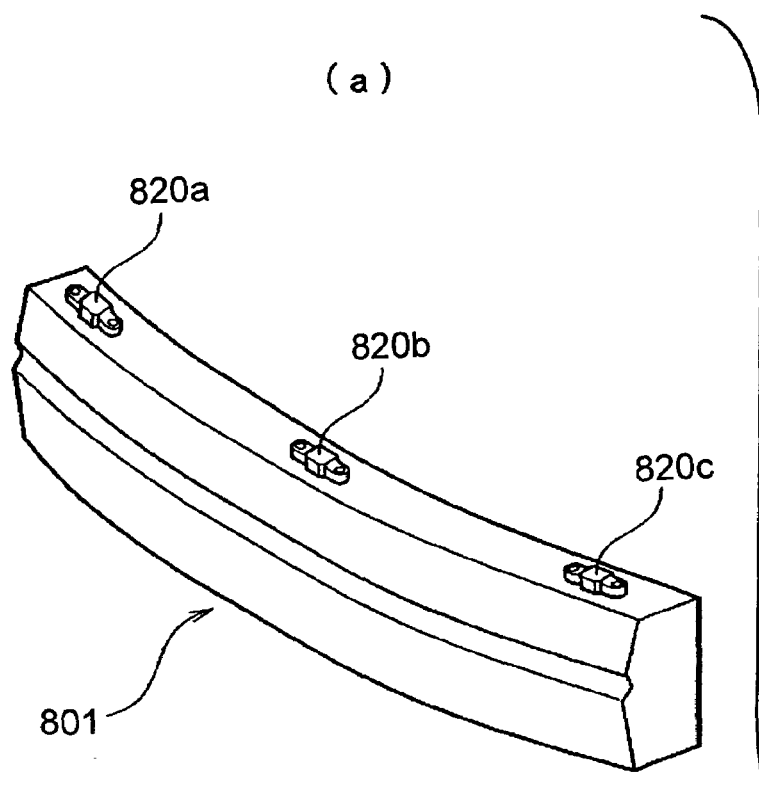
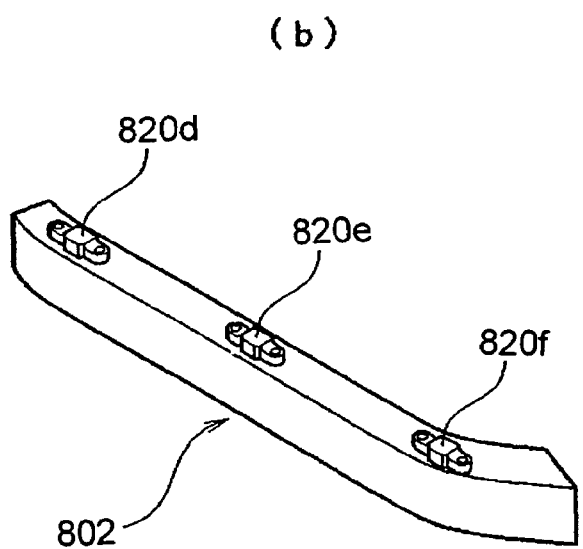
Fig. 80

VEHICLE PASSENGER RESTRAINING SYSTEM

CROSS-REFERENCE TO RELATED APPLICATIONS

This application claims priority under 35 U.S.C. § 119 to Japanese Patent Application Nos. 2004-334801 and 2004-334830. The entire disclosures of Japanese Patent Application Nos. 2004-334801 and 2004-334830 are hereby incorporated herein by reference.

BACKGROUND OF THE INVENTION

1. Field of the Invention

The present invention relates to a vehicle passenger restraining system for an automobile utilizing a collision impact location determining system.

2. Background Information

Japanese Laid-Open Patent Publication No. 2002-200962 discloses one example of a conventional vehicle passenger restraining system that is configured to restrain a passenger when a vehicle collision impact location determining system that is provided with the vehicle passenger restraining system determines that the vehicle will roll over (roll sideways). Such conventional vehicle passenger restraining system is configured to determine that the vehicle will roll over when the state of the vehicle expressed in terms of a roll angle and a roll rate of the vehicle enters a rollover region defined by a threshold line that stipulates a relationship between the roll angle and the roll rate or when the vehicle state enters a rollover region defined by a threshold line that stipulates a relationship between the lateral (transverse) acceleration and the roll rate.

Such conventional vehicle passenger restraining system is configured to initially operate only a specific passenger restraining device (or passenger restraining devices) installed on the side of the vehicle toward which the vehicle rolls over (hereinafter called "rollover side"). Then, afterwards, the vehicle passenger restraining system is configured to operate other passenger restraining devices (not on the rollover side of the vehicle) if the vehicle passenger restraining system determines that the vehicle will roll further (beyond the rollover side). In this way, the conventional vehicle passenger restraining system is configured to operate the passenger restraining devices in an appropriate manner when the vehicle undergoes a rollover event.

In view of the above, it will be apparent to those skilled in the art from this disclosure that there exists a need for an improved vehicle passenger restraining system. This invention addresses this need in the art as well as other needs, which will become apparent to those skilled in the art from this disclosure.

SUMMARY OF THE INVENTION

In the conventional vehicle passenger restraining system as described in the above mentioned reference, the determination as to whether the vehicle has entered a hypothetical rollover region is based on detection signals from a lateral acceleration sensor and a roll angle sensor. The control executed by such conventional vehicle passenger restraining system is based on the assumption that if the vehicle rolls over, the vehicle body will contact the ground sequentially starting from the rollover side.

However, when a vehicle rolls over, there are three feasible scenarios regarding which part of the vehicle makes the initial contact with the ground, i.e., undergoes the initial impact: a first scenario in which the side toward which the vehicle rolls over (rollover side) contacts the ground first, a second scenario in which the vehicle bounces into the air and first contacts the ground on the side opposite the rollover side, and a third scenario in which the vehicle first contacts the ground at a position in the vicinity of the center of the roof.

Thus, since the portion of the roof that contacts the ground when the vehicle rolls over is not necessarily the rollover side, it is possible that the vehicle passenger restraining system in accordance with the conventional technology will have difficulty operating the passenger restraining devices appropriately in a vehicle rollover situation.

Also, the control algorithm used in the conventional vehicle passenger restraining system to determine if the vehicle is rolling over uses a simple and concise information in which the vehicle passenger restraining system is configured to determine that the vehicle is undergoing a rollover event when the acceleration or rotational velocity exceeds a threshold value determined based on experience or the like. Therefore, there is the possibility that such conventional vehicle passenger restraining system will have difficulty adapting an actual rollover event should the actual rollover event be different from the hypothetical (assumed) rollover event on which the control algorithm is based.

In view of these issues, one object of the present invention is to provide a vehicle passenger restraining system that is capable of operating the passenger restraining devices of the vehicle properly in accordance with impact locations by using an algorithm configured to detect impact locations incurred by a vehicle during a collision or rollover event based on the locations where the vehicle body actually undergoes deformation.

Another object of the present invention is to provide a vehicle body upper structure and a vehicle rollover contact location detecting system that can operate the passenger restraining devices of the vehicle properly in accordance with the impact locations in a situation where the vehicle rolls over.

In order to achieve the above mentioned objects and other objects of the present invention, a vehicle passenger restraining system is provided that basically comprises a plurality of passenger restraining devices, a deformation detecting device and a passenger restraining device operating unit. The passenger restraining devices are configured and arranged to restrain a passenger inside a vehicle. The deformation detecting device is coupled to a vehicle body of the vehicle with the deformation detecting device being configured and arranged to detect a deformation condition of the vehicle body. The passenger restraining device operating unit is configured to obtain impact information of the vehicle based on the deformation condition detected by the deformation detecting device, and to selectively operate at least one of the passenger restraining devices in accordance with the impact information.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 59 is an enlarged, partial top perspective view of the reinforcing member of the vehicle passenger restraining system in accordance with the tenth embodiment of the present invention;

FIG. 80 is a pair of diagrams (a) and (b) in perspective views of various parts of the front structure of the vehicle body illustrating locations where detecting section of a deformation detecting device are mounted in accordance with the thirteenth embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
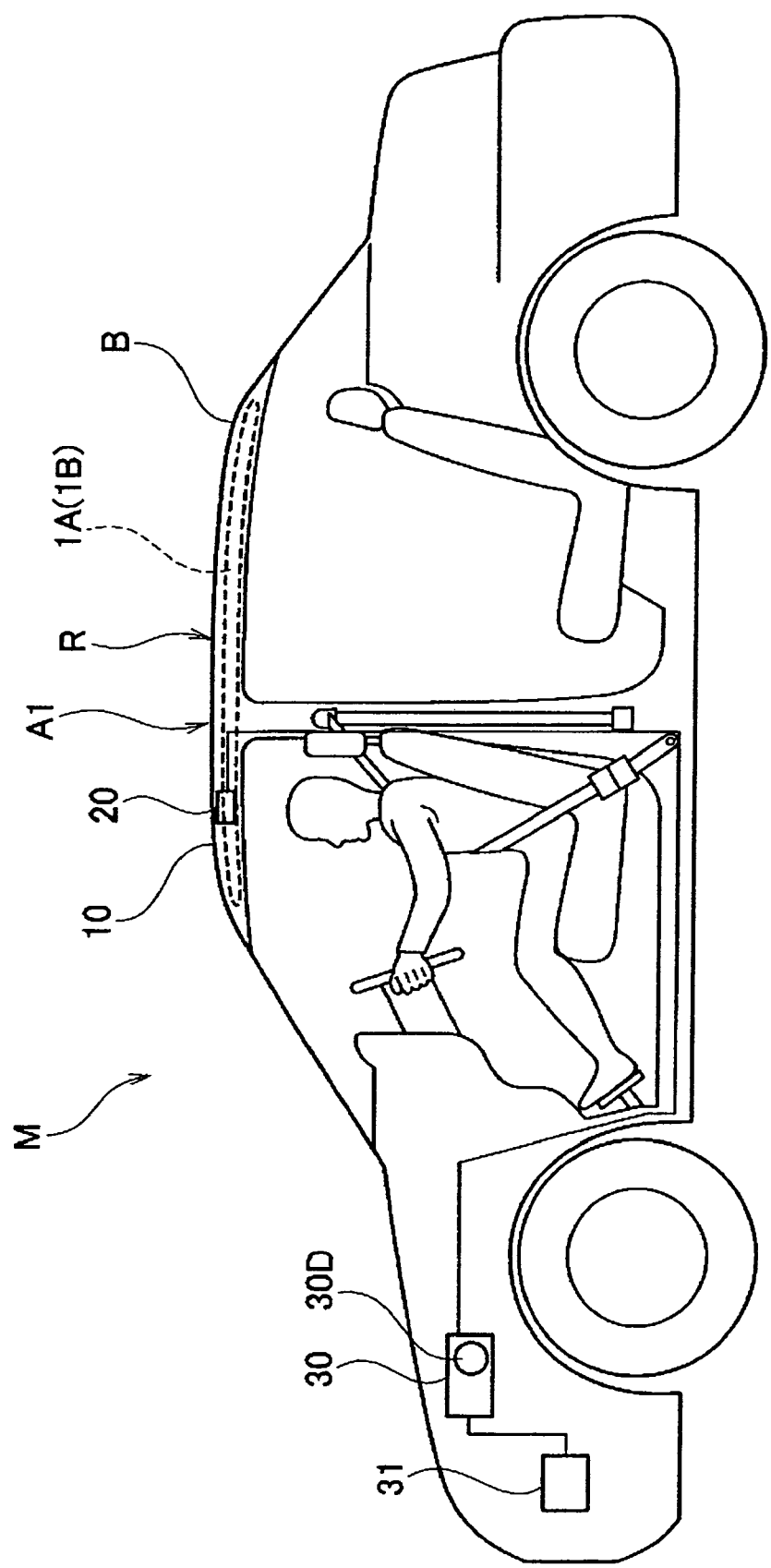
FIG. 1 is a schematic left side elevational view of a vehicle body illustrating an arrangement of a deformation detecting device, a passenger restraining device and a passenger restraining device operating unit of a vehicle passenger restraining system in accordance with a first embodiment of the present invention.

Referring initially to FIGS. 1 to 12, a vehicle passenger restraining system is illustrated in accordance with a first embodiment of the present invention. FIG. 1 is a schematic left side elevational view of a vehicle body of an automobile or vehicle M illustrating an arrangement of a deformation detecting device, a passenger restraining device and a passenger restraining device operating unit of the vehicle passenger restraining system.

As shown in FIG. 1, the vehicle passenger restraining system of the first embodiment comprises a pair of left and right curtain air bags 1A and 1B located in left and right roof rail areas of the vehicle M (only the left curtain air bag 1A is shown in FIG. 1), a deformation sensor 20 and a controller 30. Each of the left and right curtain air bags 1A and 1B constitutes a passenger restraining device that is configured to restrain a passenger inside the vehicle M in an emergency situation such as during a collision event or a rollover event. More specifically, the left air bag 1A is configured and arranged to restrain the passenger C sitting on the left side seat of the vehicle M, and the right air bag 1B is configured and arranged to restrain a passenger sitting on the right side seat of the vehicle M. The deformation sensor 20 constitutes the deformation detecting device of the first embodiment, which is configured and arranged to detect a deformation condition including a deformation location where a roof R of the vehicle M deforms when the roof R contacts the ground during the rollover event.

The controller 30 constitutes a passenger restraining device operating unit of the present invention, which is configured to determine a location on the vehicle M where a collision impact occurred using an internal reference database 30D. More specifically, the controller 30 is configured to process output signals from the deformation sensor 20 by using the reference database 30D in accordance with a prescribed control algorithm to obtain an impact information including at least an impact location. Then, the controller 30 is configured to operate a specific passenger restraining device or devices (i.e., one or both of the left curtain air bag 1A and the right curtain air bag 1B) among the plurality of passenger restraining devices in accordance with the impact location where the collision impact occurred. In other words, in the present invention, a specific passenger restraining device or devices that are disposed in an area that substantially corresponds to the impact location of the vehicle M are operated in order to restrain the passenger of the vehicle M during the rollover or collision event.

In the first embodiment of the present invention, a rollover (RO) detecting sensor 31, which is configured to detect if the vehicle M is rolling over, is provided in a front portion of the vehicle M as seen in FIG. 1. The rollover detecting sensor 31 is configured and arranged to output a rollover detection signal that is fed to the controller 30.

The controller 30 preferably includes a microcomputer with a control program that controls the detection of the impact location as discussed below. The controller 30 can also include other conventional components such as an input interface circuit, an output interface circuit, and storage devices such as a ROM (Read Only Memory) device and a RAM (Random Access Memory) device. The microcomputer of the controller 30 is programmed to control the process for determining of the impact location. The memory circuit stores processing results and control programs such as ones for impact location determining operation that are run by the processor circuit. The controller 30 is operatively coupled to the deformation sensor 20, the rollover detecting sensor 30 in a conventional manner. The internal RAM of the controller 30 stores statuses of operational flags and various control data. The internal ROM of the controller 30 stores the data and maps for various operations. The controller 30 is capable of selectively controlling any of the components of the control system in accordance with the control program. It will be apparent to those skilled in the art from this disclosure that the precise structure and algorithms for the controller 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

In the vehicle passenger restraining system of the first embodiment of the present invention, when a rollover event occurs, output signals from the deformation sensor 20 indicating a location where the roof R has undergone deformation is processed in accordance with the prescribed control algorithm to determine the location where the vehicle M has incurred a collision impact, and a specific passenger restraining device or devices (i.e., one or both of the left curtain air bag 1A and the right curtain air bag 1B) is operated in accordance with the location where the collision impact occurred.

Figure 2:
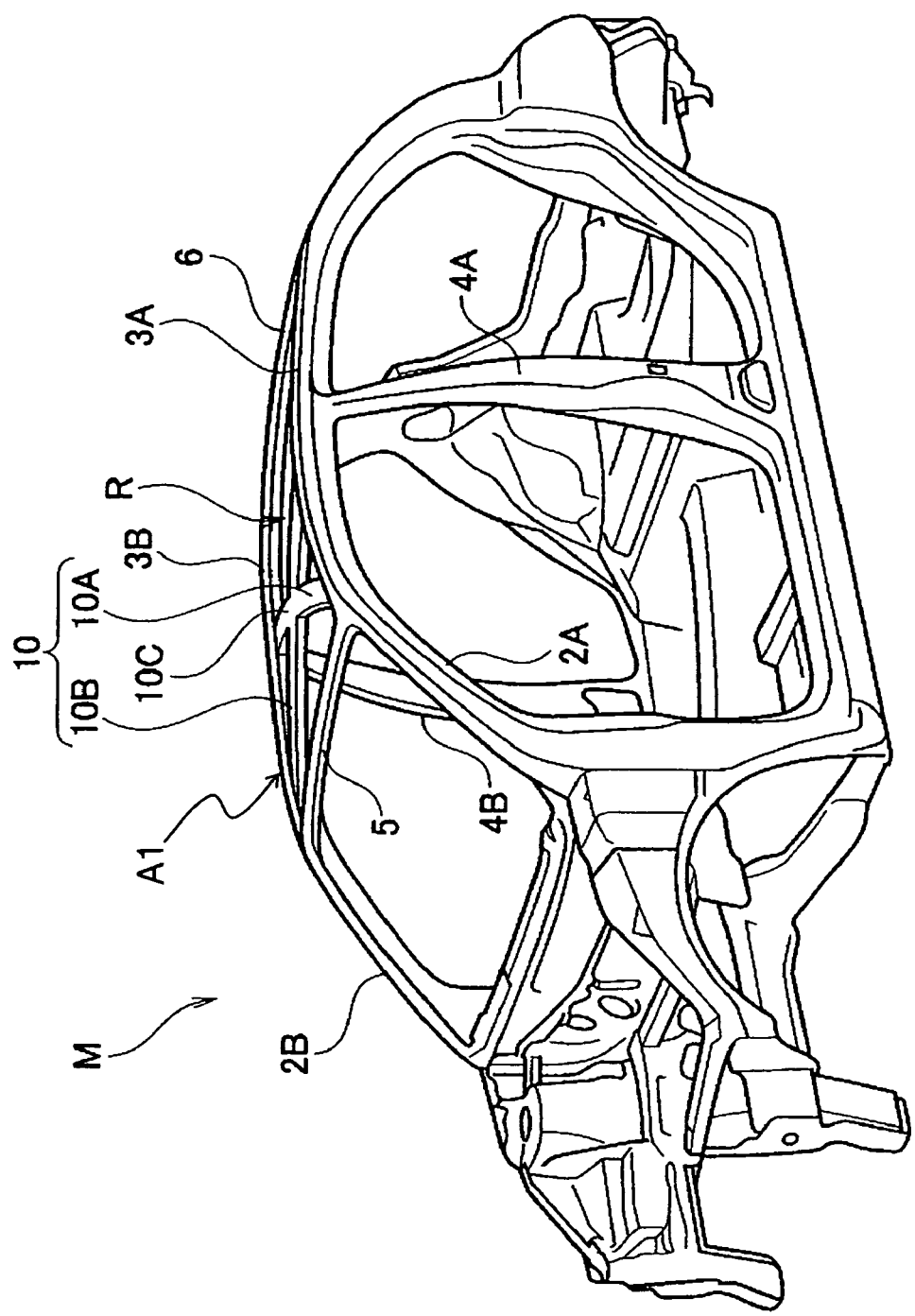
FIG. 2 is a front perspective view of a framework structure of the vehicle body in accordance with the first embodiment of the present invention.

Moreover, in the vehicle passenger restraining system of the first embodiment, the vehicle body of the vehicle M is provided with a top reinforcing member 10 in the roof R of the vehicle M. FIG. 2 is a front perspective view of a framework structure of the vehicle M in accordance with the first embodiment of the present invention. As seen in FIGS. 1 and 2, the top reinforcing member 10 is preferably provided in an impact region A1 where the roof R will contact the ground in a rollover event. The deformation sensor 20 is preferably mounted to the top reinforcing member 10.

Figure 3:
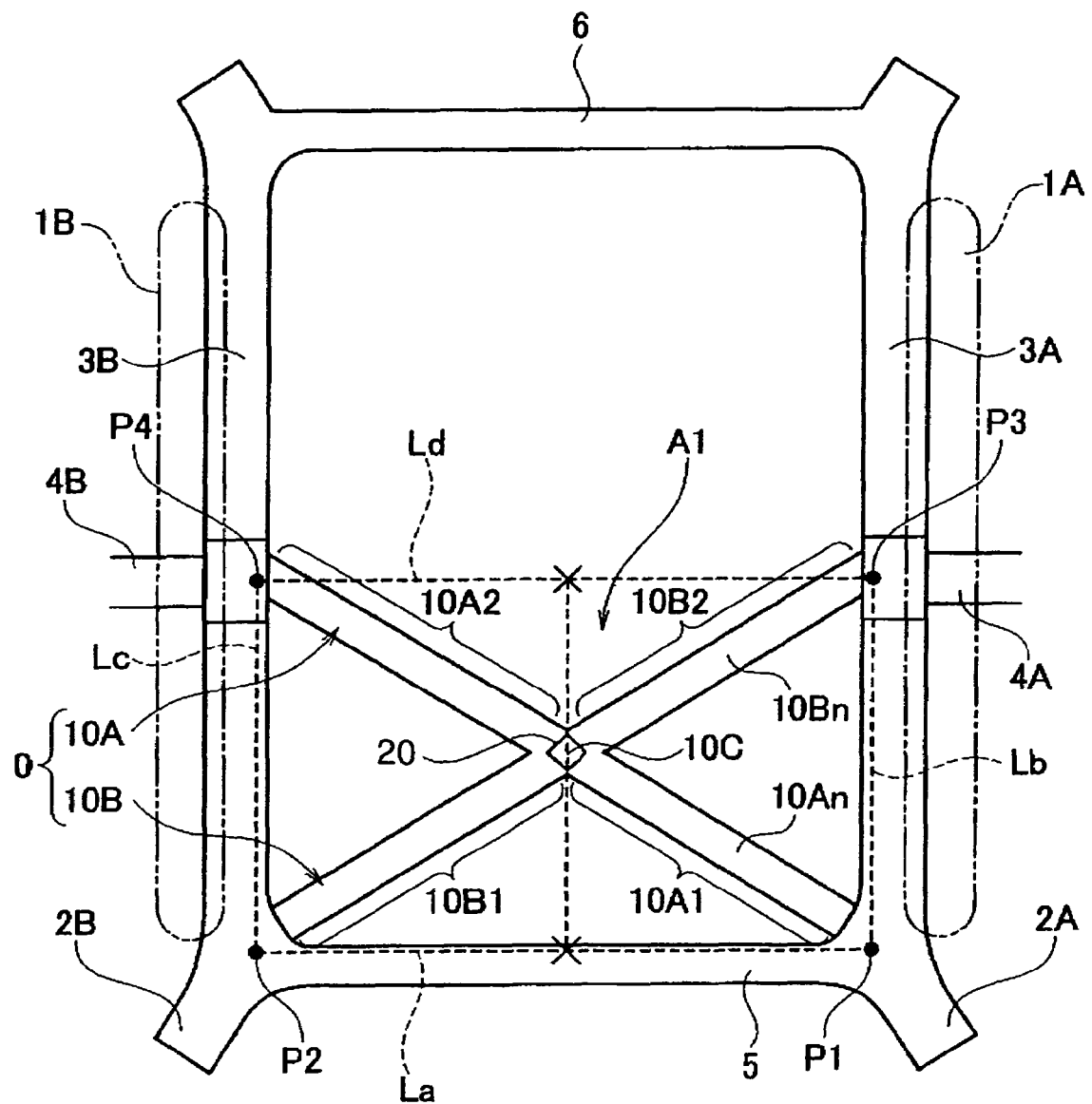
FIG. 3 is a top plan view of a roof structure of the vehicle body illustrating an arrangement of the deformation detecting device of the vehicle passenger restraining system in accordance with the first embodiment of the present invention.

FIG. 3 is a top plan view of the roof R of the vehicle M illustrating an arrangement of the top reinforcing member 10 and the deformation sensor 20 of the vehicle passenger restraining system in accordance with the first embodiment of the present invention. As shown in FIG. 3, the impact region A1 is defined as the area surrounded by the four straight line segments including a line segment La that connects a front left top portion P1 (upper end of a left front pillar 2A) of the top of the vehicle M to a front right top portion P2 (upper end of a right front pillar 2B) of the top of the vehicle M, a line segment Lb that connects the front left top portion P1 to an approximate longitudinal middle portion P3 (upper end of a left center pillar 4A) of the left edge (left roof side rail 3A) of the top of the vehicle M, a line segment Lc that connects the front right top portion P2 to an approximate longitudinal middle portion P4 (upper end of a right center pillar 4B) of the right edge (right roof side rail 3B) of the top of the vehicle M, and a line segment Ld that connects the left and right approximate longitudinal middle portions P3 and P4 together.

The left and right roof side rails 3A and 3B span between a front roof rail 5 and a rear roof rail 6 such that the left and right roof side rails 3A and 3B and the front and rear roof rails 5 and 6 form a roof framework that is generally rectangular in a top plan view as shown in FIG. 3.

As shown in FIGS. 2 and 3, the reinforcing member 10 comprises a first reinforcing frame 10A and a second reinforcing frame 10B. The first reinforcing frame 10A extends between the front left top portion P1 of the vehicle M and the approximate longitudinal middle portion P4 of the top right edge (the right roof side rail 3B) of the vehicle M. The second reinforcing frame 10B extends between the front right top portion P2 of the vehicle M and the approximate longitudinal middle portion P3 of the top left edge (the left roof side rail 3A) of the vehicle M. Thus, the first and second reinforcing frames 10A and 10B form an X-shaped structure arranged inside the impact region A1 that spans between the four corners (P1, P2, P3 and P4) of the impact region A1. The first and second reinforcing frames 10A and 10B are joined together at the portions where they intersect each other so that the resulting intersection joint section 10C is disposed in the approximate middle along the widthwise direction of the vehicle M as shown in FIG. 3.

More specifically, the first reinforcing frame 10A preferably comprises a first front frame part 10A1 disposed in a forward part thereof with respect to the vehicle M and a first rear frame part 10A2 disposed in a rearward part thereof with respect to the vehicle M. Likewise, the second reinforcing frame 10B preferably comprises a second front frame part 10B1 disposed in a forward part thereof with respect to the vehicle M and a second rear frame part 10B2 disposed in a rearward part thereof with respect to the vehicle M. In the first embodiment of the present invention, the first reinforcing member 10A is arranged so that a longitudinal axis of the first front frame part 10A1 and a longitudinal axis of the first rear frame part 10A2 form a substantially straight line as seen in FIG. 3. Likewise, the second reinforcing member 10B is arranged so that a longitudinal axis of the second front frame part 10B1 and a longitudinal axis of the second rear frame part 10B2 form a substantially straight line as seen in FIG. 3. The reinforcing member 10 of the first embodiment is arranged so that the intersection joint section 10C is disposed between the first front frame part 10A1 and the first rear frame part 10B1 of the first reinforcing member 10A, and between the second front frame part 10B1 and the second rear frame part 10B2 of the second reinforcing member 10B as shown in FIG. 3.

In the first embodiment of the present invention, the reinforcing member 10 is preferably arranged such that the bending strength of the intersection joint section 10C is larger than the bending strength of the standalone portions 10An and 10Bn of the first and second reinforcing frames 10A and 10B (i.e., the portions of the first and second reinforcing frames 10A and 10B that are disposed adjacent to the intersection joint section 10C). The deformation sensor 20 is mounted to the intersection joint section 10C. Thus, in this embodiment of the present invention, a top sensor mounting portion in which the deformation sensor 20 is disposed is formed on in the intersection joint section 10C.

Figure 4:
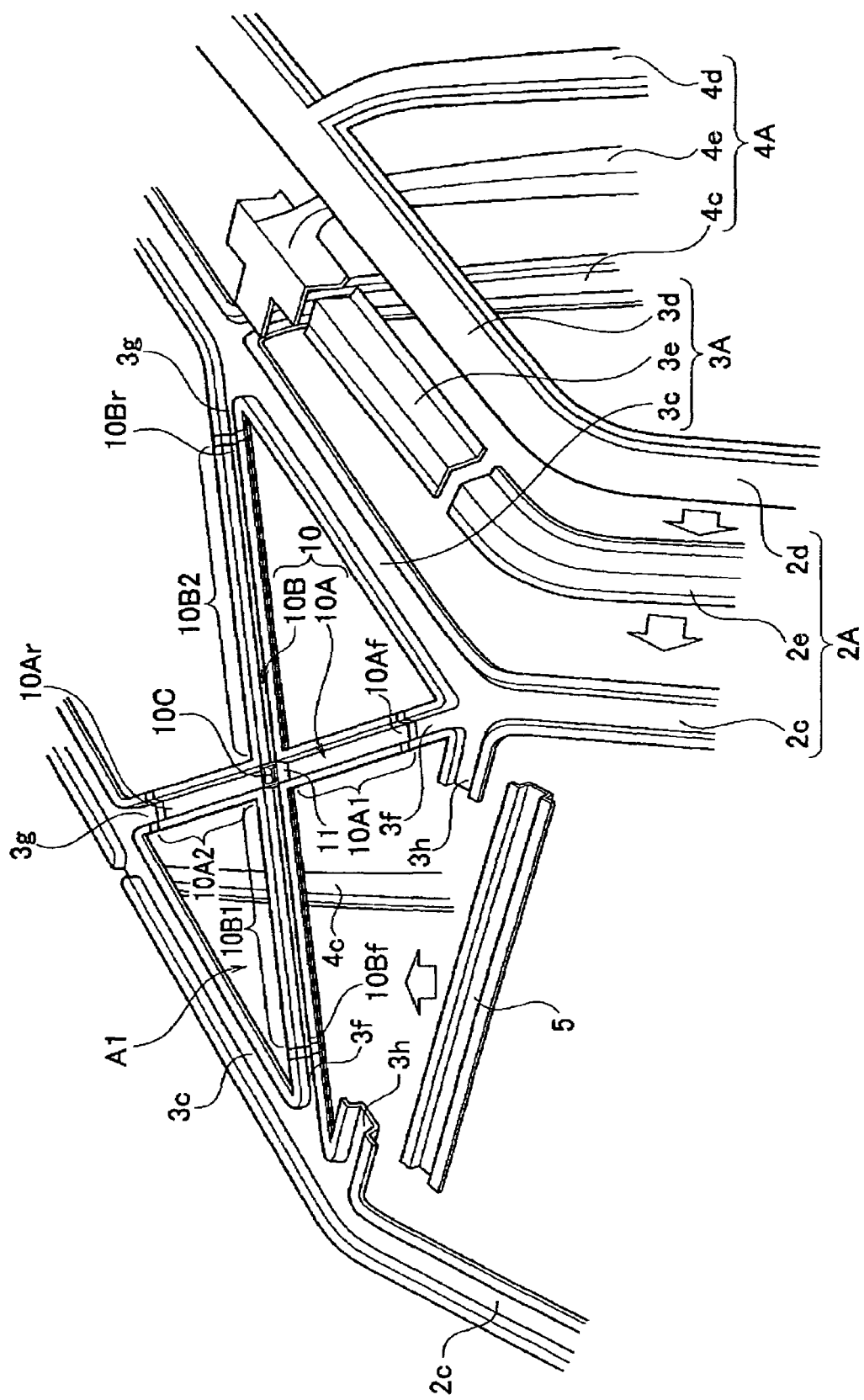
FIG. 4 is an enlarged, partial exploded top perspective view of the framework structure in the vicinity of the roof structure of the vehicle body in accordance with the first embodiment of the present invention.

FIG. 4 is an enlarged, partial exploded top perspective view of the framework structure in the vicinity of the impact region A1 of the roof R in accordance with the first embodiment of the present invention. More specifically, FIG. 4 illustrates the structure of the perimeter of the roof R of the vehicle M including the connecting portions between the first and second reinforcing frames 10A and 10B and the left and right front pillars 2A and 2B (only the left front pillar 2A is shown in FIG. 4), and the connecting portions between the first and second reinforcing frames 10A and 10B and the left and right center pillars 4A and 4B (only the left center pillar 4A is shown in FIG. 4). The left side of the structure of the perimeter of the roof R is explained referring to FIG. 4.

Figure 5:
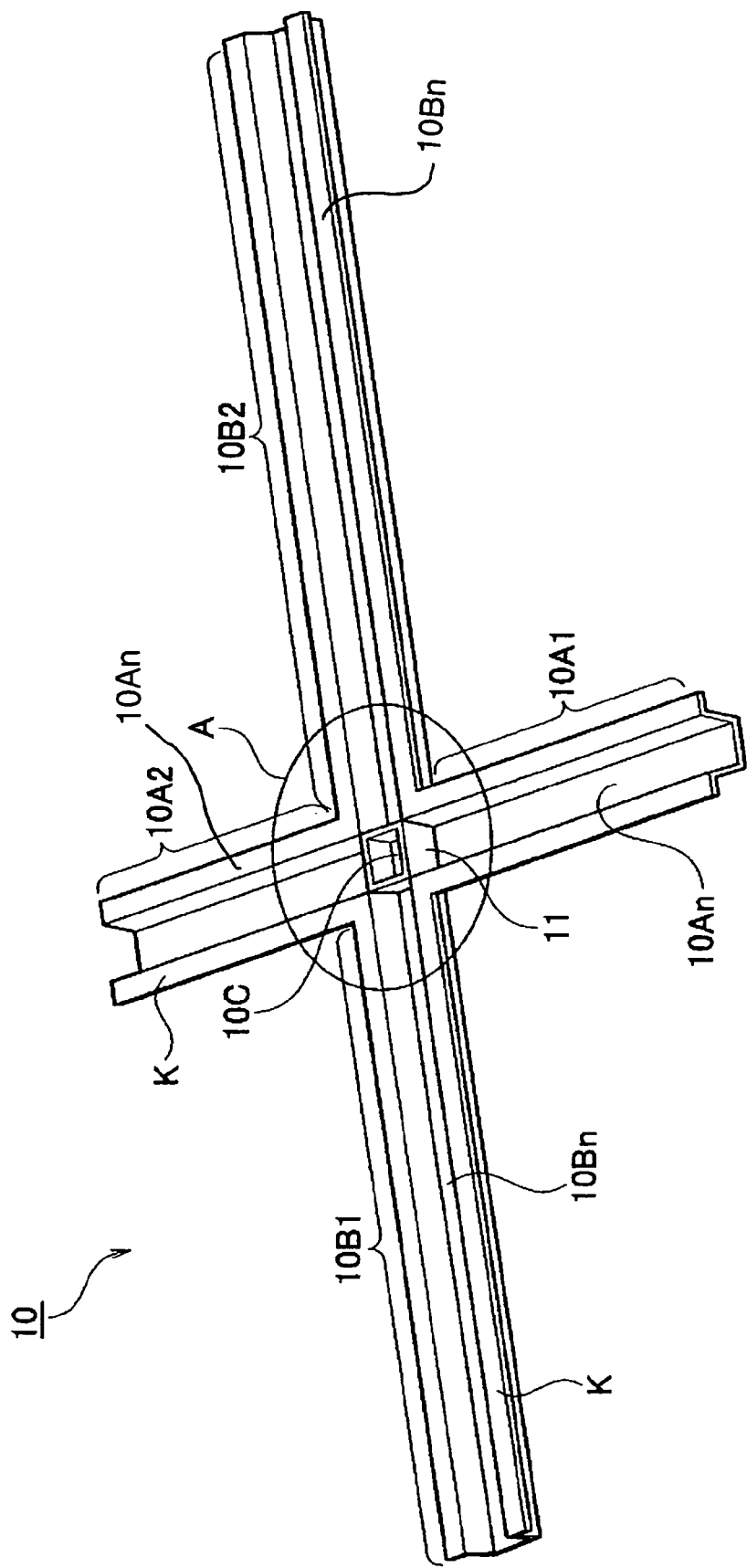
FIG. 5 is an enlarged partial top perspective view of a reinforcing member of the vehicle passenger restraining system in accordance with the first embodiment of the present invention.

The first and second reinforcing frames 10A and 10B preferably have inverted hat-shaped cross sectional shapes (that protrude downward), as also shown in FIG. 5. Each of the left front pillar 2A and the left center pillar 4A preferably has a three layered structure. More specifically, the left front pillar 2A preferably comprises a pillar inner section 2c, a pillar outer section 2d, and a pillar reinforcement section 2e arranged between the pillar inner section 2c and the pillar outer section 2d as shown in FIG. 4. Likewise, the left center pillar 4A preferably comprises a pillar inner section 4c, a pillar outer section 4d and a pillar reinforcement section 4e arranged between the pillar inner section 4c and the pillar outer section 4d as shown in FIG. 4. Moreover, the left side rail 3A also preferably has a three-layered structure comprising a roof side rail inner section 3c, a roof side rail outer section 3d, and a roof side rail reinforcement section 3e arranged between the roof side rail inner section 3c and the roof side rail outer section 3d as shown in FIG. 4.

A front pillar connecting part 3f oriented in a direction extending from the upper end of the pillar inner section 2c of the front pillar 2A toward the inner middle portion of the impact region A1 of the roof R is provided on the front end of the roof side rail inner section 3c. A center pillar connecting part 3g oriented in a direction extending from the upper end of the pillar inner section 4c of the center pillar 4A toward the inner middle portion of the impact region A1 of the roof R is provided on a longitudinal middle portion of the roof side rail inner section 3c.

The right side of the roof R has substantially identical structure as the left side of the roof R, except for the structure of the right side of the roof R being a mirror image of the structure of the left side of the roof R. In other words, each of the right front pillar 2B, the right center pillar 4B and the right roof side rail 3B has a three-layered structure, and the roof side rail inner section 3c of the right roof side rail 3B is provided with the front pillar connecting part 3f and the center pillar connecting part 3g.

On the left side of the roof R, a front end 10Af of the first reinforcing frame 10A is fitted together with the left front pillar connecting part 3f and fixedly coupled thereto with a lap joint and a rear end 10Br of the second reinforcing frame 10B is fitted together with the left center pillar connecting part 3g and fixedly coupled thereto with a lap joint.

A front roof rail connecting part 3h oriented inwardly in the widthwise direction of the vehicle is provided on the front end of each roof side rail inner section 3c to branch from the front pillar connecting part 3f and longitudinal end portions of the front roof rail 5 are joined to the left and right front roof rail connecting parts 3h. The rear roof rail 6 is also connected to the roof side rails 3A and 3B using a similar structure to that used to connect the front roof rail 5 although not shown in FIG. 4.

The perimeter structure of the right side of the roof R is the same as the left side. More specifically, a front end 10Bf of the second reinforcing frame 10B is fitted together with the right front pillar connecting part 3f and fixedly coupled thereto with a lap joint and a rear end 10Ar of the first reinforcing frame 10A is fitted together with the right center pillar connecting part 3g and fixedly coupled thereto with a lap joint.

The upwardly open sides of the first and second reinforcing frames 10A and 10B, the front and rear roof rails 5 and 6, and the connecting parts 3f, 3g and 3h of the roof side rails 3A and 3B are provided with flanges K that form the brims of the inverted hat-shaped cross sectional shapes thereof. A roof panel (not shown in FIG. 4) is joined to the flanges K and to form a closed cross section between the roof panel and the first and second reinforcing frames 10A and 10B, the front and rear roof rails 5 and 6, and the connecting parts 3f, 3g and 3h of the roof side rails 3A and 3B.

FIG. 5 is an enlarged front perspective view of the reinforcing member 10 in accordance with the first embodiment of the present invention. As shown in FIG. 5, the intersection joint section 10C of the first and second reinforcement frames 10A and 10B preferably has a rectangular or diamond shape due to the intersection of the inverted hat-shaped cross sections of the first and second reinforcing frames 10A and 10B. A rectangular or diamond-shaped reinforcing rib 11 is coupled to the intersecting joint section 10C to form an enclosure along the internal shape of the intersecting joint section 10C. As a result of the reinforcing rib 11, the bending strength of the intersection joint section 10C is larger than the bending strength of the standalone portions 10An and 10Bn of the first and second reinforcing frames 10A and 10B that are adjacent to the intersection joint section 10C.

Figure 6:
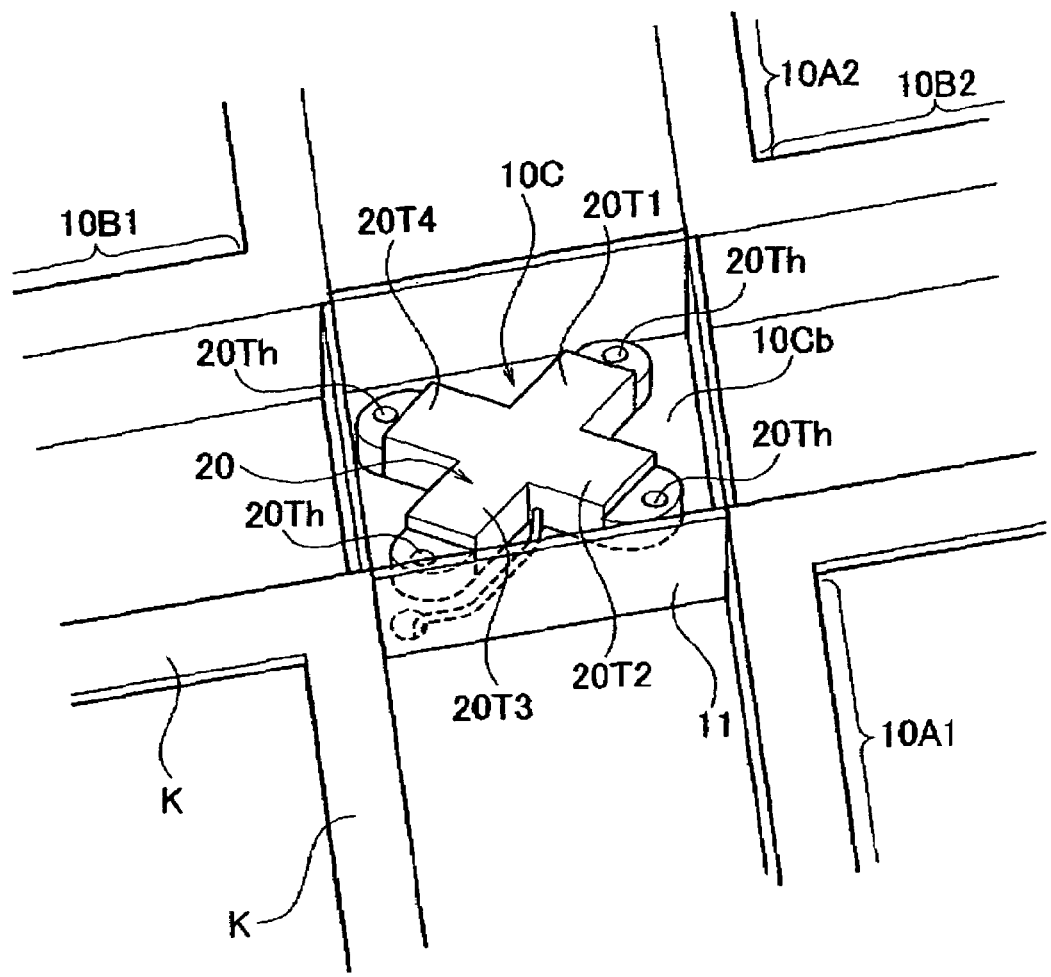
FIG. 6 is an enlarged partial top perspective view of the reinforcing member illustrating the encircled portion A shown in FIG. 5 in accordance with the first embodiment of the present invention.
Figure 7:
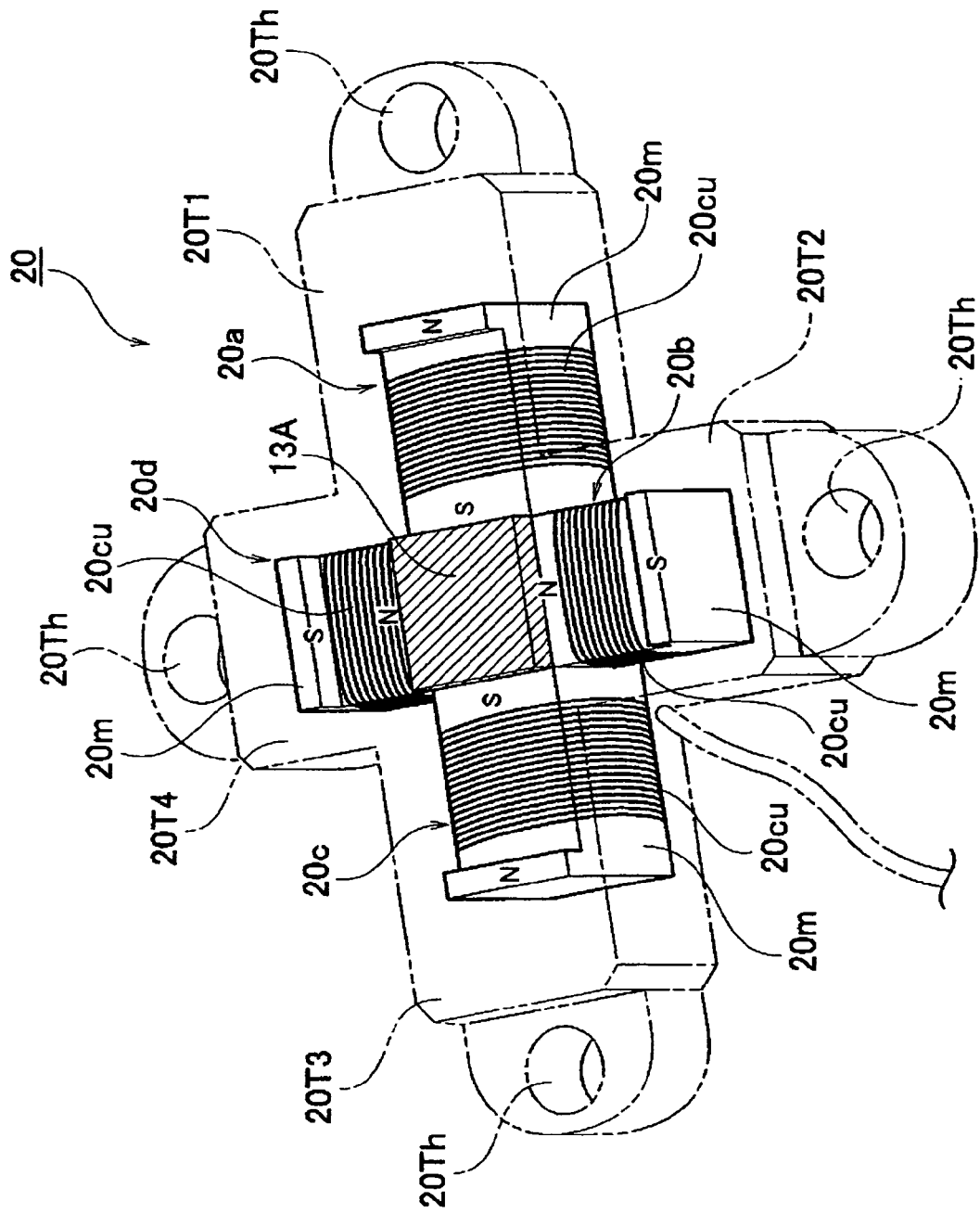
FIG. 7 is an enlarged perspective view of an internal structure of the deformation detecting device of the vehicle passenger restraining system in accordance with the first embodiment of the present invention.

FIG. 6 is a partial, enlarged top perspective view of the reinforcing member 10 with the deformation sensor 20 illustrating the encircled portion A shown in FIG. 5. FIG. 7 is an enlarged perspective view of an internal structure of the deformation sensor 20 of the first embodiment of the present invention. The deformation sensor 20 is generally plus-shaped (cross-shaped) with four protruding parts 20T1 to 20T4 as shown in FIGS. 6 and 7. Four deformation detecting sections 20a to 20d are housed inside the protruding parts 20T1 to 20T4, respectively, as shown in FIG. 7.

A mounting hole 20Th is formed on the tip of each of the protruding parts 20T1 to 20T4. The deformation sensor 20 is mounted to a bottom plate portion 10Cb inside the rectangular reinforcing rib 11 provided inside the intersection joint section 10C, as shown in FIG. 6, using bolts (not shown) that are passed through the mounting holes 20Th.

Figure 8:
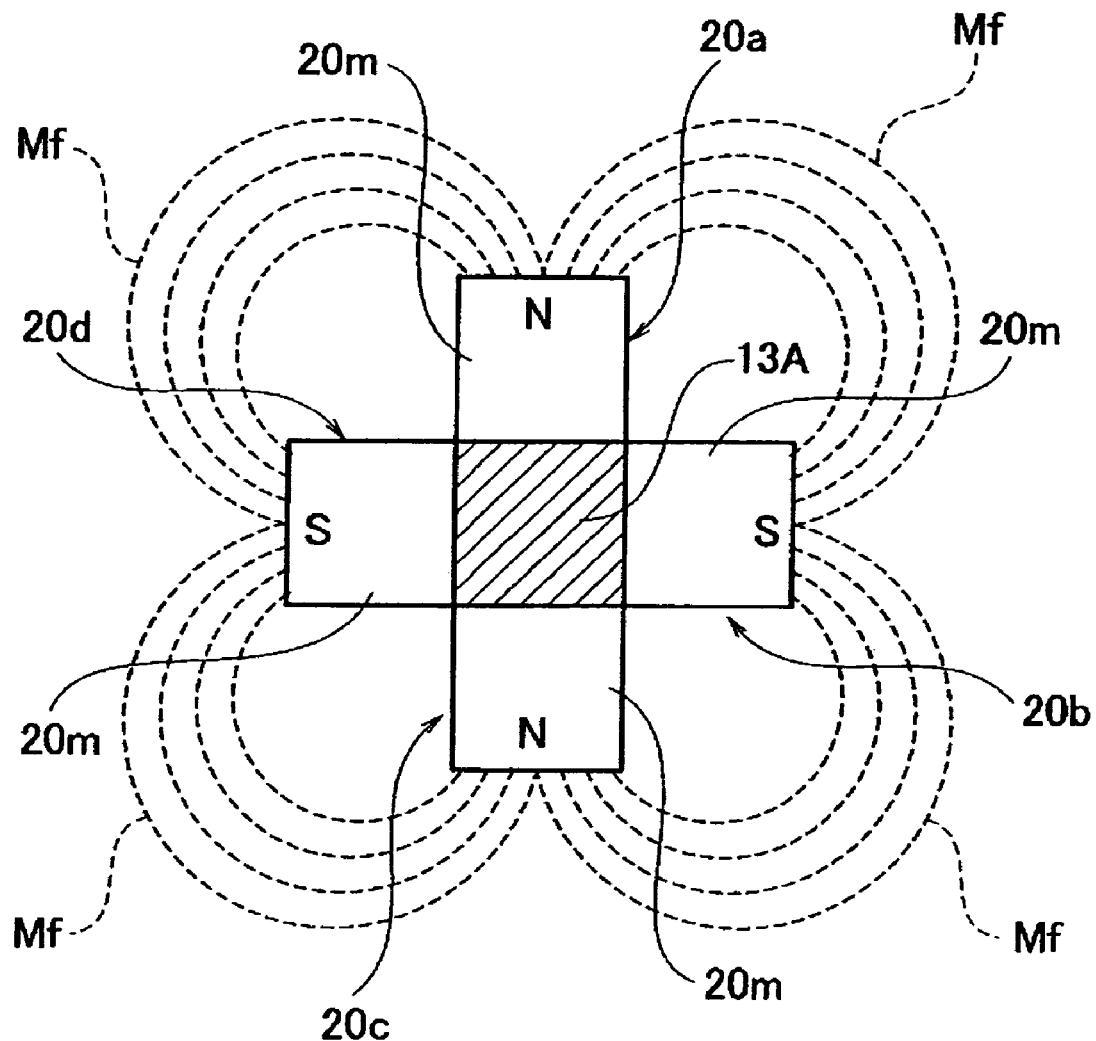
FIG. 8 is a diagrammatic top plan view of a magnetic field generated in the deformation detecting device of the vehicle passenger restraining system in accordance with the first embodiment of the present invention.

The first to fourth deformation detecting sections 20a to 20d each comprises a generally rectangular magnetic body 20m and a copper wire 20cu wound around the magnetic body 20m. FIG. 8 is a diagrammatic top plan view of a magnetic field generated in the deformation sensor 20 of the vehicle passenger restraining system in accordance with the first embodiment of the present invention. Each of the deformation detecting sections 20a to 20d is configured to output a voltage value resulting from changes in a magnetic field Mf generated as shown in FIG. 8. The deformation sensor 20 with the deformation detecting sections 20a to 20d is arranged as a stress/strain sensor that is configured and arranged to detect changes in stress/strain resulting from deformation of the reinforcing member 10.

The magnetic bodies 20m of the first to fourth deformation detecting sections 20a to 20d preferably all have the same cross sectional shape and the same dimensions. Also, the number of windings of the copper wire 20cu is the same for all four deformation detecting sections 20a to 20d.

As shown in FIG. 7, a non-magnetic body 13A is arranged in the center of the plus-shaped arrangement of the deformation detecting sections 20a to 20d to prevent interference between the magnetic fields Mf As shown in FIG. 8, the magnetic bodies 20m of the first to fourth deformation detecting sections 20a to 20d are arranged such that the north and south poles of adjacent magnetic bodies 20m are oriented in the opposite direction relative to the center of the deformation sensor 20. As a result, each of the deformation detecting sections 20a to 20d generates an independent magnetic field Mf with adjacent ones of the deformation detecting sections 20a to 20d.

The deformation sensor 20 is oriented so that a straight line joining tip portions of the first deformation detecting section 20a and the second deformation detecting section 20b is substantially perpendicular to the longitudinal axis of the rear frame part 10B2 of the second reinforcing frame 10B, a straight line joining tip portions of the second deformation detecting section 20b and the third deformation detecting section 20c is substantially perpendicular to the longitudinal axis of the front frame part 10A1 of the first reinforcing frame 10A, a straight line joining tip portions of the third deformation detecting section 20c and the fourth deformation detecting section 20d is substantially perpendicular to the longitudinally axis of the front frame part 10B1 of the second reinforcing frame 10B, and a straight line joining tip portions of the fourth deformation detecting section 20d and the first deformation detecting section 20a is substantially perpendicular to the longitudinal axis of the rear frame part 10A2 of the first reinforcing frame 10A.

Figure 9:
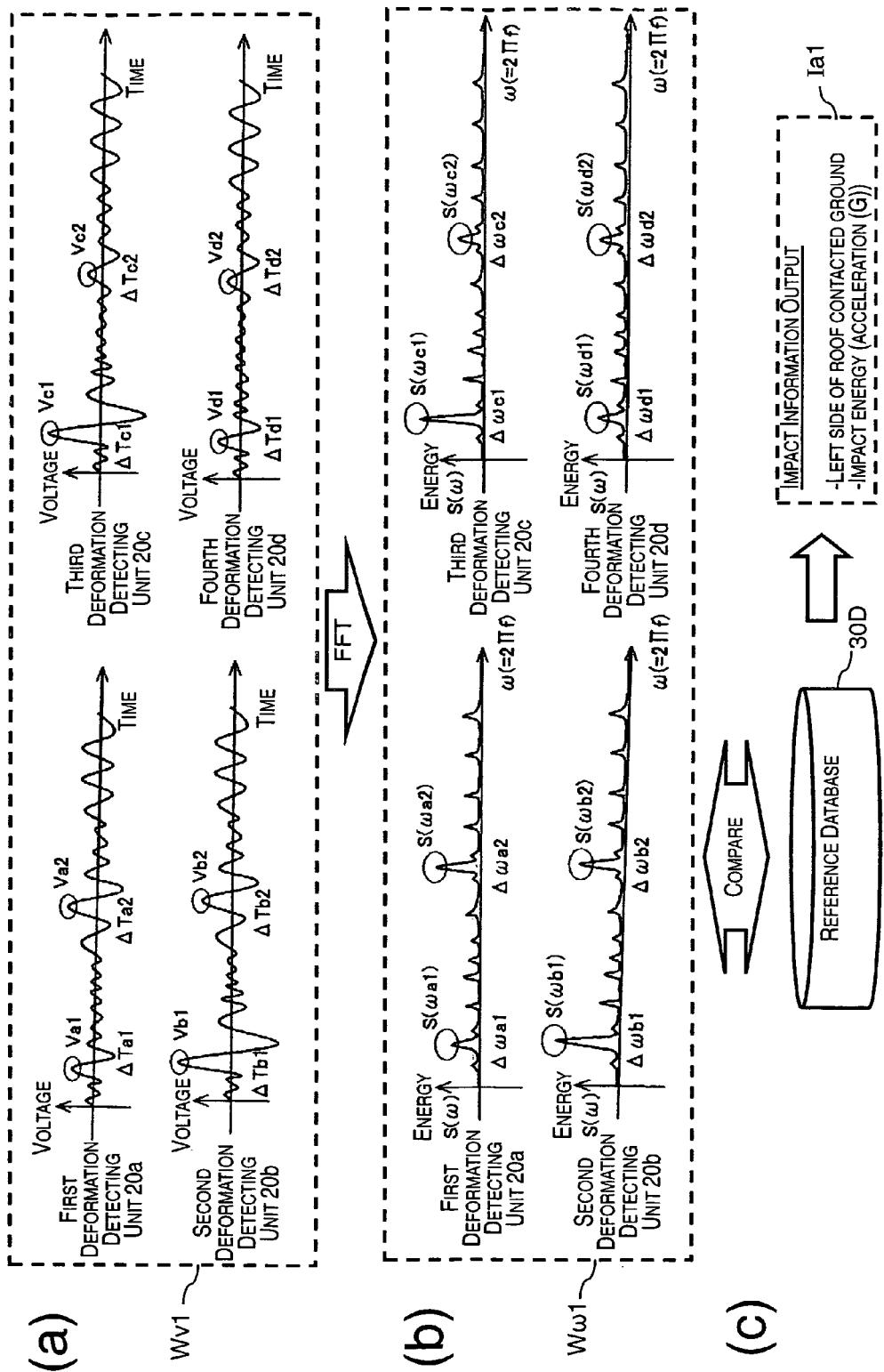
FIG. 9 is a series of diagrams (a) to (c) illustrating voltage waveforms issued from the deformation detecting device of the vehicle passenger restraining system in a case where a vehicle rolls over and makes initial contact with the ground on a left side of the roof (diagram (a)), signal waveforms that result when the voltage waveforms shown in the diagram (a) are processed with a fast Fourier transform (diagram (b)), and database used to obtain impact information based on the signal waveforms shown in diagram (b) obtained from the fast Fourier transform (diagram (c)) in accordance with the first embodiment of the present invention.
Figure 10:
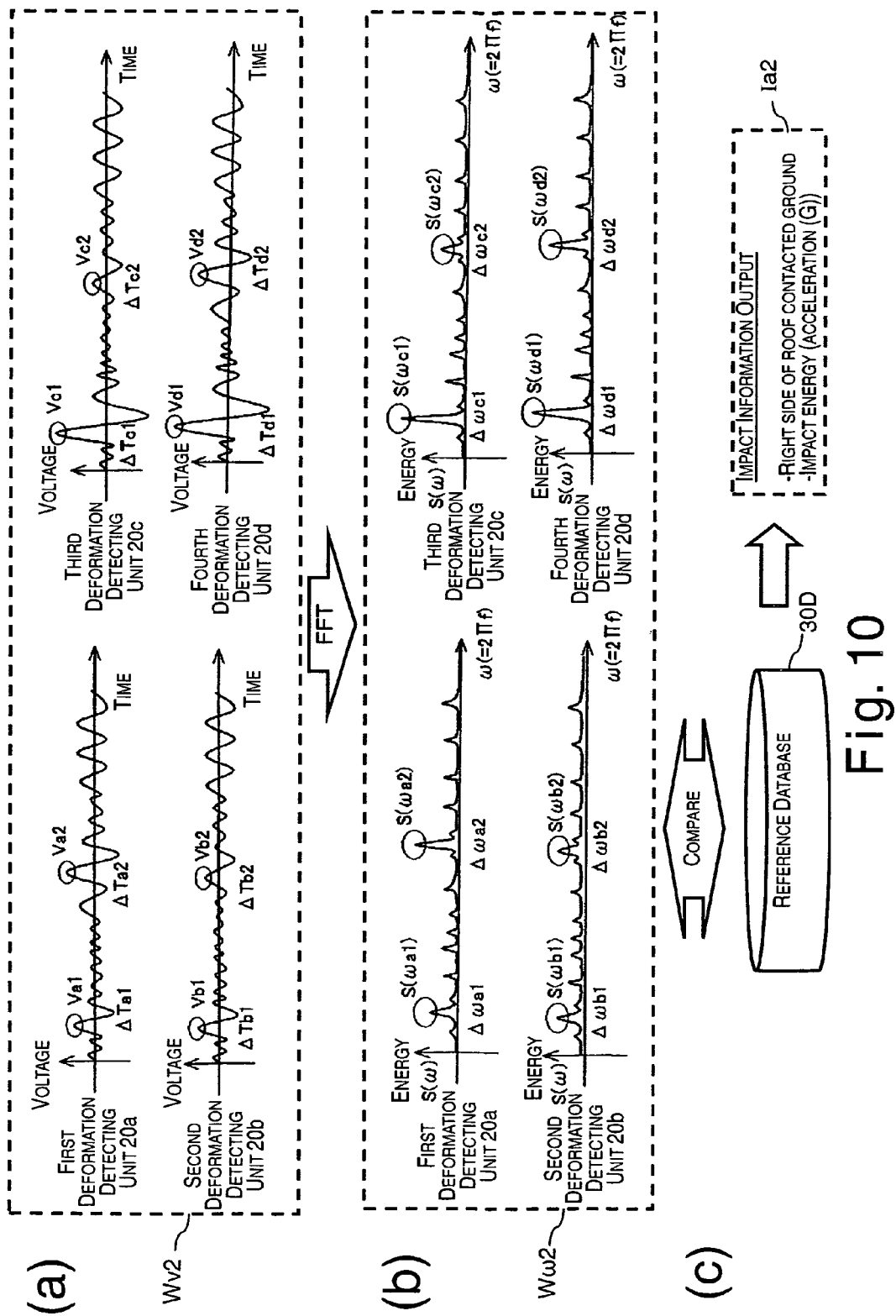
FIG. 10 is a series of diagrams (a) to (c) illustrating voltage waveforms issued from the deformation detecting device of the vehicle passenger restraining system in a case where the vehicle rolls over and makes initial contact with the ground on the right side of the roof (diagram (a)), signal waveforms that result when the voltage waveforms shown in the diagram (a) are processed with a fast Fourier transform (diagram (b)), and database used to obtain impact information based on the signal waveforms shown in diagram (b) obtained from the fast Fourier transform (diagram (c)) in accordance with the first embodiment of the present invention.
Figure 11:
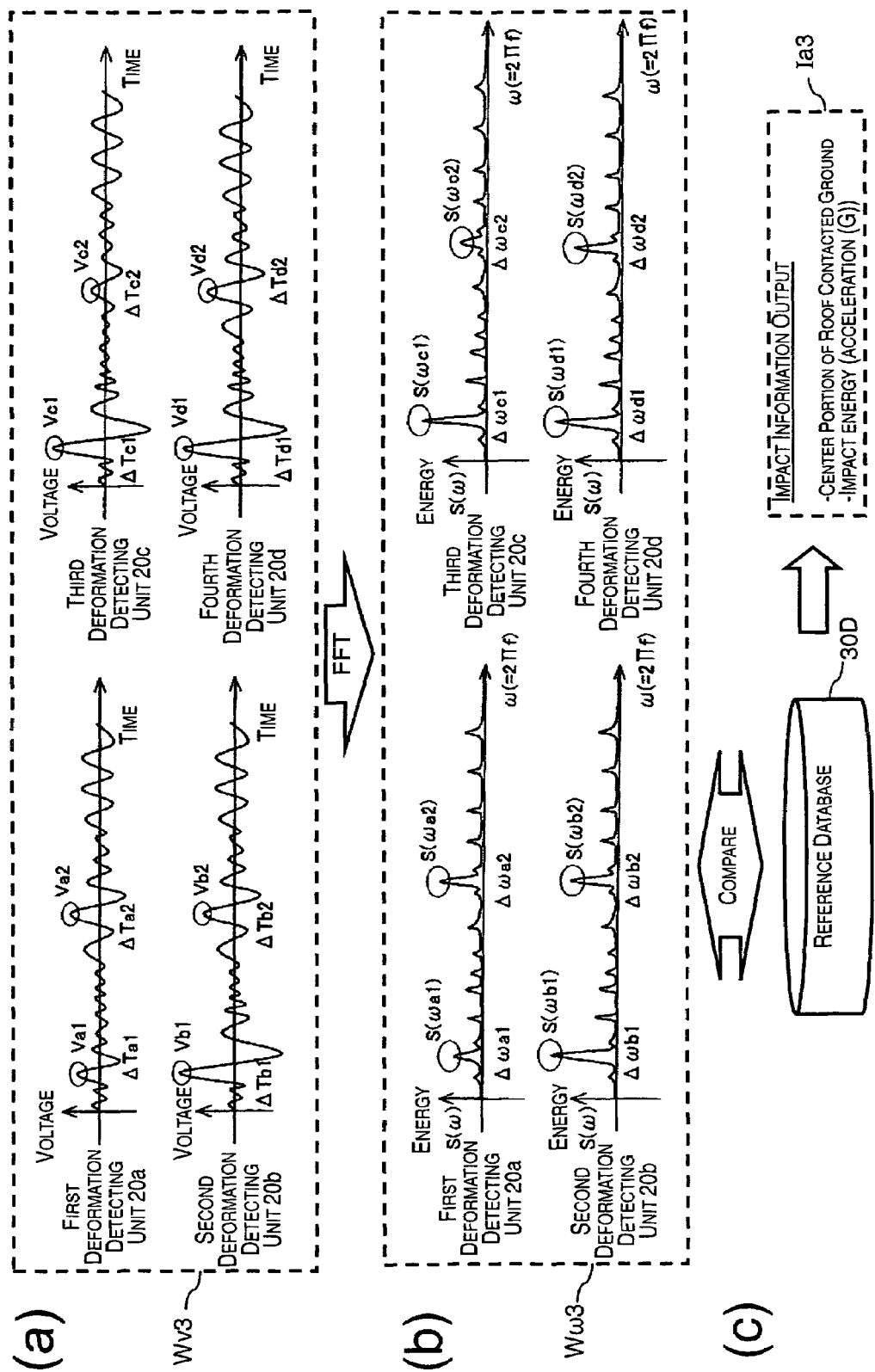
FIG. 11 is a series of diagrams (a) to (c) illustrating voltage waveforms issued from the deformation detecting device of the vehicle passenger restraining system in a case where the vehicle rolls over and makes initial contact with the ground on a central portion of the roof (diagram (a)), signal waveforms that result when the voltage waveforms shown in the diagram (a) are processed with a fast Fourier transform (diagram (b)), and database used to obtain impact information based on the signal waveforms shown in diagram (b) obtained from the fast Fourier transform (diagram (c)) in accordance with the first embodiment of the present invention.

Thus, when the vehicle M rolls over and the roof R contacts the ground such that the first and/or second reinforcing frame 10A and 10B undergoes a localized deformation, the deformation is detected by the deformation sensor 20 and voltage signals are outputted from the first to fourth deformation detecting sections 20a to 20d. FIGS. 9 to 11 illustrate the distinctive characteristics of the signal waveforms issued from the deformation sensor 20 in a rollover event in which the left side of the roof R makes the initial contact with the ground (FIG. 9), a rollover event in which the right side of the roof R makes the initial contact with the ground (FIG. 10), and a rollover event in which the approximate center of the roof R makes the initial contact with the ground (FIG. 11).

The controller 30 is configured determine impact information including an impact location where the roof R of the vehicle M first contacts on the ground and an impact acceleration during the rollover event. More specifically, according to the control algorithm in the first embodiment of the present invention, the controller 30 is configured to process the output signals from the first to fourth deformation detecting sections 20a to 20d of the deformation sensor 20 using a fast Fourier transform (FFT) to obtain the signal waveforms, and search the reference database 30D stored in the controller 30 using the signal waveforms to determine the impact information. The impact location of the impact information is used to select one or both of the curtain air bag 1A and the curtain air bag 1B to be initially operated to restrain the passenger, and the impact acceleration of the impact information is used to control the operation of the selected one or both of the curtain air bag 1A and the curtain air bag 1B.

FIG. 9 illustrates a first case where the vehicle M rolls over and makes initial contact with the ground on a left side of the roof R. The diagrams (a) of FIG. 9 shows voltage waveforms Wv1 issued from the first to fourth deformation detecting sections 20a to 20d of the deformation sensor 20. As seen in the diagram (a) of FIG. 9, the signal issued from the first deformation detecting section 20a has a first peak voltage Va1 at a time $\Delta$Ta1 and a second peak voltage Va2 at a time $\Delta$Ta2. The signal issued from the second deformation detecting section 20b has a first peak voltage Vb1 at a time $\Delta$Tb1 and a second peak voltage Vb2 at a time $\Delta$Tb2. The signal issued from the third deformation detecting section 20c has a first peak voltage Vc1 at a time $\Delta$Tc1 and a second peak voltage Vc2 at a time $\Delta$Tc2. The signal issued from the fourth deformation detecting section 20d has a first peak voltage Vd1 at a time $\Delta$Td1 and a second peak voltage Vd2 at a time $\Delta$Td2.

The diagram (b) of FIG. 9 shows signal waveforms W$\omega$1 that result when the voltage waveforms from the first to fourth deformation detecting sections 20a to 20d shown in the diagram (a) are processed with fast Fourier transform (FFT). The transformed signal of the first deformation detecting section 20a has a first peak energy S($\omega$a1) at a frequency $\Delta\omega$a1 and a second peak energy S($\omega$a2) at a frequency $\Delta\omega$a2. The transformed signal of the second deformation detecting section 20b has a first peak energy S($\omega$b1) at a frequency $\Delta\omega$b1 and a second peak energy S($\omega$b2) at a frequency $\Delta\omega$b2. The transformed signal of the third deformation detecting section 20c has a first peak energy S($\omega$c1) at a frequency $\Delta\omega$c1 and a second peak energy S($\omega$c2) at a frequency $\Delta\omega$c2. The transformed signal of the fourth deformation detecting section 20d has a first peak energy S($\omega$d1) at a frequency $\Delta\omega$d1 and a second peak energy S($\omega$d2) at a frequency $\Delta\omega$d2.

As shown in the diagram (c) of FIG. 9, the controller 30 is configured to compare the FFT processed waveforms W$\omega$1 with the prestored reference database 30D to output the impact information Ia1 including the impact location indicative of the left side of the roof contacted (impacted) the ground and the impact acceleration indicative of the energy (acceleration) of the roof impact.

FIG. 10 illustrates a second case in which the vehicle M rolls over and makes initial contact with the ground on the right side of the roof R. The diagram (a) of FIG. 10 shows voltage waveforms Wv2 issued from the first to fourth deformation detecting sections 20a to 20d of the deformation sensor 20. The diagram (b) of FIG. 10 shows the signal waveforms W$\omega$2 that result when the signal waveforms Wv2 of the first to fourth deformation detecting sections 20a to 20d are processed with the fast Fourier transform.

Since the distinctive characteristics (e.g., the occurrences of the first and second peak voltages) of the voltage waveforms Wv2 issued from the first to fourth deformation detecting sections 20a to 20d are similar to the voltage waveforms Wv1 illustrated in the diagram (a) of FIG. 9, except for the specific voltage values at the peak voltages, detail explanations thereof are omitted herein for the sake of brevity. Likewise, since the distinctive characteristics (e.g. the occurrences of the first and second peak energies) of the transformed signal waveforms W$\omega$2 is similar to the transformed signal waveforms W$\omega$1 illustrated in the diagram (b) of FIG. 9, except for the specific values of the peak energies, detail explanations thereof are omitted herein for the sake of brevity.

As shown in the diagram (c) of FIG. 10, the FFT processed waveforms W$\omega$2 are compared to the prestored reference database 30D to output impact information Ia2 including the impact location indicative of the right side of the roof R contacted (impacted) the ground and the impact acceleration indicative of the energy (acceleration) of the roof impact.

FIG. 11 illustrates a third case in which the vehicle M rolls over and makes initial contact with the ground on central portion of the roof R. The diagram (a) of FIG. 11 shows voltage waveforms Wv3 issued from the first to fourth deformation detecting sections 20a to 20d of the deformation sensor 20. The diagram (b) of FIG. 11 shows signal waveforms W$\omega$3 that result when the signal waveforms Wv3 of the first to fourth deformation detecting sections 20a to 20d are processed with the fast Fourier transform.

Since the distinctive characteristics (e.g., the occurrences of the first and second peak voltages) of the voltage waveforms Wv3 issued from the first to fourth deformation detecting sections 20a to 20d are similar to the voltage waveforms Wv1 illustrated in the diagram (a) of FIG. 9, except for the specific voltage values at the peak voltages, detail explanations thereof are omitted herein for the sake of brevity. Likewise, since the distinctive characteristics (e.g. the occurrences of the first and second peak energies) of the transformed signal waveforms W$\omega$3 is similar to the transformed signal waveforms W$\omega$1 illustrated in the diagram (b) of FIG. 9, except for the specific values of the peak energies, detail explanations thereof are omitted herein for the sake of brevity.

As shown in the diagram (c) of FIG. 11, the FFT processed waveforms W$\omega$3 are compared to the prestored reference database 30D to output impact information Ia3 including the impact location indicative of the center portion of the roof R contacted (impacted) the ground and the impact acceleration indicative of the energy (acceleration) of the roof impact.

Figure 12A:
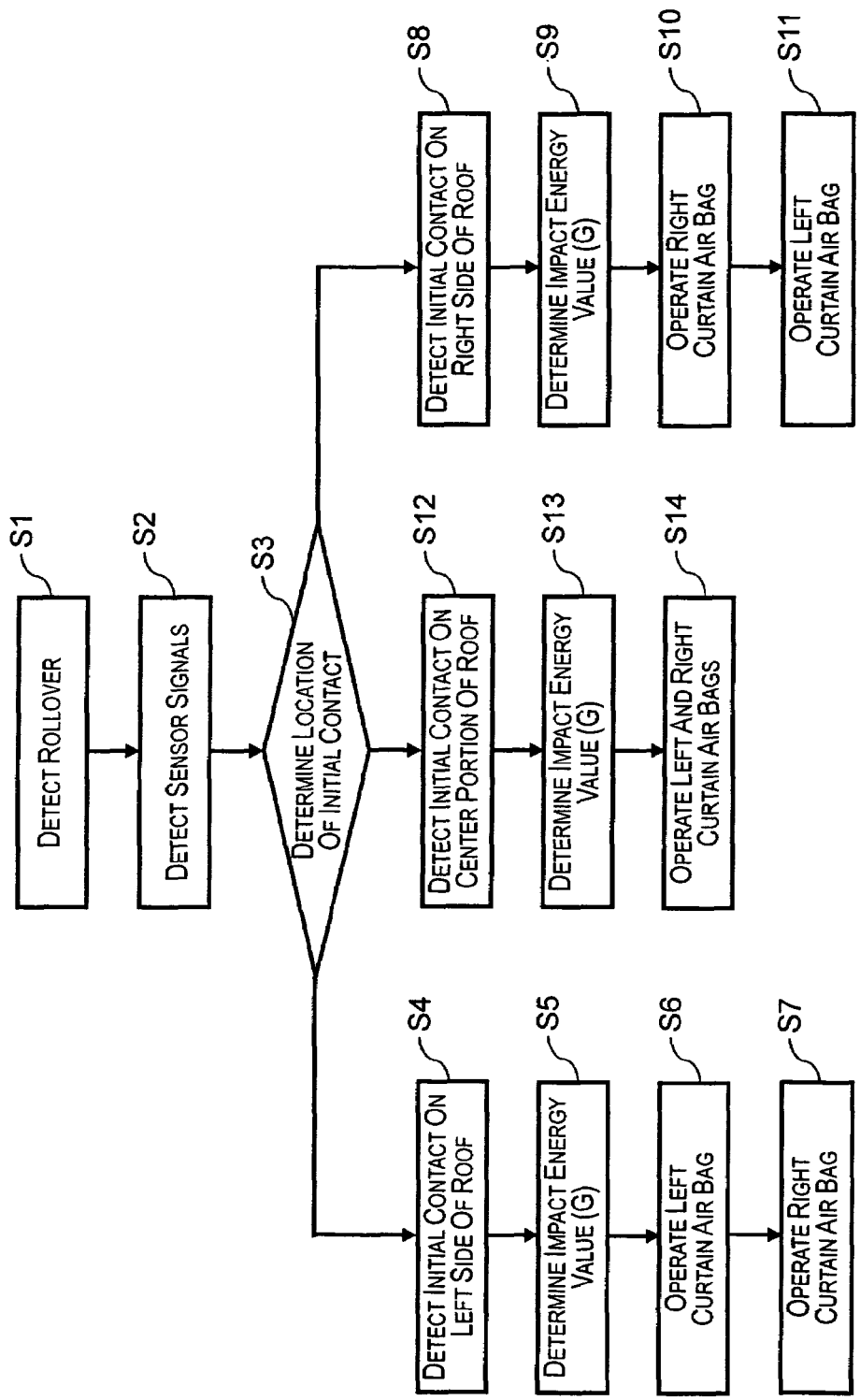
FIG. 12(A) is a flowchart illustrating a control algorithm for controlling from detection of a rollover event to operation of the passenger restraining devices executed in the vehicle passenger restraining system in accordance with the first embodiment of the present invention.

Thus, by reading the voltage signal waveforms Wv1, Wv2 or Wv3 outputted from the first to fourth deformation detecting sections 20a to 20d and obtaining the impact information Ia1, Ia2 or Ia3 from the FFT processed signal waveforms W$\omega$1, W$\omega$2 or W$\omega$3 using the prestored reference database 30D, the vehicle passenger restraining system can detect the portion (location) of the roof R that makes the initial contact with the ground during a rollover event. In the first embodiment of the present invention, the vehicle passenger restraining system is then configured to selectively initially operate/deploy one or both of the left curtain air bag 1A and the right curtain air bag 1B (i.e., operate a specific curtain air bag or air bags among a plurality of curtain air bags) in accordance with the impact location by following the control algorithm shown in FIG. 12(A). FIG. 12(A) is a flowchart illustrating a control algorithm for controlling from detection of a rollover event to operation of the passenger restraining devices executed in the vehicle passenger restraining system in accordance with the first embodiment of the present invention.

More specifically, in step S1 of the algorithm, the controller 30 is configured to detect a rollover situation through the rollover detecting sensor 31. When the roof R contacts the ground during the rollover event, in step S2 the controller 30 is configured to detect the voltage signals outputted from the first to fourth deformation detecting sections 20a to 20d of the deformation sensor 20.

In step S3, the controller 30 is configured to determine the initial contact location based on the impact information Ia1, Ia2 or Ia3 obtained from the FFT processing and the comparison with the prestored reference database 30D. If the controller 30 determines in step S3 that the initial contact occurred on the left side of the roof, the controller 30 proceeds to step S4, and then, to step S5 to determine the impact energy (acceleration G) based on the information in the reference database 30D. Then, in step S6, the controller 30 is configured to operate/deploy the left curtain air bag 1A (i.e., the curtain air bag on the side where the initial impact occurred) in accordance with the impact energy. The controller 30 is then configured to proceed to step S7 where the controller 30 is configured to operate/deploy the right curtain air bag 1B (i.e., the curtain air bag on the other side) after waiting for a prescribed amount of time.

Meanwhile, if the controller 30 determines in step S3 that the initial contact occurred on the right side of the roof, the controller 30 proceeds to step S8, and then to step S9 to determine the impact energy (acceleration G) based on the information in the reference database 30D. Then, in step S10, the controller 30 is configured to operate/deploy the right curtain air bag 1B (i.e., the curtain air bag on the side where the initial impact occurred) in accordance with the impact energy. The controller 30 is then configured to proceed to step S11 where the controller 30 is configured to operate/deploy the left curtain air bag 1A (i.e., the curtain air bag on the other side) after waiting for a prescribed amount of time.

If the controller 30 determines in step S3 that the initial contact occurred at the center portion of the roof, the controller 30 is configured to proceed to step S112, and then to step S13 to determine the impact energy (acceleration G) based on the information in the reference database 30D. Then, in step S14, the controller 30 is configured to operate/deploy the left curtain air bag 1A and the right curtain air bag 1B simultaneously in accordance with the impact energy.

Figure 12B:
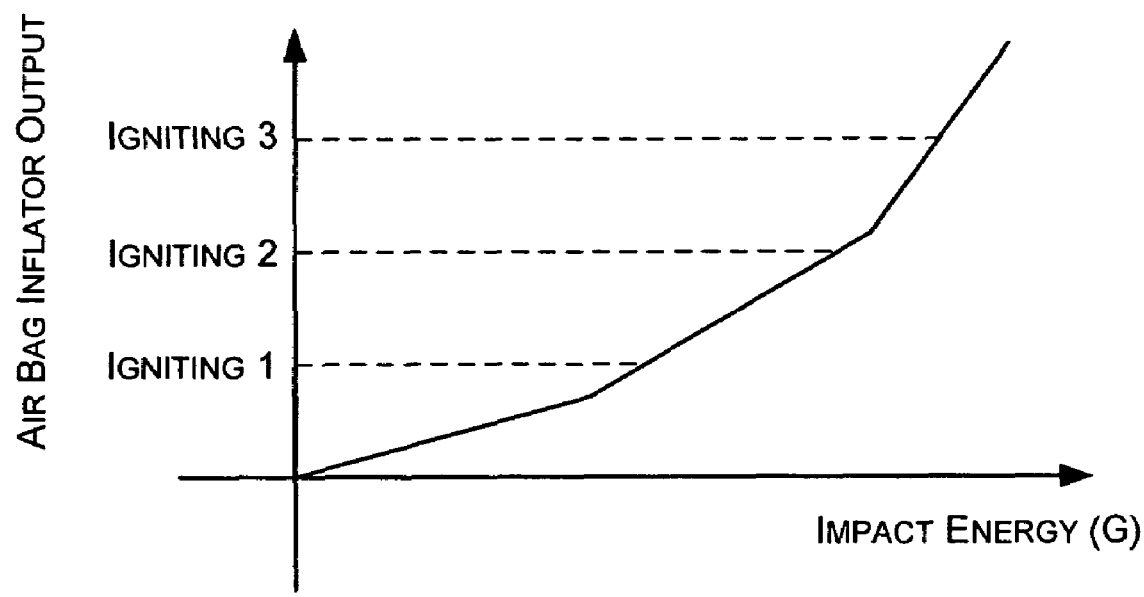
FIG. 12(B) is a schematic diagram illustrating a relationship between an impact energy and an inflator output of the passenger restraining device in accordance with the first embodiment of the present invention.

As explained above, in step S6, S10 or S14, the left and/or right curtain air bags 1A and/or 1B are operated/deployed in accordance with the impact energy. More specifically, the controller 30 is preferably configured to control an output force of an inflator device of each of the left and right curtain air bags 1A and 1B so that the left and right curtain air bags 1A and 1B are inflated in accordance with the impact energy determined in step S5, S9 or S113. For example, the inflator device of each of the left and right curtain air bags 1A and 1B can be provided with a plurality of inflators that can be ignited at different timings. In such case, the output force of the inflator device can be controlled by selectively igniting one or more of the inflators. FIG. 12(B) shows an example of a relationship between the impact energy (acceleration G) and the number of inflators ignited in a case there are three inflators provided in the inflator device of each of the left and right curtain air bags 1A and 1B. As seen in FIG. 12(B), the number of the inflators ignited increases as the impact energy increases so that an inflation force of the curtain air bag 1A or 1B becomes greater as the impact energy increases. Of course, it will be apparent to those skilled in the art from this disclosure that the inflation force of the curtain air bags 1A and 1B can be controlled by any conventional method other than by changing the number of inflators ignited, as long as the inflator output can be determined based on the impact energy to carry out the present invention.

Moreover, as explained above, in step S7 or S11, the controller 30 is configured to operate/deploy the curtain air bag 1B or 1A (i.e., the curtain air bag on the other side of the initial contact) after waiting for a prescribed amount of time since the curtain air bag 1A or 1B is deployed. However, in the present invention, the controller 30 can also be configured to operate/deploy the curtain air bag 1B or 1A (i.e., the curtain air bag on the other side of the initial contact) at timing in accordance with the impact energy determined in step S5 or S9.

Accordingly, with the vehicle passenger restraining system in accordance with the first embodiment (i.e., having the constituent features described heretofore), the deformation of the location on the roof R that makes the initial contact with the ground during a rollover event can be detected with the first to fourth deformation detecting sections 20a to 20d of the deformation sensor 20 and, based on the output signals of the first to fourth deformation detecting sections 20a to 20d, the controller 30 can detect the location where the deformation of the roof R occurred.

The controller 30 uses a prescribed algorithm to detect the impact location incurred by the vehicle M based on detection signals indicating the location where the vehicle body actually undergoes deformation. Then, based on the detected impact location, the controller 30 can operate specific curtain air bags 1A and/or 1B, i.e. one or both of the left curtain air bag 1A and the right curtain air bag 1B. As a result, the vehicle passenger restraining system can operate the curtain air bags 1A and/or 1B properly in accordance with the impact location during a rollover event and the restraining performance with respect to the passenger inside of the vehicle M can be improved.

In the first embodiment of the present invention, in order to enable the deformation sensor 20 to detect the location where the roof R undergoes deformation, the top reinforcing member 10 is provided in the impact region A1 where the roof R will contact the ground in a rollover situation and the deformation sensor 20 is mounted to the top reinforcing member 10. This arrangement enables the deformation location of the roof R to be detected precisely through the top reinforcing member that has a high rigidity.

Also, in the first embodiment, the reinforcing member 10 is provided with the first and second reinforcing frames 10A and 10B that are arranged in an X-shaped structure inside the impact region A1 and the first and second reinforcing frames 10A and 10B span between the four corners of the impact region A1. The intersection joint section 10C of the first and second reinforcing frames 10A and 10B has the larger bending strength than the standalone portions 10An and 10Bn of the first and second reinforcing frames 10A and 10B that are adjacent to the intersection joint section 10C and the deformation sensor 20 is mounted to the intersection joint section 10C. As a result of these features, the vehicle passenger restraining system can detect the impact location on the roof R that makes the initial contact with the ground in a rollover situation, i.e., if the initial contact occurs on the left side, the right side, or the center portion of the roof R, in a reliable and precise manner.

Moreover, the controller 30 is configured to process output signals from the first to fourth deformation detecting sections 20a to 20d of the deformation sensor 20 with the fast Fourier transform (FFT), and to compare the FFT transformed waveforms with the reference database 30D stored in the controller 30, the controller 30 can determine the acceleration based on the output signals of the deformation sensor 20 to obtain the impact information Ia1, Ia2 or Ia3 that indicates the impact energy. Furthermore, the impact location can be identified by comparing the distinctive characteristics of the FFT processed signals with the reference database 30D prepared in advance for the purpose of identifying the impact location.

As a result, the curtain air bags 1A and/or 1B can be operated with a more appropriate timing in accordance with the location of the initial contact with the ground and the restraining performance with respect to the passenger inside the vehicle M can be improved further.

Additionally, since each of the first to fourth deformation detecting sections 20a to 20d of the deformation sensor 20 is configured as a stress/strain sensor that is configured to detect changes in stress/strain resulting from deformation of a member, axial stress and bending stress can be communicated easily by outputting the voltage values that result from changes in the magnetic fields Mf. As a result, the precision with which deformation is detected during a rollover event can be increased, the deformation location can be determined distinctly based on the outputted voltage signal waveforms, and the curtain air bags 1A and/or 1B can be operated more accurately.

Second Embodiment

Referring now to FIGS. 13-16, a vehicle passenger restraining system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The vehicle passenger restraining system of the second embodiment is identical to the vehicle passenger restraining system of the first embodiment except for that, in the second embodiment, the controller 30 is configured to process the output signals from the first to fourth deformation detecting sections 20a to 20d by using the zero crossing analysis instead of FFT as in the first embodiment. Thus, in the second embodiment of the present invention, the reference database 30D contains database for obtaining the impact information based on the signal waveforms transformed by the zero crossing analysis.

The physical structures of the vehicle passenger restraining system in accordance with the second embodiment are the same as those of the first embodiment shown in FIGS. 1 to 8. More specifically, as shown in FIG. 1, the vehicle passenger restraining system is provided with left and right curtain air bags 1A and 1B and the controller 30 having the reference database 30D (shown in FIGS. 13 to 15) configured to process the output signals from the deformation sensor 20 in accordance with a prescribed algorithm. The controller 30 is configured to determine the location on the vehicle M where a collision impact occurred and to initially operate a specific curtain air bag or air bags (i.e., one or both of the left curtain air bag 1A and the right curtain air bag 1B) depending on the impact location.

Thus, in the second embodiment too, when the vehicle M rolls over and the roof R contacts the ground such that the first reinforcing frame 10A and/or the second reinforcing frame 10B undergoes a localized deformation, the deformation is detected by the deformation sensor 20 and voltage signals are outputted from the first to fourth deformation detecting sections 20a to 20d.

Figure 13:
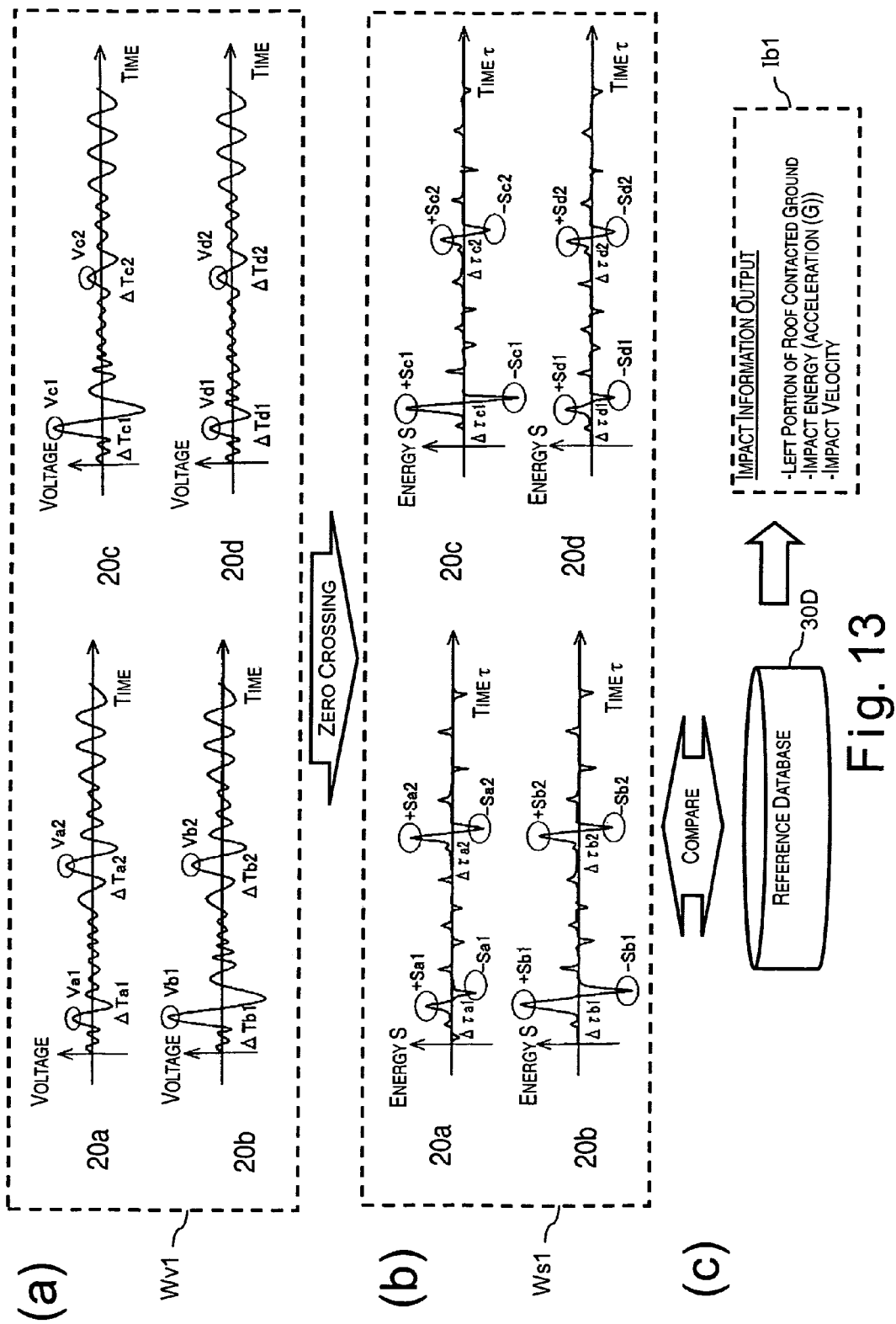
FIG. 13 is a series of diagrams (a) to (c) illustrating voltage waveforms issued from a deformation detecting device of a vehicle passenger restraining system in a case where a vehicle rolls over and makes initial contact with the ground on a left side of the roof (diagram (a)), signal waveforms that result when the voltage waveforms shown in the diagram (a) are processed with a zero crossing analysis (diagram (b)), and database used to obtain impact information based on the signal waveforms shown in diagram (b) obtained from the zero crossing analysis (diagram (c)) in accordance with a second embodiment of the present invention.
Figure 14:
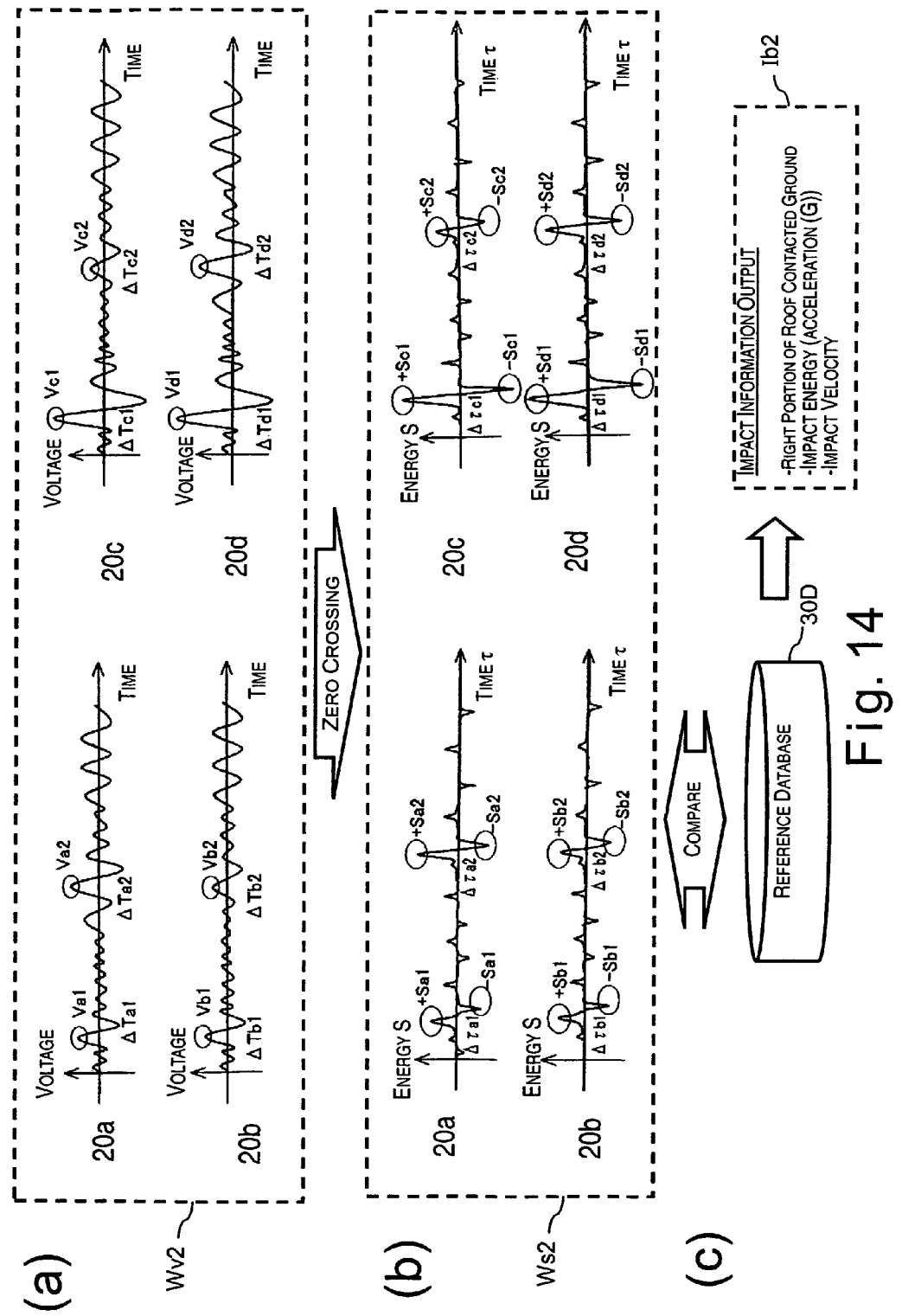
FIG. 14 is a series of diagrams (a) to (c) illustrating voltage waveforms issued from the deformation detecting device of the vehicle passenger restraining system in a case where the vehicle rolls over and makes initial contact with the ground on the right side of the roof (diagram (a)), signal waveforms that result when the voltage waveforms shown in the diagram (a) are processed with a zero crossing analysis (diagram (b)), and database used to obtain impact information based on the signal waveforms shown in diagram (b) obtained from the zero crossing analysis (diagram (c)) in accordance with the second embodiment of the present invention.
Figure 15:
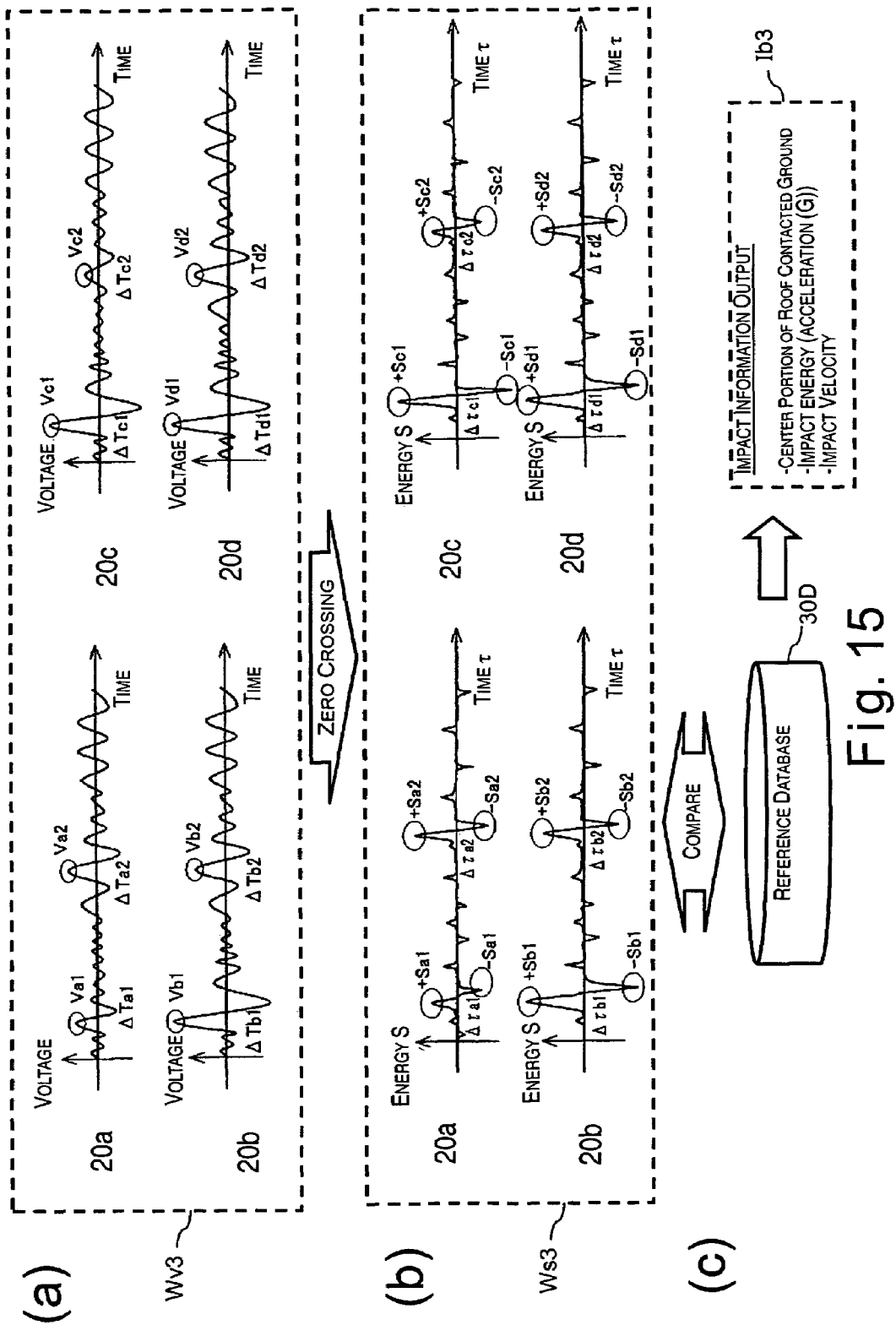
FIG. 15 is a series of diagrams (a) to (c) illustrating voltage waveforms issued from the deformation detecting device of the vehicle passenger restraining system in a case the vehicle rolls over and makes initial contact with the ground on a central portion of the roof (diagram (a)), signal waveforms that result when the voltage waveforms shown in the diagram (a) are processed with a zero crossing analysis (diagram (b)), and database used to obtain impact information based on the signal waveforms shown in diagram (b) obtained from the zero crossing analysis (diagram (c)) in accordance with the second embodiment of the present invention.

FIGS. 13 to 15 illustrate the distinctive characteristics of the signal waveforms issued in a rollover event in which the left side of the roof R makes the initial contact with the ground (FIG. 13), a rollover event in which the right side of the roof R makes the initial contact with the ground (FIG. 14), and a rollover event in which the approximate center of the roof R makes the initial contact with the ground, respectively (FIG. 15) in accordance with the second embodiment of the present invention.

In the second embodiment, the controller 30 is configured determine the impact information in accordance with a prescribed control algorithm. In the prescribed control algorithm used in the second embodiment, the controller 30 is configured to process the output signals from the first to fourth deformation detecting sections 20a to 20d by using the zero crossing analysis, and search the signal waveforms obtained by the zero crossing analysis in the reference database 30D stored in the controller 30 to obtain the impact information including the impact location and the impact acceleration. The impact location of the impact information is used to select one or both of the curtain air bag 1A and the curtain air bag 1B to be initially operated, and the impact acceleration of the impact information is used to control the operation of the curtain air bag 1A and the curtain air bag 1B. Also, in the second embodiment of the present invention, the controller 30 is also configured to obtain the impact velocity as part of the impact information.

FIG. 13 illustrates a first case in which the vehicle rolls over and makes initial contact with the ground on the left side of the roof R. The diagram (a) of FIG. 13 shows the voltage waveforms Wv1 issued from the first to fourth deformation detecting sections 20a to 20d of the deformation sensor 20. Similarly to the first embodiment (see the diagram (a) of FIG. 9), the signal issued from the first deformation detecting section 20a has a first peak voltage Va1 at a time $\Delta$Ta1 and a second peak voltage Va2 at a time $\Delta$Ta2. The signal issued from the second deformation detecting section 20b has a first peak voltage Vb1 at a time $\Delta$Tb1 and a second peak voltage Vb2 at a time $\Delta$Tb2. The signal issued from the third deformation detecting section 20c has a first peak voltage Vc1 at a time $\Delta$Tc1 and a second peak voltage Vc2 at a time $\Delta$Tc2. The signal issued from the fourth deformation detecting section 20d has a first peak voltage Vd1 at a time $\Delta$Td1 and a second peak voltage Vd2 at a time $\Delta$Td2.

The diagram (b) of FIG. 13 shows signal waveforms Ws1 that result when the signal waveforms of the first to fourth deformation detecting sections 20a to 20d shown in the diagram (a) of FIG. 13 are processed with the zero crossing analysis. The processed signal of the first deformation detecting section 20a has a first peak energy +Sa1 and −Sa1 at a time $\Delta\tau$a1 and a second peak energy +Sa2 and −Sa2 at a time $\Delta\tau$a2. The processed signal of the second deformation detecting section 20b has a first peak energy +Sb1 and −Sb1 at a time $\Delta\tau$b1 and a second peak energy +Sb2 and −Sb2 at a time $\Delta\tau$b2. The processed signal of the third deformation detecting section 20c has a first peak energy +Sc1 and −Sc1 at a time $\Delta\tau c1$ and a second peak energy $+Sc2$ and $-Sc2$ at a time $\Delta\tau c2$. The processed signal of the fourth deformation detecting section 20d has a first peak energy $+Sd1$ and $-Sd1$ at a time $\Delta\tau d1$ and a second peak energy $+Sd2$ and $-Sd2$ at a time $\Delta\tau d2$.

As shown in the diagram (c) of FIG. 13, the zero crossing processed waveforms Ws1 are compared to the prestored reference database 30D to output the impact information Ib1. Then, based on the impact information Ib1, the controller 30 is configured to determine that the left side of the roof contacted (impacted) the ground and to obtain the energy (acceleration) of the roof impact. The controller 30 is also configured to integrate the energy (acceleration) with respect to time in order to obtain the impact velocity of the roof impact.

FIG. 14 illustrates a second case in which the vehicle M rolls over and makes initial contact with the ground on the right side of the roof R. The diagram (a) of FIG. 14 shows the voltage waveforms Wv2 issued from the first to fourth deformation detecting sections 20a to 20d of the deformation sensor 20. The diagram (b) illustrates signal waveforms Ws2 that result when the signal waveforms Wv2 of the first to fourth deformation detecting sections 20a to 20d shown in the diagram (a) of FIG. 14 are processed with the zero crossing analysis.

Since the distinctive characteristics (e.g., the occurrences of the first and second peak voltages) of the voltage waveforms Wv2 issued from the first to fourth deformation detecting sections 20a to 20d are similar to the voltage waveforms Wv1 illustrated in the diagram (a) of FIG. 13, except for the specific voltage values at the peak voltages, detail explanations thereof are omitted herein for the sake of brevity. Likewise, since the distinctive characteristics (e.g. the occurrences of the first and second peak energies) of the transformed signal waveforms Ws2 is similar to the zero crossing processed signal waveforms Ws1 illustrated in the diagram (b) of FIG. 13, except for the specific values of the peak energies, detail explanations thereof are omitted herein for the sake of brevity.

As shown in the diagram (c) of FIG. 14, the zero crossing processed waveforms Ws2 are compared to the prestored reference database 30D to output the impact information Ib2. Then, based on the impact information Ib2, the controller 30 is configured to determine that the right side of the roof contacted (impacted) the ground and obtains the energy (acceleration) of the roof impact. The controller 30 is also configured to integrate the energy (acceleration) with respect to time in order to obtain the impact velocity of the roof impact.

FIG. 15 illustrates a third case in which the vehicle M rolls over and makes initial contact with the ground on central portion of the roof R. The diagram (a) of FIG. 15 shows the voltage waveforms Wv3 issued from the first to fourth deformation detecting sections 20a to 20d of the deformation sensor 20. The diagram (b) shows signal waveforms Ws3 that result when the signal waveforms Wv3 of the first to fourth deformation detecting sections 20a to 20d shown in the diagram (a) of FIG. 15 are processed with the zero crossing analysis.

Since the distinctive characteristics (e.g., the occurrences of the first and second peak voltages) of the voltage waveforms Wv3 issued from the first to fourth deformation detecting sections 20a to 20d are similar to the voltage waveforms Wv1 illustrated in the diagram (a) of FIG. 13, except for the specific voltage values at the peak voltages, detail explanations thereof are omitted herein for the sake of brevity. Likewise, since the distinctive characteristics (e.g. the occurrences of the first and second peak energies) of the transformed signal waveforms Ws3 is similar to the zero crossing processed signal waveforms Ws1 illustrated in the diagram (b) of FIG. 13, except for the specific values of the peak energies, detail explanations thereof are omitted herein for the sake of brevity.

As shown in the diagram (c) of FIG. 15, the zero crossing processed waveforms Ws3 are compared to the prestored reference database 30D to output the impact information Ib3. Then, based on the impact information Ib3, the controller 30 is configured to determine that the center portion of the roof contacted (impacted) the ground and to obtain the energy (acceleration) of the roof impact. The controller 30 is also configured to integrate the energy (acceleration) with respect to time in order to obtain the impact velocity of the roof impact.

Figure 16A:
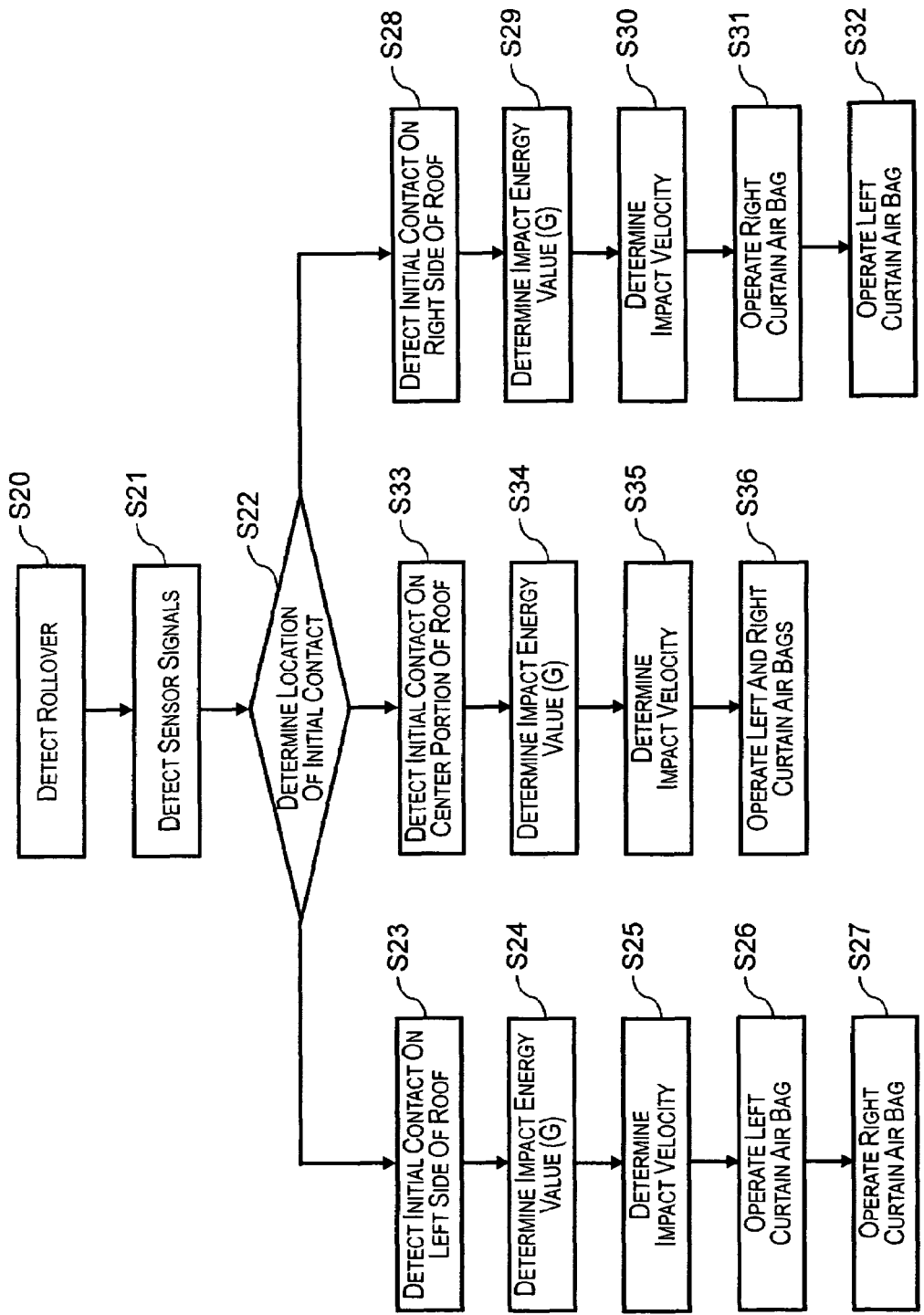
FIG. 16(A) is a flowchart illustrating a control algorithm for controlling from detection of a rollover event to operation of the passenger restraining devices executed in the vehicle passenger restraining system in accordance with the second embodiment of the present invention.

Thus, by reading the voltage signal waveforms Wv1, Wv2 or Wv3 outputted from the first to fourth deformation detecting sections 20a to 20d and obtaining the impact information Ib1, Ib2 or Ib3 from the zero crossing processed signal waveforms Ws1, Ws2, or Ws3, the vehicle passenger restraining system can detect the portion (location) of the roof R that makes the initial contact with the ground during a rollover event. In the second embodiment, the vehicle passenger restraining system can then selectively initially operate/deploy one or both of the left curtain airbag 1A and the right curtain air bag 1B (operate a specific curtain air bag or air bags among a plurality of curtain air bags) in accordance with the impact location by following the control algorithm shown in FIG. 16(A). FIG. 16(A) is a flowchart illustrating a control algorithm for controlling from detection of a rollover event to operation of the passenger restraining devices executed in the vehicle passenger restraining system in accordance with the second embodiment of the present invention.

More specifically, in step S20 of the control algorithm the controller 30 detects a rollover situation through the rollover detecting sensor 31 and, when the roof R contacts the ground, in step S21 the controller 30 detects the voltage signals outputted from the first to fourth deformation detecting sections 20a to 20d.

In step S22, the controller 30 is configured to determine the initial contact location based on the impact information Ib1, Ib2 or Ib3 obtained from the zero crossing processing. If the controller 30 determines in step S22 that the initial contact occurred on the left side of the roof, the controller 30 is configured to proceed to step S23, and then to step S24 where the controller 30 is configured to determine the impact energy (acceleration G) based on the information in the reference database 30D. Then in step S25, the controller 30 is configured to determine the impact velocity based on the information in the reference database 30D. Then, in step S26, the controller 30 is configured to operate/deploy the left curtain air bag 1A (i.e., the curtain air bag on the side where the initial impact occurred) in accordance with the impact energy and impact velocity. The controller 30 is then configured to proceed to step S27 to operate/deploy the right curtain air bag 1B (i.e., the curtain air bag on the other side) after waiting for a prescribed amount of time.

On the other hand, if the controller 30 determines in step S22 that the initial contact occurred on the right side of the roof, the controller 30 is configured to proceed step S28, and then to step S29 where the controller 30 is configured to determine the impact energy (acceleration G) based on the information in the reference database 30D. In step S30, the controller 30 is configured to determine the impact velocity based on the information in the reference database 30D. Then, in step S31, the controller 30 is configured to operate/deploy the right curtain air bag 1B (i.e., the curtain air bag on the side where the initial impact occurred) in accordance with the impact energy and impact velocity. The controller 30 is then configured to proceed to step S32 to operate/deploy the left curtain air bag 1A (i.e., the curtain air bag on the other side) after waiting for a prescribed amount of time.

If the controller 30 determines in step S22 that the initial contact occurred at the center portion of the roof R, the controller 30 is configured to proceed to step S33, and then to step S34 where the controller 30 is configured to determine the impact energy (acceleration G) based on the information in the reference database 30D. In step S35, the controller 30 is configured to determine the impact velocity based on the information in the reference database 30D. Then, in step S36, the controller 30 is configured to operate/deploy the left curtain air bag 1A and the right curtain air bag 1B simultaneously in accordance with the impact energy and the impact velocity.

Figure 16B:
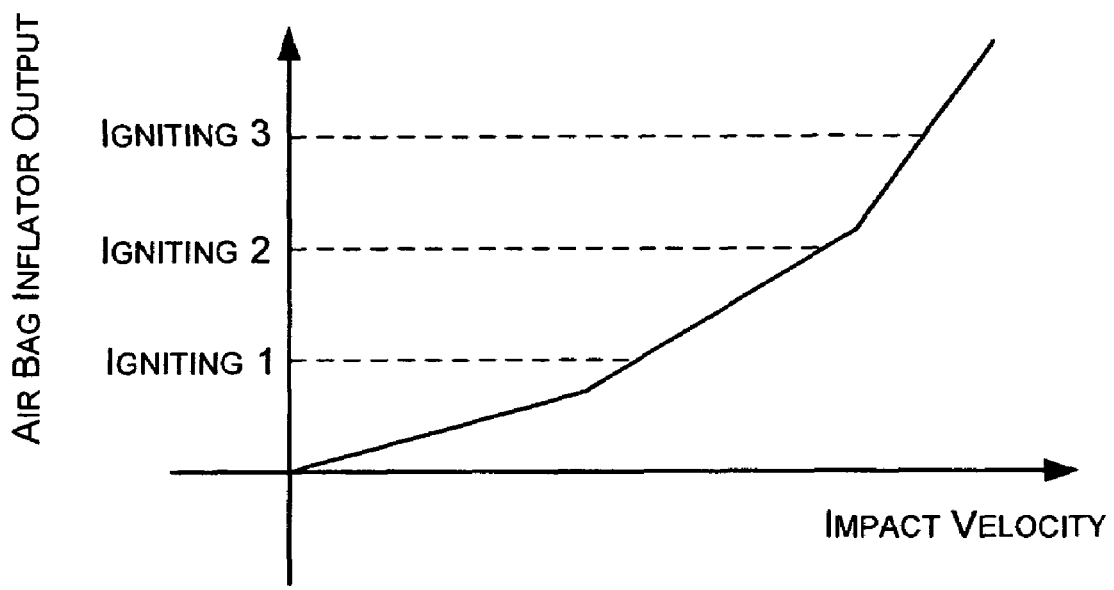
FIG. 16(B) is a schematic diagram illustrating a relationship between an impact velocity and an inflator output of the passenger restraining device in accordance with the second embodiment of the present invention.

As explained above, in step S26, S31 or S36, the left and/or right curtain air bags 1A and/or 1B are operated/deployed in accordance with the impact energy and the impact velocity. More specifically, the controller 30 is preferably configured to control an output force of an inflator device of each of the left and right curtain air bags 1A and 1B so that the left and right curtain air bags 1A and 1B are inflated in accordance with the impact energy determined in step S24, S29 or S34 and the impact velocity determined in step S25, S30 or S35. For example, the inflator device of each of the left and right curtain air bags 1A and 1B can be provided with a plurality of inflators that can be ignited at different timings. In such case, the output force of the inflator device can be controlled by selectively igniting one or more of the inflators. As explained in the first embodiment with referring to FIG. 12(B), the deployment of the curtain air bags 1A and 1B is preferably controlled such that the number of the inflators ignited increases as the impact energy increases so that an inflation force of the curtain air bag 1A or 1B becomes greater as the impact energy increases. FIG. 16(B) shows an example of a relationship between the impact velocity and the number of inflators ignited in a case there are three inflators provided in the inflator device of each of the left and right curtain air bags 1A and 1B. As seen in FIG. 16(B), the number of the inflators ignited increases as the impact velocity increases so that an inflation force of the curtain air bag 1A or 1B becomes greater as the impact velocity increases. Of course, it will be apparent to those skilled in the art from this disclosure that the inflation force of the curtain air bags 1A and 1B can be controlled by any conventional method other than by changing the number of inflators ignited, as long as the inflator output can be determined based on the impact energy and the impact velocity to carry out the present invention.

Moreover, as explained above, in step S27 or S32, the controller 30 is configured to operate/deploy the curtain air bag 1B or 1A (i.e., the curtain air bag on the other side of the initial contact) after waiting for a prescribed amount of time since the curtain air bag 1A or 1B is deployed. However, in the present invention, the controller 30 can also be configured to operate/deploy the curtain air bag 1B or 1A (i.e., the curtain air bag on the other side of the initial contact) at timing in accordance with the impact energy determined in step S24 or S29 and the impact velocity determined in step S25 or S30.

Accordingly, with the constituent features described above, the vehicle passenger restraining system in accordance with the second embodiment offers substantially the same operational effects as first embodiment. More particularly, the controller 30 is configured execute the control algorithm in which the output signals form the first to fourth deformation detecting sections 20a to 20d are processed by the zero crossing analysis, and the processed signal waveforms are compared in the reference database 30D to obtain the impact information Ib1, Ib2 or Ib3, the processing can be executed in accordance with a time axis that is somewhat close to real time and such impact information Ib1, Ib2 or Ib3 as the impact acceleration and the impact velocity (at least the impact acceleration and impact velocity) can be detected as well as the impact location. Furthermore, the impact location can be identified by comparing the distinctive characteristics of the zero crossing processed signals with the reference database 30D prepared in advance for the purpose of identifying the impact location.

As a result, the curtain air bags 1A and 1B can be operated with a more appropriate timing in accordance with the location of the initial contact with the ground and the restraining performance with respect to the passenger inside the vehicle M can be improved further.

Third Embodiment

Referring now to FIGS. 17 to 20, a vehicle passenger restraining system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

The vehicle passenger restraining system of the third embodiment is identical to the vehicle passenger restraining system of the first embodiment except for that, in the third embodiment, the output signals from the first to fourth deformation detecting sections 20a to 20d are processed by using autocorrelation function instead of FFT as in the first embodiment. Thus, in the third embodiment of the present invention, an internal reference database 30D contains database for obtaining the impact information based on the signal waveforms processed with the autocorrelation function.

Similarly to the second embodiment, the physical features of the vehicle passenger restraining system in accordance with the third embodiment are the same as those of the first embodiment shown in FIGS. 1 to 8. More specifically, as shown in FIG. 1, the vehicle passenger restraining system is provided with the left and right curtain air bags 1A and 1B and the controller 30 having the reference database 30D (FIGS. 17-19) configured to process the output signals from the deformation sensor 20 in accordance with a prescribed control algorithm. The controller 30 is configured to determine the location on the vehicle M where a collision impact occurred and to initially operate a specific curtain air bag or air bags (i.e., one or both of the left curtain air bag 1A and the right curtain air bag 1B) depending on the impact location.

Thus, in the third embodiment too, when the vehicle M rolls over and the roof R contacts the ground such that the first and/or second reinforcing frame 10A and 10B undergoes a localized deformation, the deformation is detected by the deformation sensor 20 and voltage signals are outputted from the first to fourth deformation detecting sections 20a to 20d.

Figure 17:
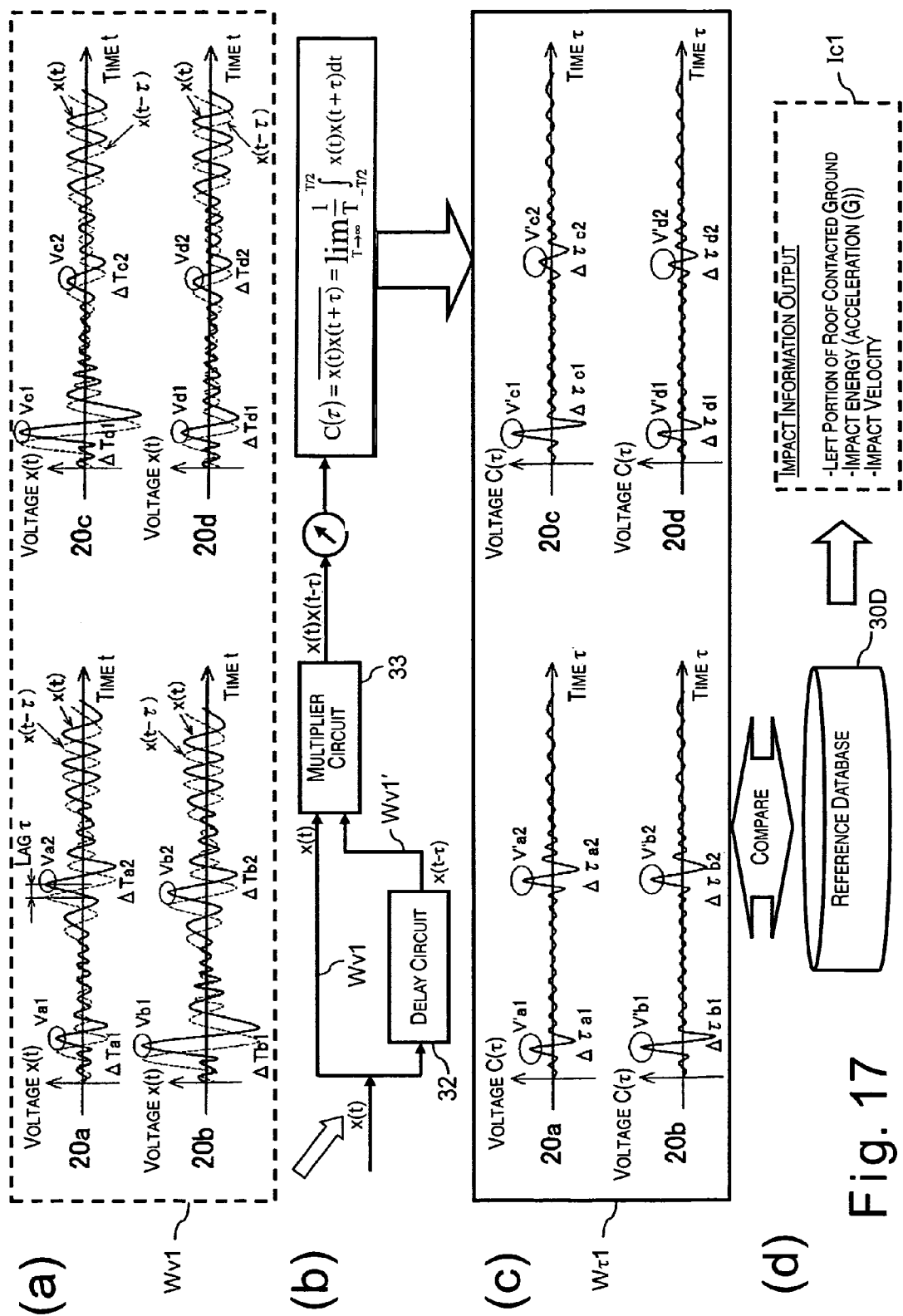
FIG. 17 is a series of diagrams (a) to (d) illustrating voltage waveforms issued from a deformation detecting device of a vehicle passenger restraining system in a case where a vehicle rolls over and makes initial contact with the ground on a left side of the roof (diagram (a)), a flow of computations used to process the voltage waveforms shown in the diagram (a) with an autocorrelation function (diagram (b)), signal waveforms that result when the voltage waveforms shown in the diagram (a) are processed with the autocorrelation function shown in the diagram (b) (diagram (c)), and database used to obtain impact information based on the signal waveforms shown in diagram (c) obtained with the autocorrelation function (diagram (d)) in accordance with a third embodiment of the present invention.
Figure 18:
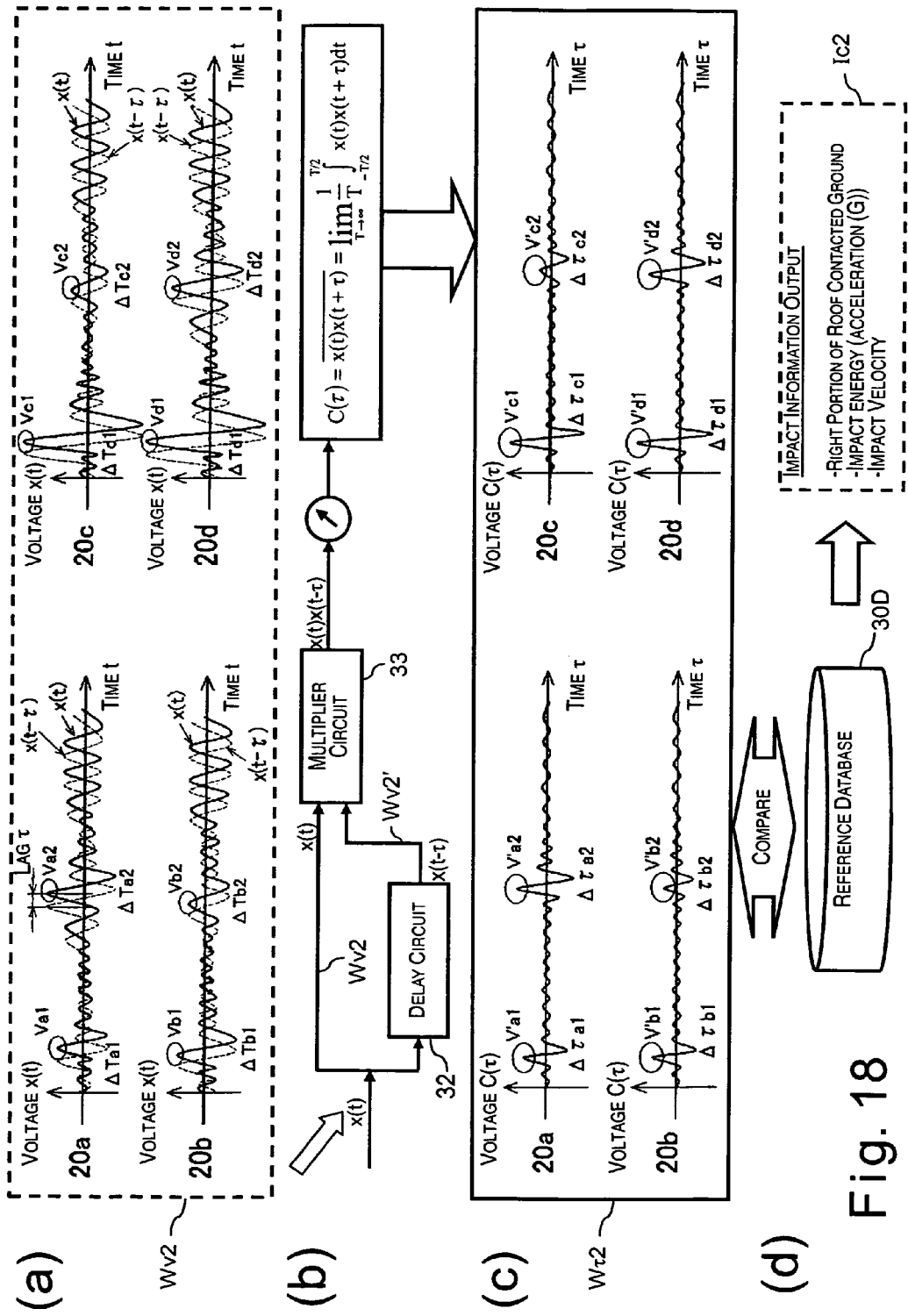
FIG. 18 is a series of diagrams (a) to (d) illustrating voltage waveforms issued from the deformation detecting device of the vehicle passenger restraining system in a case where the vehicle rolls over and makes initial contact with the ground on the right side of the roof (diagram (a)), a flow of computations used to process the voltage waveforms shown in the diagram (a) with an autocorrelation function (diagram (b)), signal waveforms that result when the voltage waveforms shown in the diagram (a) are processed with the autocorrelation function shown in the diagram (b) (diagram (c)), and database used to obtain impact information based on the signal waveforms shown in diagram (c) obtained with the autocorrelation function (diagram (d)) in accordance with the third embodiment of the present invention.
Figure 19:
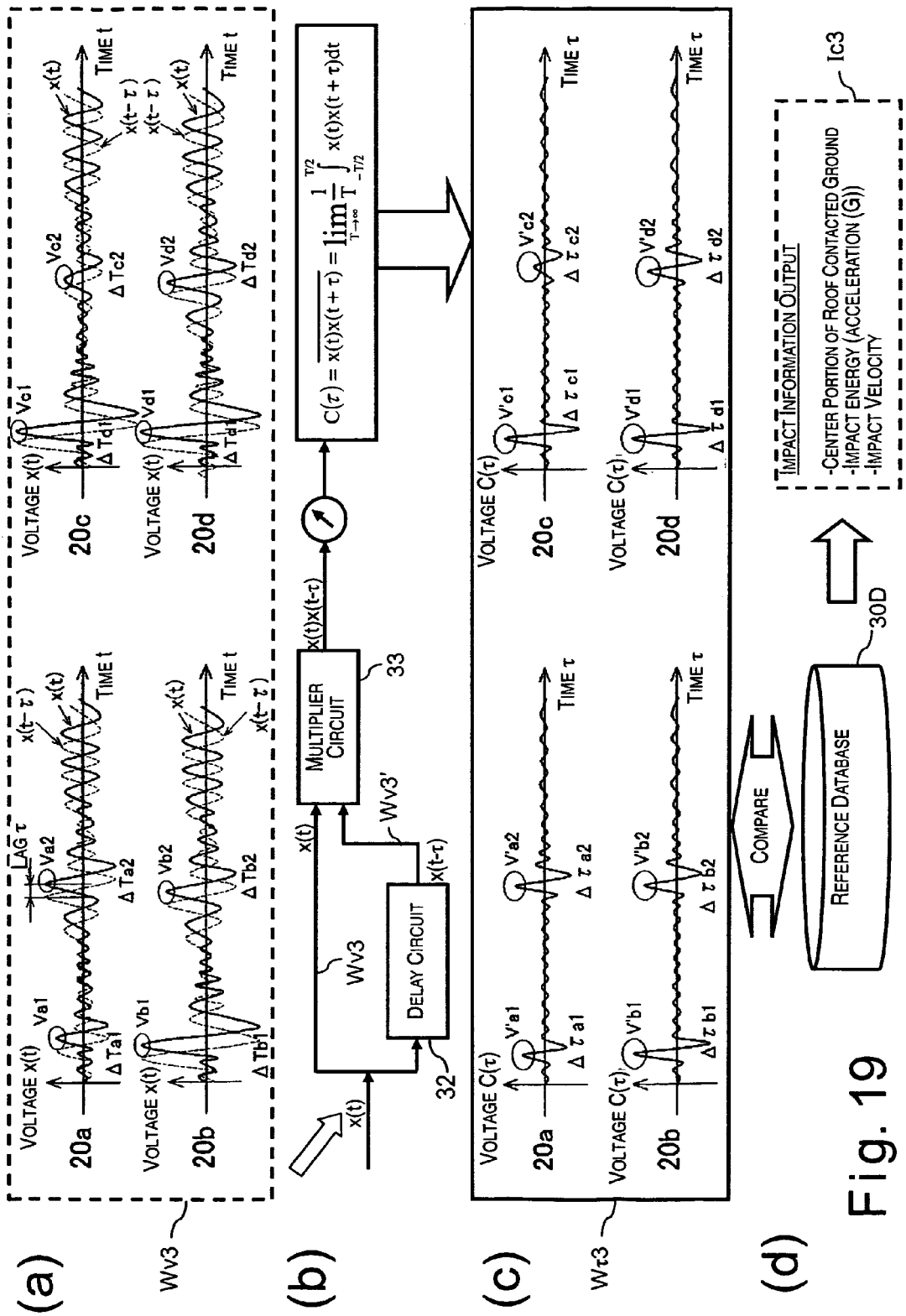
FIG. 19 is a series of diagrams (a) to (d) illustrating voltage waveforms issued from the deformation detecting device of the vehicle passenger restraining system in a case where the vehicle rolls over and makes initial contact with the ground on the center portion of the roof (diagram (a)), a flow of computations used to process the voltage waveforms shown in the diagram (a) with an autocorrelation function (diagram (b)), signal waveforms that result when the voltage waveforms shown in the diagram (a) are processed with the autocorrelation function shown in the diagram (b) (diagram (c)), and database used to obtain impact information based on the signal waveforms shown in diagram (c) obtained with the autocorrelation function (diagram (d)) in accordance with the third embodiment of the present invention.

FIGS. 17 to 19 illustrate the distinctive characteristics of the signal waveforms issued in a rollover event in which the left side of the roof R makes the initial contact with the ground (FIG. 17), a rollover event in which the right side of the roof R makes the initial contact with the ground (FIG. 18), and a rollover event in which the approximate center of the roof R makes the initial contact with the ground (FIG. 19) in accordance with the third embodiment of the present invention.

In the third embodiment, the controller 30 is configured to determine impact information including the impact location, the impact energy and the impact velocity in accordance with a prescribed control algorithm. In accordance with the prescribed control algorithm, the controller 30 is configured to process the output signals from the first to fourth deformation detecting sections 20a to 20d using the autocorrelation function, and to search the processed signal waveforms in the reference database 30D stored in the controller 30 to obtain the impact information including the impact location and the impact acceleration. The impact location of the impact information is used to select one or both of the curtain air bag 1A and the curtain air bag 1B to be initially operated, and the impact acceleration is used to control the operation of the left curtain air bag 1A and the right curtain air bag 1B.

FIG. 17 illustrates a first case in which the vehicle M rolls over and makes initial contact with the ground on the left side of the roof R. The diagram (a) of FIG. 17 shows the voltage waveforms Wv1 issued from the first to fourth deformation detecting sections 20a to 20d of the deformation sensor 20. Similarly to the first embodiment (see the diagram (a) of FIG. 9), the signal issued from the first deformation detecting section 20a has a first peak voltage Va1 at a time ΔTa1 and a second peak voltage Va2 at a time ΔTa2. The signal issued from the second deformation detecting section 20b has a first peak voltage Vb1 at a time ΔTb1 and a second peak voltage Vb2 at a time ΔTb2. The signal issued from the third deformation detecting section 20c has a first peak voltage Vc1 at a time ΔTc1 and a second peak voltage Vc2 at a time ΔTc2. The signal issued from the fourth deformation detecting section 20d has a first peak voltage Vd1 at a time ΔTd1 and a second peak voltage Vd2 at a time ΔTd2.

In the third embodiment of the present invention, the voltage waveforms Wv1 outputted from the first to fourth deformation detecting sections 20a to 20d are processed using the autocorrelation function. More specifically, as shown in the diagram (b) of FIG. 17, the signal waveforms Wv1 shown in the diagram (a) of FIG. 17 are fed into a delay circuit 32 and the resulting signal waveforms Wv1'(x(t−τ)), which have been delayed by a lag time τ, are multiplied by the original signal waveforms Wv1 (x(t)) using a multiplier circuit 33. The resulting products are used to obtain signal waveforms Wτ1 that are given by an autocorrelation function C(τ) as shown in the diagram (b) of FIG. 17.

The diagram (c) of FIG. 17 shows the signal waveforms Wτ1 that result when the signal waveforms of the first to fourth deformation detecting sections 20a to 20d shown in the diagram (a) of FIG. 17 are processed with the autocorrelation function. The processed signal of the first deformation detecting section 20a has a first peak voltage V'a1 at a time Δτa1 and a second peak voltage V'a2 at a time Δτa2. The processed signal of the second deformation detecting section 20b has a first peak voltage V'b1 at a time Δτb1 and a second peak voltage V'b2 at a time Δτb2. The processed signal of the third deformation detecting section 20c has a first peak voltage V'c1 at a time Δτc1 and a second peak voltage V'c2 at a time Δτc2. The processed signal of the fourth deformation detecting section 20d has a first peak voltage V'd1 at a time Δτd1 and a second peak voltage V'd2 at a time Δτd2.

As shown in the diagram (d) of FIG. 17, the autocorrelation function processed waveforms Wτ1 are compared to the prestored reference database 30D to output the impact information Ic1. Then, based on the impact information Ic1, the controller 30 is configured to determine that the left side of the roof R contacted (impacted) the ground and obtains the energy (acceleration) of the roof impact. The controller 30 is also configured to integrate the energy (acceleration) with respect to time in order to obtain the velocity of the roof impact.

FIG. 18 illustrates a second case in which the vehicle M rolls over and makes initial contact with the ground on the right side of the roof R. The diagram (a) of FIG. 18 shows the voltage waveforms Wv2 issued from the first to fourth deformation detecting sections 20a to 20d of the deformation sensor 20. The diagram (b) of FIG. 18 shows a process in which the signal waveforms Wv2 are fed into the delay circuit 32, the resulting signal waveforms Wv2'(x(t−τ)) (which have been delayed by a lag time τ) are multiplied by the original signal waveforms Wv2(x(t)) using the multiplier circuit 33, and the resulting products are used to obtain signal waveforms Wτ2 that are given by the autocorrelation function C(τ).

The diagram (c) of FIG. 18 shows the resulting signal waveforms Wτ2. As shown in the diagram (d) of FIG. 18, the autocorrelation function processed waveforms Wτ2 are compared to the prescribed reference database 30D to output the impact information Ic2 including the impact location, impact acceleration and the impact velocity. Then, based on the impact information Ic2, the controller 30 is configured to determine that the right side of the roof R contacted (impacted) the ground and obtains the energy (acceleration) of the roof impact. The controller 30 is also configured to integrate the energy (acceleration) with respect to time in order to obtain the velocity of the roof impact.

Since the distinctive characteristics (e.g., the occurrences of the first and second peak voltages) of the voltage waveforms Wv2 issued from the first to fourth deformation detecting sections 20a to 20d are similar to the voltage waveforms Wv1 illustrated in the diagram (a) of FIG. 17, except for the specific voltage values at the peak voltages, detail explanations thereof are omitted herein for the sake of brevity. Likewise, since the distinctive characteristics (e.g. the occurrences of the first and second peak voltages) of the transformed signal waveforms Wτ2 is similar to the processed signal waveforms Wτ1 illustrated in the diagram (c) of FIG. 17, except for the specific values of the peak voltages, detail explanations thereof are omitted herein for the sake of brevity.

FIG. 19 is a third case in which the vehicle M rolls over and makes initial contact with the ground on central portion of the roof R will now be described. The diagram (a) of FIG. 19 shows the voltage waveforms Wv3 issued from the first to fourth deformation detecting sections 20a to 20d of the deformation sensor 20. The diagram (b) of FIG. 19 shows a process in which the signal waveforms Wv3 are fed into the delay circuit 32, the resulting signal waveforms Wv3'(x(t−τ)) (which have been delayed by a lag time τ) are multiplied by the original signal waveforms Wv3 (x(t)) using the multiplier circuit 33, and the resulting products are used to obtain signal waveforms Wτ3 that are given by the autocorrelation function C(τ).

The diagram (c) of FIG. 19 shows the resulting signal waveforms Wτ3. As shown in the diagram (d) of FIG. 19, the autocorrelation function processed waveforms Wτ3 are compared to the prestored reference database 30D to output the impact information Ic3 including the impact location, the impact acceleration and the impact velocity. Then, based on the impact information Ic3, the controller 30 is configured to determines that the center portion of the roof contacted (impacted) the ground and to obtain the energy (acceleration) of the roof impact. The controller 30 is also configured to integrate the energy (acceleration) with respect to time in order to obtain the velocity of the roof impact.

Since the distinctive characteristics (e.g., the occurrences of the first and second peak voltages) of the voltage waveforms Wv3 issued from the first to fourth deformation detecting sections 20a to 20d are similar to the voltage waveforms Wv1 illustrated in the diagram (a) of FIG. 17, except for the specific voltage values at the peak voltages, detail explanations thereof are omitted herein for the sake of brevity. Likewise, since the distinctive characteristics (e.g. the occurrences of the first and second peak voltages) of the transformed signal waveforms Wτ3 is similar to the processed signal waveforms Wτ1 illustrated in the diagram (c) of FIG. 17, except for the specific values of the peak voltages, detail explanations thereof are omitted herein for the sake of brevity.

Figure 20:
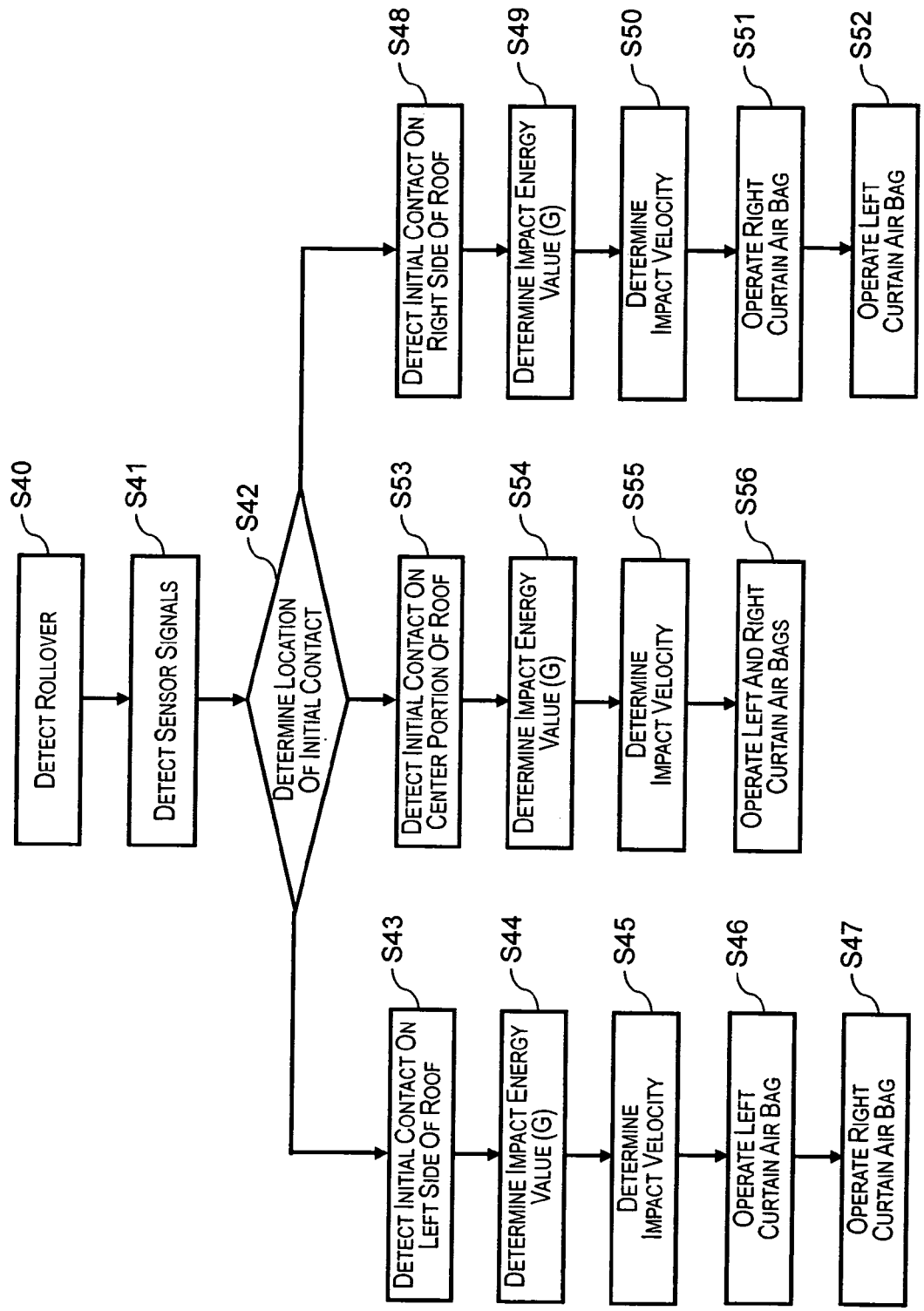
FIG. 20 is a flowchart illustrating a control algorithm for controlling from detection of a rollover event to operation of the passenger restraining devices executed in the vehicle passenger restraining system in accordance with the third embodiment of the present invention.

Thus, by reading the voltage signal waveforms Wv1, Wv2 or Wv3 outputted from the first to fourth deformation detecting sections 20a to 20d and obtaining the impact information Ic1, Ic2 or Ic3 from the autocorrelation function processed signal waveforms Wτ1, Wτ2 or Wτ3, the vehicle passenger restraining system can detect the portion (location) of the roof R that makes the initial contact with the ground during a rollover event. In the third embodiment of the present invention, the vehicle passenger restraining system can then selectively operate/deploy one or both of the left curtain air bag 1A and the right curtain air bag 1B (i.e., operate a specific curtain air bag or air bags among a plurality of curtain air bags) in accordance with the impact location by following the control algorithm shown in FIG. 20. FIG. 20 is a flowchart illustrating a control algorithm for controlling from detection of a rollover event to operation of the passenger restraining devices executed in the vehicle passenger restraining system in accordance with the third embodiment of the present invention.

More specifically, in step S40 of the control algorithm of FIG. 20, the controller 30 is configured to detect a rollover situation through the rollover detecting sensor 31. When the roof R contacts the ground, in step S41, the controller 30 is configured to detect the voltage signals outputted from the first to fourth deformation detecting sections 20a to 20d.

In step S42, the controller 30 is configured to determine the initial contact location based on the impact information Ic1, Ic2 or Ic3 obtained from the autocorrelation function processing. If the controller 30 determines in step S42 that the initial contact occurred on the left side of the roof R, the controller 30 is configured to proceed to step S43, and then to step S44, where the controller 30 is configured to determine the impact energy (acceleration G) based on the information in the reference database 30D. In step S45, the controller 30 is configured to determine the impact velocity based on the information in the reference database 30D. Then, in step S46, the controller 30 is configured to operate/deploy the left curtain air bag 1A (i.e., the curtain air bag on the side where the initial impact occurred) in accordance with the impact energy and impact velocity. The controller 30 is then configured to proceed to step S47 to operate/deploy the right curtain air bag 1B (i.e., the curtain air bag on the other side) after waiting for a prescribed amount of time.

On the other hand, if the controller 30 determines in step S42 that the initial contact occurred on the right side of the roof R, the controller 30 is configured to proceed to step S48, and then to step S49, where the controller 30 is configured to determine the impact energy (acceleration G) based on the information in the reference database 30D. In step S50, the controller 30 is configured to determine the impact velocity based on the information in the reference database 30D. Then, in step S51, the controller 30 is configured to operate/deploy the right curtain air bag 1B (i.e., the curtain air bag on the side where the initial impact occurred) in accordance with the impact energy and impact velocity. The controller 30 is then configured to proceed to step S52 to operate/deploy the left curtain air bag 1A (i.e., the curtain air bag on the other side) after waiting for a prescribed amount of time.

If the controller 30 determines in step S42 that the initial contact occurred at the center portion of the roof R, the controller 30 is configured to proceed to step S53, and then to step S54, where the controller 30 is configured to determine the impact energy (acceleration G) based on the information in the reference database 30D. In step S55, the controller 30 is configured to determine the impact velocity based on the information in the reference database 30D. Then, in step S56, the controller 30 is configured to operate/deploy the left curtain air bag 1A and the right curtain air bag 1B simultaneously in accordance with the impact energy and impact velocity.

Thus, with the constituent features described above, the vehicle passenger restraining system in accordance with the third embodiment offers substantially the same operational effects as the first embodiment. More particularly, since the controller 30 is configured to execute the prescribed control algorithm in which the output signals are processed by the autocorrelation function, and the processed signal waveforms are compared in the reference database 30D stored in the controller 30 to obtain the impact information Ic1, Ic2 or Ic3. Thus, the processing can be executed in accordance with a time axis that is closer to real time and such impact information Ic1, Ic2 or Ic3 as the impact acceleration and the impact velocity (at least the impact acceleration and impact velocity) can be detected more precisely. Furthermore, since the distinctive characteristics of the output signals obtained from the deformation detecting sections 20a to 20d can be expressed more clearly when the signals are processed with the autocorrelation function, it is easier to compare the distinctive characteristics of the processed signals with the reference database 30D (which is prepared in advance for the purpose of identifying the impact location) and the impact location can be identified more precisely.

As a result, the left and right curtain air bags 1A and 1B can be operated with a more appropriate timing in accordance with the location of the initial contact with the ground and the restraining performance with respect to the passenger inside the vehicle M can be improved further.

Fourth Embodiment

Referring now to FIGS. 21(A) to 24, a vehicle passenger restraining system in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a triple prime ("').

The vehicle passenger restraining system of the fourth embodiment is identical to the vehicle passenger restraining system of the first embodiment except for that, in the fourth embodiment, the controller 30 is configured to process the output signals from the first to fourth deformation detecting sections 20a to 20d by using covariance function instead of FFT as in the first embodiment. Thus, in the fourth embodiment of the present invention, the reference database 30D contains database for obtaining the impact information based on the signal waveforms processed with the covariance function.

Similarly to the second and third embodiments, the physical features of the vehicle passenger restraining system in accordance with the fourth embodiment are the same as those of the first embodiment shown in FIGS. 1 to 8. More specifically, as shown in FIG. 1, the vehicle passenger restraining system is provided with the left and right curtain air bags 1A and 1B and the controller 30 having the reference database 30D (FIGS. 21(B), 22(B) and 23(B)) configured to process the output signals from the deformation sensor 20 in accordance with a prescribed control algorithm. The controller 30 is configured to determine the location on the vehicle M where a collision impact occurred and initially operate a specific curtain air bag or air bags (i.e., one or both of the left curtain air bag 1A and the right curtain air bag 1B) depending on the impact location.

Thus, in the fourth embodiment too, when the vehicle M rolls over and the roof R contacts the ground such that the first and/or second reinforcing frame 10A and 10B undergoes a localized deformation, the deformation is detected by the deformation sensor 20 and voltage signals are outputted from the first to fourth deformation detecting sections 20a to 20d.

Figure 21A:
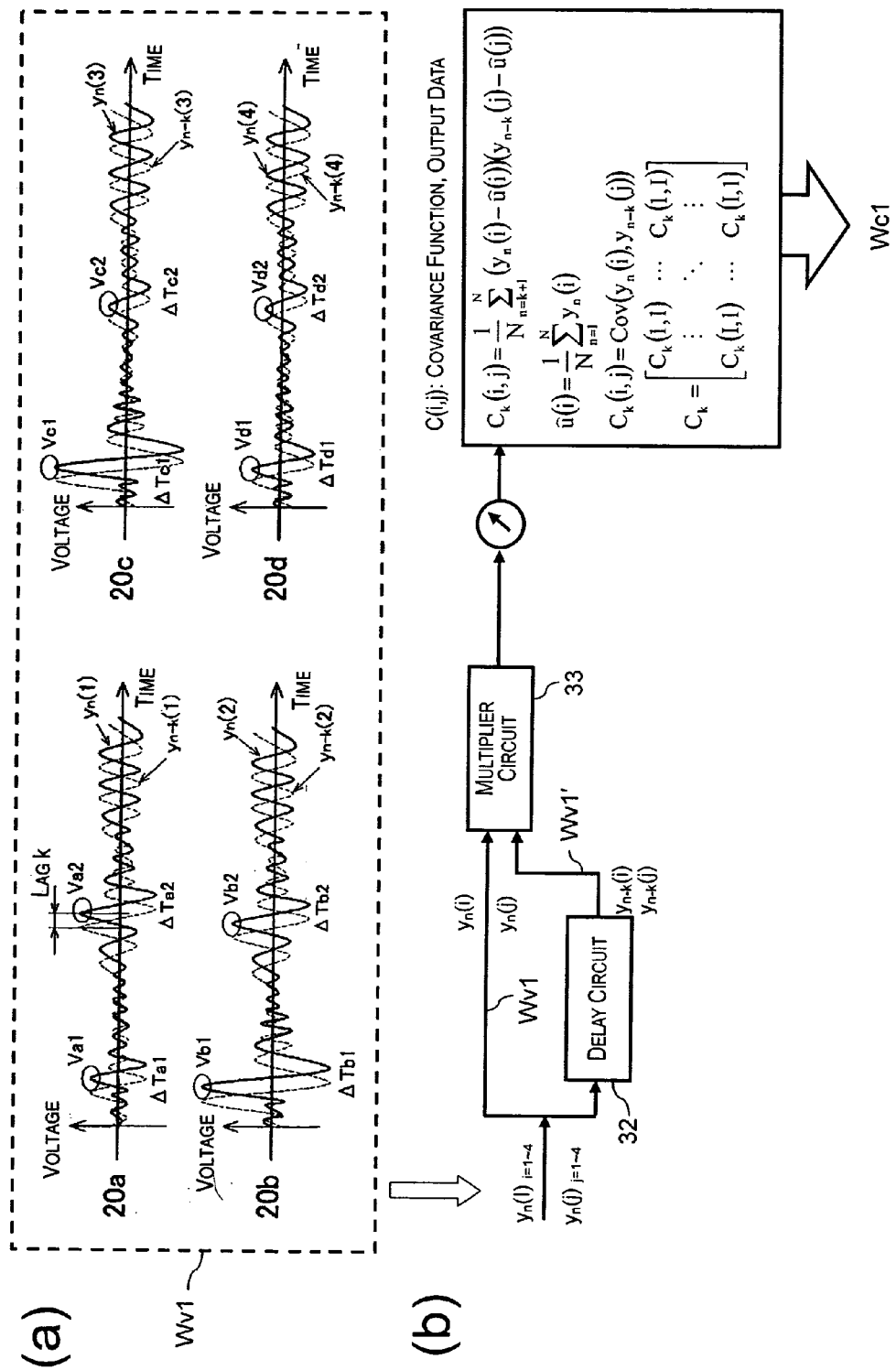
FIG. 21(A) is a pair of diagrams (a) and (b) illustrating voltage waveforms issued from a deformation detecting device of a vehicle passenger restraining system in a case where the vehicle rolls over and makes initial contact with the ground on the left side of the roof (diagram (a)), a flow of computations used to process the voltage waveforms shown in the diagram (a) with a covariance function (diagram (b)) in accordance with a fourth embodiment of the present invention.
Figure 21B:
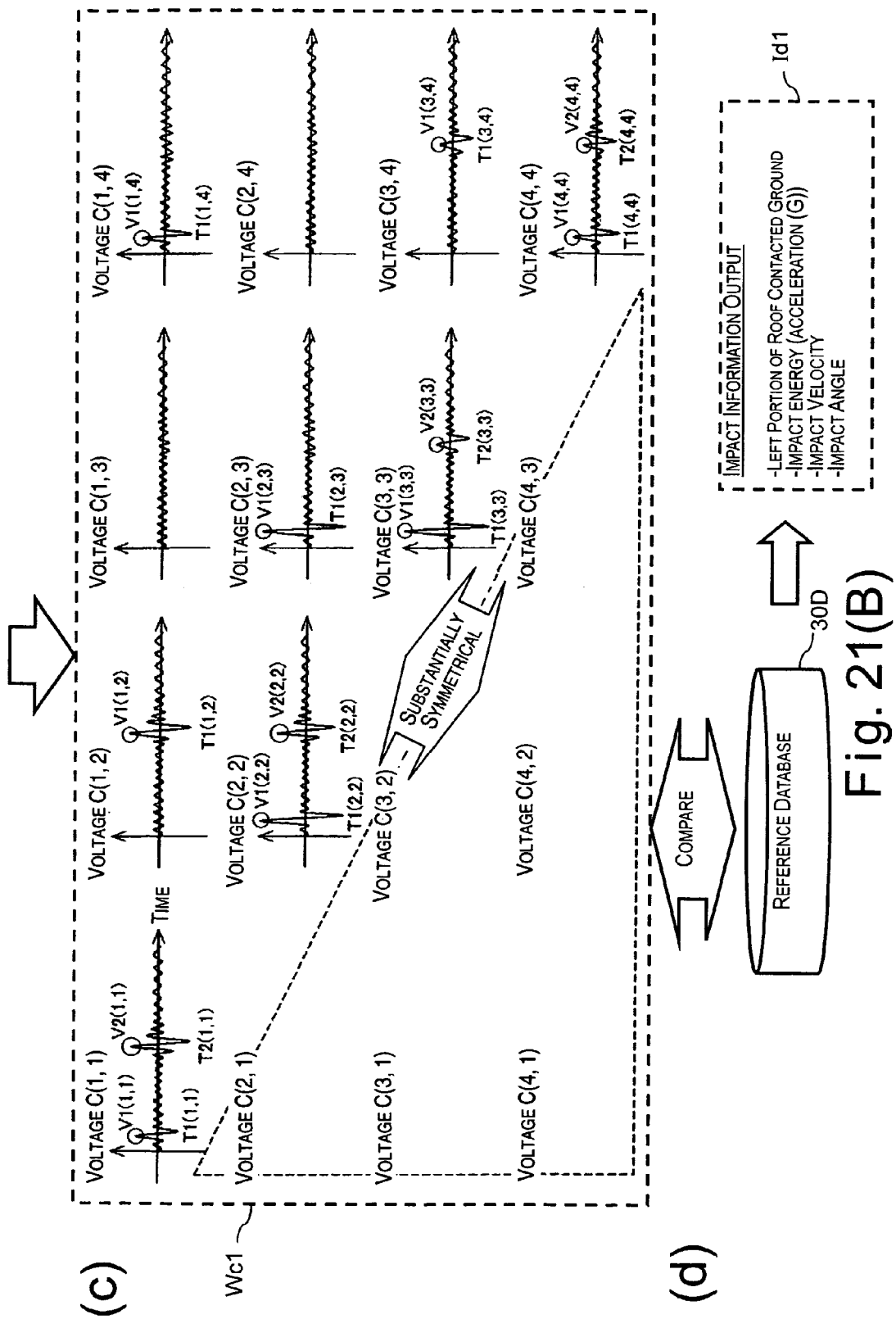
FIG. 21(B) is a pair of diagrams (c) and (d) illustrating signal waveforms that result when the voltage waveforms shown in the diagram (a) of FIG. 21(A) are processed with the covariance function shown in the diagram (b) of FIG. 21(A) (diagram (c)), database used to obtain impact information based on the signal waveforms shown in the diagram (c) obtained from the covariance function processing (diagram (d)) in accordance with the fourth embodiment of the present invention.
Figure 22A:
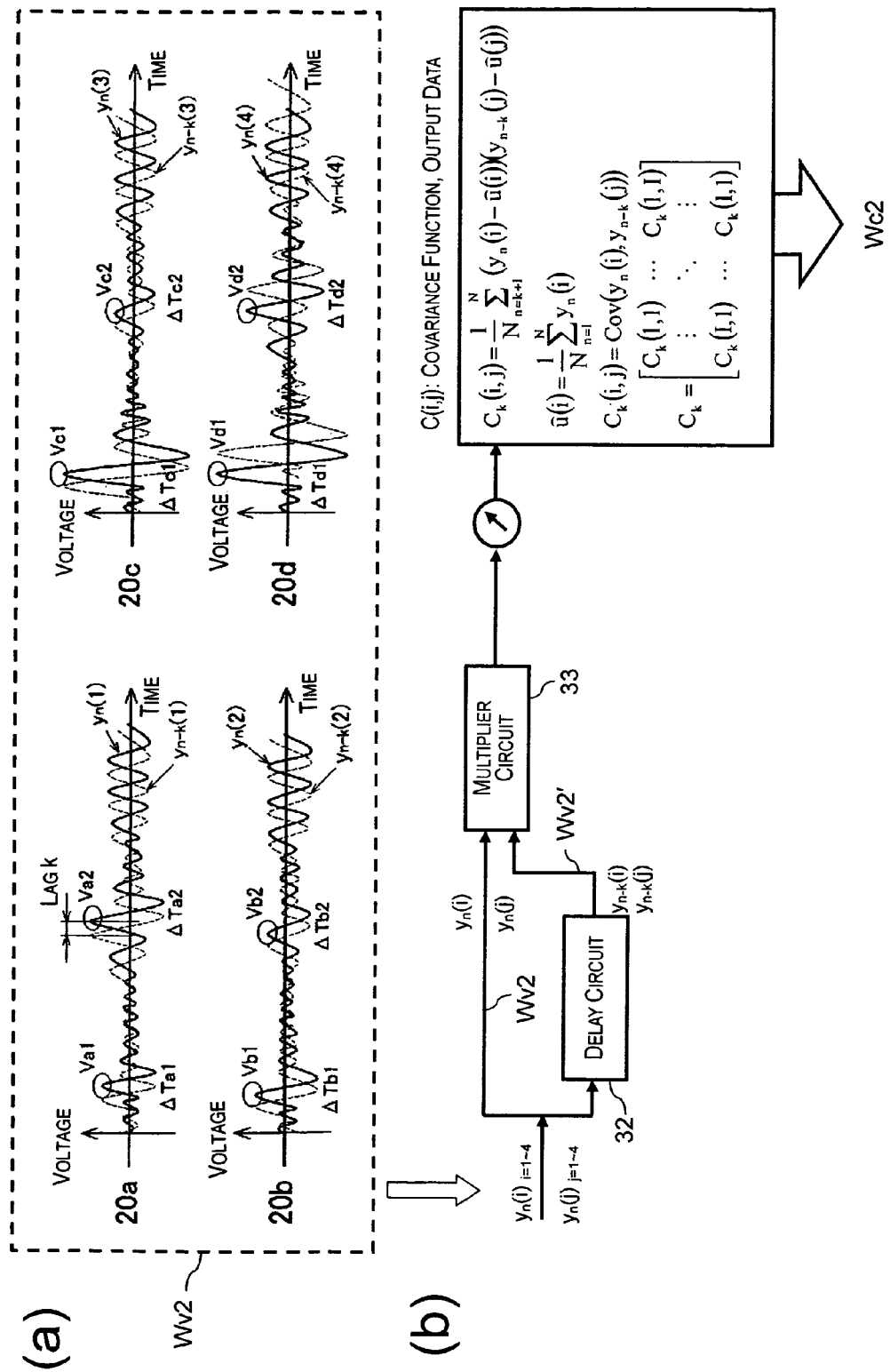
FIG. 22(A) is a pair of diagrams (a) and (b) illustrating voltage waveforms issued from the deformation detecting device of the vehicle passenger restraining system in a case where the vehicle rolls over and makes initial contact with the ground on the right side of the roof (diagram (a)), a flow of computations used to process the voltage waveforms shown in the diagram (a) with a covariance function (diagram (b)) in accordance with the fourth embodiment of the present invention.
Figure 22B:
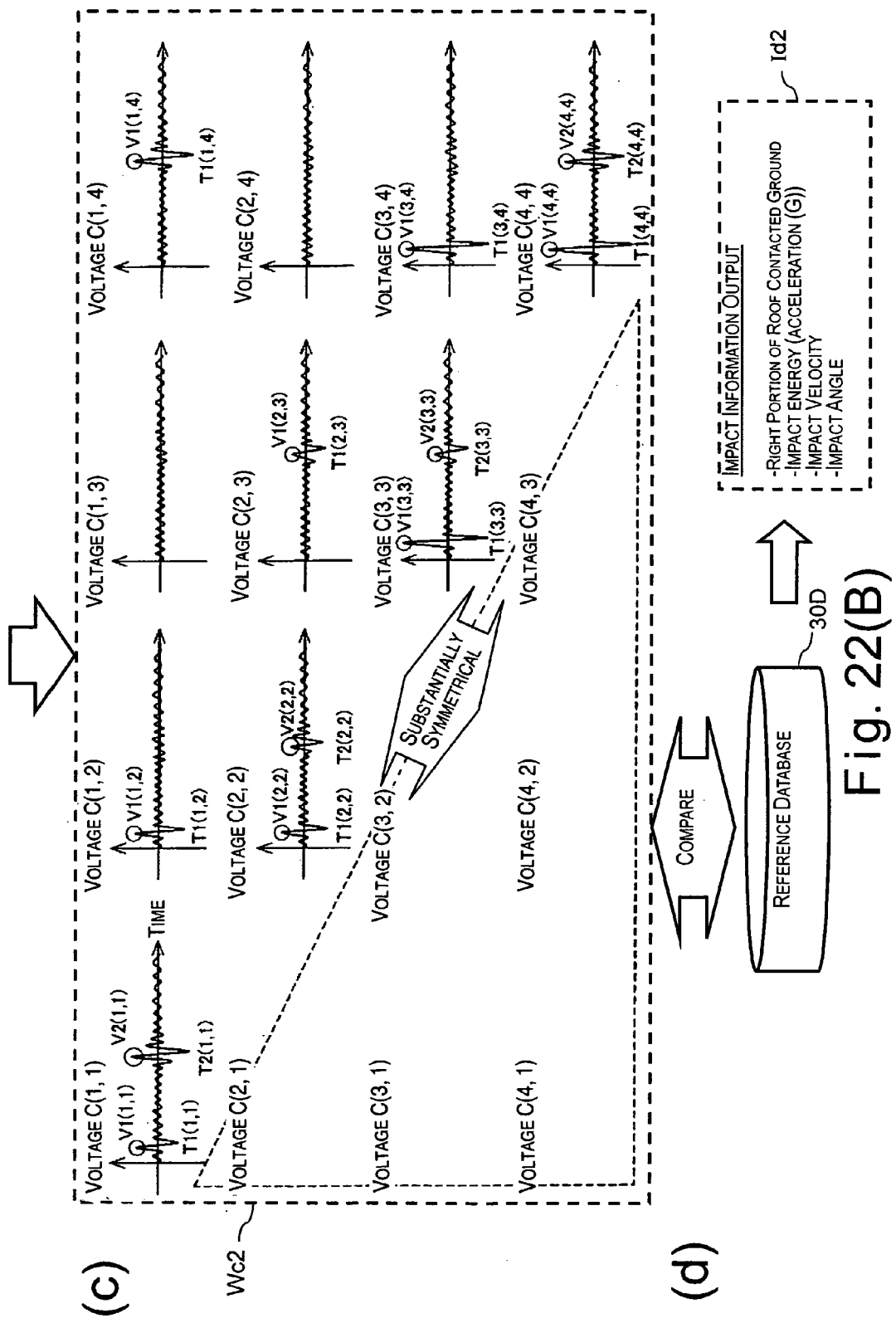
FIG. 22(B) is a pair of diagrams (c) and (d) illustrating signal waveforms that result when the voltage waveforms shown in the diagram (a) of FIG. 22(A) are processed with the covariance function shown in the diagram (b) of FIG. 22(A) (diagram (c)), database used to obtain impact information based on the signal waveforms shown in the diagram (c) obtained from the covariance function processing (diagram (d)) in accordance with the fourth embodiment of the present invention.
Figure 23A:
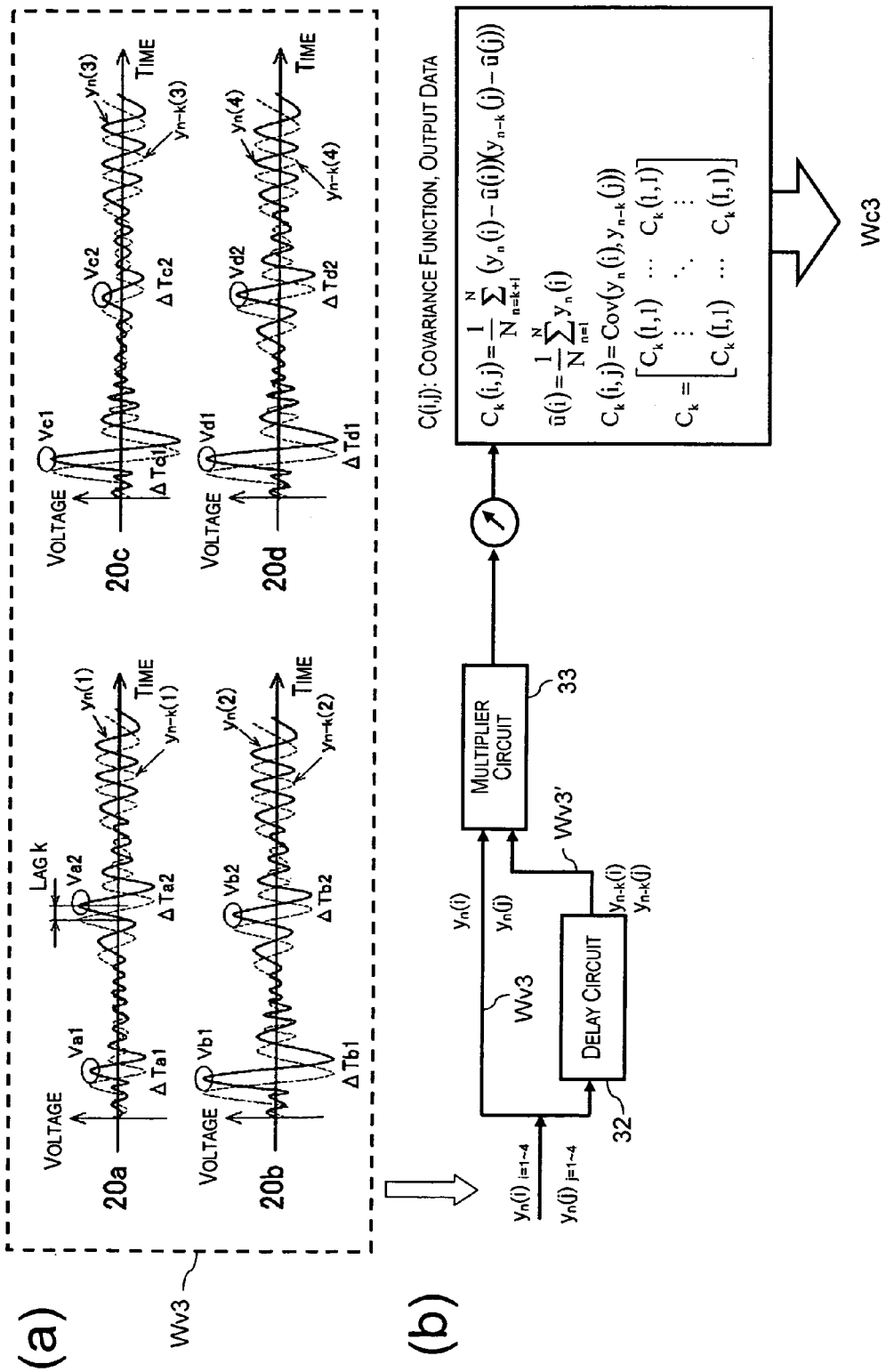
FIG. 23(A) is a series of diagrams (a) and (b) illustrating voltage waveforms issued from the deformation detecting device of the vehicle passenger restraining system in a case where the vehicle rolls over and makes initial contact with the ground on the center portion of the roof (diagram (a)), a flow of computations used to process the voltage waveforms shown in the diagram (a) with a covariance function (diagram (b)) in accordance with the fourth embodiment of the present invention.
Figure 23B:
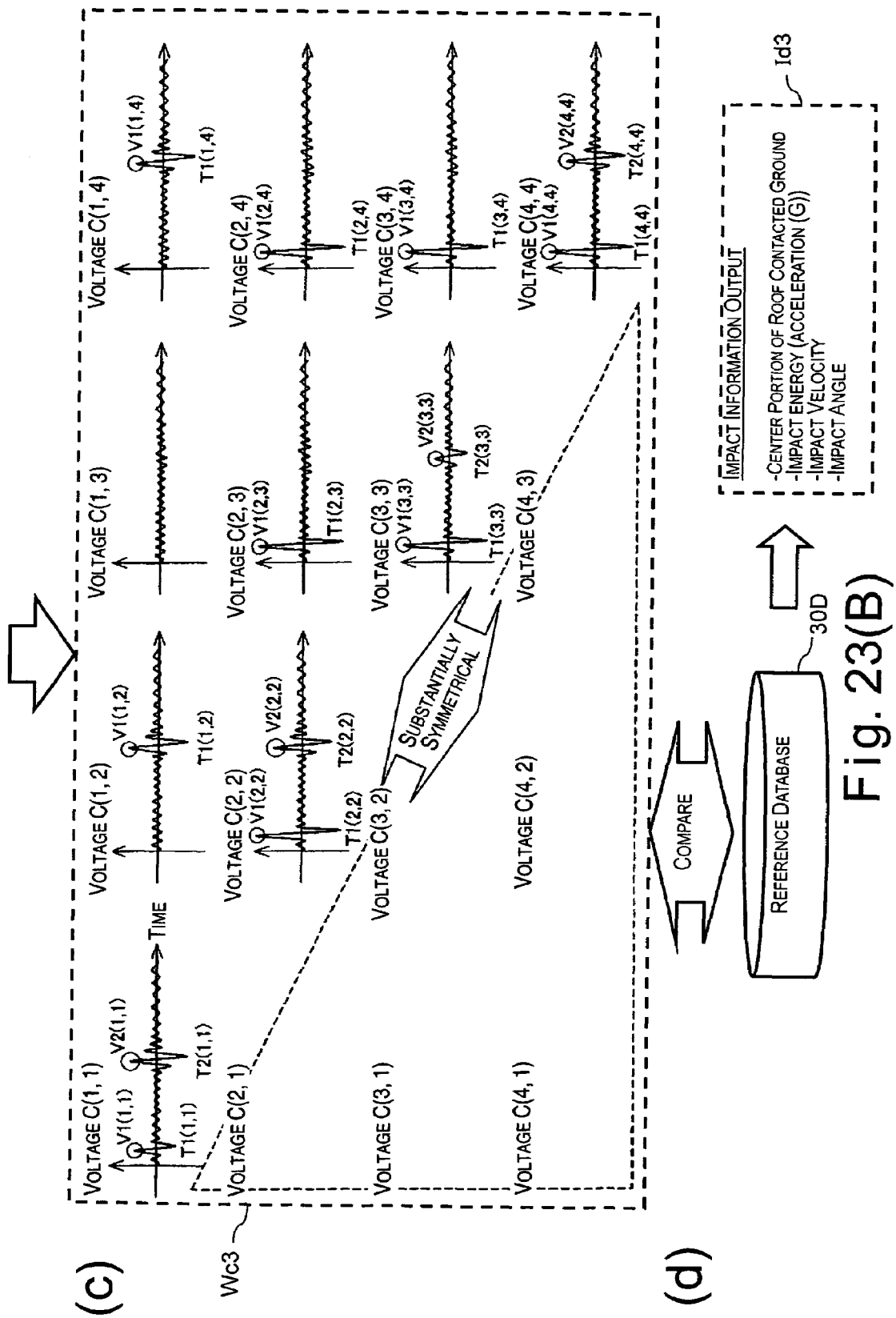
FIG. 23(B) is a pair of diagrams (c) and (d) illustrating signal waveforms that result when the voltage waveforms shown in the diagram (a) of FIG. 23(A) are processed with the covariance function shown in the diagram (b) of FIG. 23(A) (diagram (c)), database used to obtain impact information based on the signal waveforms shown in the diagram (c) obtained from the covariance function processing (diagram (d)) in accordance with the fourth embodiment of the present invention.

FIGS. 21(A) to 23(B) illustrate the distinctive characteristics of the signal waveforms issued in a rollover event in which the left side of the roof R makes the initial contact with the ground (FIGS. 21(A) and 21(B)), a rollover event in which the right side of the roof R makes the initial contact with the ground (FIGS. 22(A) and 22(B)), and a rollover event in which the approximate center of the roof R makes the initial contact with the ground (FIGS. 23(A) and 23(B)) in accordance with the fourth embodiment of the present invention.

In the fourth embodiment, the controller 30 is configured to obtain impact information in accordance with a prescribed control algorithm. In accordance with the prescribed control algorithm of the fourth embodiment, the controller 30 is configured to process the output signals from the first to fourth deformation detecting sections 20a to 20d using a covariance function, and to compare the processed waveforms with the reference database 30D stored in the controller 30 to detect the impact information including the impact location, the impact acceleration and the impact velocity. The impact location of the impact information is used to select one or both of the curtain air bag 1A and the curtain air bag 1B to be initially operated, and the impact acceleration is used to control the operation of the left and right curtain air bags 1A and 1B.

FIGS. 21(A) and 21(B) illustrate a first case in which the vehicle M rolls over and makes initial contact with the ground on the left side of the roof R. The diagram (a) of FIG. 21(A) shows the voltage waveforms Wv1 issued from the first to fourth deformation detecting sections 20a to 20d of the deformation sensor 20. Similarly to the first embodiment (see the diagram (a) of FIG. 9), the signal issued from the first deformation detecting section 20a has a first peak voltage Va1 at a time ΔTa1 and a second peak voltage Va2 at a time ΔTa2. The signal issued from the second deformation detecting section 20b has a first peak voltage Vb1 at a time ΔTb1 and a second peak voltage Vb2 at a time ΔTb2. The signal issued from the third deformation detecting section 20c has a first peak voltage Vc1 at a time ΔTc1 and a second peak voltage Vc2 at a time ΔTc2. The signal issued from the fourth deformation detecting section 20d has a first peak voltage Vd1 at a time ΔTd1 and a second peak voltage Vd2 at a time ΔTd2.

As shown in the diagram (b) of FIG. 21(A), the signal waveforms Wv1 are fed into a delay circuit 32 and the resulting signal waveforms Wv1'(y(n−κ)), which have been delayed by a lag time κ, are multiplied by the original signal waveforms Wv1 (y(n)) using a multiplier circuit 33. The resulting products are used to obtain signal waveforms Wc1 that are given by a covariance function C(i, j).

As shown in the diagram (c) of FIG. 21(B), in addition to the signal waveforms C(1, 1), C(2, 2), C(3, 3), and C(4, 4) that result from processing the signals from the deformation detecting sections 20a to 20b with the covariance function in the diagram (b) of FIG. 21(A), the mutual relationships of the output signals of the deformation detecting sections 20a to 20d are also processed with the covariance function and outputted as the signal waveforms C(1, 2), C(1, 3), C(1, 4), C(2, 1), C(2, 3), C(2, 4), C(3, 1), C(3, 2), C(3, 4), C(4, 1), C(4, 2) and C(4, 3). These signal waveforms are arranged in a matrix format as shown in the diagram (c) of FIG. 21(B).

Among the signal waveforms Wc1 obtained by processing with the covariance function shown in the diagram (c) of FIG. 21(B), the processed signal waveform C(1, 1) of the first deformation detecting section 20a has a first peak voltage V1 (1, 1) at a time T1(1, 1) and a second peak voltage V2(1, 1) at a time T2(1, 1). The processed signal waveform C(2, 2) of the second deformation detecting section 20b has a first peak voltage V1(2, 2) at a time T1(2, 2) and a second peak voltage V2(2, 2) at a time T2(2, 2). The transformed signal of the third deformation detecting section 20c has a first peak voltage V1(3, 3) at a time T1(3, 3) and a second peak voltage V2(3, 3) at a time T2(3, 3). The processed signal of the fourth deformation detecting section 20d has a first peak voltage V1(4, 4) at a time T1(4, 4) and a second peak voltage V2(4, 4) at a time T2(4, 4).

On the other hand, among the other signal waveforms shown in the diagram (c) of FIG. 21(B), the signal waveform C(1, 2) has a peak voltage V1(1, 2) at a time T1(1, 2). The signal waveform C(1, 4) has a peak voltage V1(1, 4) at a time T1(1, 4). The signal waveform C(2, 3) has a peak voltage V1(2, 3) at a time T1(2, 3). The signal waveform C(3, 4) has a peak voltage V1(3, 4) at a time T1(3, 4). The signal waveforms C(1, 3) and C(2, 4) do not have a peak as shown in the diagram (c) of FIG. 21(B).

The following signal waveforms pairs are substantially the same such that the matrix shown in the diagram (c) of FIG. 21(B) appears substantially symmetrical: C(2, 1) and C(1, 2), C(3, 1) and C(1, 3), C(3, 2) and C(2, 3), C(4, 1) and C(1, 4), C(4, 2) and C(2, 4), and C(4, 3) and C(3, 4).

As shown in the diagram (d) of FIG. 21(B), the covariance function processed waveforms Wc1 are compared to the pre-stored reference database 30D to output the impact information Id1. Then, based on the impact information Id1, the controller 30 is configured to determine that the left side of the roof contacted (impacted) the ground and obtains the energy (acceleration) of the roof impact. The controller 30 is also configured to integrate the energy (acceleration) with respect to time in order to obtain the velocity of the roof impact. In the fourth embodiment of the present invention, the controller 30 is also configured to obtain the input angle of the impact.

FIGS. 22(A) and 22(B) illustrate a second case in which the vehicle M rolls over and makes initial contact with the ground on the right side of the roof R. The diagram (a) of FIG. 22(A) shows the voltage waveforms Wv2 issued from the first to fourth deformation detecting sections 20a to 20d of the deformation sensor 20. The diagram (b) of FIG. 22 shows a process in which the signal waveforms Wv2 are fed into the delay circuit 32, the resulting signal waveforms Wv2'(y(n−κ)) (which have been delayed by a lag time κ) are multiplied by the original signal waveforms Wv2(y(n)) using the multiplier circuit 33, and the resulting products are used to obtain signal waveforms Wc2 that are given by the covariance function C(i, j).

The diagram (c) of FIG. 22(B) shows the resulting signal waveforms Wc2. As shown in the diagram (d) of FIG. 22(B), the covariance function processed waveforms Wc2 are compared to the prestored reference database 30D so as to output impact information Id2. Then, based on the impact information Ic2, the controller 30 is configured to determine that the right side of the roof R contacted (impacted) the ground and obtains the energy (acceleration) of the roof impact. The controller 30 is also configured to integrate the energy (acceleration) with respect to time in order to obtain the velocity of the roof impact. In the fourth embodiment of the present invention, the controller 30 is also configured to obtain the input angle of the impact.

Since the distinctive characteristics (e.g., the occurrences of the first and second peak voltages) of the voltage waveforms Wv2 issued from the first to fourth deformation detecting sections 20a to 20d are similar to the voltage waveforms Wv1 illustrated in the diagram (a) of FIG. 21(A), except for the specific voltage values at the peak voltages, detail explanations thereof are omitted herein for the sake of brevity. Likewise, since the distinctive characteristics (e.g. the occurrences of the first and second peak voltages) of the transformed signal waveforms Wc2 is similar to the processed signal waveforms Wc1 illustrated in the diagram (c) of FIG. 22(B), except for the specific values of the peak voltages, detail explanations thereof are omitted herein for the sake of brevity.

FIGS. 23(A) and 23(B) illustrate a third case in which the vehicle M rolls over and makes initial contact with the ground on the center portion of the roof R. The diagram (a) of FIG. 23(A) shows the voltage waveforms Wv3 issued from the first to fourth deformation detecting sections 20a to 20d of the deformation sensor 20 in such a case. The diagram (b) of FIG. 23(B) shows a process in which the signal waveforms Wv3 are fed into the delay circuit 32, the resulting signal waveforms Wv3'(y(n−κ)) (which have been delayed by a lag time κ) are multiplied by the original signal waveforms Wv3(y(n)) using the multiplier circuit 33, and the resulting products are used to obtain signal waveforms Wc3 that are given by a covariance function C(i, j).

The diagram (c) of FIG. 23(B) shows the resulting signal waveforms Wc3. As shown in the diagram (d) of FIG. 23(B), the covariance function processed waveforms Wc3 are compared to the prestored reference database 30D so as to output the impact information Id3. Then, based on the impact information Ic2, the controller 30 is configured to determine that the center portion of the roof R contacted (impacted) the ground and obtains the energy (acceleration) of the roof impact. The controller 30 is also configured to integrate the energy (acceleration) with respect to time in order to obtain the velocity of the roof impact. In the fourth embodiment of the present invention, the controller 30 is also configured to obtain the input angle of the impact.

Since the distinctive characteristics (e.g., the occurrences of the first and second peak voltages) of the voltage waveforms Wv3 issued from the first to fourth deformation detecting sections 20a to 20d are similar to the voltage waveforms Wv1 illustrated in the diagram (a) of FIG. 21(A), except for the specific voltage values at the peak voltages, detail explanations thereof are omitted herein for the sake of brevity. Likewise, since the distinctive characteristics (e.g. the occurrences of the first and second peak voltages) of the transformed signal waveforms Wc3 is similar to the processed signal waveforms Wc1 illustrated in the diagram (c) of FIG. 22(B), except for the specific values of the peak voltages, detail explanations thereof are omitted herein for the sake of brevity.

Thus, by reading the voltage signal waveforms Wv1, Wv2 or Wv3 outputted from the first to fourth deformation detecting sections 20a to 20d and obtaining the impact information Id1, Id2 or Id3 from the covariance function processed signal waveforms Wc1, Wc2 or Wc3, the vehicle passenger restraining system can detect the portion (location) of the roof R that makes the initial contact with the ground during a rollover event. In this embodiment, the vehicle passenger restraining system can then selectively initially operate/deploy one or both of the left and the right curtain air bags 1A and 1B (i.e., operate a specific curtain air bag or air bags among a plurality of curtain air bags) in accordance with the impact location by following the prescribed control algorithm shown in FIG. 24.

Figure 24:
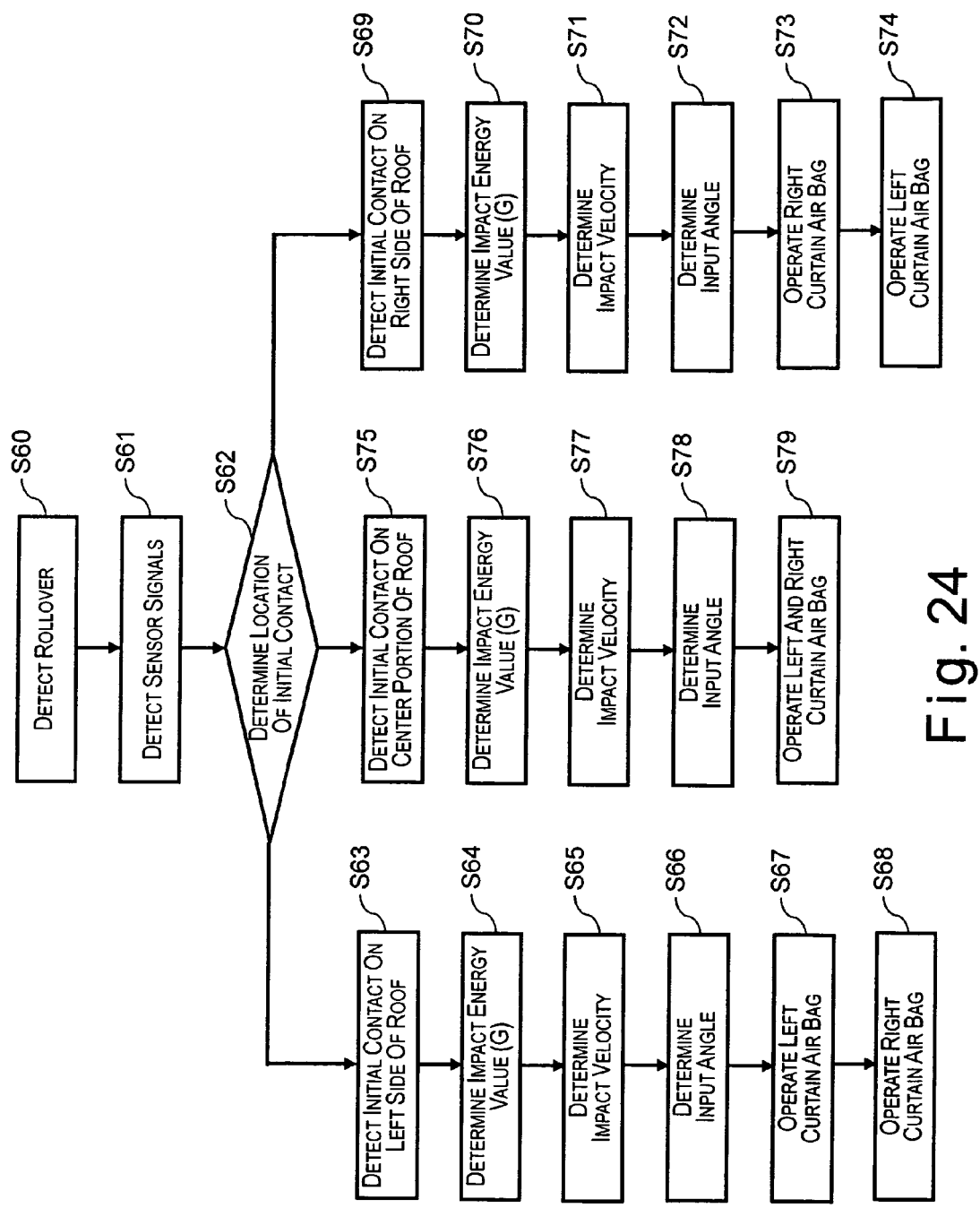
FIG. 24 is a flowchart illustrating a control algorithm for controlling from detection of a rollover event to operation of the passenger restraining devices executed in the vehicle passenger restraining system in accordance with the fourth embodiment of the present invention.

More specifically, in step S60 of the control algorithm of FIG. 24, the controller 30 is configured to detect a rollover situation through the rollover detecting sensor 31. When the roof R contacts the ground, in step S61, the controller 30 is configured to detect the voltage signals outputted from the first to fourth deformation detecting sections 20a to 20d.

In step S62, the controller 30 is configured to determine the initial contact location based on the impact information Id1, Id2 or Id3 obtained from the covariance function processing. If the controller 30 determines in step S62 that the initial contact occurred on the left side of the roof, the controller 30 is configured to proceed to step S63, and then to step S64 where the controller 30 is configured to determine the impact energy (acceleration G) based on the information in the reference database 30D. In step S65, the controller 30 is configured to determine the impact velocity based on the information in the reference database 30D, and in step S66 the controller 30 is configured to determine the input angle of the impact based on the information in the reference database 30D.

Then, in step S67, the controller 30 is configured to operate/deploy the left curtain air bag 1A (i.e., the curtain air bag on the side where the initial impact occurred) in accordance with the impact energy, impact velocity, and impact angle. The controller 30 is then configured to proceed to step S68 to operate/deploy the right curtain air bag 1B (i.e., the curtain air bag on the other side) after waiting for a prescribed amount of time.

On the other hand, if the controller 30 determines in step S62 that the initial contact occurred on the right side of the roof, the controller 30 is configured to proceed to step S69, and then to step S70, where the controller 30 is configured to determine the impact energy (acceleration G) based on the information in the reference database 30D. In step S71, the controller 30 is configured to determine the impact velocity based on the information in the reference database 30D. In step S72, the controller 30 is configured to determine the input angle of the impact based on the information in the reference database 30D.

Then, in step S73, the controller 30 is configured to operate/deploy the right curtain air bag 1B (i.e., the curtain air bag on the side where the initial impact occurred) in accordance with the impact energy, the impact velocity, and the input angle. The controller 30 is then configured to proceed to step S74 to operate/deploy the left curtain air bag 1A (i.e., the curtain air bag on the other side) after waiting for a prescribed amount of time.

If the controller 30 determines in step S62 that the initial contact occurred at the center portion of the roof R, the controller 30 is configured to proceed to step S75, and then to step S76, where the controller 30 is configured to determine the impact energy (acceleration G) based on the information in the reference database 30D. In step S77, the controller 30 is configured to determine the impact velocity based on the information in the reference database 30D. In step S78, the controller 30 is configured to determine the input angle of the impact based on the information in the reference database 30D.

Then, in step S79, the controller 30 is configured to operate/deploy the left curtain air bag 1A and the right curtain air bag 1B simultaneously in accordance with the impact energy, the impact velocity, and the input angle.

Figure 26A:
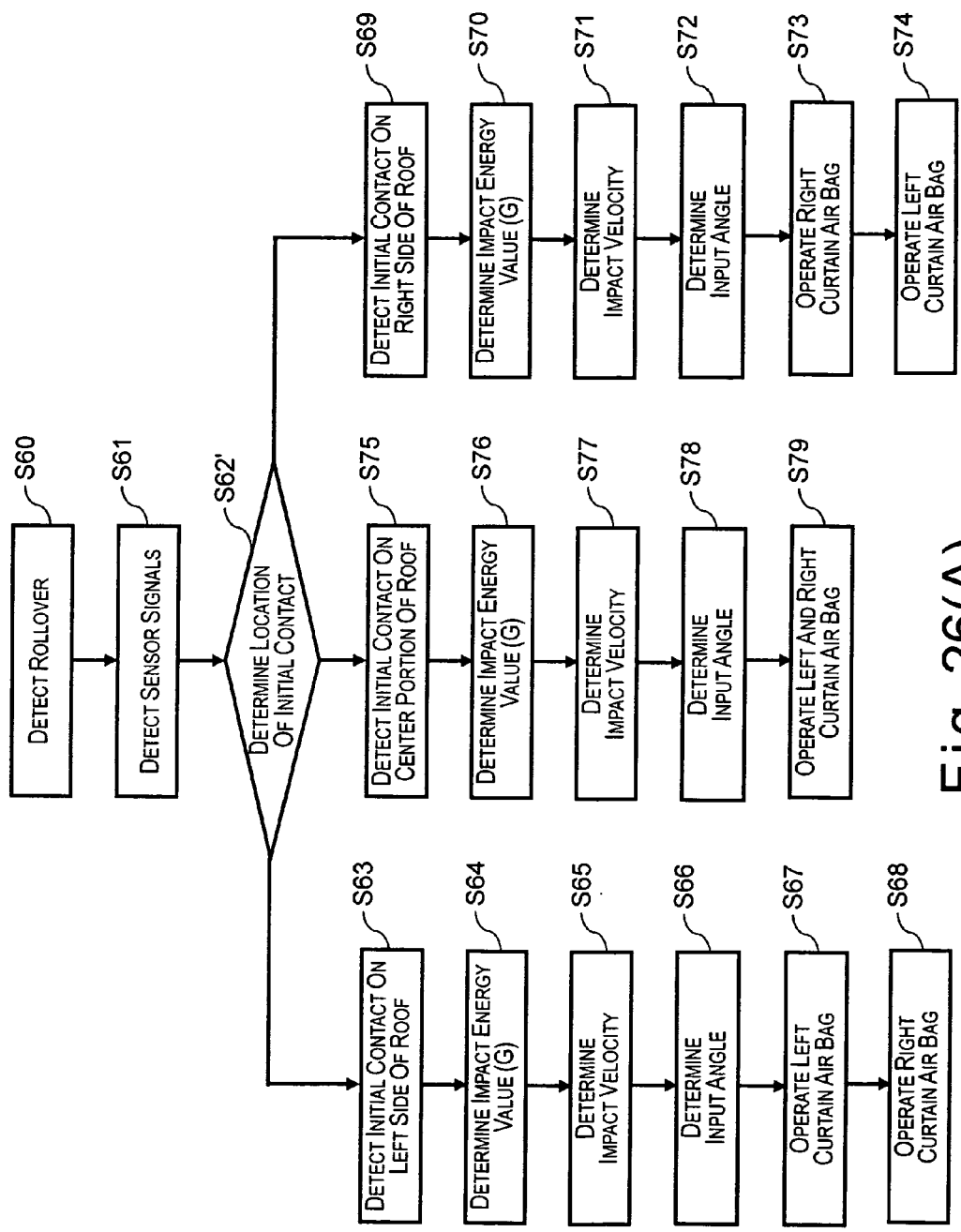
FIG. 26(A) is a flowchart illustrating a control algorithm for controlling from detection of a rollover event to operation of the passenger restraining devices executed in the vehicle passenger restraining system in accordance with the fifth embodiment of the present invention.
Figure 26B:
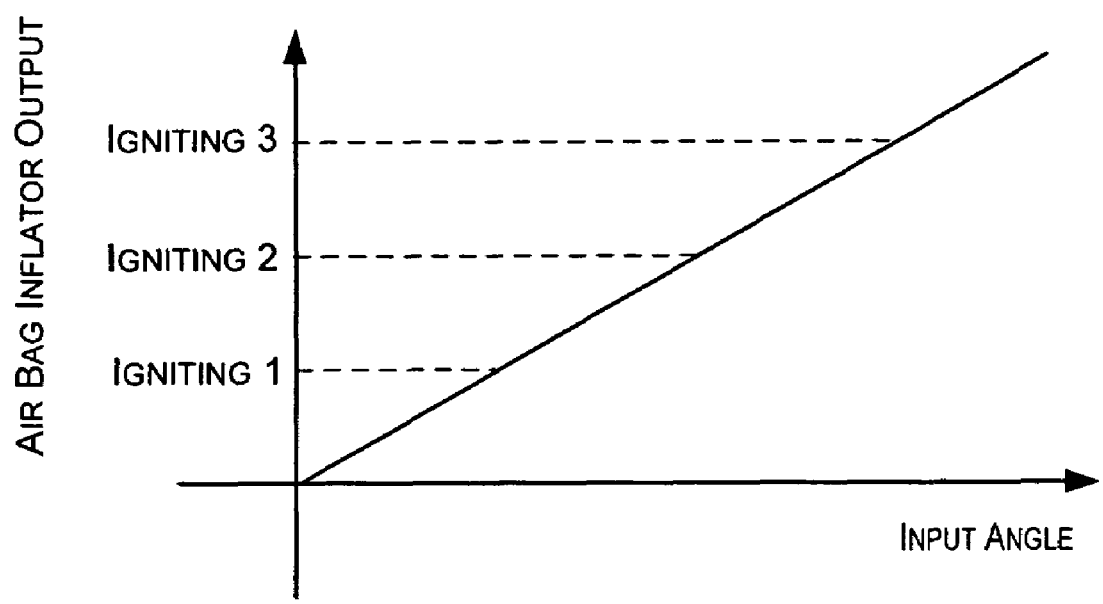
FIG. 26(B) is a schematic diagram illustrating a relationship between an input angle and an inflator output of the passenger restraining device in accordance with the fifth embodiment of the present invention.

As explained above, in step S67, S73 or S79, the left and/or right curtain air bags 1A and/or 1B are operated/deployed in accordance with the impact energy, the impact velocity, and the input angle. More specifically, the controller 30 is preferably configured to control an output force of an inflator device of each of the left and right curtain air bags 1A and 1B so that the left and right curtain air bags 1A and 1B are inflated in accordance with the impact energy determined in step S64, S70 or S76, the impact velocity determined in step S65, S71 or S77 and the input angle determined in step S66, S72 or S78. For example, the inflator device of each of the left and right curtain air bags 1A and 1B can be provided with a plurality of inflators that can be ignited at different timings. In such case, the output force of the inflator device can be controlled by selectively igniting one or more of the inflators. As explained in the first and second embodiments with referring to FIGS. 12(B) and 16(B), the deployment of the curtain air bags 1A and B is preferably controlled such that the number of the inflators ignited increases as the impact energy and the impact velocity increase, and thus, an inflation force of the curtain air bag 1A or 1B becomes greater as the impact energy and the impact velocity increase. FIG. 26(B) shows an example of a relationship between the input angle and the number of inflators ignited in a case there are three inflators provided in the inflator device of each of the left and right curtain air bags 1A and 1B. As seen in FIG. 16(B), the number of the inflators ignited increases as the input angle increases so that an inflation force of the curtain air bag 1A or 1B becomes greater as the input angle increases. Of course, it will be apparent to those skilled in the art from this disclosure that the inflation force of the curtain air bags 1A and 1B can be controlled by any conventional method other than by changing the number of inflators ignited, as long as the inflator output can be determined based on the impact energy, the impact velocity and the input angle to carry out the present invention.

Moreover, as explained above, in step S67 or S73, the controller 30 is configured to operate/deploy the curtain air bag 1B or 1A (i.e., the curtain air bag on the other side of the initial contact) after waiting for a prescribed amount of time since the curtain air bag 1A or 1B is deployed. However, in the present invention, the controller 30 can also be configured to operate/deploy the curtain air bag 1B or 1A (i.e., the curtain air bag on the other side of the initial contact) at timing in accordance with the impact energy determined in step S64 or S70, the impact velocity determined in step S65 or S77, and the input angle determined in step S66 or S72.

Thus, with the constituent features described above, the vehicle passenger restraining system in accordance with the fourth embodiment offers substantially the same operational effects as first embodiment. More particularly, since the controller 30 is configured to process the output signals form the first to fourth deformation detecting sections 20a to 20d using the covariance function, and the processed signal waveforms are compared in the prestored reference database 30D stored in the controller 30 to obtain the impact information, the processing can be executed in accordance with a time axis that is closer to real time and such impact information Id1, Id2 or Id3 as the impact acceleration and the impact velocity (at least the impact acceleration and impact velocity) can be detected more precisely. Furthermore, since the distinctive characteristics of the signals obtained from the deformation detecting sections 20a to 20d can be expressed more clearly when the signals are processed with the covariance function, it is easier to compare the distinctive characteristics of the processed signals with the reference database 30D (which is prepared in advance for the purpose of identifying the impact location) and the impact location can be identified more precisely.

As a result, the left and right curtain air bags 1A and 1B can be operated with a more appropriate timing in accordance with the location of the initial contact with the ground and the restraining performance with respect to the passenger inside the vehicle M can be improved further.

Fifth Embodiment

Figure 25:
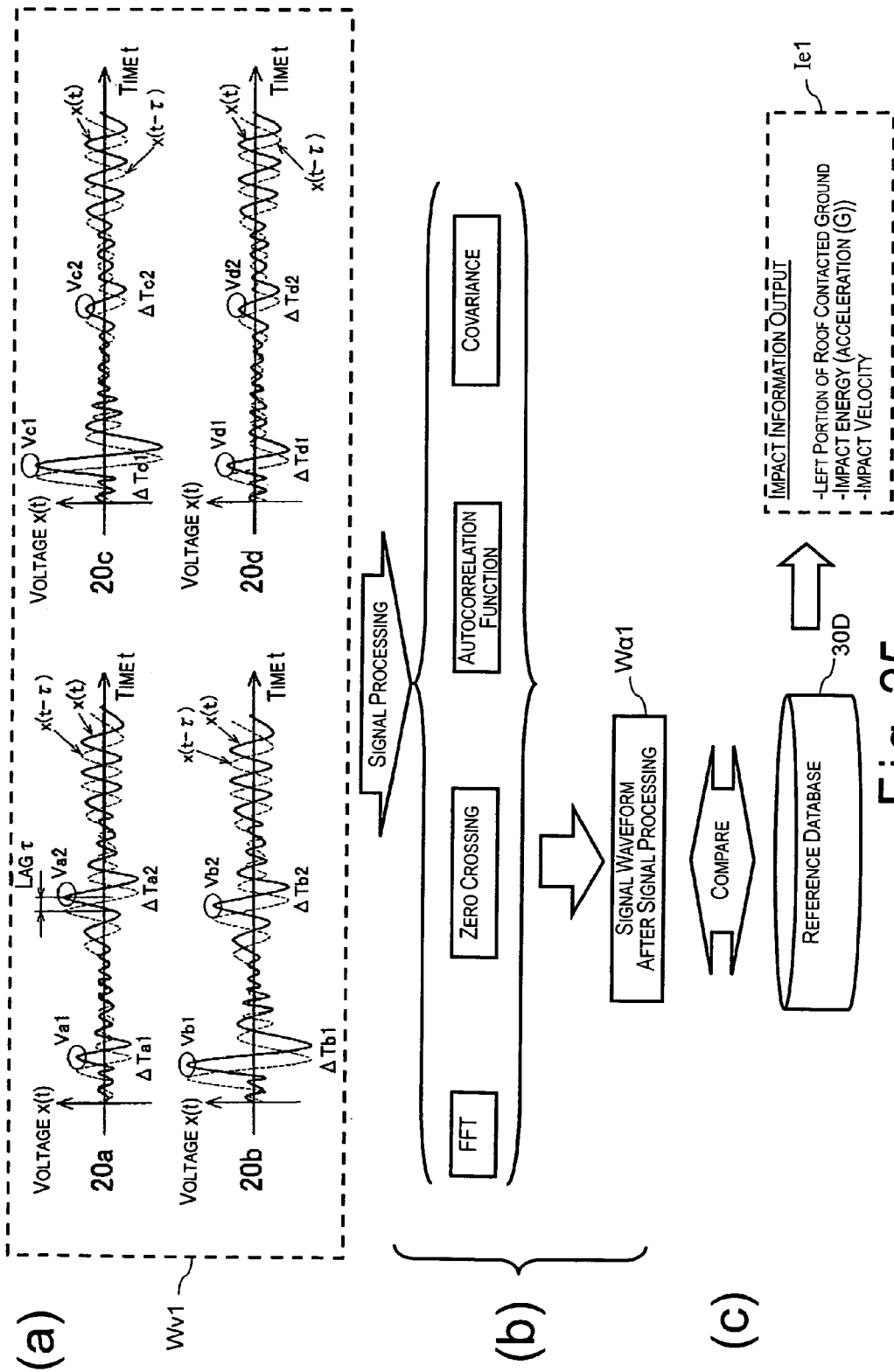
FIG. 25 is a series of diagrams (a) to (c) illustrating voltage waveforms issued from a deformation detecting device of a vehicle passenger restraining system in a case where the vehicle rolls over and makes initial contact with the ground on the left side of the roof (diagram (a)), a flow of operations for processing the voltage waveforms shown in the diagram (a) with a fast Fourier transform, a zero crossing analysis, an autocorrelation function, and a covariance function (diagram (b), and database used to obtain impact information based on the signal waveforms shown in the diagram (a) obtained from the signal processing shown in the diagram (b) (diagram (c)) in accordance with a fifth embodiment of the present invention.

Referring now to FIGS. 25 and 26, a vehicle passenger restraining system in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a quadruple prime ("'''").

The vehicle passenger restraining system of the fifth embodiment is identical to the vehicle passenger restraining system of the first embodiment except for that, in the fifth embodiment, the controller 30 is configured to process the output signals from the first to fourth deformation detecting sections 20a to 20d by using the FFT, the zero crossing analysis, the autocorrelation function and the covariance function instead of the FFT alone as in the first embodiment. Thus, in the fifth embodiment of the present invention, the reference database 30D contains database for obtaining the impact information based on the signal waveforms processed with the FFT, the zero crossing analysis, the autocorrelation function and the covariance function.

Similarly to the second to fourth embodiments, the physical features of the vehicle passenger restraining system in accordance with the fifth embodiment are the same as those of the first embodiment shown in FIGS. 1 to 8. More specifically, as shown in FIG. 1, the vehicle passenger restraining system is provided with the left and right curtain air bags 1A and 1B and the controller 30 having the reference database 30D (FIGS. 21(B), 22(B) and 23(B)) configured to process the output signals from the deformation sensor 20 in accordance with a prescribed control algorithm. The controller 30 is configured to determine the location on the vehicle M where a collision impact occurred and initially operate a specific curtain air bag or air bags (i.e., one or both of the left curtain air bag 1A and the right curtain air bag 1B) depending on the impact location.

Thus, in the fifth embodiment too, when the vehicle M rolls over and the roof R contacts the ground such that the first and/or second reinforcing frame 10A and 10B undergoes a localized deformation, the deformation is detected by the deformation sensor 20 and voltage signals are outputted from the first to fourth deformation detecting sections 20a to 20d.

Signal waveforms having different distinctive characteristics are issued in each of the following cases: a rollover event in which the left side of the roof R makes the initial contact with the ground, a rollover event in which the right side of the roof R makes the initial contact with the ground, and a rollover event in which the approximate center of the roof R makes the initial contact with the ground.

In the fifth embodiment of the present invention, the controller 30 is configured to process the output signals from the first to fourth deformation detecting sections 20a to 20d using a combination of the FFT, the zero crossing analysis, the autocorrelation function and the covariance function, and to compare the processed signal waveforms in the reference database 30D stored in the controller 30 to detect the impact information including the impact location and the impact acceleration. The impact location of the impact information is used to select one or both of the left curtain air bag 1A and the right curtain air bag 1B to be initially operated, and the impact acceleration of the impact information is used to control the operation of the left curtain air bag 1A and the right curtain air bag 1B.

For example, a case in which the vehicle M rolls over and makes initial contact with the ground on the left side of the roof R will now be explained with referring to FIG. 25. It will be apparent to those skilled in the art that the same process illustrated in FIG. 25 is applied to cases in which the vehicle makes initial contact on the right side or the center portion of the roof R to obtain the impact information in each case.

The diagram (a) of FIG. 25 shows the voltage waveforms Wv1 issued from the first to fourth deformation detecting sections 20a to 20d of the deformation sensor 20 in a case in which the vehicle M rolls over and makes initial contact with the ground on the left side of the roof R. Similarly to the first embodiment, the signal issued from the first deformation detecting section 20a has a first peak voltage Va1 at a time ΔTa1 and a second peak voltage Va2 at a time ΔTa2. The signal issued from the second deformation detecting section 20b has a first peak voltage Vb1 at a time ΔTb1 and a second peak voltage Vb2 at a time ΔTb2. The signal issued from the third deformation detecting section 20c has a first peak voltage Vc1 at a time ΔTc1 and a second peak voltage Vc2 at a time ΔTc2. The signal issued from the fourth deformation detecting section 20d has a first peak voltage Vd1 at a time ΔTd1 and a second peak voltage Vd2 at a time ΔTd2.

As shown in the diagram (b) of FIG. 25, the signal waveforms Wv1 are processed with the fast Fourier transform (FFT), the zero crossing analysis, the autocorrelation function, and the covariance function to obtain processed signal waveforms Wα1.

As shown in the diagram (c) of FIG. 25, the processed waveforms Wv1 obtained by processing the signals from the first to fourth deformation detecting sections 20a to 20d are compared to the prestored reference database 30D to output the impact information Ie1. Then, based on the impact information Ie1, the controller 30 is configured to determine that the left side of the roof R contacted (impacted) the ground and to obtain the energy (acceleration) of the roof impact. The controller 30 is also configured to integrate the energy (acceleration) with respect to time in order to obtain the velocity of the roof impact. The controller 30 is also configured to obtain the input angle of the impact.

Thus, by reading the voltage signal waveforms Wv1, Wv2 or Wv3 (such as the ones shown in FIGS. 9-11) outputted from the first to fourth deformation detecting sections 20a to 20d and obtaining the impact information from the signal waveforms Wc1, Wc2 or Wc3 obtained by processing with the fast Fourier transform (FFT), the zero crossing analysis, the autocorrelation function, and the covariance function, the vehicle passenger restraining system can detect the portion (location) of the roof R that makes the initial contact with the ground during a rollover event. In the fifth embodiment, the vehicle passenger restraining system can then selectively initially operate/deploy one or both of the left and the right curtain air bag 1A and 1B (i.e., operate a specific curtain air bag or air bags among a plurality of curtain air bags) by following a control algorithm shown in FIG. 26(A). FIG. 26(A) is a flowchart illustrating a control algorithm for controlling from detection of a rollover event to operation of the passenger restraining devices executed in the vehicle passenger restraining system in accordance with the fifth embodiment of the present invention.

The control algorithm shown in FIG. 26(A) is basically the same as the control algorithm used in the fourth embodiment shown in FIG. 24 except for step S62 for obtaining the impact information in FIG. 24 is substituted with step S62' in FIG. 26(A) in the fifth embodiment. More specifically, in step S60 of the control algorithm, the controller 30 is configured to detect a rollover situation through the rollover detecting sensor 31. When the roof R contacts the ground, in step S61, the controller 30 is configured to detect the voltage signals outputted from the first to fourth deformation detecting sections 20a to 20d.

In step S62', the controller 30 is configured to determine the initial contact location based on the impact information obtained from the fast Fourier transform (FFT), the zero crossing analysis, the autocorrelation function, and the covariance function processing. If the controller 30 determines in step S62 that the initial contact occurred on the left side of the roof R, the controller 30 is configured to proceed to S63, and then to step S64 where the controller 30 is configured to determine the impact energy (acceleration G) based on the information in the reference database 30D. In step S65, the controller 30 is configured to determine the impact velocity based on the information in the reference database 30D. In step S66, the controller 30 is configured to determine the input angle of the impact based on the information in the reference database 30D.

Then, in step S67, the controller 30 is configured to operate/deploy the left curtain air bag 1A (i.e., the curtain air bag on the side where the initial impact occurred) in accordance with the impact energy, the impact velocity, and the input angle. The controller 30 is then configured to proceed to step S68 to operate/deploy the right curtain air bag 1B (i.e., the curtain air bag on the other side) after waiting for a prescribed amount of time.

On the other hand, if the controller 30 determines in step S62' that the initial contact occurred on the right side of the roof, the controller 30 is configured to proceed to step S69, and then to step S70 where the controller 30 is configured to determine the impact energy (acceleration G) based on the information in the reference database 30D. In step S71, the controller 30 is configured to determine the impact velocity based on the information in the reference database 30D. In step S72, the controller 30 is configured to determine the input angle of the impact based on the information in the reference database 30D.

Then, in step S73, the controller 30 is configured to operate/deploy the right curtain air bag 1B (i.e., the curtain air bag on the side where the initial impact occurred) in accordance with the impact energy, the impact velocity, and the input angle. The controller 30 is then configured to proceed to step S74 to operate/deploy the left curtain air bag 1A (i.e., the curtain air bag on the other side) after waiting for a prescribed amount of time.

If the controller 30 determines in step S62' that the initial contact occurred at the center portion of the roof R, the controller 30 is configured to proceed to step S75, and then to step S76 where the controller 30 is configured to determine the impact energy (acceleration G) based on the information in the reference database 30D. In step S77, the controller 30 is configured to determine the impact velocity based on the information in the reference database 30D. In step S78, the controller 30 is configured to determine the input angle of the impact based on the information in the reference database 30D.

Then, in step S79, the controller 30 is configured to operate/deploy the left curtain air bag 1A and the right curtain air bag 1B simultaneously in accordance with the impact energy, the impact velocity, and the input angle.

Thus, with the constituent features described above, the vehicle passenger restraining system in accordance with the fifth embodiment offers substantially the same operational effects as first embodiment. More particularly, the controller 30 is configured to process the output signals from the first to fourth deformation detecting sections 20a to 20d with the combination of the fast Fourier transform (FFT), the zero crossing analysis, the autocorrelation function, and the covariance function, and to compare the processed signal waveforms in the reference database 30D stored in the controller 30, distinctive characteristics of the output signals that are difficult to express with one processing method can be picked up by one of the other processing methods such that the different processing methods supplement one another.

Consequently, since the distinctive characteristics of the signals obtained from the deformation detecting sections 20a to 20d can be expressed more clearly, it is easier to compare the distinctive characteristics of the processed signals with the reference database 30D (which is prepared in advance for the purpose of identifying the impact location) and the impact location can be identified more precisely. Additionally, the impact acceleration, the impact velocity, and the impact angle can be determined more precisely.

As a result, the left and right curtain air bags 1A and 1B can be operated with a more appropriate timing in accordance with the location of the initial contact with the ground and the restraining performance with respect to the passenger inside of the vehicle M can be improved further.

Sixth Embodiment

Referring now to FIGS. 27 to 35, a vehicle passenger restraining system in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The vehicle passenger restraining system of the sixth embodiment differs from the vehicle passenger restraining system in the first embodiment in that a deformation sensor unit 120 with a pair of first and second sensors 120A and 120B (first and second detecting sections) are provided instead of the deformation sensor 20 of the first embodiment. Moreover, a method of determination of the impact information based on the output signals from the first and second deformation sensors 120A and 120B that is used in the sixth embodiment is different from the first embodiment.

Figure 27:
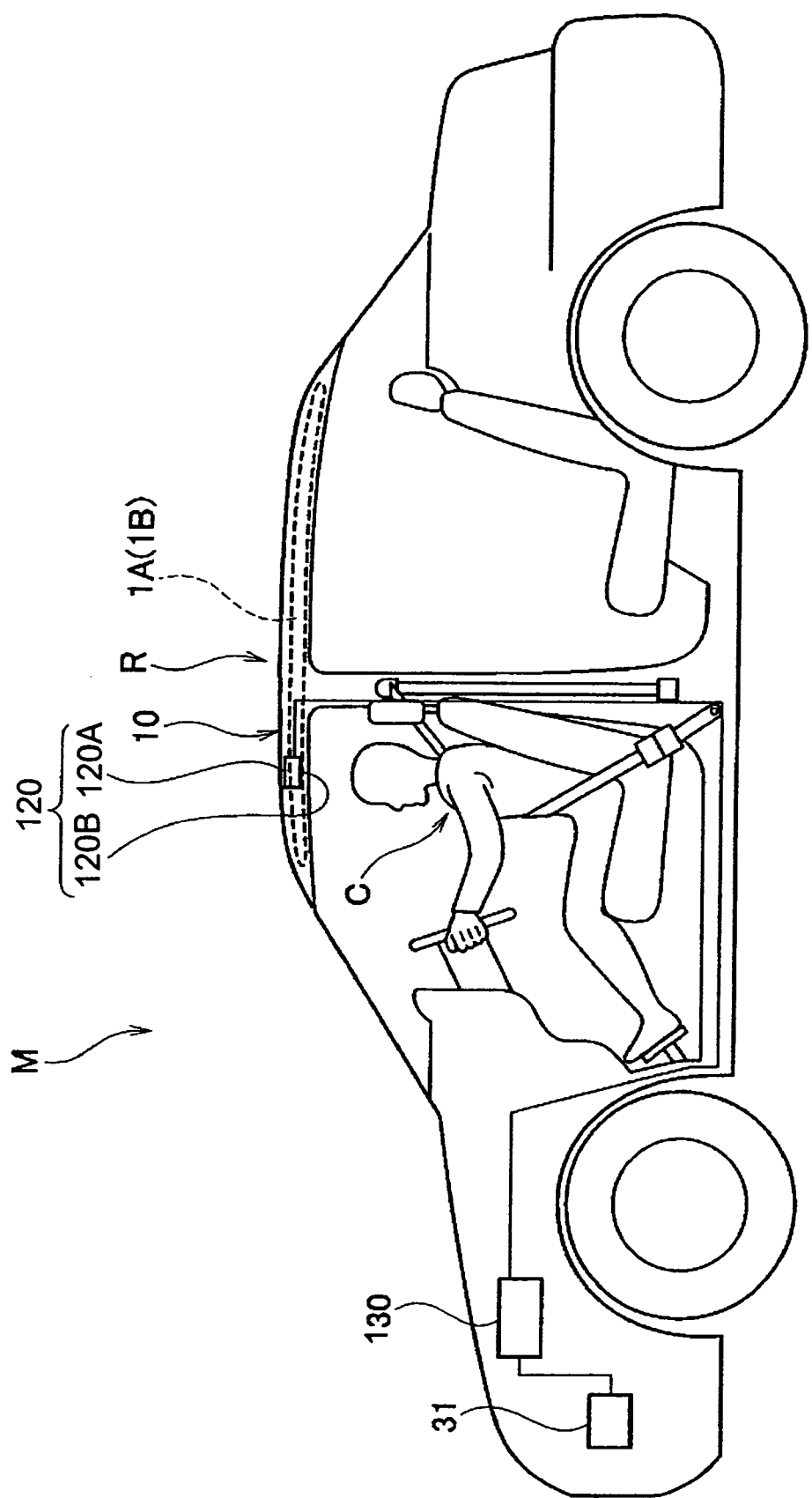
FIG. 27 is a schematic side elevational view of a vehicle body illustrating an arrangement of a deformation detecting device, a passenger restraining device, and a passenger restraining device operating unit of a vehicle passenger restraining system in accordance with a sixth embodiment of the present invention.
Figure 28:
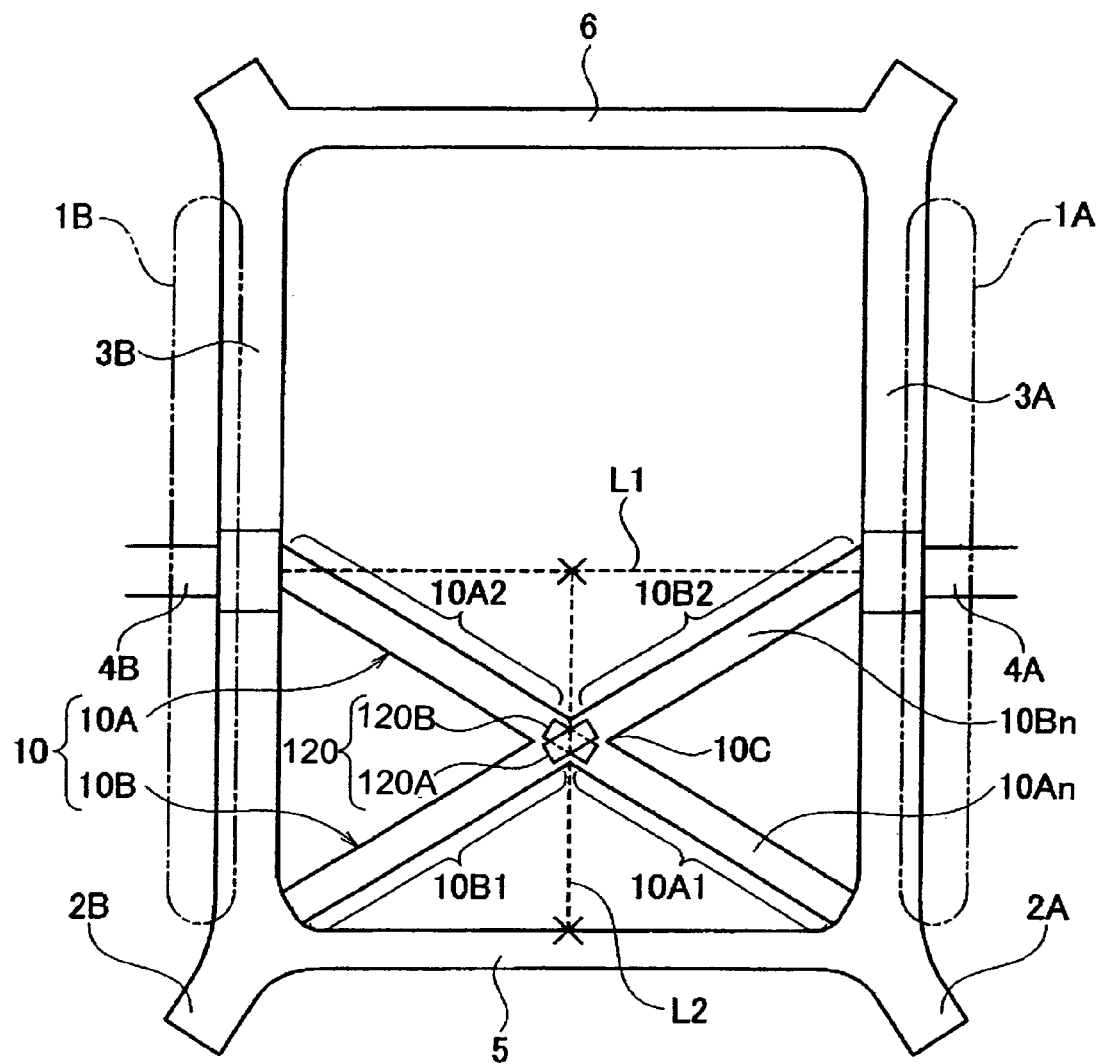
FIG. 28 is a top plan view of a roof structure of the vehicle body illustrating an arrangement of a reinforcing member in accordance with the sixth embodiment of the present invention.

FIG. 27 is a schematic left side elevational view of a vehicle body illustrating an arrangement of the detecting sensor unit 120, the left and right curtain air bags 1A and 1B (only the left curtain air bag 1A is shown in FIG. 27), and a passenger restraining device operating unit (a controller 130) of the vehicle passenger restraining system in accordance with the sixth embodiment of the present invention. FIG. 28 is a top plan view of a roof structure of the vehicle body illustrating an arrangement of the reinforcing member 10 in accordance with the sixth embodiment of the present invention.

Similarly to the first embodiment, as seen in FIGS. 27 and 28, the vehicle body upper structure is provided with the left and right curtain air bags 1A and 1B (only the left curtain air bag 1A is shown in FIG. 27), the reinforcing member 10, the deformation sensor unit 120, and the controller 130. The left and right curtain air bags 1A and 1B are arranged on the left and right sides inside the cabin of the vehicle M. The left and right curtain air bags 1A and 1B constitute a plurality of passenger restraining devices of the present invention, and the left and right curtain air bags 1A and 1B are configured to restrain a passenger inside of the vehicle M in an emergency situation such as a rollover event. Similarly to the first embodiment explained above, the reinforcing member 10 is arranged in the impact region A1 where the roof R will contact the ground in a rollover event. In this embodiment, the impact region A1 is preferably defined as a region in the forward half of the roof R. The deformation sensor unit 120 constitutes a deformation detecting device of the present invention, and includes the deformation detecting sections 120A and 120B that are arranged in an appropriate location on or in the reinforcing member 10. The deformation sensor unit 120 is configured to detect deformation of the reinforcing member 10. The controller 130 preferably constitutes a passenger restraining device operating unit of the present invention. The controller 130 is configured to detect a location on the roof R that contacts the ground in a rollover event based on information from the deformation sensor unit 120. Then the controller 130 is configured to operate a specific one or both of the curtain air bags (i.e., one or both of the left curtain air bag 1A and the right curtain air bag 1B) in accordance with the location where deformation occurred.

Similarly to the first embodiment explained above, the rollover (RO) detecting sensor 131 configured to detect if the vehicle M is rolling over is provided in a front portion of the vehicle M and a rollover detection signal from the rollover detecting sensor 131 is fed to the controller 130.

Thus, in the vehicle passenger restraining system in accordance with the sixth embodiment of the present invention, the reinforcing member 10 is arranged in the region where the roof R of the vehicle M will contact the ground in a rollover situation and the first and second sensors 120A and 120B of the deformation sensor unit 120 are provided in an appropriate location on or in the reinforcing member 10. When the rollover situation occurs, the deformation sensor unit 120 is configured to detect the location on the roof R that contacts the ground and a specific curtain air bag or air bags (i.e., one or both of the left curtain air bag 1A and the right curtain air bag 1B) is operated in accordance with the deformation location. The reinforcing member 10 is the same as the first embodiment, and thus, will not be discussed in further detail herein. The deformation sensor unit 120 is arranged in the intersection joint section 10C of the reinforcing member 10.

Also, similarly to the first embodiment explained above, in the sixth embodiment of the present invention, the first and second reinforcing frames 10A and 10B each have a generally linear shape and are arranged in an X-shaped structure in which the intersection portion of the X-shaped structure forms the intersection joint section 10C as shown in FIG. 28. The intersection joint section 10C preferably has a larger bending strength than the standalone portions 10An and 10Bn of the first and second reinforcing frames 10A and 10B that are disposed adjacent to the intersection joint section 10C.

As mentioned above, the deformation sensor unit 120 preferably comprises the first sensor 120A and the second sensor 120B that are stress/strain sensors configured and arranged to detect stress/strain of the first and second reinforcing frames 10A and 10B. The first and second sensors 120A and 120B are preferably mounted to an upper surface and a lower surface of a central portion of the intersection joint section 10C of the reinforcing member 10 (i.e., arranged above and below the central portion of the inside of the intersection joint section 10C).

Also, as shown in FIG. 28, the intersection joint section 10C of the reinforcing member 10 is positioned along a straight line segment L2 that joins the approximate transverse middle portion of the front roof rail 5 to the approximate middle of a straight line segment L1 joining the upper end of the left center pillar 4A to the upper end of the right center pillar 4B.

Figure 29:
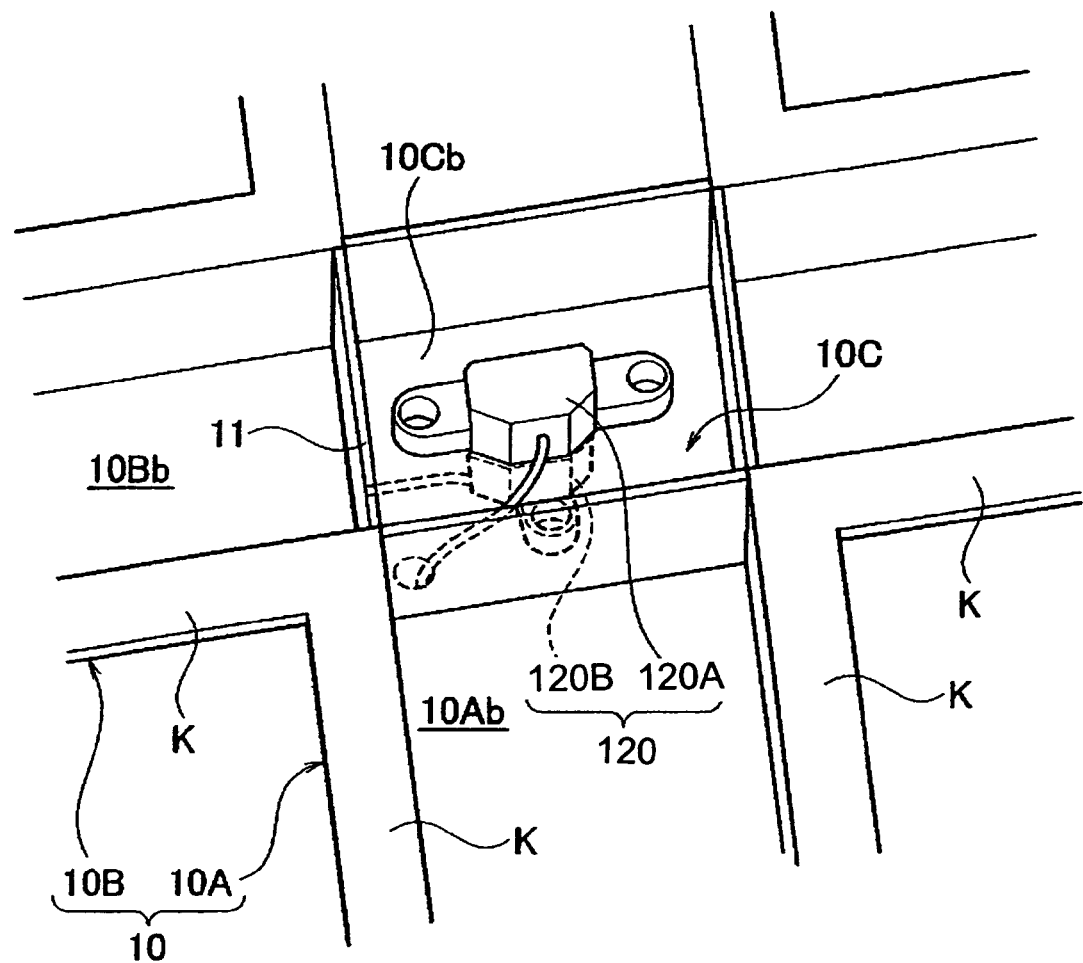
FIG. 29 is an enlarged, partial top perspective view of the reinforcing member illustrating the encircled portion A of FIG. 31 in accordance with the sixth embodiment of the present invention.
Figure 31:
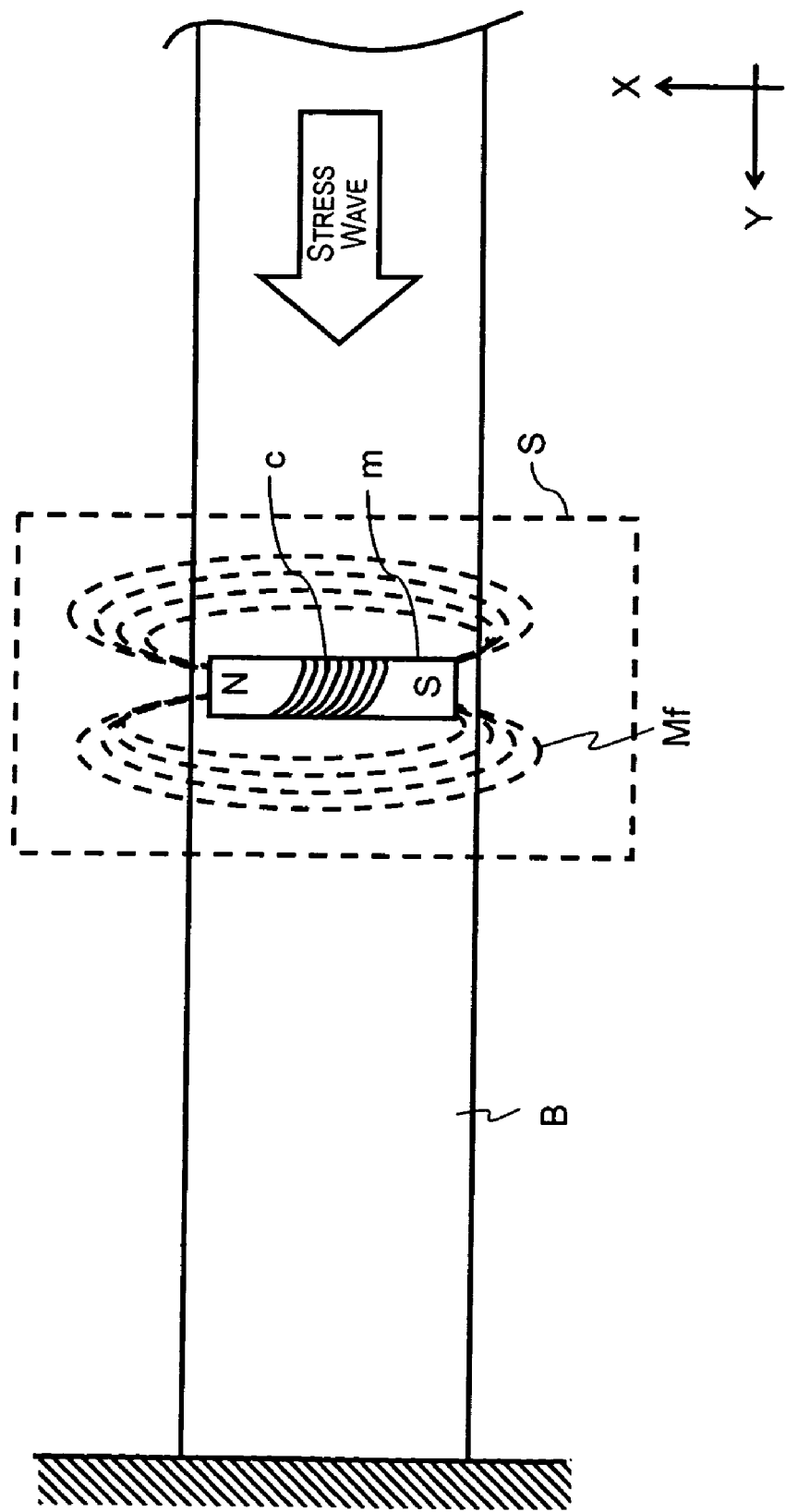
FIG. 31 is a schematic diagram of a magnetic field formed in the vicinity of a stress/strain sensor similar to the deformation detecting device in accordance with the sixth embodiment of the present invention.

FIG. 29 is an enlarged, partial top perspective view of the reinforcing member 10 illustrating the encircled portion A of FIG. 31 in accordance with the sixth embodiment of the present invention. As shown in FIG. 29, the first and second sensors 120A and 120B are arranged in the intersection joint section 10C surrounded by the reinforcing rib 11 similar to the first embodiment. The first sensor 120A is preferably mounted to the upper surface of the bottom plate 10Cb of the intersection joint section 10C and the second sensor 120B is preferably mounted to the bottom surface of the bottom plate 10Cb.

The first sensor 120A is oriented such that a longitudinal axis of the first sensor 120A forms a right angle with respect to the longitudinal axis of the first reinforcing frame 10A and the second sensor 120B is oriented such that a longitudinal axis of the second sensor 120B forms a right angle with respect to the longitudinal axis of the second reinforcing frame 10B as shown in FIG. 29.

As mentioned above, the front frame part 10A1 constitutes the portion of the first reinforcing frame 10A extending from the intersection joint section 10C to the front pillar connecting part 103f of the left front pillar 2A and the rear front frame 10A2 constitutes the portion of the first reinforcing frame 10A extending from the intersection joint section 10C to the center pillar connecting part 103g of the right center pillar 4B. The front frame part 10B1 constitutes the portion of the second reinforcing frame 10B extending from the intersection joint section 10C to the front pillar connecting part 103f of the right front pillar 2B, and the rear frame part 10B2 constitutes the portion of the second reinforcing frame 10B extending from the intersection joint section 10C to the center pillar connecting part 103g of the left center pillar 4A.

In the sixth embodiment of the present invention, the first and second reinforcing frames 10A and 10B are preferably arranges such that the transverse cross sectional areas of the first and second front frame parts 10A1 and 10B1 and the first and second rear frame parts 10A2 and 10B2 are substantially equal as in the first embodiment.

Figure 30:
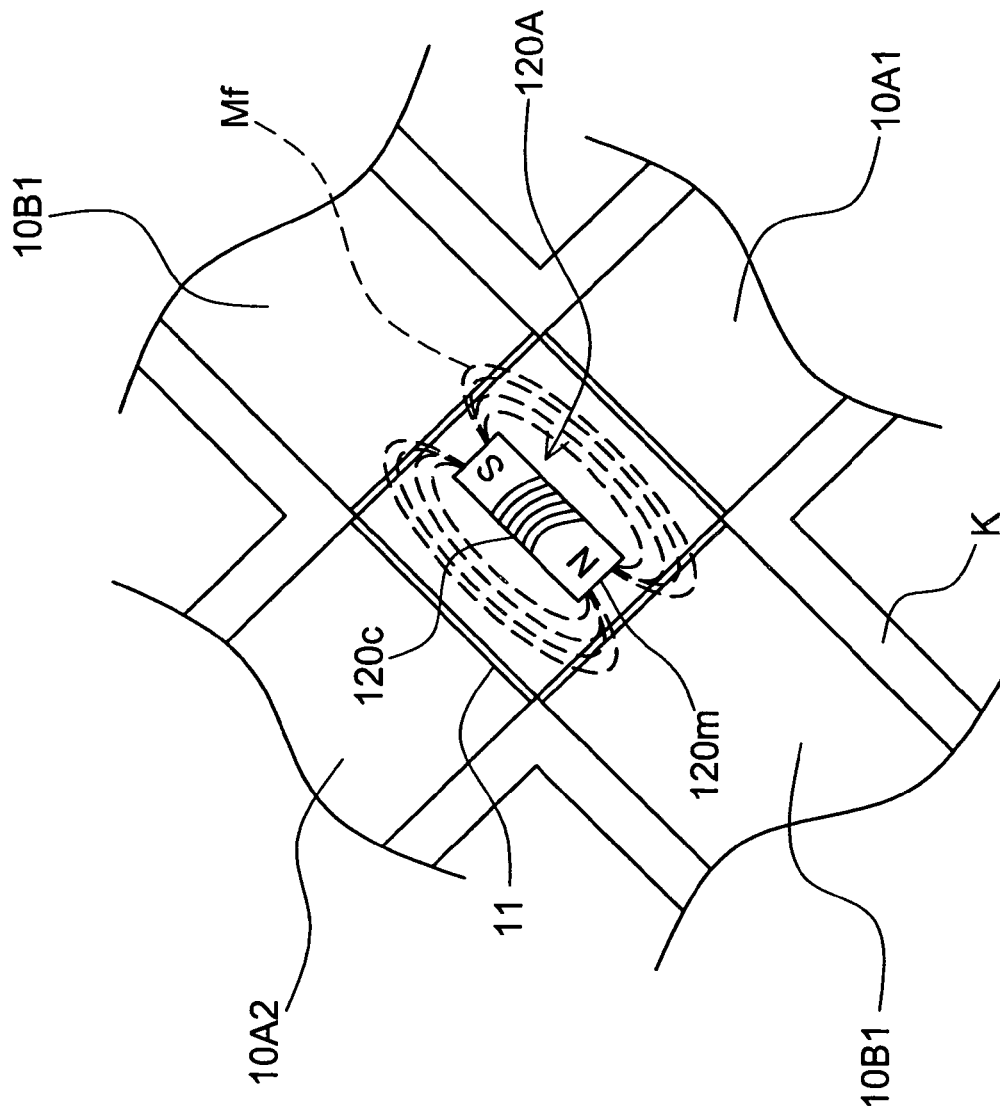
FIG. 30 is an enlarged diagrammatic top perspective view of an internal structure of the deformation detecting device illustrating a magnetic field generated in the deformation detecting device in accordance with the sixth embodiment of the present invention.

FIG. 30 is an enlarged diagrammatic top plan view of an internal structure of the first sensor 120A illustrating a magnetic field Mf generated in the first sensor 120A in accordance with the sixth embodiment of the present invention. Each of the first and second sensors 120A and 120B preferably comprises a magnetic body 120m and a copper wire 120c wound around the magnetic body 120m as shown in FIG. 30 (only the first sensor 120A is shown in FIG. 30). Each of first and second sensors 120A and 120B is configured to output a voltage value resulting from changes in the magnetic field Mf generated around the magnetic body 120m.

Figure 32:
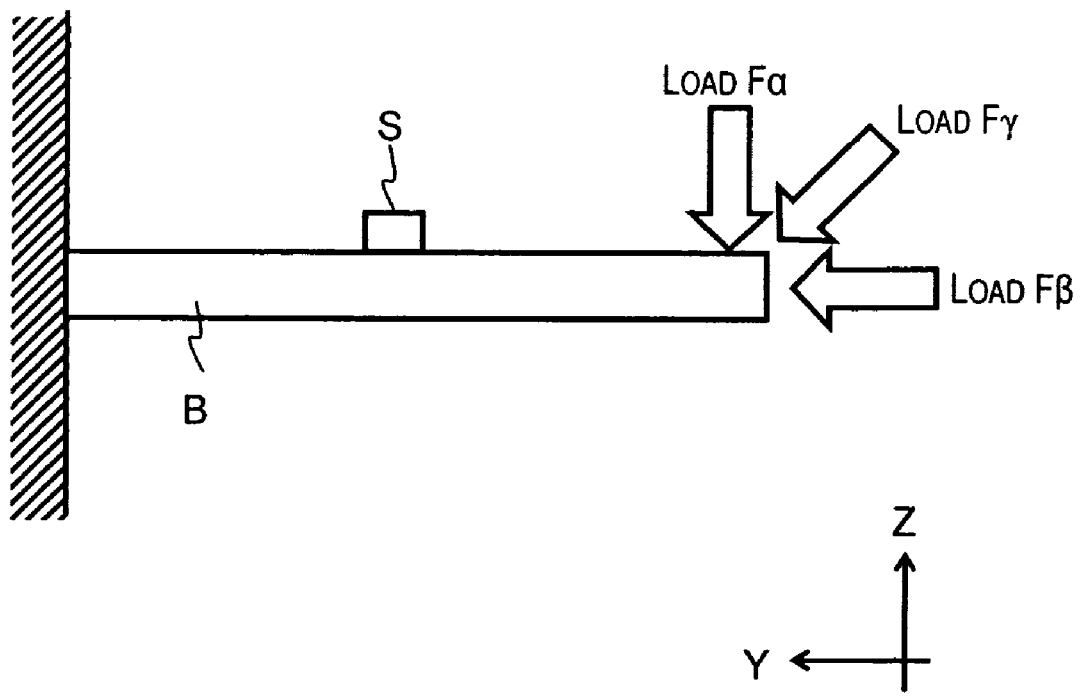
FIG. 32 is a simplified schematic diagram illustrating an experiment for testing the performance of the stress/strain sensor illustrated in FIG. 31 with respect to loads Fα, Fβ and Fγ in accordance with the sixth embodiment of the present invention.

FIG. 31 is a schematic diagram of a magnetic field formed in the vicinity of a stress/strain sensor S similar to the deformation detecting device in accordance with the sixth embodiment of the present invention. FIG. 32 is a simplified schematic diagram illustrating an experiment for testing the performance of the stress/strain sensor S with respect to loads Fα, Fβ and Fγ in accordance with the sixth embodiment of the present invention. Referring now to FIGS. 31 and 32, the general characteristics of a stress/strain sensor S will now be discussed by considering the behavior of a stress/strain sensor S mounted to a middle portion of a cantilevered beam B in the three different load scenarios illustrated in FIG. 32: a vertical load Fα applied to the free end of the beam B, a diagonal load Fγ applied to the free end of the beam B, and a horizontal load Fβ applied to the free end of the beam B. The structure of the stress/strain sensor S of FIG. 31 is substantially identical to the structure of the first and second sensors 120A and 120B as the stress/strain sensor S has a magnetic body m and a copper wire c wound around the magnetic body m.

Figure 33:
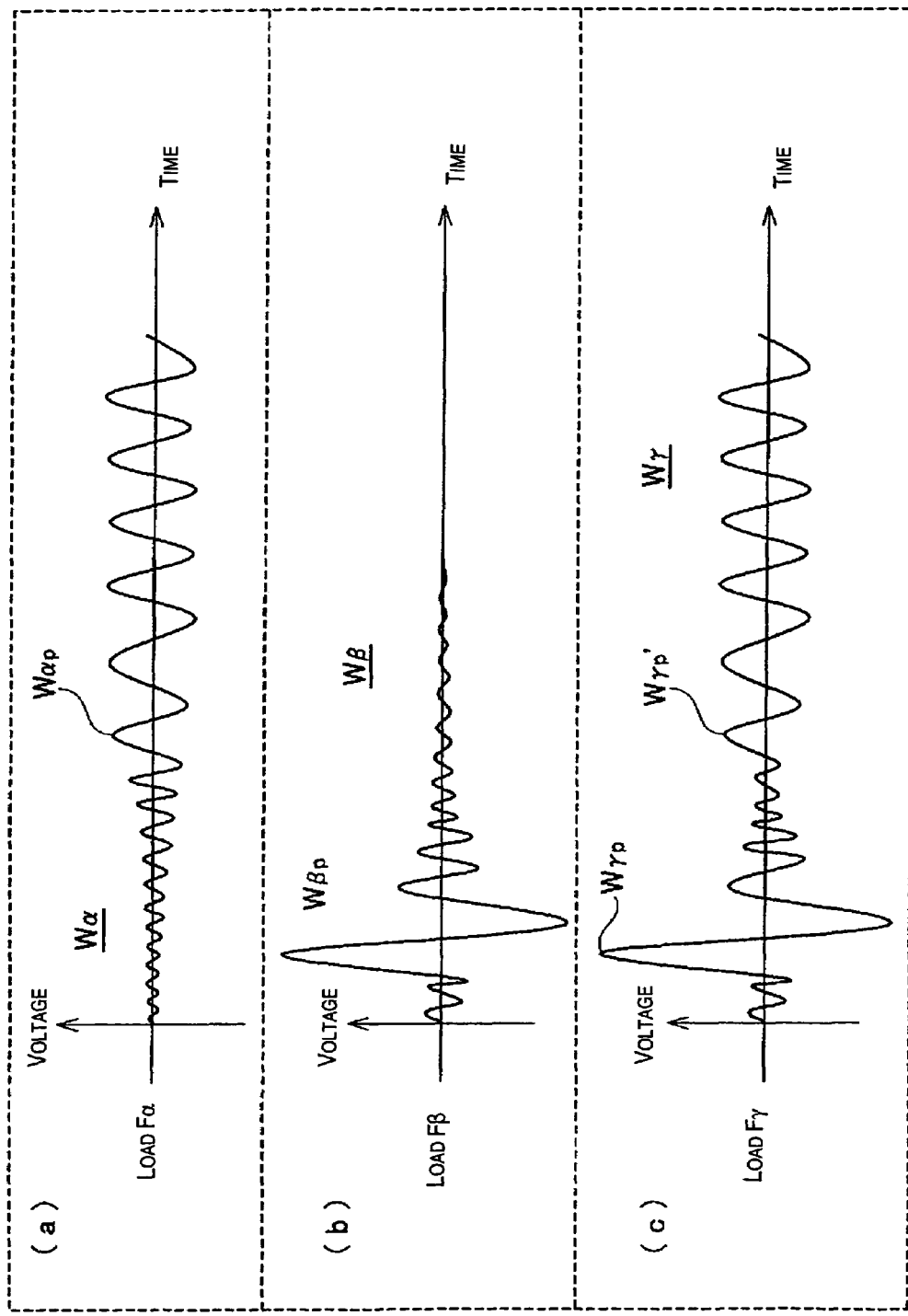
FIG. 33 is a series of diagrams (a) to (c) illustrating voltage patterns (waveforms) generated by the stress/strain sensor illustrated in FIGS. 31 and 32 in response to the load Fα (diagram (a)), the load Fβ (diagram (b)), and the load Fγ (diagram (c)) in accordance with the sixth embodiment of the present invention.

FIG. 33 is a series of diagrams (a) to (c) illustrating voltage patterns (waveforms) generated by the stress/strain sensor S in response to the load Fα (diagram (a)), the load Fβ (diagram (b)), and the load Fγ (diagram (c)) shown in FIG. 32. As shown in FIG. 33, the peak voltage Wαp (the diagram (a) of FIG. 33) of the sensor signal waveform Wα produced in a case where the load Fα is applied to the beam B is later than the peak voltage Wβp (the diagram (b) of FIG. 33) of the sensor signal waveform Wβ produced in a case where the load Fβ is applied to the beam B. This difference occurs because of the effects of bending stress in the former case and axial stress in the latter case. The value of the peak voltage Wαp is also smaller than value of the peak voltage Wβp.

On the other hand, when the load Fγ, which has both bending and axial components, acts on the beam B, the sensor signal waveform Wγ has two peak voltages: a preceding peak voltage Wγp that results from the effects of axial stress and a subsequent peak voltage Wγp' that results from the effects of bending stress as seen in the diagram (c) of FIG. 33. Here, the stress/strain sensor S is arranged to be perpendicular to the stress wave transmitted through the beam B.

Figure 34:
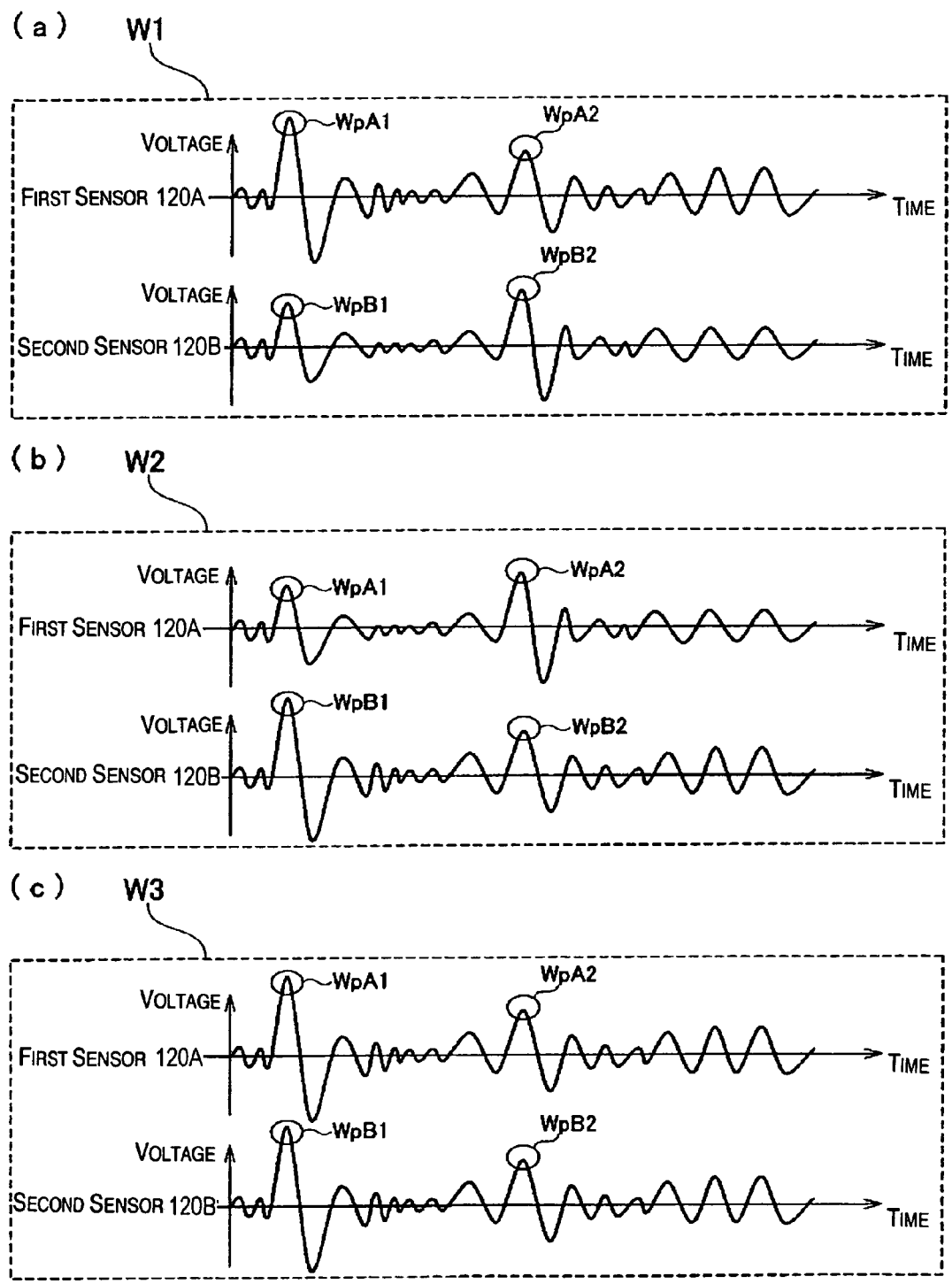
FIG. 34 is a series of diagrams (a) to (c) illustrating voltage waveforms issued from the deformation detecting device of the vehicle passenger restraining system in a case where the vehicle rolls over and makes initial contact with the ground on the left side of the roof (diagram (a)), in a case where the vehicle rolls over and makes initial contact on the right side of the roof (diagram (b)), and in a case where the vehicle rolls over and makes initial contact on the approximate center of the roof (diagram (c)) in accordance with the sixth embodiment of the present invention.

Thus, when the vehicle M rolls over and the roof R contacts the ground such that the first and/or second reinforcing frame 10A and 10B undergoes a localized deformation corresponding to the location on the roof R that contacted the ground, the first and second sensors 120A and 120B are configured to detect the deformation of the first and/or second reinforcing frame 10A and 10B and output voltage signals. FIG. 34 is a series of diagrams (a) to (c) that illustrate the signal waveforms issued in a rollover event in which the left side of the roof R makes the initial contact with the ground (the diagram (a)), a rollover event in which the right side of the roof R makes the initial contact with the ground (the diagram (b)), and a rollover event in which the approximate center of the roof R makes the initial contact with the ground (the diagram (c)) in accordance with the sixth embodiment of the present invention.

The diagram (a) of FIG. 34 shows the voltage waveforms W1 issued from the first and second sensors 120A and 120B in a first case in which the vehicle M rolls over and makes initial contact with the ground on the left side of the roof R. As shown in the diagram (a) of FIG. 34, the first peak voltage WpA1 of the first sensor 120A is higher than the first peak voltage WpB1 of the second sensor 120B and the second peak voltage WpB2 of the second sensor B is higher than the second peak voltage WpA2 of the first sensor 120A.

The diagram (b) of FIG. 34 shows the voltage waveforms W2 issued from the first and second sensors 120A and 120B in a second case in which the vehicle M rolls over and makes initial contact with the ground on the right side of the roof R. As shown in the diagram (b) of FIG. 34, the first peak voltage WpB1 of the second sensor 120B is higher than the first peak voltage WpA1 of the first sensor 120A and the second peak voltage WpA2 of the first sensor 120A is higher than the second peak voltage WpB2 of the second sensor 120B.

The diagram (c) of FIG. 34 shows the voltage waveforms W3 issued from the first and second sensors 120A and 120B in a third case in which the vehicle M rolls over and makes initial contact with the ground on a central portion of the roof R. As shown in the diagram (c) of FIG. 34, the first peak voltage WpA1 of the first sensor 120A and the first peak voltage WpB1 of the second sensor 120B are approximately the same and the second peak voltage WpA2 of the first sensor 120A and the second peak voltage WpB2 of the second sensor 120B are approximately the same.

Figure 35:
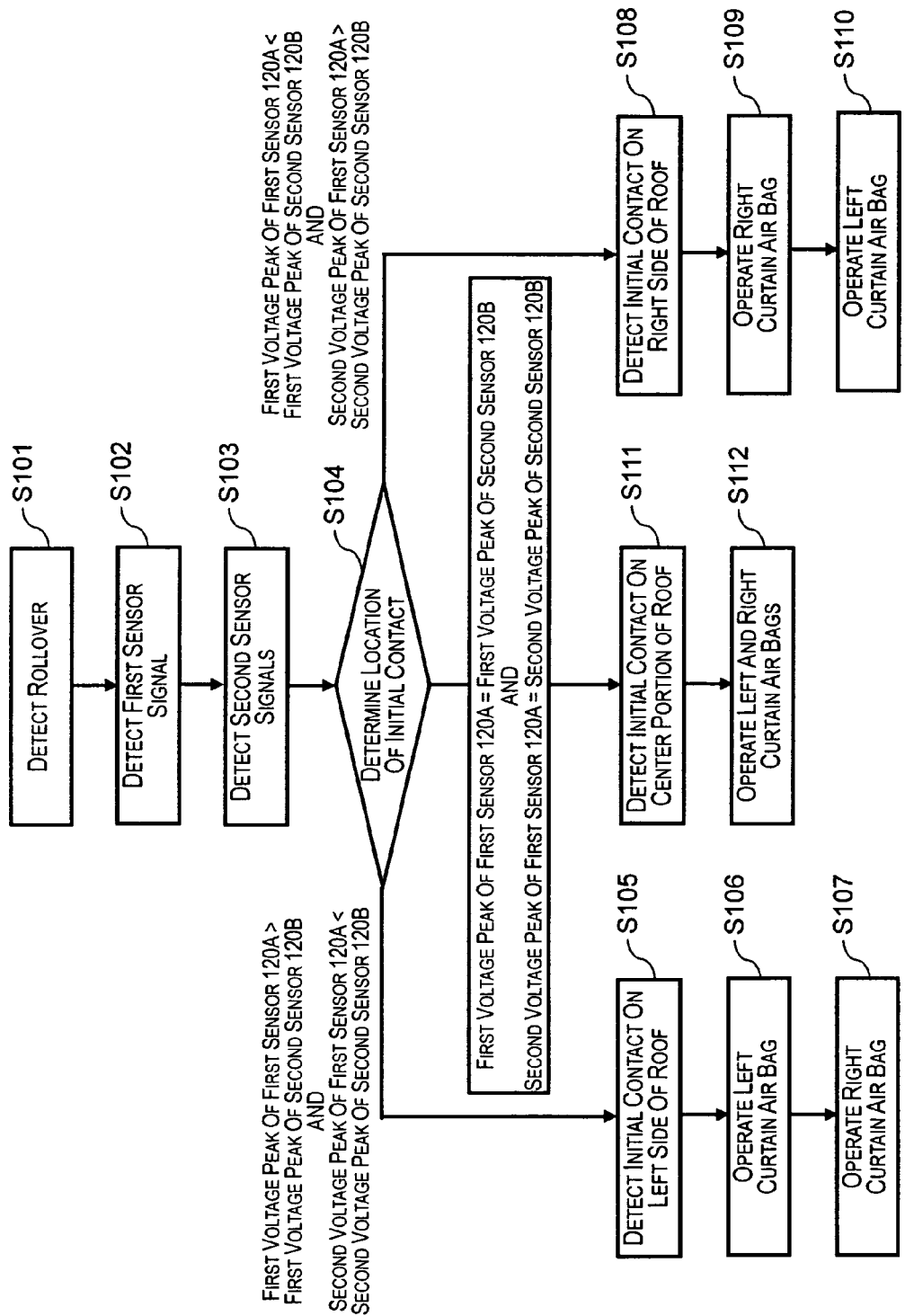
FIG. 35 is a flowchart illustrating a control algorithm for controlling from detection of a rollover event to operation of the passenger restraining devices executed in the vehicle passenger restraining system in accordance with the sixth embodiment of the present invention.

Thus, by reading the voltage signal waveforms outputted from the first and second sensors 120A and 120B, it is possible to detect the portion (location) of the roof R that makes the initial contact with the ground during a rollover event. Then, the controller 130 is configured to select one or both of the left and right curtain air bags 1A and 1B (i.e., specific curtain air bags among a plurality of curtain air bag 1A and 1B) to be initially operated/deployed by following the control algorithm shown in FIG. 35. FIG. 35 is a flowchart illustrating a control algorithm for controlling from detection of a rollover event to operation of the passenger restraining devices executed in the vehicle passenger restraining system in accordance with the sixth embodiment of the present invention.

More specifically, in step S101 of the control algorithm of FIG. 35, the rollover detecting sensor 131 is configured to detect a rollover event. When the roof R contacts the ground, in steps S102 and S103 voltage signals are outputted from the first sensor 120A and the second sensor 120B to the controller 130.

In step S104, the controller 130 is configured to receive the signals from the first and second sensors 120A and 120B. If the first peak voltage WpA1 of the first sensor 120A is higher than the first peak voltage WpB1 of the second sensor 120B and the second peak voltage WpB2 of the second sensor B is higher than the second peak voltage WpA2 of the first sensor 120A, then the controller 130 is configured to determine in step S5 that the initial contact occurred on the left side of the roof R. Then, the controller 130 is configured to proceed to step S106 where the controller 130 is configured to operate/deploy the left curtain air bag 1A first. Then, in step S107, the controller 130 is configured to operate/deploy the right curtain air bag 1B after waiting for a prescribed amount of time.

On the other hand, if the first peak voltage WpB1 of the second sensor 120B is higher than the first peak voltage WpA1 of the first sensor 120A and the second peak voltage WpA2 of the first sensor 120A is higher than the second peak voltage WpB2 of the second sensor 120B in step S104, then the controller 130 is configured to determine in step S108 that the initial contact occurred on the right side of the roof R and to proceed to step S109 where the controller 130 is configured to operate/deploy the right curtain air bag 1B first. Then, in step S1110, the controller 130 is configured and arranged to operate/deploy the left curtain air bag 1A after waiting for a prescribed amount of time.

If the first peak voltage WpA1 of the first sensor 120A and the first peak voltage WpB1 of the second sensor 120B are approximately the same and the second peak voltage WpA2 of the first sensor 120A and the second peak voltage WpB2 of the second sensor 120B are approximately the same in step S104, the controller 130 is configured to determine in step S111 that the initial contact occurred at the center portion of the roof and to proceed to step S112 where the controller 130 is configured to operate/deploy the left curtain air bag 1A and the right curtain air bag 1B simultaneously.

Thus, in the vehicle passenger restraining system in accordance with the sixth embodiment (i.e., having the constituent features described heretofore), the reinforcing member 10 is arranged in a region where the roof R of the vehicle M will contact the ground in a rollover situation and the sensor unit 120 is arranged and configured to detect the deformation of the reinforcing member 10 corresponding to the location on the roof R that makes contact with the ground when the vehicle M rolls over. As a result, the controller 130 can detect the actual location on the roof R where the roof R contacts the ground in a rollover situation in a precise manner.

Based on the detected deformation location on the roof R, the controller 130 can operate specific passenger restraining devices (i.e. one or both of the left curtain air bag 1A and the right curtain air bag 1B). As a result, the curtain air bag 1A or 1B that properly corresponds to the impact location can be operated earlier during a rollover event and the passenger restraining effect can be increased.

Also, in the sixth embodiment, the reinforcing member 10 comprises the first reinforcing frame 10A extending between the upper end of the left front pillar 2A and the upper end of the right center pillar 4B and the second reinforcing frame 10B extending between the upper end of the right front pillar 2B and the upper end of the left center pillar 4A. The first and second reinforcing frames 10A and 10B are coupled together at the portions where they intersect each other, the resulting intersection joint section 10C being arranged in the approximate middle with respect to the widthwise direction of the vehicle M. The sensor unit 120 is mounted to the intersection joint section 10C. As a result, in addition to the aforementioned operational effects, the location where the roof R makes initial contact with the ground in a situation where the vehicle M rolls over can be indicated in a reliable manner by the deformation that results from the load imparted to the first and second reinforcing frames 10A and 10B. Thus, the deformation can be detected precisely by the deformation sensor unit 120 arranged in the intersection joint section 10C.

Additionally, in the sixth embodiment of the present invention, the first and second reinforcing frames 10A and 10B each have a generally linear shape and the bending strength of the intersection joint section 10C is larger than the bending strength of the standalone portions 10An and 10Bn of the first and second reinforcing frames 10A and 10B that are disposed adjacent to the intersection joint section 10C. Also, the deformation sensor unit 120 comprises the first sensor 120A and the second sensor 120B that are configured to detect stress/strain of the first and second reinforcing frames 10A and 10B and arranged above and below the central portion of the intersection joint section 10C. As a result, since the bending strength of the intersection joint section 10C is higher than the adjacent portions, the first and second sensors 120A and 120B arranged in the intersection joint section 10C can detect the deformation of the first and second reinforcing frames 10A and 10B with good sensitivity and, thus, can deliver accurate output signals.

Since the first and second sensors 120A and 120B capable of detecting stress/strain are used as the deformation sensor unit 120, the signal waveforms can be outputted in a short amount of time (approximately one third the time of a conventional acceleration sensor) and the response with which the curtain air bags 1A and 1B are operated/deployed can be increased.

Also, since the transmission speeds of the signal waveforms outputted from the first and second sensors 120A and 120B are different depending on whether axial stress or bending stress is detected, the signal waveform processing can be executed easily with a small number of sensors by configuring the first and second reinforcing frames 10A and 10B to have a simple linear structure that enables axial and bending stresses to be communicated (transmitted) readily.

Seventh Embodiment

Referring now to FIGS. 36 to 42, a vehicle passenger restraining system in accordance with a seventh embodiment will now be explained. In view of the similarity between the sixth and seventh embodiments, the parts of the seventh embodiment that are identical to the parts of the sixth embodiment will be given the same reference numerals as the parts of the sixth embodiment. Moreover, the descriptions of the parts of the seventh embodiment that are identical to the parts of the sixth embodiment may be omitted for the sake of brevity.

The vehicle passenger restraining system of the seventh embodiment differs from the vehicle passenger restraining system of the sixth embodiment in that a reinforcing member 210 is substituted for the reinforcing member 10 of the sixth embodiment, and also in that a deformation sensor unit 220 having first, second and third sensors 220A, 220B and 220C are used instead of the deformation sensor 120 of the sixth embodiment. Other constituent features of the vehicle body upper structure in accordance with the seventh embodiment are the same as those of the sixth embodiment.

Figure 36:
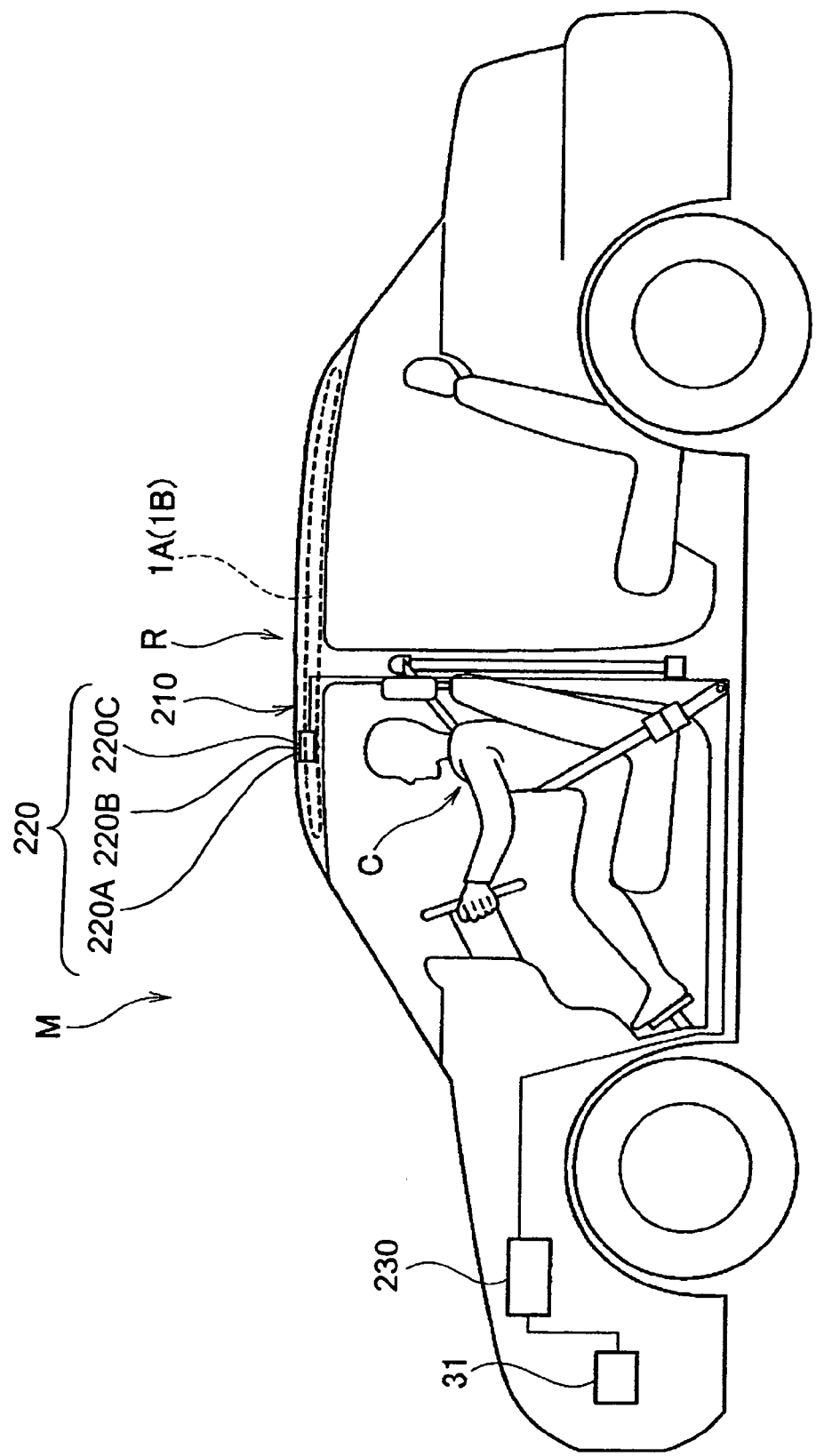
FIG. 36 is a schematic side elevational view of a vehicle body illustrating an arrangement of a deformation detecting device, a passenger restraining device, and a passenger restraining device operating unit of a vehicle passenger restraining system in accordance with a seventh embodiment of the present invention.
Figure 37:
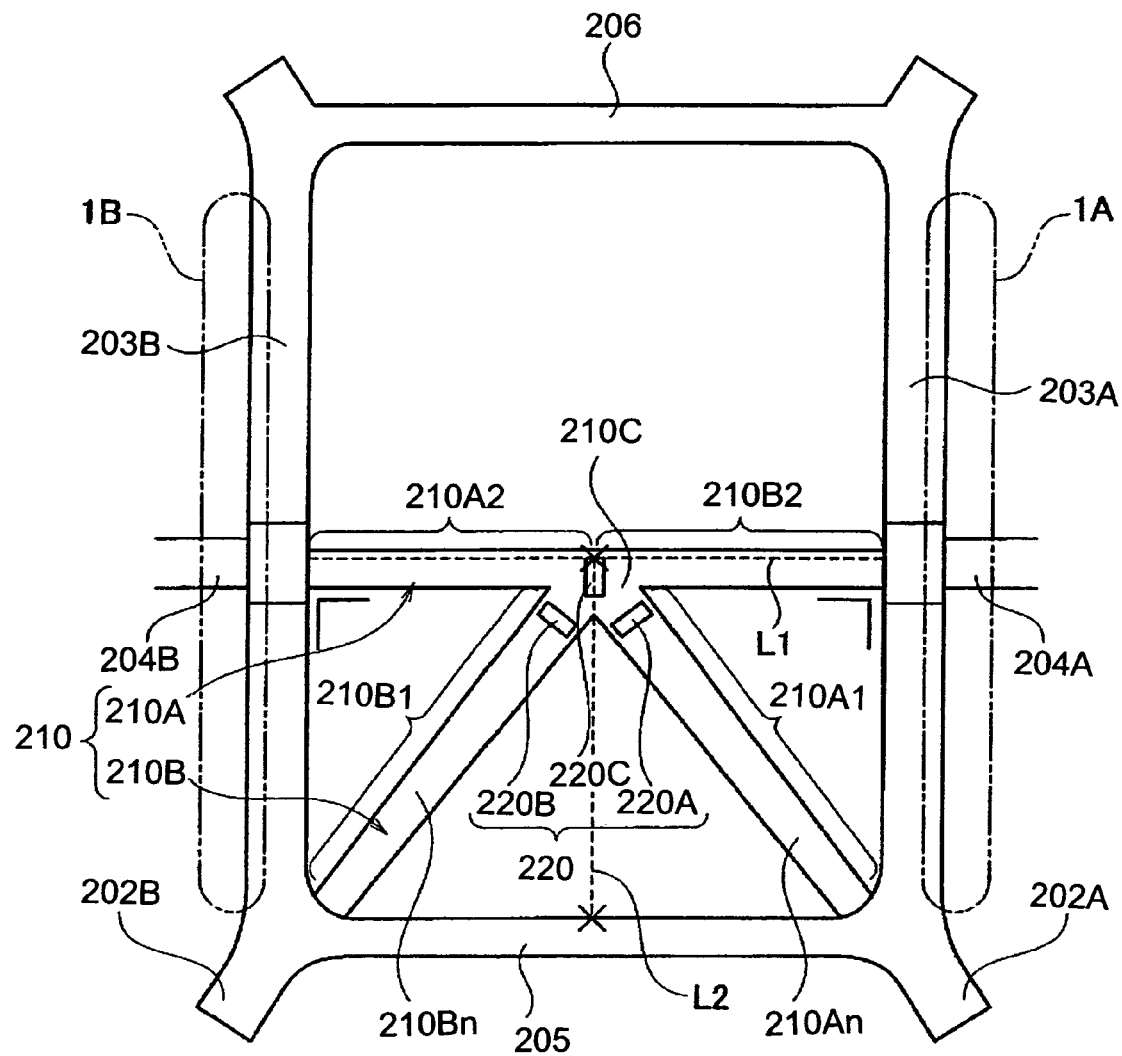
FIG. 37 is a top plan view of a roof structure of a vehicle body illustrating an arrangement of the reinforcing member used in the vehicle passenger restraining system in accordance with the seventh embodiment of the present invention.

FIG. 36 is a schematic side view of a vehicle body illustrating an arrangement of a deformation detecting device (the deformation sensor unit 220), a passenger restraining device (the curtain air gas 1A and 1B), and a passenger restraining device operating unit (a controller 230) of a vehicle passenger restraining system in accordance with the seventh embodiment of the present invention. FIG. 37 is a top plan view of a roof structure of a vehicle body illustrating an arrangement of the reinforcing member 210 used in the vehicle passenger restraining system in accordance with the seventh embodiment of the present invention.

More specifically, as shown in FIGS. 36 and 37, the vehicle body upper structure in accordance with the seventh embodiment has the reinforcing member 210 arranged in a region where the roof R will contact the ground in a rollover situation and the deformation sensor unit 220 (which replaces the deformation sensor unit 120 of the sixth embodiment) serving as a deformation detecting device that is arranged in an appropriate location on or in the reinforcing member 210. The deformation sensor unit 220 is configured and arranged to detect deformation of the reinforcing member 210. Also, as shown in FIG. 36, the vehicle body upper structure is provided with the controller 230 configured to detect a location on the roof R that contacts the ground in a rollover event based on information from the sensor unit 220 and to operate a specific curtain air bag or air bags (i.e., one or both of the left curtain air bag 1A and the right curtain air bag 1B) in accordance with the location where deformation occurred. Additionally, the vehicle body upper structure is provided with a rollover detecting sensor 231 configured to detect if the vehicle is rolling over.

In the seventh embodiment too, as shown in FIG. 37, the reinforcing member 210 comprises a first reinforcing frame 210A extending between the upper end of a left front pillar 202A (front left top portion of vehicle M) to the upper end of a right center pillar 204B (approximate longitudinal middle portion of top right edge of vehicle M) and a second reinforcing frame 210B extending between the upper end of the right front pillar 202B (front right top portion of vehicle M) to the upper end of left center pillar 204A (approximate longitudinal middle portion of top left edge of vehicle M). The first and second reinforcing frames 210A and 210B are joined together at the portions where they intersect each other and the resulting intersection joint section 210C is arranged in the approximate middle portion with respect to the widthwise direction of the vehicle M as seen in FIG. 37. The deformation sensor unit 220 is arranged in the intersection joint section 210C.

The differences in the seventh embodiment with respect to the sixth embodiment will now be described. As shown in FIG. 37, first and second rear frame parts 210A2 and 210B2 located rearward of the intersection joint section 210C of the first and second reinforcing frames 210A and 210B are arranged linearly (in a straight line) along the widthwise direction of the vehicle M. On the other hand, first and second front frame parts 210A1 and 210A2 located forward of the intersection joint section 210C of the first and second reinforcing frames 210A and 210B are arranged in angle with respect to each other. Each of the first and second front frame parts 210A1 and 210A2 are arranged in a generally linear manner. Therefore, the overall reinforcing member 210 has the general shape of a letter K. Additionally, the intersection joint section 210C has a larger bending strength than the standalone portions of the first and second reinforcing frames 210A and 210B that are disposed adjacent to the intersection joint section 210C. The sensor unit 220 comprises the first, second and third sensors 220A, 220B and 220C that are stress/strain sensors configured and arranged to detect stress/strain of the first and second reinforcing frames 210A and 210B.

Figure 40:
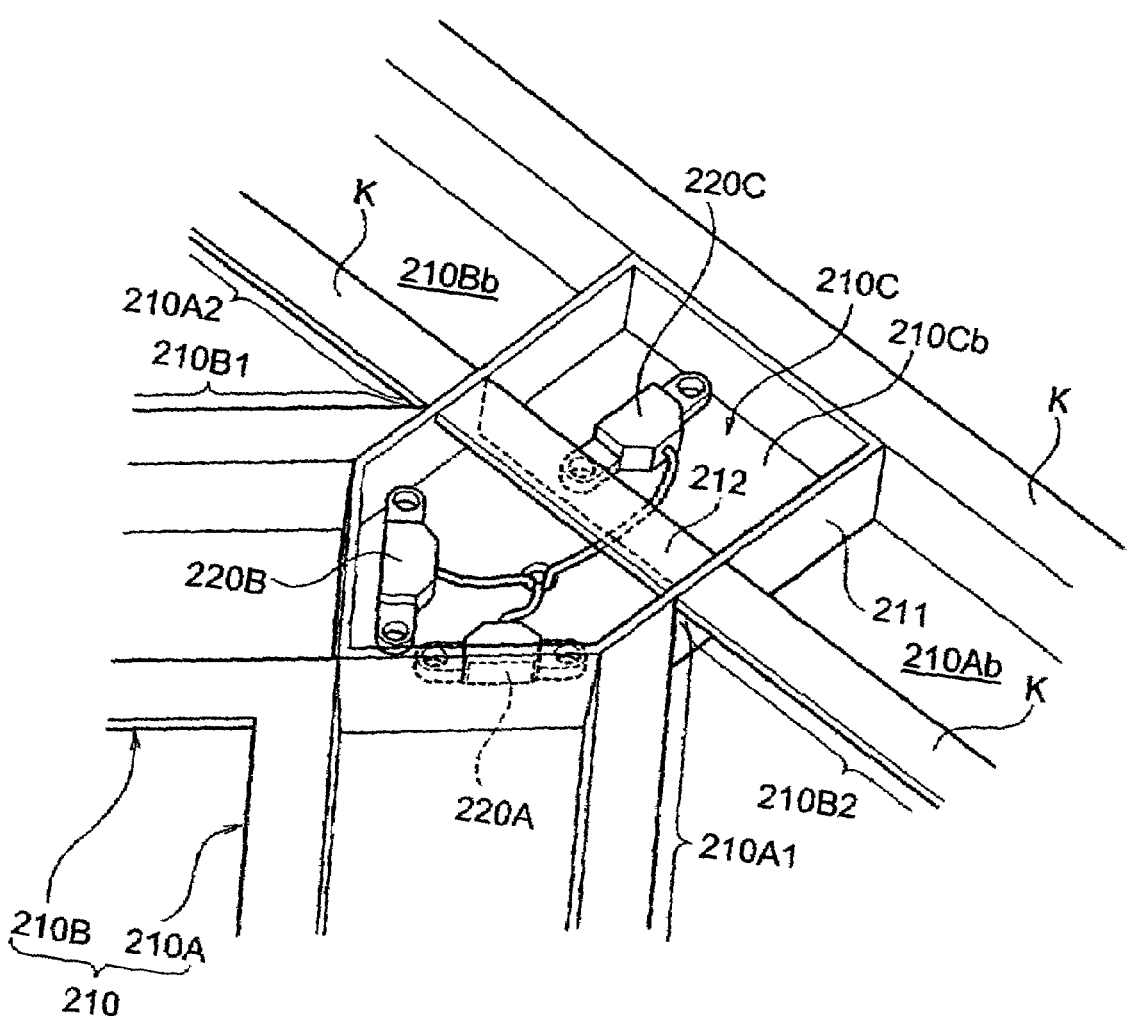
FIG. 40 is an enlarged, partial top perspective view of the reinforcing member illustrating the encircled portion B of FIG. 39 in accordance with the seventh embodiment of the present invention.

As shown in FIG. 40, the first and second sensors 220A and 220B are arranged inside the intersection joint section 210C in positions facing toward the first and second front frame parts 210A1 and 210B1, respectively. The third sensor 220C is arranged inside the intersection joint section 210C in a position between the first and second rear frame parts 210A2 and 210B2.

In the seventh embodiment of the present invention, the first, second and third sensors 220A, 220B and 220C are stress/strain sensors that are basically the same as those used as the first and second sensors 120A and 120B in the sixth embodiment. The first, second and third sensors 220A, 220B and 220C are arranged on an upper surface of a bottom plate 210Cb of the intersection joint section 210C as shown in FIG. 40.

As shown in FIG. 40, the first sensor 220A is preferably oriented so that the longitudinal axis thereof is arranged at a right angle with respect to the longitudinal axis of the front frame part 210A1 of the first reinforcing frame 210A and the second sensor unit 220B is preferably oriented so that the longitudinal axis of thereof is arranged at right angle with respect to the front frame part 210B1 of the second reinforcing frame 210B. The third sensor unit 220C is preferably oriented so that the longitudinal axis thereof is arranged at a right angle with respect to the first and second rear frame parts 210A2 and 210B2 of the first and second reinforcing frames 210A and 210B.

Figure 38:
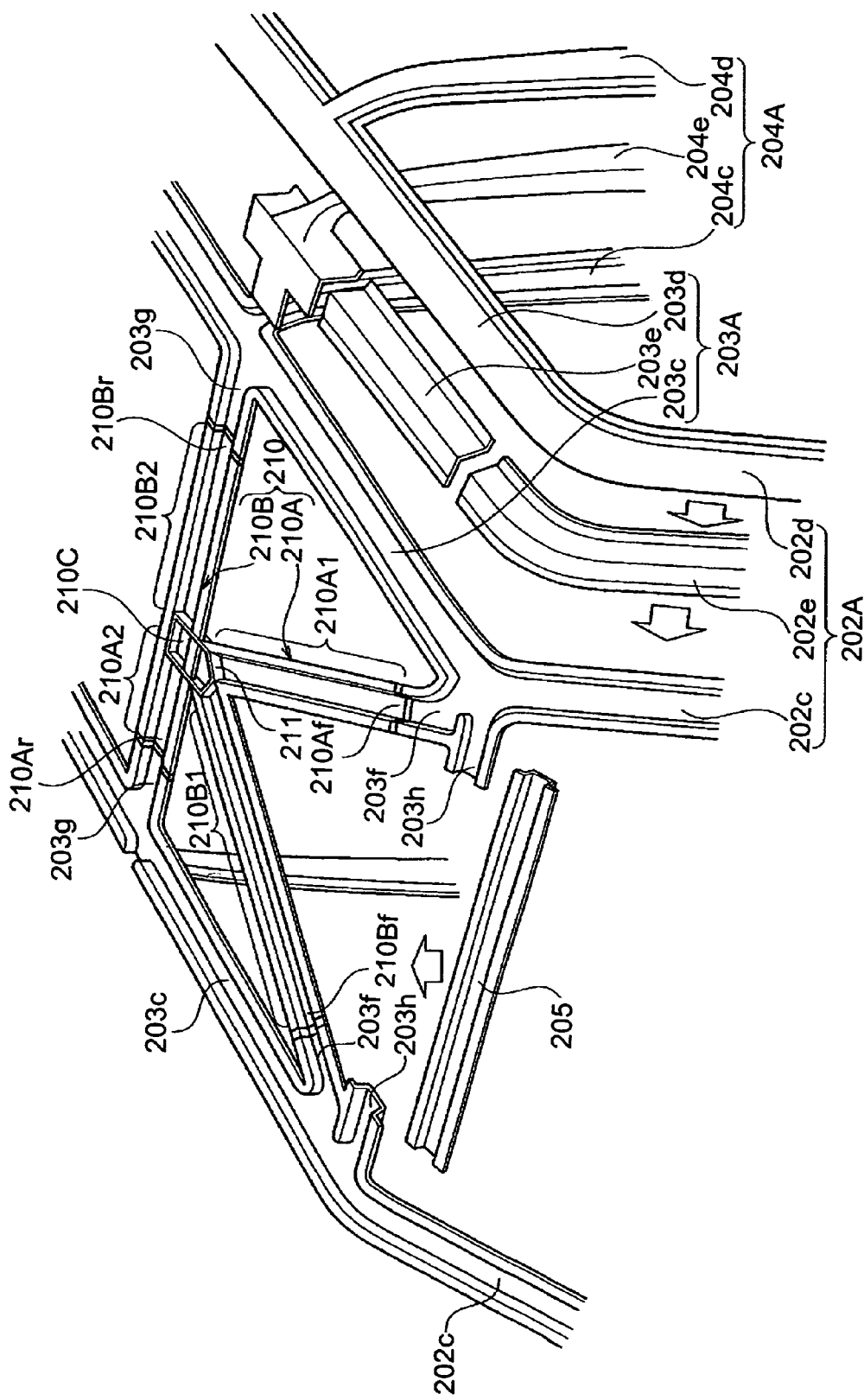
FIG. 38 is an exploded, partial top front perspective view of a framework structure in the vicinity of a roof of the vehicle in accordance with the seventh embodiment of the present invention.

FIG. 38 is an exploded partial front perspective view of a framework structure in the vicinity of the roof R of the vehicle M in accordance with the seventh embodiment of the present invention. In the seventh embodiment of the present invention, the structure of the perimeter of the roof R (i.e., the structures of the front pillars 202A and 202B, the roof side rails 203A and 203B, and the center pillars 204A and 204B) is as shown in FIG. 38, which is generally the same as that of the sixth embodiment, except that the first and second rear frame parts 210A2 and 210B2 of the first and second reinforcing frames 210A and 210B are arranged linearly along the widthwise direction of the vehicle M.

Figure 39:
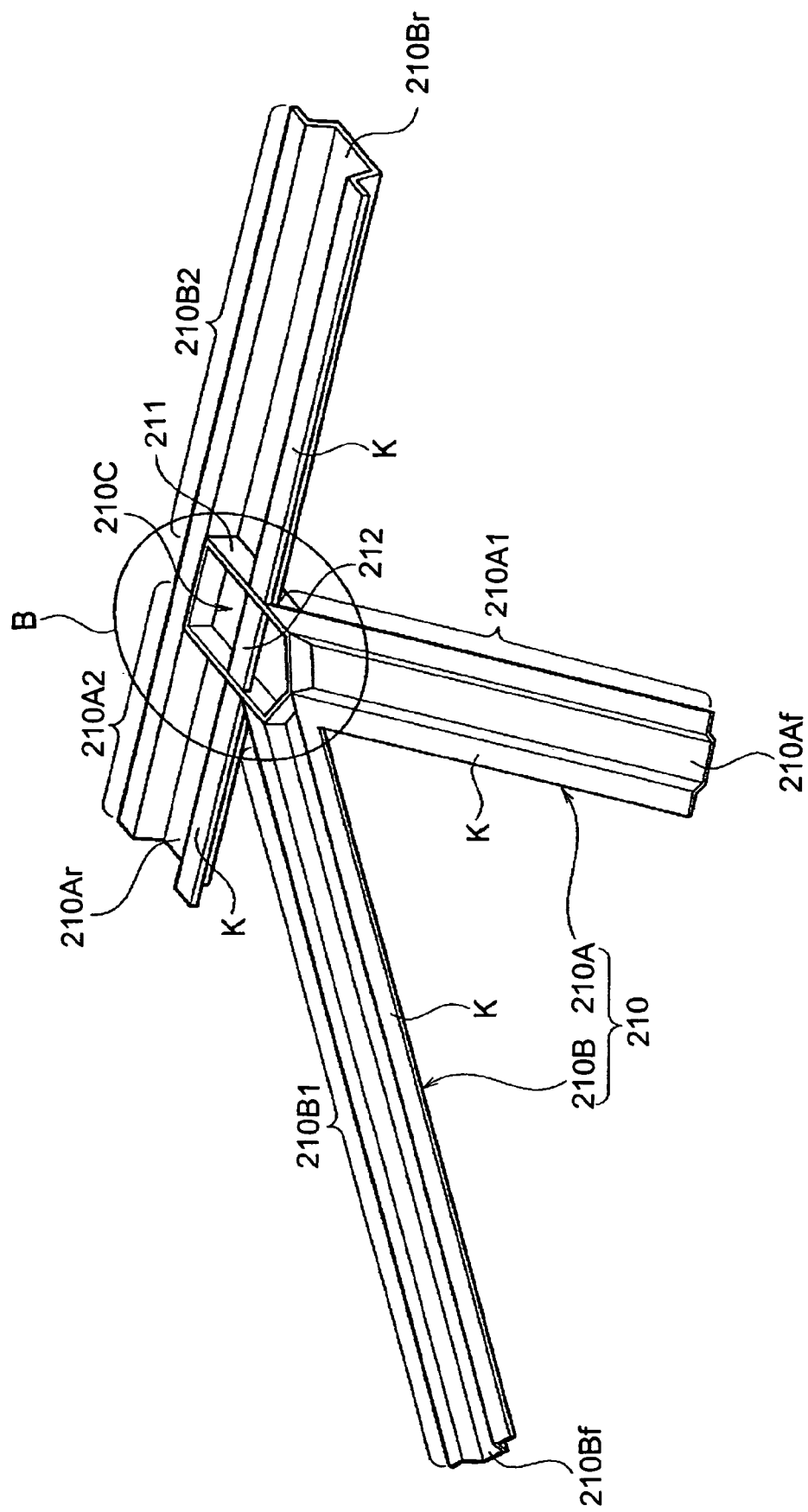
FIG. 39 is an enlarged, partial top perspective view of the reinforcing member of the vehicle passenger restraining system in accordance with the seventh embodiment of the present invention.

FIG. 39 is an enlarged front perspective view of the reinforcing member 210 of the vehicle passenger restraining system in accordance with the seventh embodiment of the present invention. As shown in FIG. 39 and similarly to the sixth embodiment, the first and second reinforcing frames 210A and 210B have inverted hat-shaped cross sectional shapes that protrude downwardly. Also, as shown in FIG. 38, the front end 210Af of the first reinforcing frame 210A is fitted together with the front pillar connecting part 203f of the left front pillar 202A and joined thereto with a lap joint, and the rear end 210Ar of the first reinforcing frame 210A is fitted together with the center pillar connecting part 203g of the right roof side rail 203B and joined thereto with a lap joint.

Likewise, the front end 210Bf of the second reinforcing frame 210B is fitted together with the front pillar connecting part 203f of the right front pillar 202B and joined thereto with a lap joint, and the rear end 210Br of the second reinforcing frame 210B is fitted together with the center pillar connecting part 203g of the left roof side rail 203A and joined thereto with a lap joint.

Also, similarly to the sixth embodiment, the front pillars 202A and 202B and the center pillars 204A and 204B each have a three layered structure comprising the pillar inner section 202c and 204c, the pillar outer section 202d and 204d, and the pillar reinforcement 202e and 204e, respectively. The left and right roof side rails 203A and 203B also have a three-layered structure comprising the roof side rail inner section 203c, the roof side rail outer section 203d, and the roof side rail reinforcement section 203e.

In the seventh embodiment too, the upwardly open sides of the first and second reinforcing frames 210A and 210B, the front and rear roof rails 205 and 206, and the connecting parts 203f, 203g and 203h are provided with flanges K that form the brims of the inverted hat-shaped cross sectional shapes thereof as shown in FIG. 39. A roof panel is joined to the flanges K and thereby closes the cross sections of these members.

FIG. 40 is an enlarged, partial top perspective view of the reinforcing member 210 illustrating the encircled portion B of FIG. 39 in accordance with the seventh embodiment of the present invention. In the seventh embodiment, since the first and second rear frame parts 210A2 and 210B2 of the first and second frames 210A and 210B are arranged linearly in the widthwise direction of the vehicle M, the intersection joint section 210C in which the first, second and third sensors 220A, 220B and 220C are arranged has a pentagonal shape in a top plan view, as shown in FIGS. 39 and 40. Similarly to the sixth embodiment, the perimeter of the intersection joint section 210C is enclosed by a pentagonal reinforcing rib 211. Moreover, a rib 212 corresponding to the forward side flange K of the first and second rear frame parts 210A2 and 210B2 is arranged across a middle portion of the reinforcing rib 211. The first and second sensors 220A and 220B are arranged on the forward side of the rib 212 in the longitudinal direction of the vehicle M and the third sensor 220C is arranged on the rearward side of the rib 212 in the longitudinal direction of the vehicle M as shown in FIG. 40.

Figure 41:
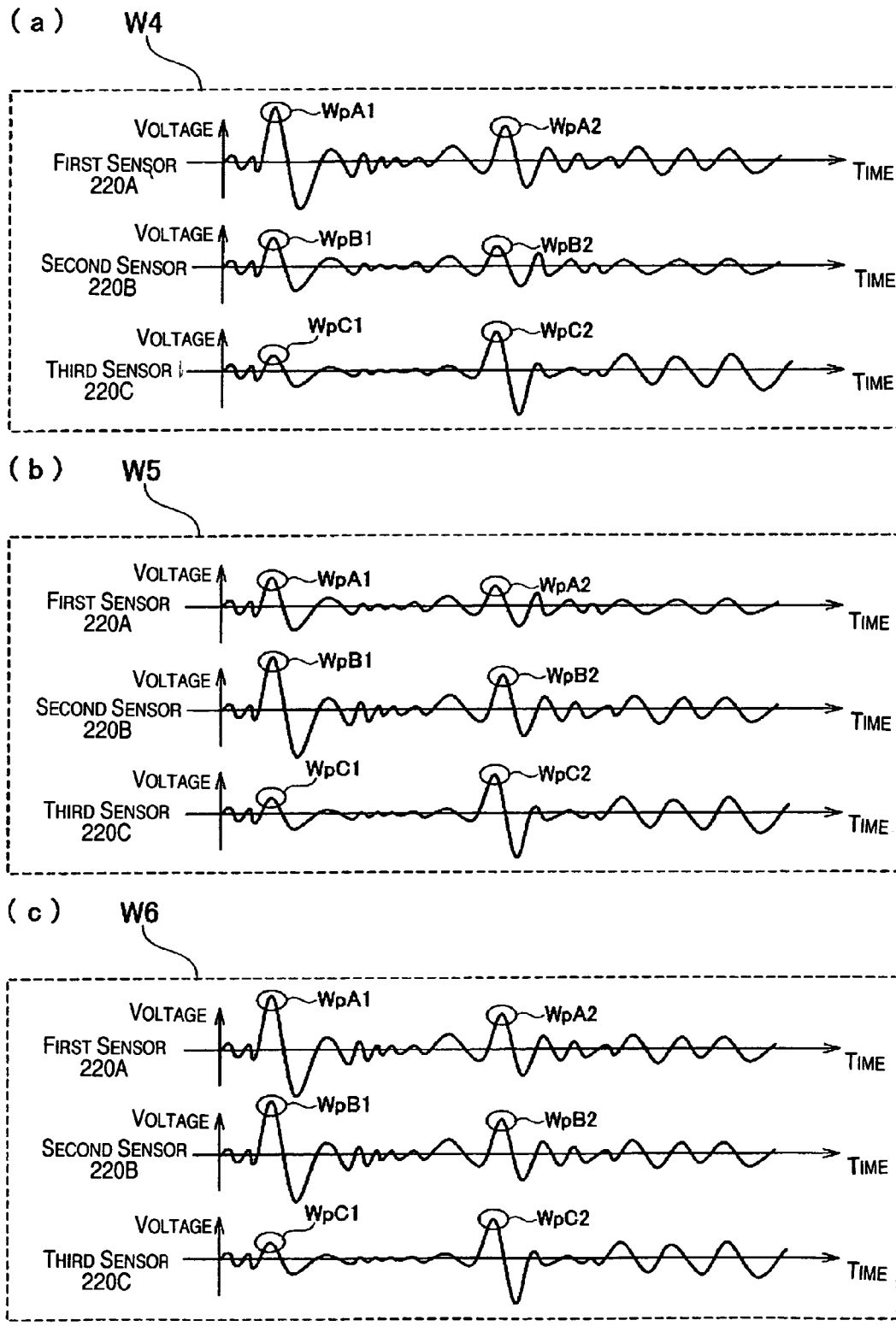
FIG. 41 is a series of diagrams (a) to (c) illustrating voltage waveforms issued from the deformation detecting device of the vehicle passenger restraining system in a case where the vehicle rolls over and makes initial contact with the ground on the left side of the roof (diagram (a)), in a case where the vehicle rolls over and makes initial contact on the right side of the roof (diagram (b)), and in a case where the vehicle rolls over and makes initial contact on the approximate center of the roof (diagram (c)) in accordance with the seventh embodiment of the present invention.

FIG. 41 is a series of diagrams (a) to (c) illustrating the detection signals issued from the first, second and third sensors 220A, 220B and 220C in three different cases in which the vehicle M rolls over such that the roof R contacts the ground, the contact location being different in each case.

The diagram (a) of FIG. 41 shows the voltage waveforms W4 issued from the first, second and third sensors 220A, 220B and 220C in a first case in which the vehicle M rolls over and makes initial contact with the ground on the left side of the roof R. As shown in the diagram (a) of FIG. 41, in a comparison of the first peak voltages WpA1, WpB1 and WpC1 of the first, second and third sensors 220A, 220B and 220C, respectively, the first peak voltage WpA1 of the first sensor 220A is the highest and the first peak voltage WpB1 of the second sensor 220B is higher than the first peak voltage WpC1 of the third sensor 220C. Also, in a comparison of the second peak voltages WpA2, WpB2 and WpC2 of the first, second and third sensors 220A, 220B and 220C, respectively, the second peak voltage WpC2 of the third sensor 220C is the highest and the second peak voltage WpA2 of the first sensor 220A is higher than the second peak voltage WpB2 of the second sensor 220B.

The diagram (b) of FIG. 41 shows the voltage waveforms W5 issued from the first, second and third sensors 220A, 220B and 220C in a second case in which the vehicle M rolls over and makes initial contact with the ground on the right side of the roof R. As shown in the diagram (b) of FIG. 41, in a comparison of the first peak voltages WpA1, WpB1 and WpC1 of the first, second and third sensors 220A, 220B and 220C, respectively, the first peak voltage WpB1 of the second sensor 220B is the highest and the first peak voltage WpA1 of the first sensor 220A is higher than the first peak voltage WpC1 of the third sensor 220C. Also, in a comparison of the second peak voltages WpA2, WpB2 and WpC2 of the first, second and third sensors 220A, 220B and 220C, respectively, the second peak voltage WpC2 of the third sensor 220C is the highest and the second peak voltage WpB2 of the second sensor 220B is higher than the second peak voltage WpA2 of the first sensor 220A.

The diagram (c) of FIG. 41 shows the voltage waveforms W6 issued from the first, second and third sensors 220A, 220B and 220C in a third case in which the vehicle M rolls over and makes initial contact with the ground on a central portion of the roof R. As shown in the diagram (c) of FIG. 41, in a comparison of the first peak voltages WpA1, WpB1 and WpC1 of the first, second and third sensors 220A, 220B and 220C, respectively, the first peak voltage WpA1 of the first sensor 220A and the first peak voltage WpB1 of the second sensor 220B are substantially the same and both are higher than the first peak voltage WpC1 of the third sensor 220C. Also, in a comparison of the second peak voltages WpA2, WpB2 and WpC2 of the first, second and third sensors 220A, 220B and 220C, respectively, the second peak voltage WpC2 of the third sensor 220C is the highest and the second peak voltage WpA2 of the first sensor 220A is substantially the same as the second peak voltage WpB2 of the second sensor 220B.

Figure 42:
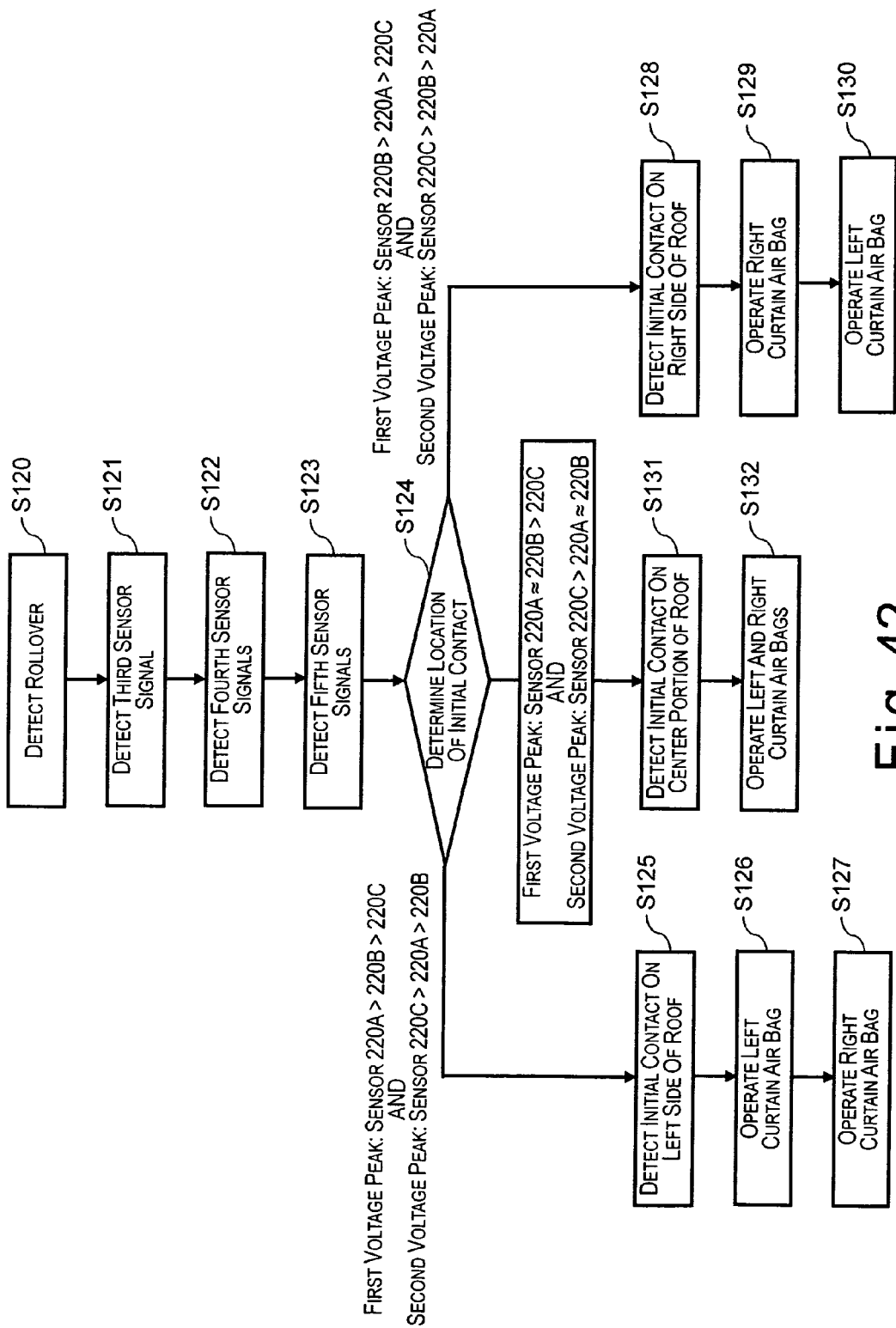
FIG. 42 is a flowchart illustrating a control algorithm for controlling from detection of a rollover event to operation of the passenger restraining devices executed in the vehicle passenger restraining system in accordance with the seventh embodiment of the present invention.

Thus, with the seventh embodiment too, by reading the voltage signal waveforms outputted from the first, second and third sensors 220A, 220B and 220C, it is possible to detect the portion (location) of the roof R that makes the initial contact with the ground during a rollover event. Then, the controller 230 is configured to select one or both of the left and the right curtain air bag 1A and 1B (i.e., a specific curtain air bag or air bags among a plurality of curtain air bags 1A and 1B) to be initially operated/deployed by following the control algorithm shown in FIG. 42. FIG. 42 is a flowchart illustrating the control algorithm for controlling from detection of a rollover event to operation of the passenger restraining devices executed in the vehicle passenger restraining system in accordance with the seventh embodiment of the present invention.

More specifically, in step S120 of the control algorithm of FIG. 42, the rollover detecting sensor 231 is configured to detect a rollover situation. When the roof R contacts the ground, in steps S121, S122, and S123, voltage signals are outputted from first, second and third sensors 220A, 220B and 220C to the controller 230.

In step S124, the controller 230 is configured to receive the signals from the first, second and third sensors 220A, 220B and 220C. If a comparison of the first peak voltages WpA1, WpB1 and WpC1 indicates that the first peak voltage WpA1 of the first sensor 220A is the highest and the first peak voltage WpB1 of the second sensor 220B is higher than the first peak voltage WpC1 of the third sensor 220C and a comparison of the second peak voltages WpA2, WpB2 and WpC2 indicates that the second peak voltage WpC2 of the third sensor 220C is the highest and the second peak voltage WpA2 of the first sensor 220A is higher than the second peak voltage WpB2 of the second sensor 220B, then the controller 230 is configured to determine in step S125 that the initial contact occurred on the left side of the roof R. Then, the controller 230 is configured to proceed to step S126 where the controller 230 is configured to operate/deploy the left curtain air bag 1A first. Then, in step S127, the controller 30 is configured to operate/deploy the right curtain air bag 1B after waiting for a prescribed amount of time.

On the other hand, in step S124, if a comparison of the first peak voltages WpA1, WpB1 and WpC1 indicates that the first peak voltage WpB1 of the second sensor 220B is the highest and the first peak voltage WpA1 of the first sensor 220A is higher than the first peak voltage WpC1 of the third sensor 220C and a comparison of the second peak voltages WpA2, WpB2 and WpC2 indicates that the second peak voltage WpC2 of the third sensor 220C is the highest and the second peak voltage WpB2 of the second sensor 220B is higher than the second peak voltage WpA2 of the first sensor 220A, then the controller 230 is configured to determine in step S128 that the initial contact occurred on the right side of the roof R. Then, the controller 230 is configured to proceed to step S129 where the controller 230 is configured to operate/deploy the right curtain air bag 1B first. Then, in step S130, the controller 230 is configured to operate/deploy the left curtain air bag 1A after waiting for a prescribed amount of time.

In step S124, if a comparison of the first peak voltages WpA1, WpB1 and WpC1 indicates that the first peak voltage WpA1 of the first sensor 220A and the first peak voltage WpB1 of the second sensor 220B are substantially the same and both are higher than the first peak voltage WpC1 of the third sensor 220C and a comparison of the second peak voltages WpA2, WpB2 and WpC2 indicates that the second peak voltage WpC2 of the third sensor 220C is the highest and the second peak voltage WpA2 of the first sensor 220A is substantially the same as the second peak voltage WpB2 of the second sensor 220B, the controller 230 is configured to determine in step S131 that the initial contact occurred at the center portion of the roof R. Then, the controller 230 is configured to proceed to step S132 where the controller 230 is configured to operate/deploy the left curtain air bag 1A and the right curtain air bag 1B simultaneously.

Thus, with the constituent features described above, the vehicle passenger restraining system accordance with the seventh embodiment offers substantially the same operational effects as the sixth embodiment. More specifically, the sensor unit 220 is arranged and configured to detect the deformation of the reinforcing frame 210 that occurs when the vehicle M rolls over and the roof R contacts the ground, the deformation corresponding to the location on the roof R that makes contact with the ground. As a result, the controller 230 can detect the actual location on the roof R where the roof R contacts the ground in a rollover situation in a precise manner.

Based on the detected deformation location on the roof R, the controller 230 can operate specific passenger restraining devices (i.e. either the left curtain air bag 1A or the right curtain air bag 1B). As a result, the curtain air bag 1A or 1B that properly corresponds to the impact location can be operated earlier during a rollover event and the passenger restraining effect can be increased.

In the seventh embodiment, the first and second rear frame parts 210A2 and 210B2 of the first and second reinforcing frames 210A and 210B are arranged linearly (in a straight line) along the widthwise direction of the vehicle M and the first and second front frame parts 210A1 and 210A2 of the first and second reinforcing frames 210A and 210B are arranged at an angle with respect to each other. Additionally, the first, second and third sensors 220A, 220B and 220C arranged in the intersection joint section 210C are stress/strain sensors configured to output signal waveforms having different transmission speeds depending on whether axial stress or bending stress is detected. Similarly to the sixth embodiment, axial stress and bending stress are communicated readily to this kind of stress/strain sensor because the individual first and second rear frame parts 210A2 and 210B2 and the first and second front frame parts 210A1 and 210B1 each have a linear shape. Furthermore, since the structure of the reinforcing member 210 is such that the load input angle and the angles of the first and second reinforcing frames 210A and 210B are approximately the same when viewed from directly above the vehicle M, the transmission efficiency of the axial stress and bending stress is improved further and the signal waveform processing precision can be increased. As a result, the response with which the curtain air bags 1A and 1B are operated/deployed can be increased.

In the seventh embodiment too, the bending strength of the intersection joint section 210C is larger than the bending strength of the standalone portions of the first and second reinforcing frames 210A and 210B due to the existence of the reinforcing rib 211. As a result, the first, second and third sensors 220A, 220B and 220C arranged in the intersection joint section 210C can detect the deformation of the first and second reinforcing frames 210A and 210B with good sensitivity and, thus, can deliver accurate output signals.

Also, similarly to the sixth embodiment, since first, second and third sensors 220A, 220B and 220C capable of detecting stress/strain are used as the sensor unit 220, the signal waveforms can be outputted in a short amount of time (approximately one third the time of a conventional acceleration sensor) and the response with which the curtain air bags 1A and 1B are operated/deployed can be increased.

Also, since the transmission speeds of the signal waveforms outputted from the first, second and third sensors 220A, 220B and 220C are different depending on whether axial stress or bending stress is detected, the signal waveform processing can be executed easily with a small number of sensors by configuring the first and second reinforcing frames 210A and 210B to have a simple linear structure that enables axial and bending stresses to be communicated (transmitted) readily.

Eighth Embodiment

Referring now to FIG. 43 to 51, a vehicle passenger restraining system in accordance with an eighth embodiment will now be explained. In view of the similarity between the sixth and eighth embodiments, the parts of the eighth embodiment that are identical to the parts of the sixth embodiment will be given the same reference numerals as the parts of the sixth embodiment. Moreover, the descriptions of the parts of the eighth embodiment that are identical to the parts of the sixth embodiment may be omitted for the sake of brevity.

The vehicle passenger restraining system of the eighth embodiment differs from the vehicle passenger restraining system of the sixth embodiment in that a deformation sensor unit 320 including first, second, third and fourth switch-type sensors 320A, 320B, 320C and 320D is used instead of the deformation sensor unit 120 of the sixth embodiment. Thus, other constituent features of the vehicle body upper structure in accordance with the eighth embodiment are the same as those of the sixth embodiment.

Figure 43:
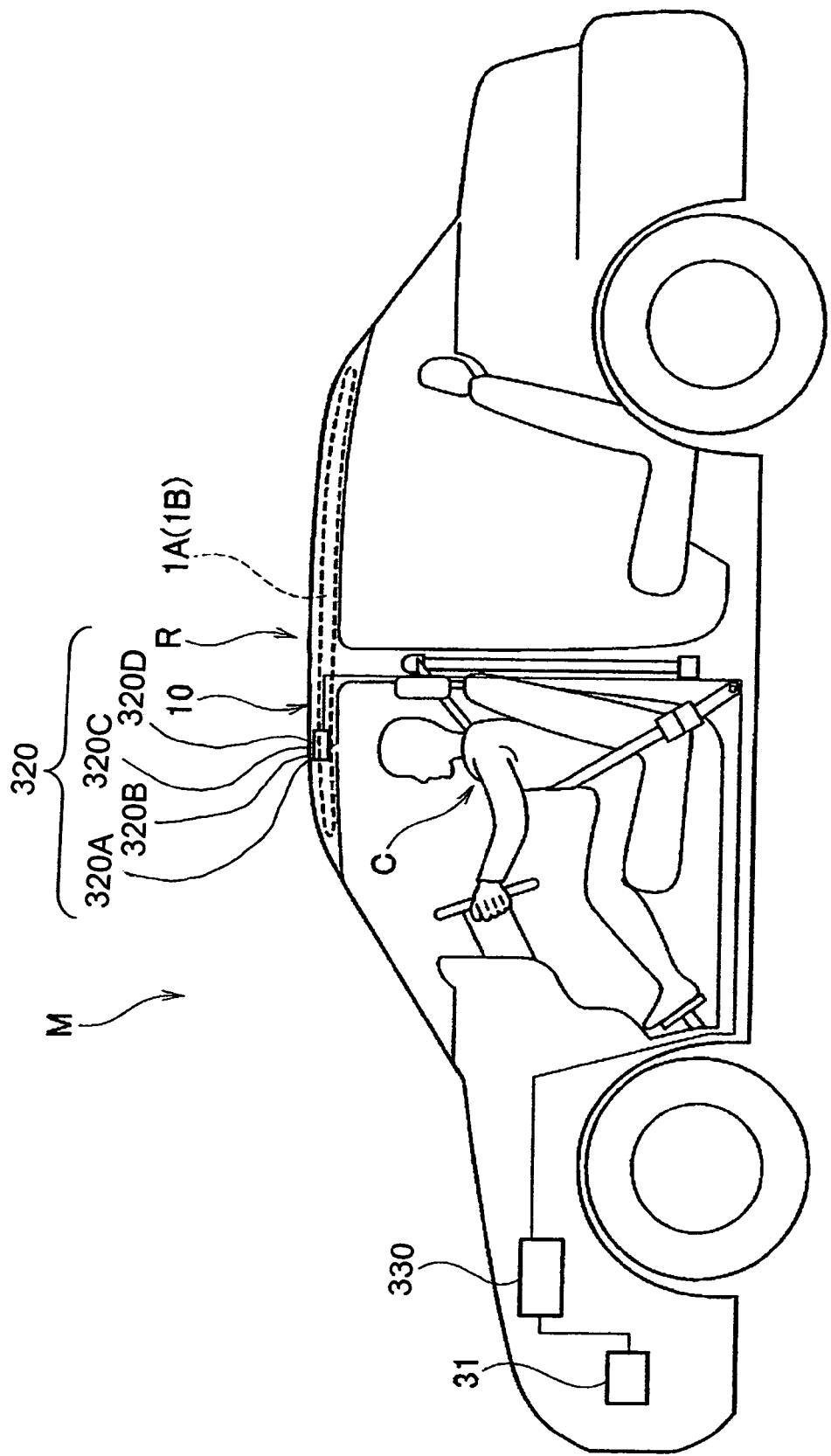
FIG. 43 is a schematic side elevational view of a vehicle body illustrating an arrangement of a deformation detecting device, a passenger restraining device, and a passenger restraining device operating unit of a vehicle passenger restraining system in accordance with an eighth embodiment of the present invention.
Figure 44:
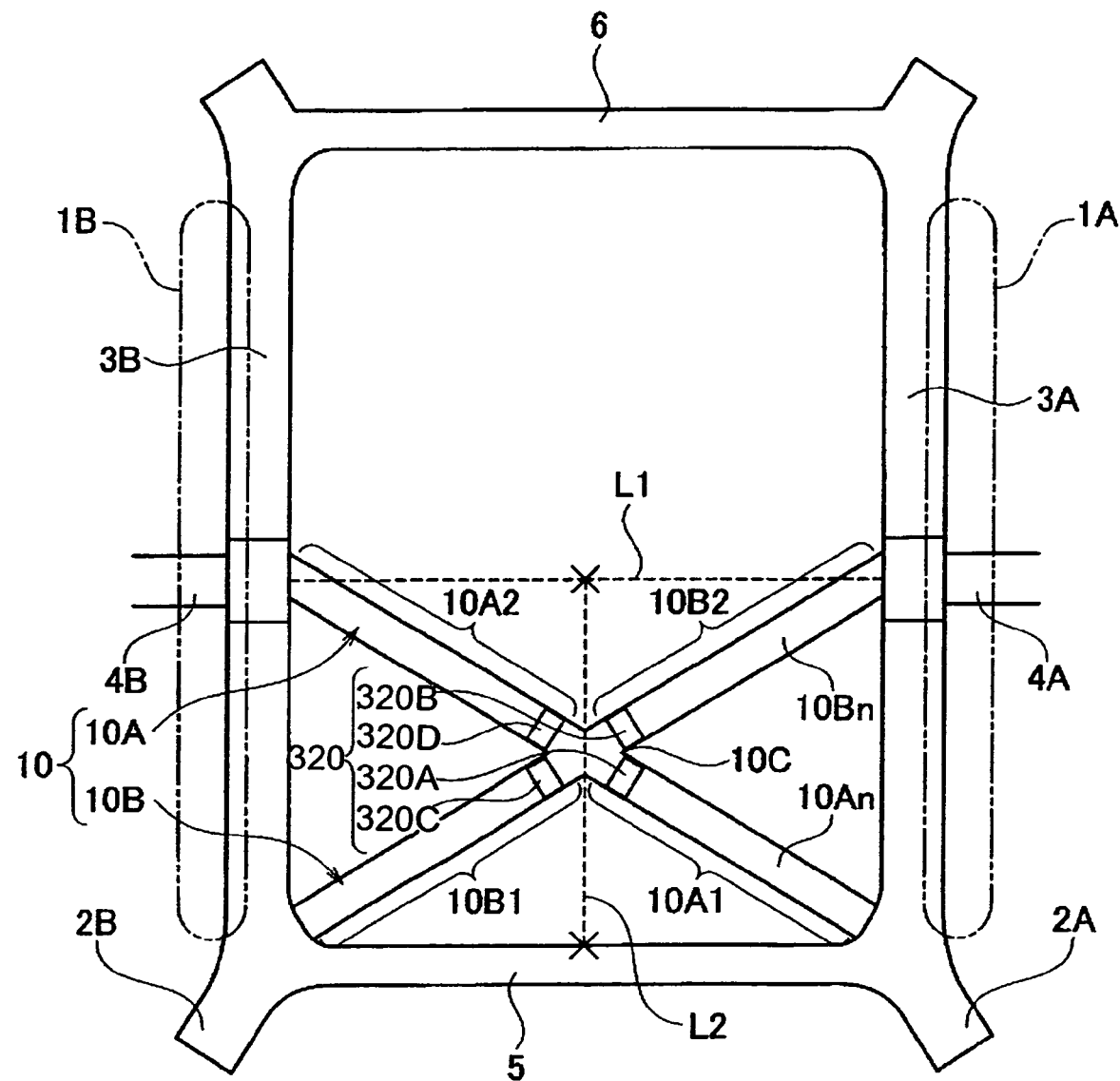
FIG. 44 is a top plan view of a roof structure of a vehicle body illustrating an arrangement of a reinforcing member used in the vehicle passenger restraining system in accordance with the eighth embodiment of the present invention.

FIG. 43 is a schematic side elevational view of a vehicle body illustrating an arrangement of the deformation sensor unit 320, the passenger restraining device (the curtain air bags 1A and 1B), and a passenger restraining device operating unit (a controller 330) of a vehicle passenger restraining system in accordance with the eighth embodiment of the present invention. FIG. 44 is a top plan view of a roof structure of a vehicle body illustrating an arrangement of the reinforcing member 10 used in the vehicle passenger restraining system in accordance with the eighth embodiment of the present invention.

More specifically, as shown in FIGS. 43 and 44, the vehicle body upper structure in accordance with the eighth embodiment has the reinforcing member 10 arranged in a region where the roof R will contact the ground in a rollover situation and the sensor unit 320 (which replaces the deformation sensor unit 120) serving as a deformation detecting device that is arranged in an appropriate location on or in the reinforcing member 10 and configured to detect deformation of the reinforcing member 10. Also, as shown in FIG. 43, the vehicle body upper structure is provided with a controller 330 configured to detect a location on the roof R that contacts the ground in a rollover event based on information from the sensor unit 320 and operate a specific curtain air bag or air bags (i.e., one or both of the left curtain air bag 1A and the right curtain air bag 1B) in accordance with the location where deformation occurred. Additionally, the vehicle body upper structure is provided with a rollover detecting sensor 31 configured to detect if the vehicle M is rolling over.

Also, as shown in FIG. 44, the reinforcing member 10, similar to the sixth embodiment, comprises the first reinforcing frame 10A extending between the upper end of the left front pillar 2A (front left top portion of vehicle) and the upper end of the right center pillar 4B (approximate longitudinal middle portion of top right edge of vehicle) and the second reinforcing frame 10B extending between the upper end of the right front pillar 2B (front right top portion of vehicle) and the upper end of left center pillar 4A (approximate longitudinal middle portion of top left edge of vehicle). The first and second reinforcing frames 10A and 10B are joined together at the portions where they intersect each other and the resulting intersection joint section 10C is arranged in the approximate middle with respect to the widthwise direction of the vehicle. The sensor unit 320 is arranged in the intersection joint section 10C.

Figure 45:
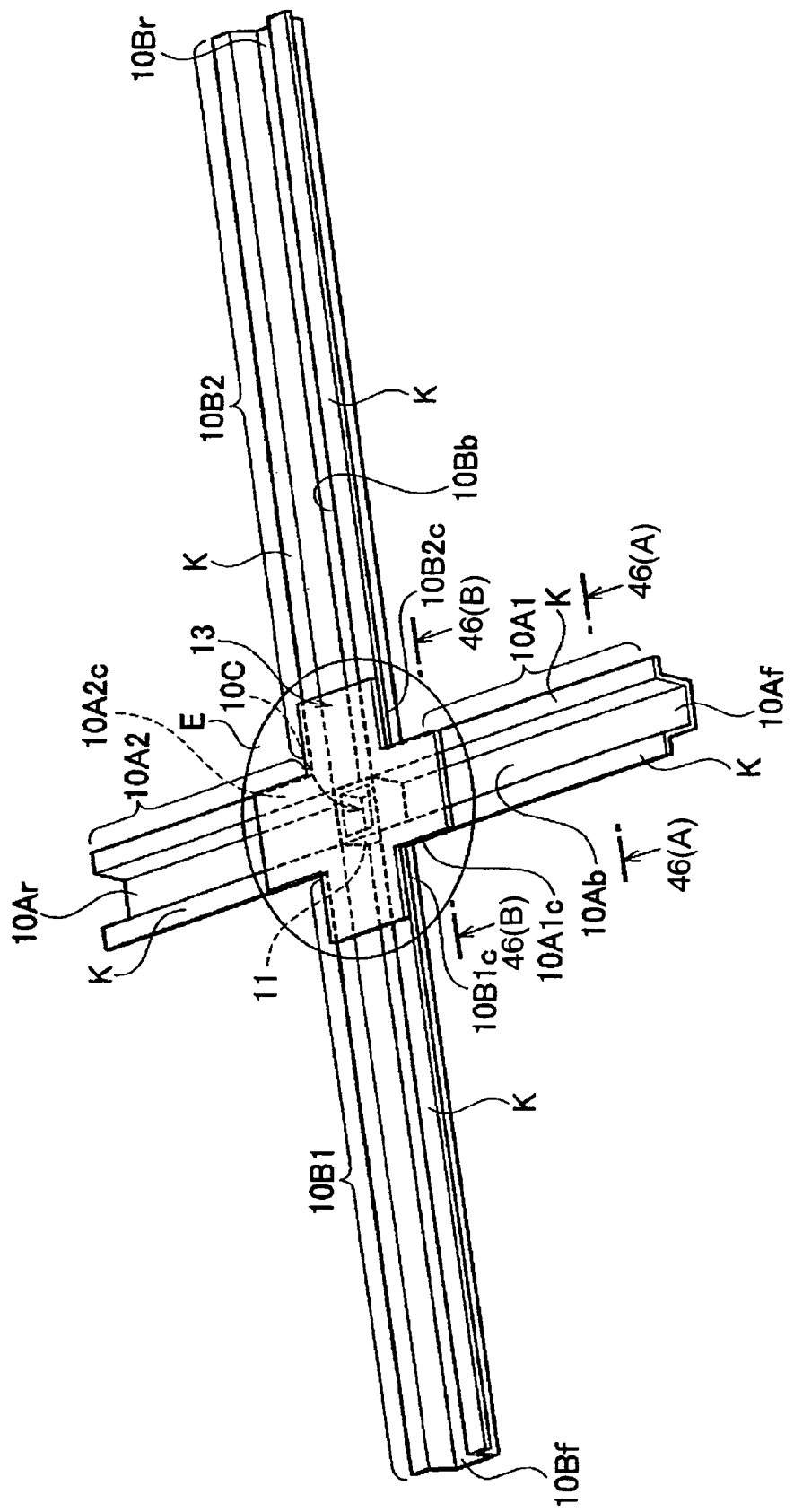
FIG. 45 is an enlarged, partial top perspective view of the reinforcing member of the vehicle passenger restraining system in accordance with the eighth embodiment of the present invention.
Figure 47:
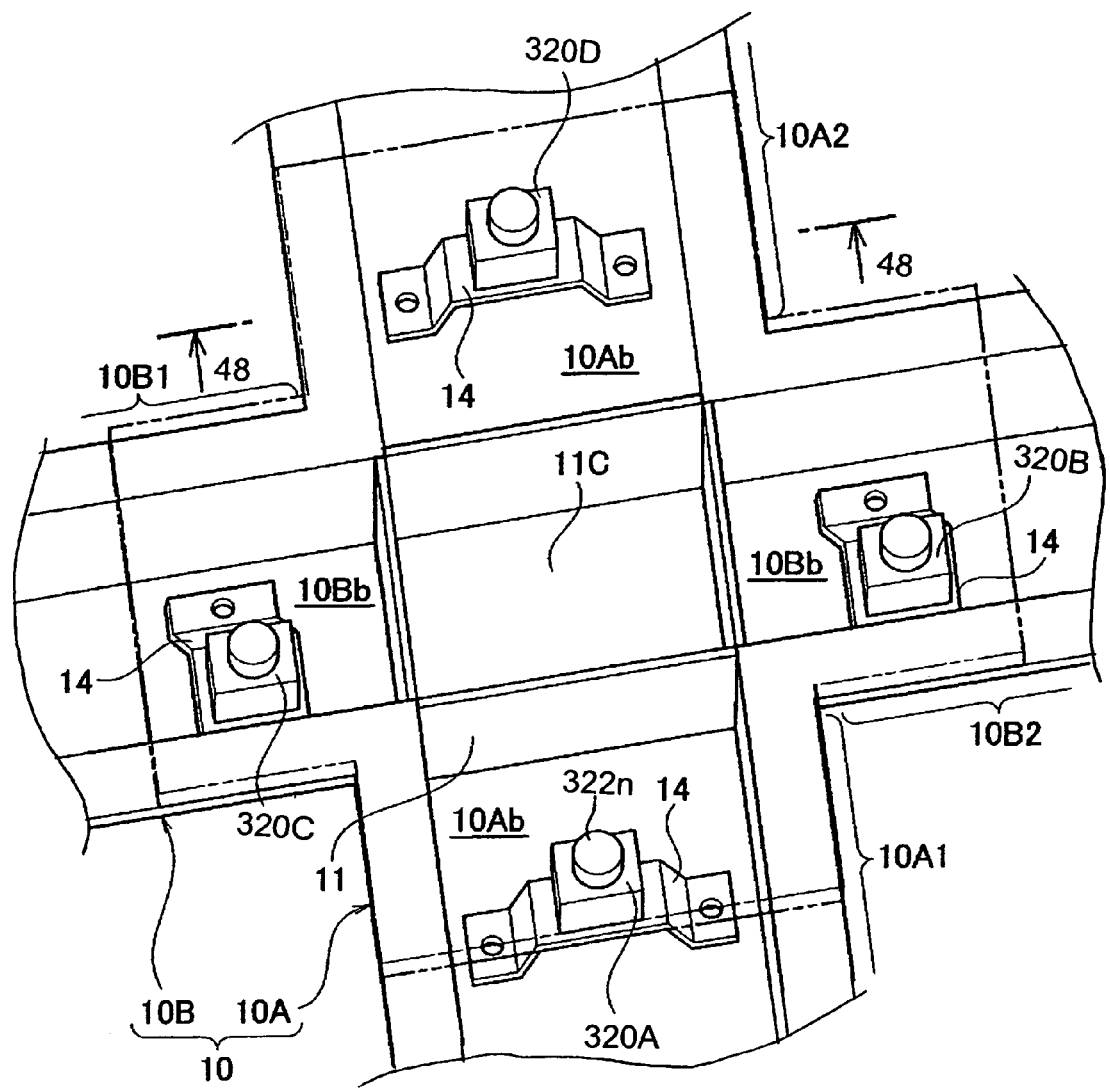
FIG. 47 is an enlarged perspective view of the reinforcing member with the deformation detecting device illustrating the encircled portion E of FIG. 45 in accordance with the eighth embodiment of the present invention.

Similarly to the sixth embodiment, the first and second reinforcing frames 10A and 10B each have a generally linear shape and are arranged in an X-shaped structure. The intersection joint section 10C has a larger bending strength than the standalone portions 10An and 10Bn of the first and second reinforcing frames 10A and 10B that are disposed adjacent to the intersection joint section 10C. FIG. 45 is an enlarged top perspective view of the reinforcing member 10 of the vehicle passenger restraining system in accordance with the eighth embodiment of the present invention. As shown in FIG. 45, the ends 10A1c and 10B1c of the first and second front parts 10A1 and 10B1, and the ends 10A2c and 10B2c of the first and second rear frame part 10A2 and 10B2 of the first and second reinforcing frames 10A and 10B that are near the intersection joint section 10C (hereinafter called "intersection joint ends 10A1c, 10B1c, 10A2c and 10B2c") have closed cross sectional structures. As shown in FIG. 47, the deformation sensor unit 320 comprises the first sensor 320A, the second sensor 320B, the third sensor 320C, and the fourth sensor 320D, each of which is arranged as a switch-type sensor configured to output an electric signal when a switch button 322n provided in each of the first to fourth sensors 320A to 320D is depressed. The first to fourth sensors 320A to 320D are arranged inside the closed cross sectional structures such that the operating directions of the switch buttons 322n thereof are oriented in a generally vertical direction of the vehicle M.

Figure 46A:
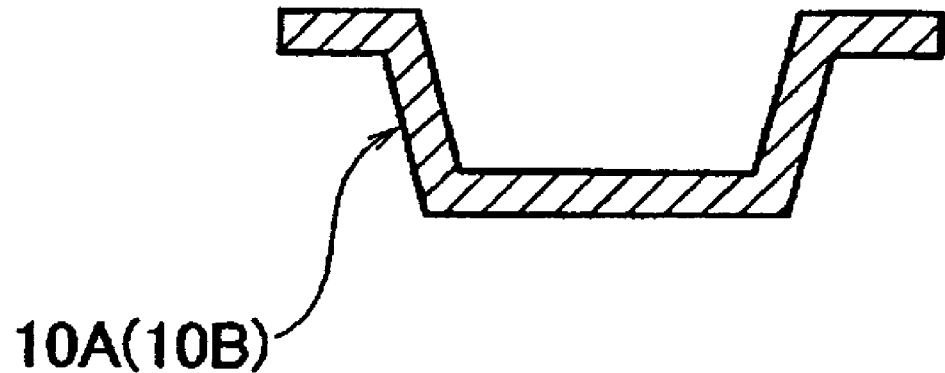
FIG. 46(A) is a cross sectional view of the reinforcing member taken along a section line 46(A)-46(A) of FIG. 45 in accordance with the eighth embodiment of the present invention.
Figure 46B:
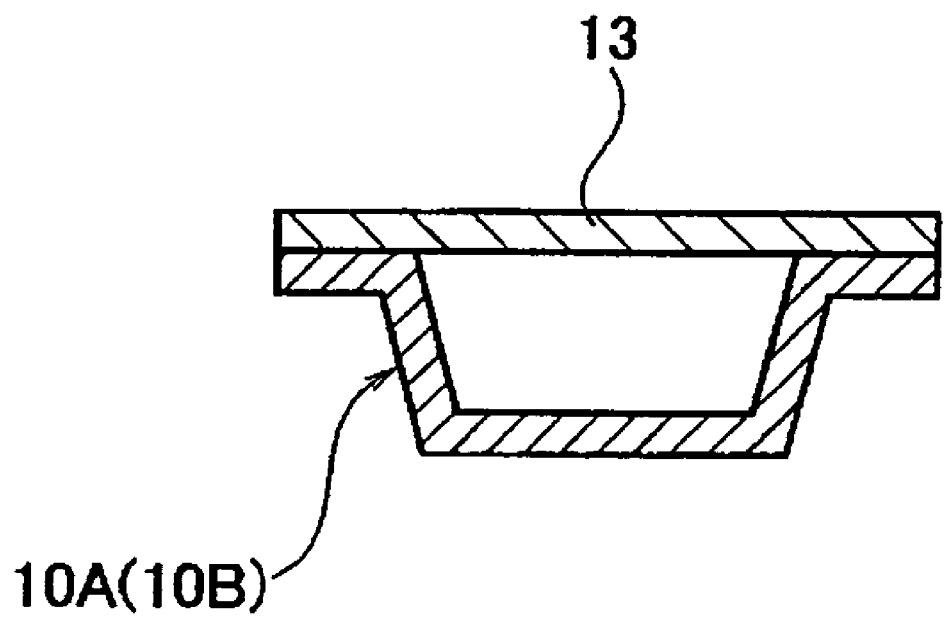
FIG. 46(B) is a cross sectional view of the reinforcing member taken along a section line 46(B)-46(B) of FIG. 45 in accordance with the eighth embodiment of the present invention.

FIG. 46(A) is a cross sectional view of the reinforcing member 10 taken along a section line 46(A)-46(A) of FIG. 45 in accordance with the eighth embodiment of the present invention. FIG. 46(B) is a cross sectional view of the reinforcing member 10 taken along a section line 46(B)-46(B) of FIG. 45 in accordance with the eighth embodiment of the present invention.

As shown in FIG. 46(B), the closed cross sectional structure of each of the intersection joint ends 10A1c, 10B1c, 10A2c and 10B2c is formed by the inverted hat-shaped cross sectional shapes of the front frame parts 10A1 and 10B1 and the rear frame parts 10A2 and 10B2 and a plus-shaped closure plate 13 provided there-above.

Figure 48:
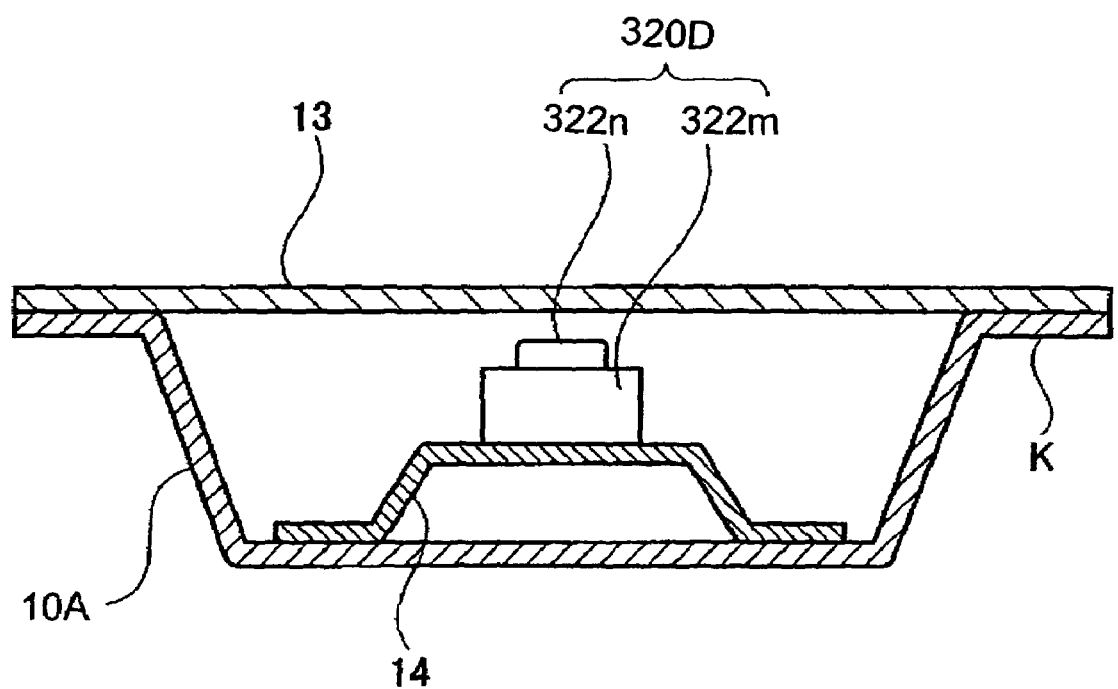
FIG. 48 is a cross sectional view of the reinforcing member taken along a section line 48-48 of FIG. 47 in accordance with the eighth embodiment of the present invention.

FIG. 47 is an enlarged top perspective view of the reinforcing member 10 with the first to fourth sensors 320A to 320D illustrating the encircled portion E of FIG. 45 in accordance with the eighth embodiment of the present invention. FIG. 48 is a cross sectional view of the reinforcing member 10 taken along a section line 48-48 of FIG. 47 in accordance with the eighth embodiment of the present invention.

As shown in FIG. 47, the first to fourth sensors 320A to 320D are arranged inside the closed cross sectional intersection joint ends 10A1c, 10B1c, 10A2c, and 10B2c. More specifically, the first sensor 320A is arranged in the intersection joint end 10A1c of the first reinforcing frame 10A, the second sensor 320B is arranged in the intersection joint end 10B1c of the second reinforcing frame 10B, the third sensor 320C is arranged in the intersection joint end 10B2c of the second reinforcing frame 10B, and the fourth sensor 320D is arranged in the intersection joint end 10A2c of the first reinforcing frame 10A.

As shown in FIGS. 47 and 48, each of the first to fourth sensors 320A to 320D (only the fourth sensor 320D is shown in FIG. 48) has a main unit 322m with the protruding switch button 322n provided on the upper side of the main unit 322m such that the switch button 322n can move freely inward and outward relative to the main unit 322m. Each of the first to fourth sensors 320A to 320D is configured such that a voltage is produced when the switch button 322n is depressed. Each of the first to fourth sensors 320A to 320D is mounted to the bottom surface 10Ab and 10Bb of the respective intersection joint end 10A1c, 10B1c, 10A2c and 10B2c through a platform 14 such that the switch button 322n thereof is in close proximity to the bottom surface of the closure plate 13.

Figure 49:
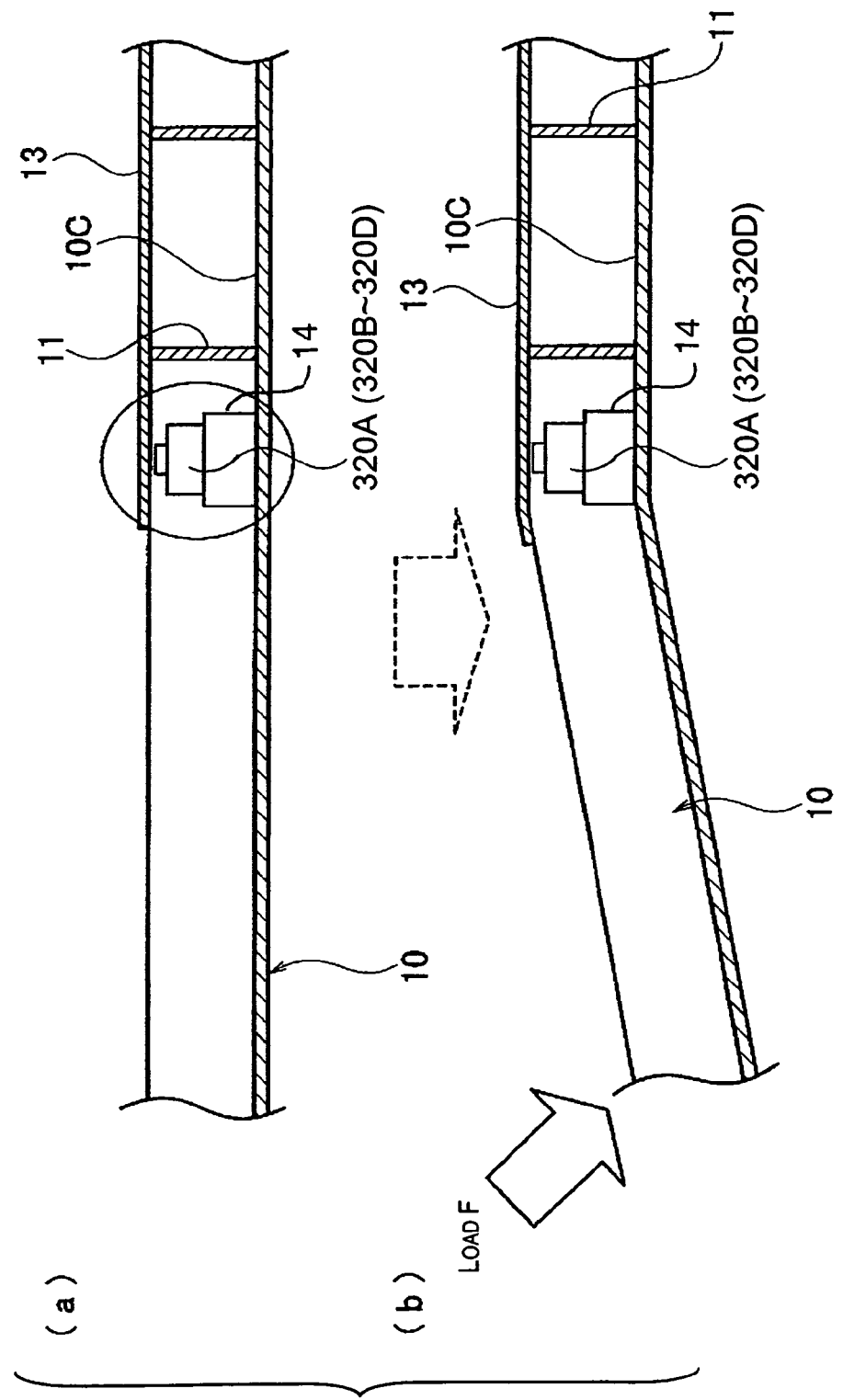
FIG. 49 is a pair of diagrams (a) and (b) in partial cross sectional views of the reinforcing member with the deformation detecting device illustrating sequential operating states of the deformation detecting device in accordance with the eighth embodiment of the present invention.

FIG. 49 is a pair of diagrams (a) and (b) in partial cross sectional views of the reinforcing member 10 with the first sensor 320A illustrating sequential operating states of the first sensor 320A in accordance with the eighth embodiment of the present invention.

When a load F acts on an end of the reinforcing frame 10 opposite the intersection joint section 10C, while the first to fourth sensors 320A to 320D are mounted in the reinforcing member 10 (first and second reinforcing frames 10A and 10B) as shown in the diagram (a) of FIG. 49, the reinforcing member 10 and the closure plate 13 flex (bend) together as shown in the diagram (b) of FIG. 49 and the deformed closure plate 13 depresses the switch button 322n of the first to fourth sensors 320A to 320D, thereby causing an electric signal to be outputted.

In the eighth embodiment too, the intersection joint section 10C has a rectangular or diamond shape due to the intersection of the inverted hat-shaped cross sections of the first and second reinforcing frames 10A and 10B and a rectangular or diamond-shaped reinforcing rib 11 is joined to the intersecting joint section 10C to form an enclosure along the internal shape of the intersecting joint section 10C. As a result, the bending strength of the intersection joint section 10C is larger than the bending strength of the standalone portions 10An and 10Bn of the first and second reinforcing frames 10A and 10B that are disposed adjacent to the intersection joint section 10C.

Figure 50:
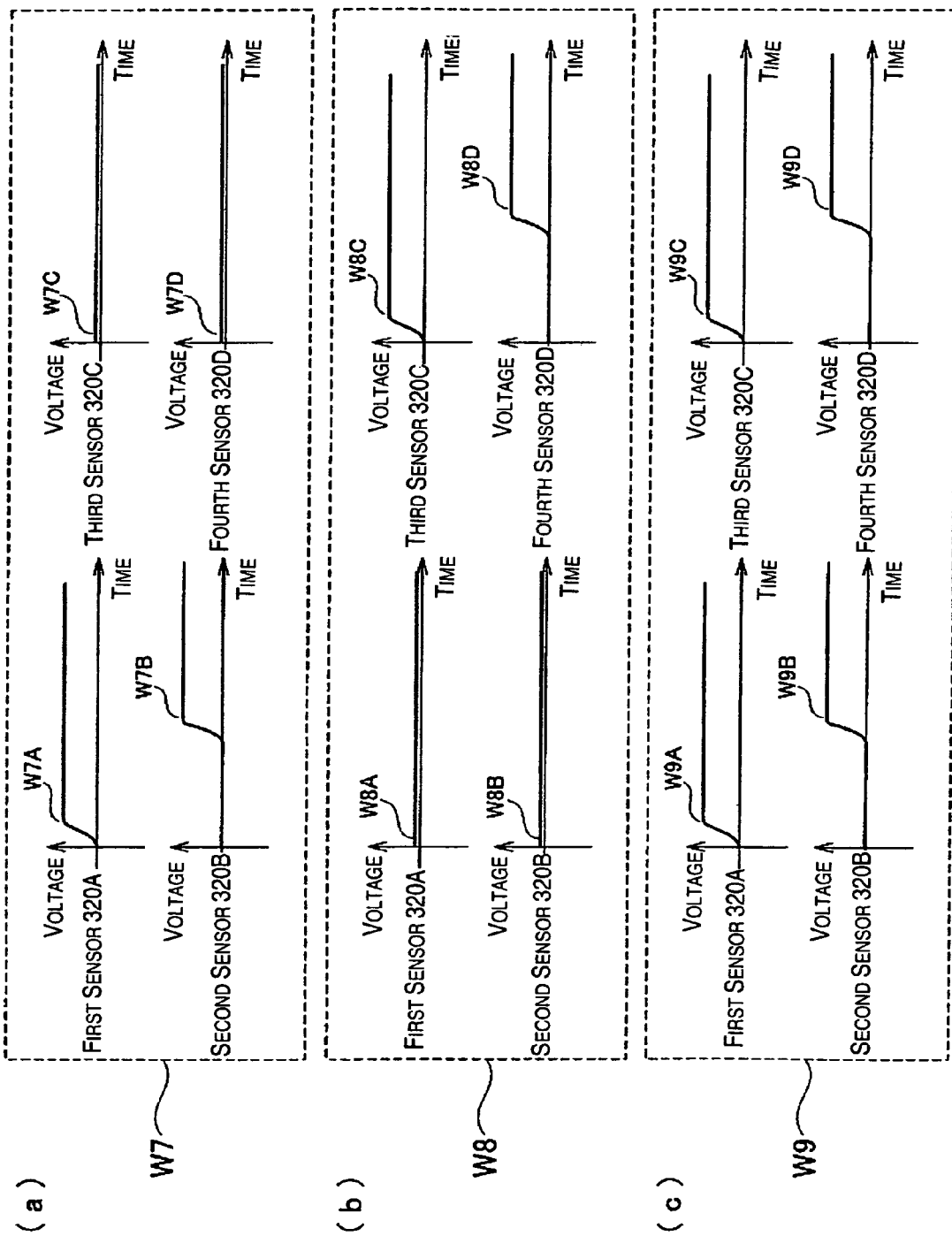
FIG. 50 is a series of diagrams (a) to (c) illustrating voltage waveforms issued from the deformation detecting device of the vehicle passenger restraining system in a case where the vehicle rolls over and makes initial contact with the ground on the left side of the roof (diagram (a)), in a case where the vehicle rolls over and makes initial contact on the right side of the roof (diagram (b)), and in a case where the vehicle rolls over and makes initial contact on the approximate center of the roof (diagram (c)) in accordance with the eighth embodiment of the present invention.

FIG. 50 shows the detection signals issued from the first to fourth sensors 320A to 320D in three different cases in which the vehicle M rolls over such that the roof R contacts the ground, the contact location being different in each case.

The diagram (a) of FIG. 50 shows the voltage waveforms W7 issued from the first to fourth sensors 320A to 320D in a first case in which the vehicle M rolls over and makes initial contact with the ground on the left side of the roof R. As shown in the diagram (a) of FIG. 50, the voltage W7A produced by the first sensor 320A occurs earlier than the voltage W7B produced by the second sensor 320B. Meanwhile, the voltage W7C of the third sensor 320C and the voltage W7D of the fourth sensor 320D are both substantially zero.

The diagram (b) of FIG. 50 shows the voltage waveforms W8 issued from the first to fourth sensors 320A to 320D in a second case in which the vehicle M rolls over and makes initial contact with the ground on the right side of the roof R. As shown in the diagram (b) of FIG. 50, the voltage W8C produced by the third sensor 320C occurs earlier than the voltage W8D produced by the fourth sensor 320D. Meanwhile, the voltage W8A of the first sensor 320A and the voltage W8B of the second sensor 320B are both approximately zero.

The diagram (c) of FIG. 50 shows the voltage waveforms W9 issued from the first to fourth sensors 320A to 320D in a third case in which the vehicle M rolls over and makes initial contact with the ground on a central portion of the roof R. As shown in the diagram (c) of FIG. 50, the voltage W9A produced by the first sensor 320A and the voltage W9C produced by the third sensor 320C occur substantially simultaneously. Meanwhile, the voltage W9B produced by the second sensor 320B and the voltage W9D produced by the fourth sensor 320D also occur substantially simultaneously at a later time than the voltages W9A and W9C.

Figure 51:
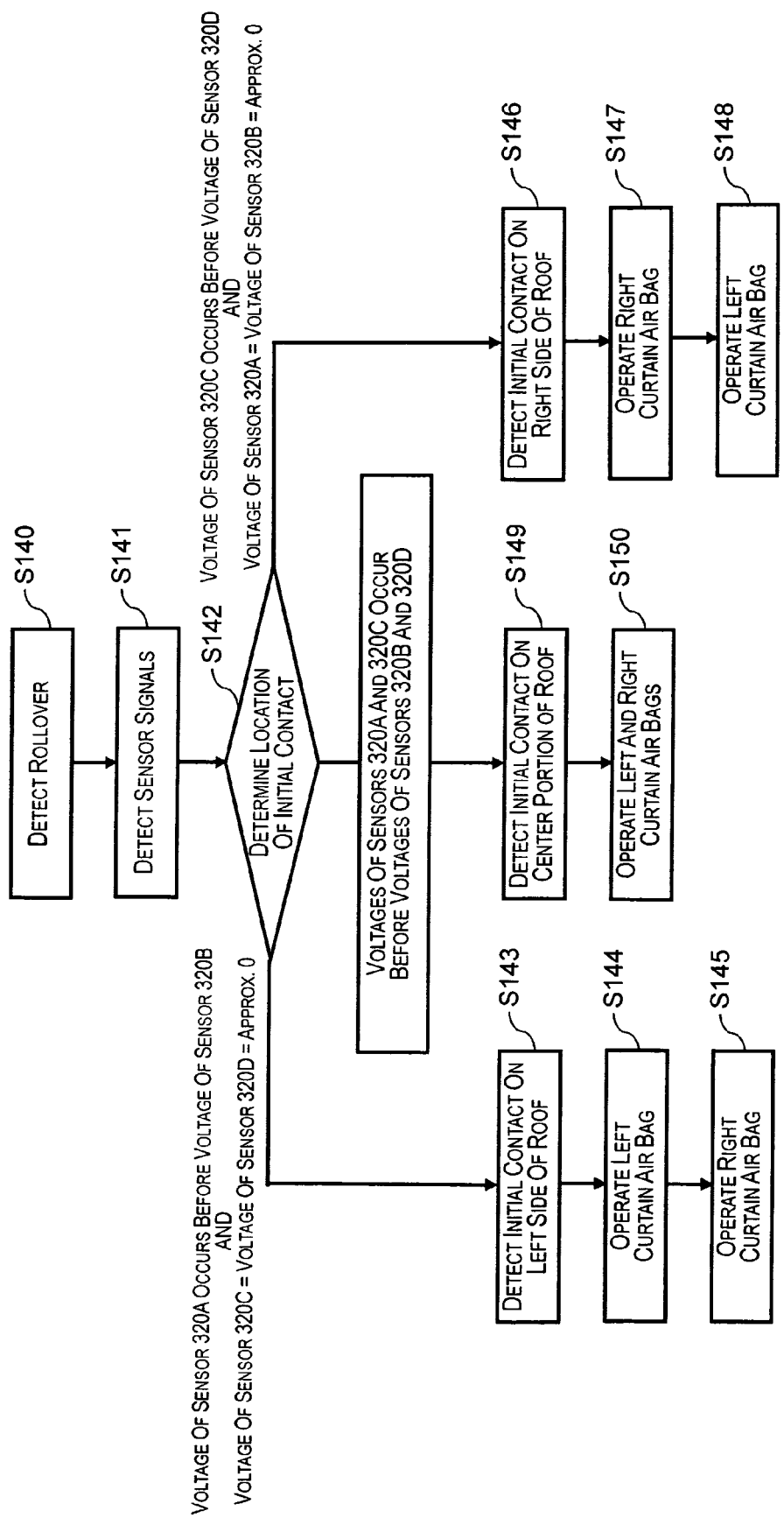
FIG. 51 is a flowchart illustrating a control algorithm for controlling from detection of a rollover event to operation of the passenger restraining devices executed in the vehicle passenger restraining system in accordance with the eighth embodiment of the present invention.

Thus, in the eighth embodiment too, by reading the voltage signal waveforms outputted from the first to fourth sensors 320A to 320D, it is possible to detect the portion (location) of the roof R that makes the initial contact with the ground during a rollover event. Then, the controller 330 is configured to select one or both of the left and right curtain air bags 1A and 1B (i.e., a specific curtain air bag or air bags among a plurality of the curtain air bags 1A and 1B) to be initially operated/deployed by following the control algorithm shown in FIG. 51. FIG. 51 is a flowchart illustrating the control algorithm for controlling from detection of a rollover event to operation of the passenger restraining devices executed in the vehicle passenger restraining system in accordance with the eighth embodiment of the present invention.

More specifically, in step S140 of the control algorithm of FIG. 51, the rollover detecting sensor 31 is configured to detect a rollover situation. When the roof R contacts the ground, in step S141 voltage signals are outputted from the first to fourth sensors 320A to 320D to the controller 330.

In step S142, the controller 330 is configured to receive the signals from the first to fourth sensors 320A to 320D. If the voltage W7A produced by the first sensor 320A occurs earlier than the voltage W7B produced by the second sensor 320B and the voltage W7C of the third sensor 320C and the voltage W7D of the fourth sensor 320D are both substantially zero, then the controller 330 is configured to determine in step S143 that the initial contact occurred on the left side of the roof R and to proceed to step S144 where the controller 330 is configured to operate/deploy the left curtain air bag 1A first. Then, in step S145, the controller 330 is configured to operate/deploy the right curtain air bag 1B after waiting for a prescribed amount of time.

On the other hand, in step S142, if the voltage W8C of the third sensor 320C occurs earlier than the voltage W8D of the fourth sensor 320D and the voltage W8A of the first sensor 320A and the voltage W8B of the second sensor 320B are both approximately zero, then the controller 330 is configured to determine in step S146 that the initial contact occurred on the right side of the roof R and to proceed to step S1147 where the controller 330 is configured to operate/deploy the right curtain air bag 1B first. Then, in step S148, the controller 330 is configured to operate/deploy the left curtain air bag 1A after waiting for a prescribed amount of time.

In step S142, if the voltage W9A of the first sensor 320A and the voltage W9C of the third sensor 320C occur substantially simultaneously and, afterwards (at a later time), the voltage W9B of the second sensor 320B and the voltage W9D of the fourth sensor 320D also occur substantially simultaneously, the controller 330 is configured to determine in step S149 that the initial contact occurred at the center portion of the roof R and to proceed to step S150 where the controller 330 is configured to operate/deploy the left curtain air bag 1A and the right curtain air bag 1B simultaneously.

Thus, with the constituent features described above, the vehicle passenger restraining system in accordance with the eighth embodiment offers substantially the same operational effects as the sixth embodiment. More specifically, the deformation sensor unit 320 is arranged and configured to detect the deformation of the reinforcing member 10 that occurs when the vehicle M rolls over and the roof R contacts the ground, the deformation corresponding to the location on the roof R that makes contact with the ground. As a result, the controller 330 can detect the actual location on the roof R where the roof R contacts the ground in a rollover situation in a precise manner.

Based on the detected deformation location on the roof R, the controller 330 can operate specific passenger restraining devices (i.e., either the left curtain air bag 1A or the right curtain air bag 1B). As a result, the curtain air bag 1A or 1B that properly corresponds to the impact location can be operated earlier during a rollover event and the passenger restraining effect can be increased.

With the eighth embodiment of the present invention, since the intersection joint ends 10A1c, 10B1c, 10A2c and 10B2c of the first and second front frame parts 10A1 and 10B1 and the first and second rear frame parts 10A2 and 10B2 of the first and second reinforcing frames 10A and 10B have closed cross sectional structures, switch-type sensors can be used as the first to fourth sensors 320A to 320D arranged inside the closed cross sectional structure. Since switch-type sensors are of simple construction, the cost of the vehicle body upper structure can be reduced while enabling the electric signals to be outputted in a short amount of time, thereby enabling rapid detection of the contact location. As a result, the response with which the curtain air bags 1A and 1B are operated/deployed can be increased.

In the eighth embodiment too, the bending strength of the intersection joint section 10C is larger than the bending strength of the standalone portions of the first and second reinforcing frames 10A and 10B due to the existence of the reinforcing rib 11. As a result, the first to fourth sensors 320A to 320D arranged in the intersection joint section 10C can detect the deformation of the first and second reinforcing frames 110A and 101B with good sensitivity and, thus, can deliver accurate output signals.

Ninth Embodiment

Referring now to FIGS. 52(A) to 57, a vehicle passenger restraining system in accordance with a ninth embodiment will now be explained. In view of the similarity between the sixth and ninth embodiments, the parts of the ninth embodiment that are identical to the parts of the sixth embodiment will be given the same reference numerals as the parts of the sixth embodiment. Moreover, the descriptions of the parts of the ninth embodiment that are identical to the parts of the sixth embodiment may be omitted for the sake of brevity.

The vehicle passenger restraining system of the ninth embodiment differs from the vehicle passenger restraining system of the sixth embodiment in that a deformation sensor unit 420 including first, second, third, fourth sensors 420A, 420B, 420C and 420D is used instead of the deformation sensor unit 120 of the sixth embodiment. Thus, other constituent features of a vehicle body upper structure in accordance with the ninth embodiment are the same as those of the sixth embodiment.

Figure 52A:
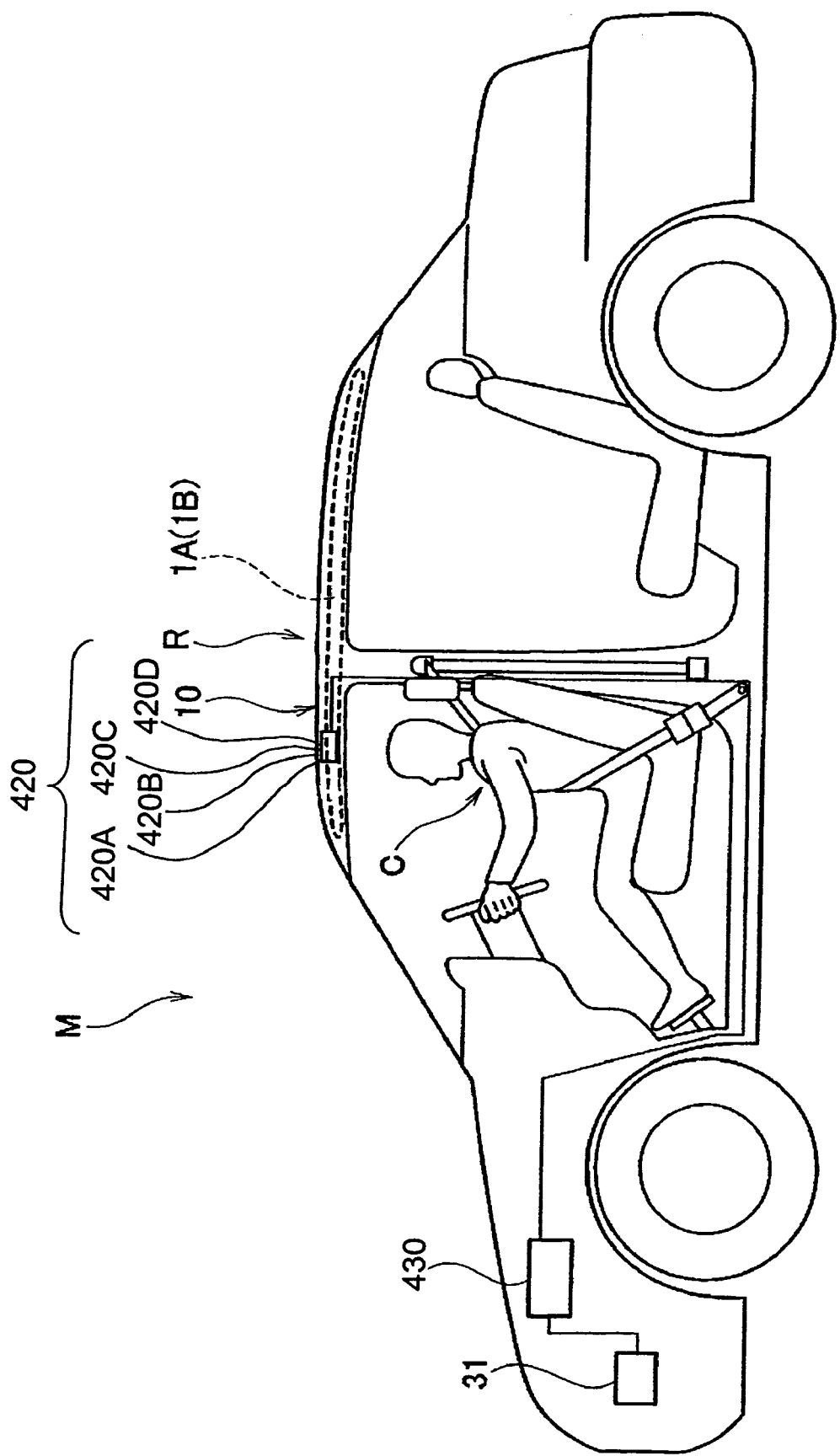
FIG. 52(A) is a schematic side elevational view of a vehicle body illustrating an arrangement of a deformation detecting device, a passenger restraining device, and a passenger restraining device operating unit of a vehicle passenger restraining system in accordance with a ninth embodiment of the present invention.
Figure 52B:
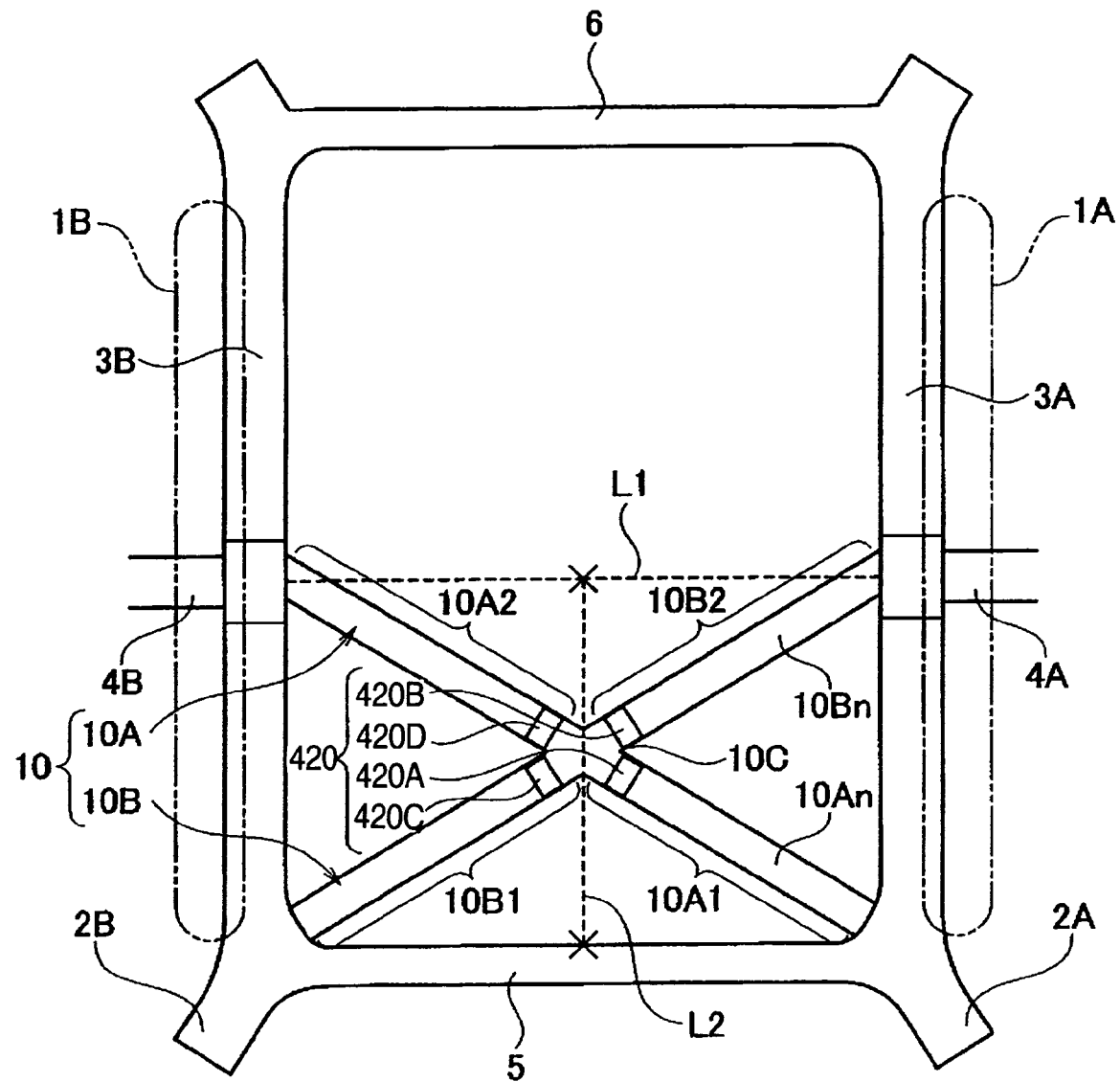
FIG. 52(B) is a top plan view of a roof structure of a vehicle body illustrating an arrangement of a reinforcing member used in the vehicle passenger restraining system in accordance with the ninth embodiment of the present invention.

FIG. 52(A) is a schematic side elevational view of a vehicle body illustrating an arrangement of the deformation sensor unit 420, the passenger restraining device (the curtain air bags 1A and 1B), and the passenger restraining device operating unit (a controller 430) of a vehicle passenger restraining system in accordance with the ninth embodiment of the present invention. FIG. 52(B) is a top plan view of a roof structure of a vehicle body illustrating an arrangement of the reinforcing member 10 used in the vehicle passenger restraining system in accordance with the ninth embodiment of the present invention.

More specifically, as shown in FIGS. 52(A) and 52(B), a vehicle body upper structure in accordance with the ninth embodiment has the reinforcing member 10 arranged in a region where the roof R will contact the ground in a rollover situation and a deformation sensor unit 420 (which replaces the deformation sensor 20) serving as a deformation detecting device that is arranged in an appropriate location on or in the reinforcing member 10 and configured to detect deformation of the reinforcing member 10. Also, as shown in FIG. 52(A), the vehicle body upper structure is provided with the controller 430 that is configured to detect a location on the roof R that contacts the ground in a rollover event based on information from the deformation sensor unit 420 and operate a specific curtain air bag or air bags (i.e., one or both of the left curtain air bag 1A and the right curtain air bag 1B) in accordance with the location where deformation occurred. Additionally, the vehicle body upper structure is provided with a rollover detecting sensor 31 configured to detect if the vehicle M is rolling over.

Also, as shown in FIG. 52(B), the reinforcing member 10, similar to the sixth embodiment, comprises the first reinforcing member 10A extending between the upper end of the left front pillar 2A (front left top portion of vehicle M) and the upper end of the right center pillar 4B (approximate longitudinal middle portion of top right edge of vehicle M) and the second reinforcing member 10B extending between the upper end of the right front pillar 2B (front right top portion of vehicle M) and the upper end of left center pillar 4A (approximate longitudinal middle portion of top left edge of vehicle M). The first and second reinforcing frames 10A and 10B are joined together at the portions where they intersect each other and the resulting intersection joint section 10C is arranged in the approximate middle with respect to the widthwise direction of the vehicle M. The deformation sensor unit 420 is arranged in the intersection joint section 10C.

Similarly to the sixth embodiment, the first and second reinforcing frames 10A and 10B each have a generally linear shape and are arranged in the X-shaped structure. The intersection joint section 10C has a larger bending strength than the standalone portions 10An and 10Bn of the first and second reinforcing frames 10A and 10B that are disposed adjacent to the intersection joint section 10C. Also, in the ninth embodiment of the present invention, the standalone portions 10An and 10Bn of the first and second front frame parts 10A1 and 10B1 and the first and second rear frame parts 10A2 and 10B2 of the first and second reinforcing frames 10A and 10B have closed space structures. The deformation sensor unit 420 comprises first to fourth sensors 420A to 420D that are pressure detecting sensors configured to detect a change in pressure. The first to fourth sensors 420A to 420D are arranged inside the closed space structures of the reinforcing member 10.

Figure 53:
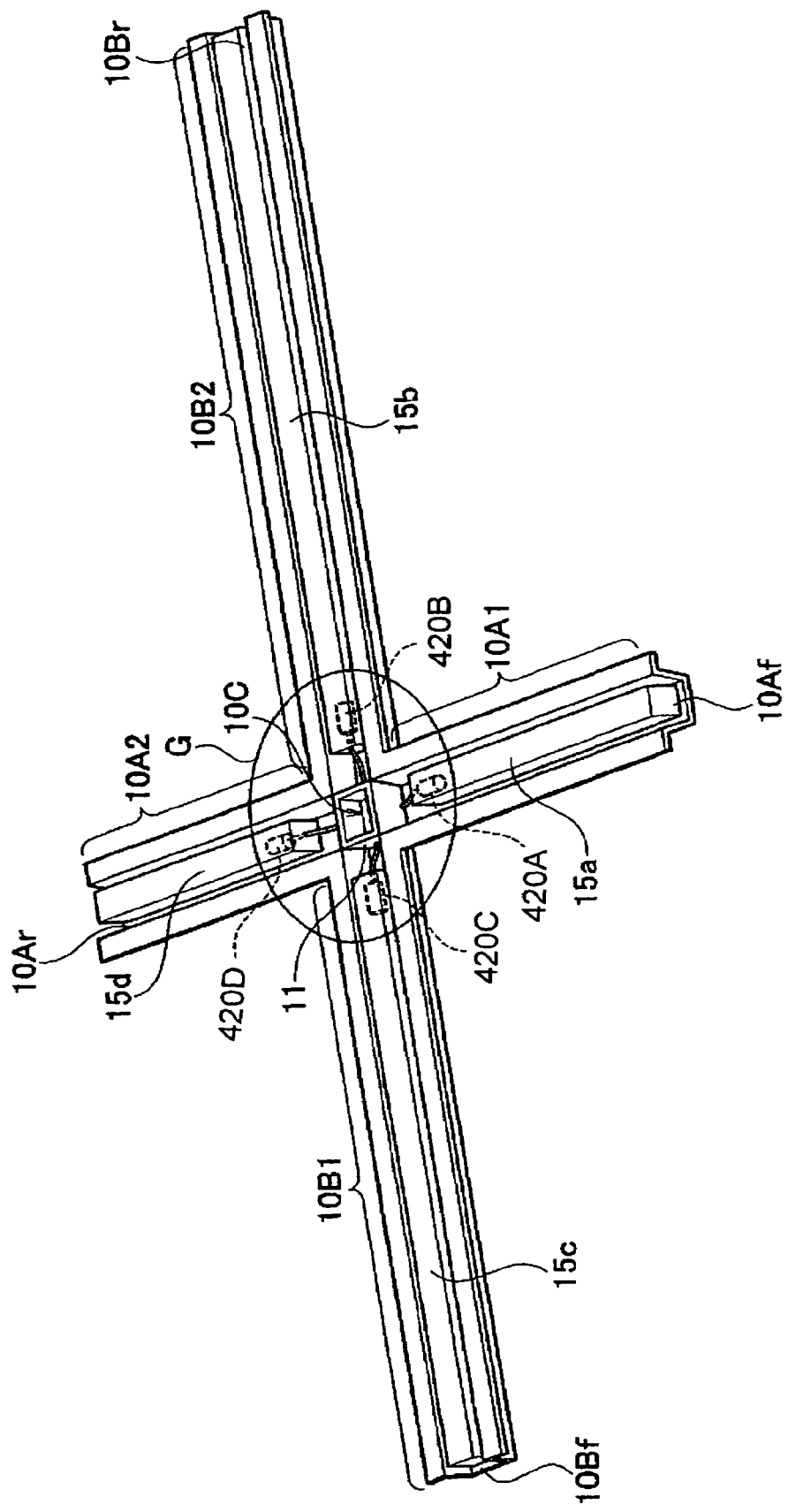
FIG. 53 is an enlarged, partial top perspective view of the reinforcing member of the vehicle passenger restraining system in accordance with the ninth embodiment of the present invention.
Figure 54:
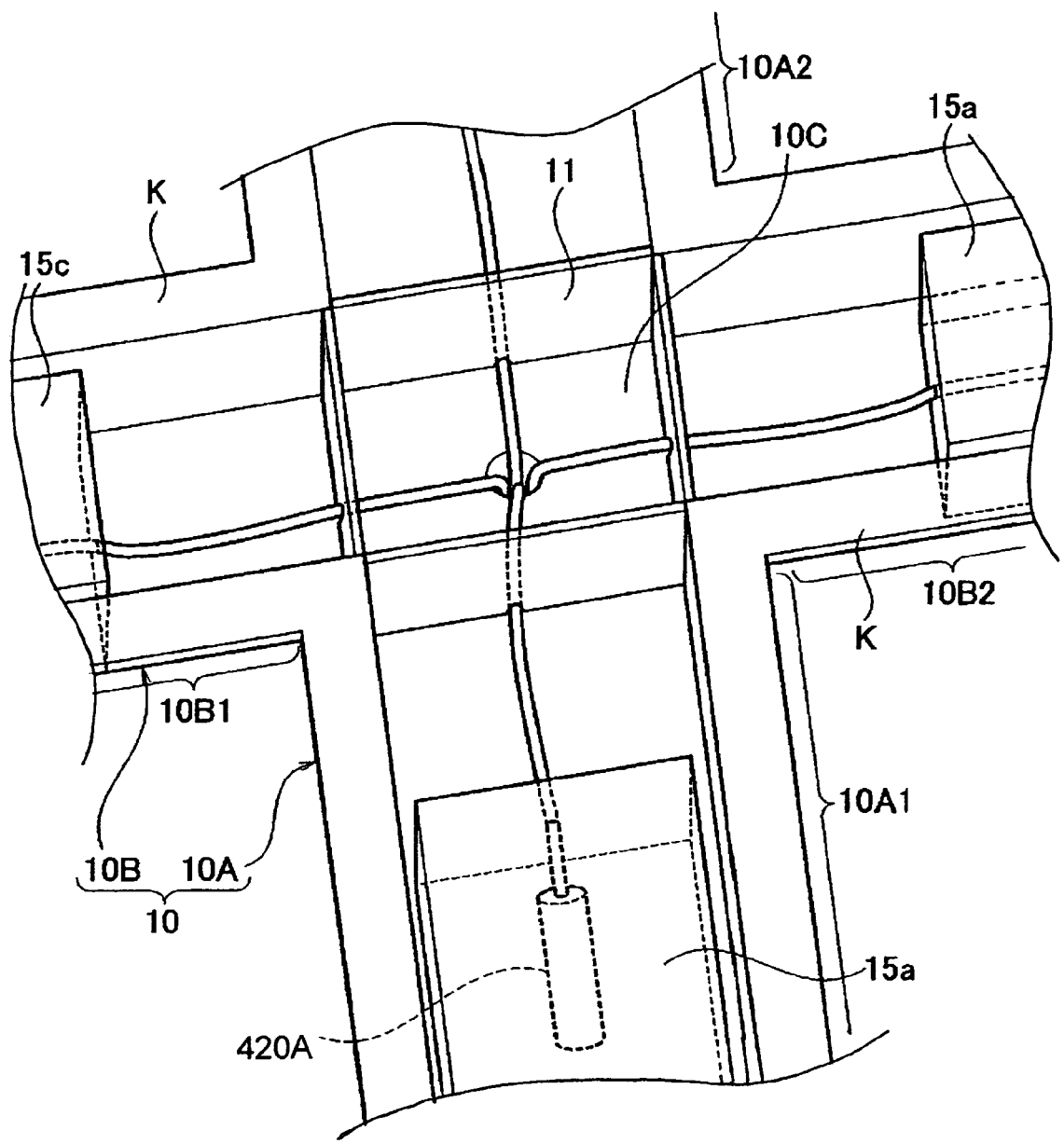
FIG. 54 is an enlarged, partial top perspective view of the reinforcing member with a deformation detecting device illustrating the encircled portion G of FIG. 53.

FIG. 53 is an enlarged top perspective view of the reinforcing member 10 of the vehicle passenger restraining system in accordance with the eighth embodiment of the present invention. FIG. 54 is an enlarged top perspective view of the reinforcing member 10 with the deformation sensor unit 420 illustrating the encircled portion G of FIG. 53.

As shown in FIG. 53, the closed space structures of the standalone portions 10An and 10Bn of the first and second front frame parts 10A1 and 10B1 and rear frame parts 10A2, 10B2 are formed by first to fourth airtight hollow members 15a to 15d that have rectangular cross sectional shapes. The airtight hollow members 15a to 15d are arranged inside the inverted hat-shaped cross sections of the first and second front frame parts 10A1 and 10B1 and the first and second rear frame parts 10A2 and 10B2, and are configured to span the entire length of the front and rear frame parts 10A1, 10B1, 10A2 and 10B2. More specifically, in order to form the closed space structures, the first airtight hollow member 15a is arranged inside the front frame part 10A1 of the first reinforcing member 10A. The second airtight hollow member 15b is arranged inside the rear frame part 10B2 of the second reinforcing member 10B. The third airtight hollow member 15c is arranged inside the front frame part 10B1 of the second reinforcing member 10B. The fourth airtight hollow member 15d is arranged inside the rear frame part 10A2 of the first reinforcing member 10A.

The first to fourth sensors 420A to 420D each comprise chiefly a piezoelectric element. As shown in FIGS. 53 and 54, the first sensor 420A is arranged inside the first airtight hollow member 15a at the end thereof that is near the middle of the vehicle body (i.e., the end near the intersection joint section 10C). The second sensor 420B is arranged inside the second airtight hollow member 15b at the end thereof that is near the middle of the vehicle body (i.e., the end near the intersection joint section 10C). The third sensor 420C is arranged inside the third airtight hollow member 15c at the end thereof that is near the middle of the vehicle body (i.e., the end near the intersection joint section 10C). The fourth sensor 420D is arranged inside the fourth airtight hollow member 15d at the end thereof that is near the middle of the vehicle body (i.e., the end near the intersection joint section 10C).

Figure 55:
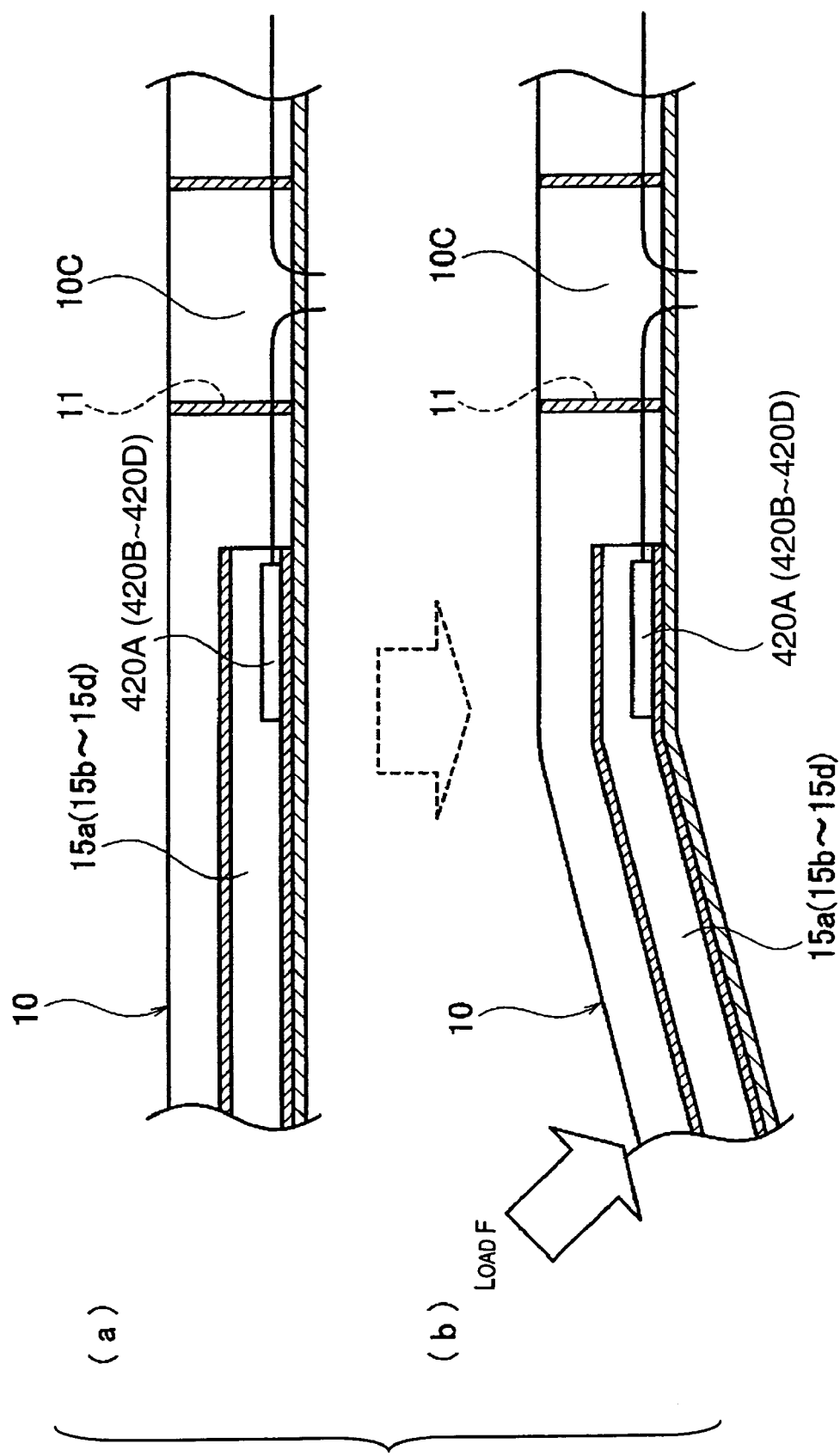
FIG. 55 is a pair of diagrams (a) and (b) in partial cross sectional views of the reinforcing member with the deformation detecting device illustrating sequential operating states of the deformation detecting device in accordance with the ninth embodiment of the present invention.

FIG. 55 is a pair of diagrams (a) and (b) in partial cross sectional views of the reinforcing member 10 with the first sensor 420A illustrating sequential operating states of the first sensor 420A in accordance with the ninth embodiment of the present invention. When a load F acts on an end of the reinforcing member 10 opposite the intersection joint section 10C, while the first to fourth sensors 420A to 420D are mounted in the reinforcing member 10 (first and second reinforcing frames 10A and 10B) as shown in the diagram (a) of FIG. 55, the reinforcing member 10 and the airtight hollow members 15a to 15d flex (bend) together as shown in the diagram (b) of FIG. 55 and the pressures inside the deformed airtight hollow members 15a to 15d change. The first to fourth sensors 420A to 420D detect the pressure changes and convert the pressure changes into voltage signals.

In the ninth embodiment too, the intersection joint section 10C has a rectangular or diamond shape due to the intersection of the inverted hat-shaped cross sections of the first and second reinforcing frames 10A and 10B and a rectangular or diamond-shaped reinforcing rib 11 is joined to the intersecting joint section 10C to form an enclosure along the internal shape of the intersecting joint section 10C. As a result, the bending strength of the intersection joint section 10C is larger than the bending strength of the standalone portions 10An and 10Bn of the first and second reinforcing frames 10A and 10B.

Figure 56:
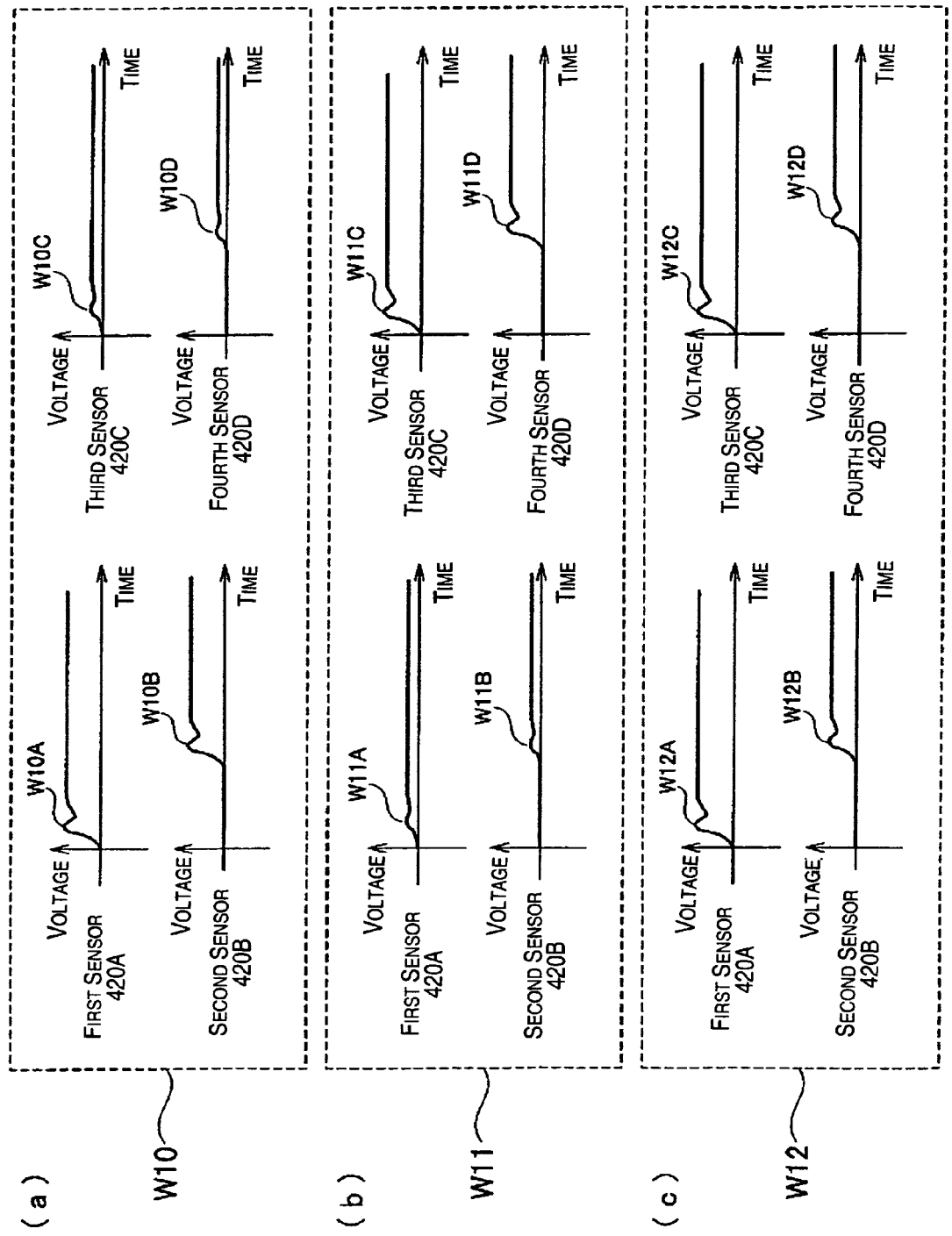
FIG. 56 is a series of diagrams (a) to (c) illustrating voltage waveforms issued from the deformation detecting device of the vehicle passenger restraining system in a case where the vehicle rolls over and makes initial contact with the ground on the left side of the roof (diagram (a)), in a case where the vehicle rolls over and makes initial contact on the right side of the roof (diagram (b)), and in a case where the vehicle rolls over and makes initial contact on the approximate center of the roof (diagram (c)) in accordance with the ninth embodiment of the present invention.

FIG. 56 shows the detection signals issued from the first to fourth sensors 420A to 420D in three different cases in which the vehicle M rolls over such that the roof R contacts the ground, the contact location being different in each case.

The diagram (a) of FIG. 56 shows the voltage waveforms W10 issued from the first to fourth sensors 420A to 420D in a first case in which the vehicle M rolls over and makes initial contact with the ground on the left side of the roof R. As shown in the diagram (a) of FIG. 56, the voltage W10A produced by the first sensor 420A occurs earlier than the voltage W10B produced by the second sensor 420B. Meanwhile, the voltage W10C of the third sensor 420C and the voltage W10D of the fourth sensor 420D are both significantly smaller than the voltage W10A of the first sensor 420A and the voltage W10B of the second sensor 420B.

The diagram (b) of FIG. 56 shows the voltage waveforms W11 issued from the first to fourth sensors 420A to 420D in a second case in which the vehicle M rolls over and makes initial contact with the ground on the right side of the roof R. As shown in the diagram (b) of FIG. 56, the voltage W11C produced by the third sensor 420C occurs earlier than the voltage W11D produced by the fourth sensor 420D. Meanwhile, the voltage W11A of the first sensor 420A and the voltage W11B of the second sensor 420B are both significantly smaller than the voltage W11C of the third sensor 420C and the voltage W11D of the fourth sensor 420D.

The diagram (c) of FIG. 56 shows the voltage waveforms W12 issued from the first to fourth sensors 420A to 420D in a third case in which the vehicle M rolls over and makes initial contact with the ground on a central portion of the roof R. As shown in the diagram (c) of FIG. 56, the voltage W12A produced by the first sensor 420A and the voltage W12C produced by the third sensor 420C occur substantially simultaneously and are substantially equal. Meanwhile, the voltage W12B produced by the second sensor 420B and the voltage W12D produced by the fourth sensor 420D also occur substantially simultaneously but at a lower voltage and a later time than the voltages W12A and W12C.

Figure 57:
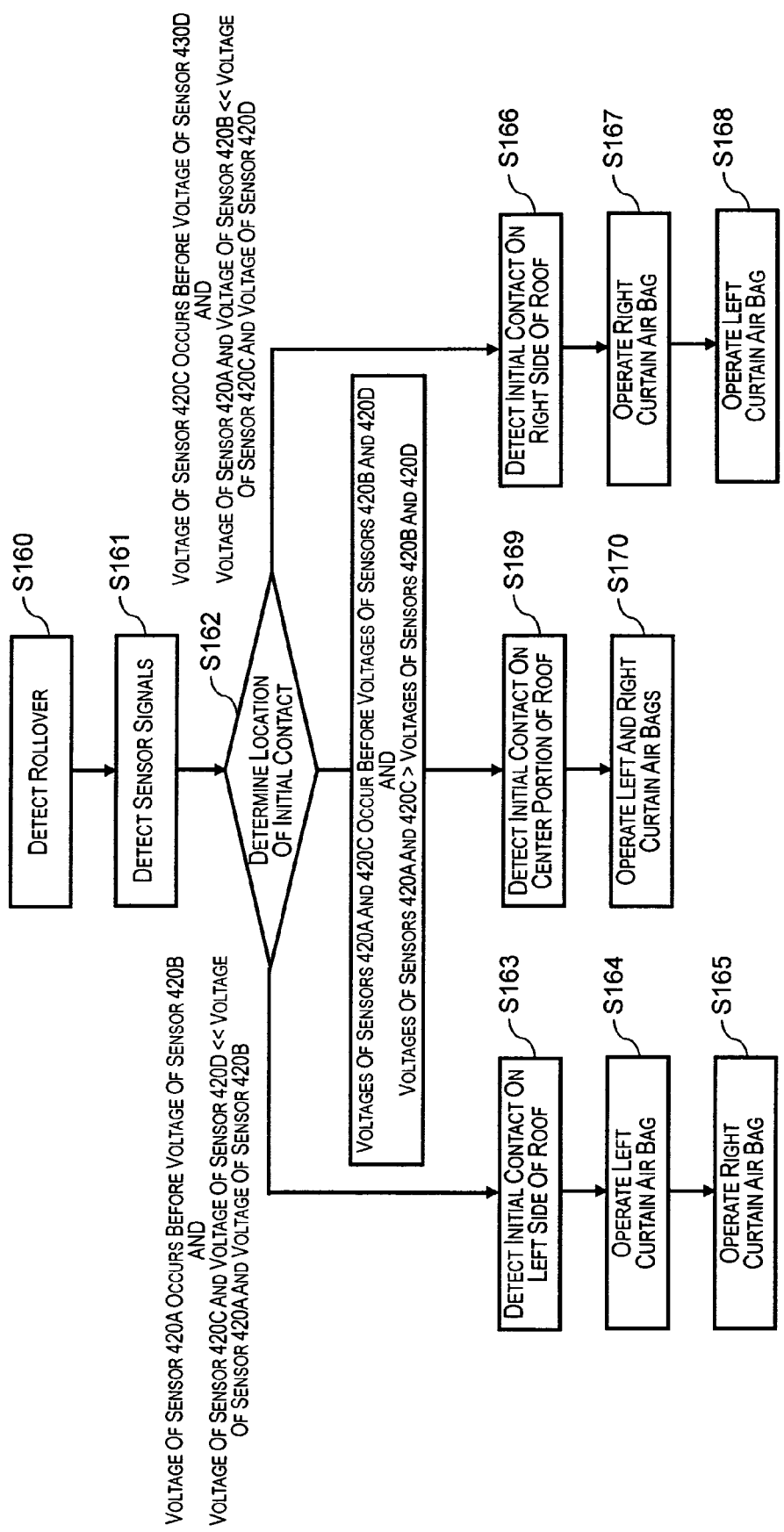
FIG. 57 is a flowchart illustrating a control algorithm for controlling from detection of a rollover event to operation of the passenger restraining devices executed in the vehicle passenger restraining system in accordance with the ninth embodiment of the present invention.

Thus, in the ninth embodiment too, by reading the voltage signal waveforms outputted from the first to fourth sensors 420A to 420D, it is possible to detect the portion (location) of the roof R that makes the initial contact with the ground during a rollover event. The controller 430 is then configured to select one or both of the left and right curtain air bags 1A and 1B (i.e., a specific curtain air bag or air bags among a plurality of the curtain air bags 1A and 1B) to be initially operated/deployed by following the control algorithm shown in FIG. 57. FIG. 57 is a flowchart illustrating the control algorithm for controlling from detection of a rollover event to operation of the passenger restraining devices executed in the vehicle passenger restraining system in accordance with the ninth embodiment of the present invention.

More specifically, in step S160 of the control algorithm shown in FIG. 57, the rollover detecting sensor 31 is configured to detect a rollover situation. When the roof R contacts the ground, in step S161, voltage signals are outputted from the first to fourth sensors 420A to 420D to the controller 430.

In step S162, the controller 430 is configured to receive the signals from the first to fourth sensors 420A to 420D. If the voltage W10A of the first sensor 420A occurs earlier than the voltage W10B of the second sensor 420B and the voltages W10C, W10D of the third and fourth sensors 420C, 420D are both smaller than the voltages W10A, W10B of the first and second sensors 420A, 420B, then the controller 430 is configured to determine in step S163 that the initial contact occurred on the left side of the roof R and to proceed to step S164 where the controller 430 is configured to operate/deploy the left curtain air bag 1A first. Then, in step S165, the controller 430 is configured to operate/deploy the right curtain air bag 1B after waiting for a prescribed amount of time.

Meanwhile, in step S162, if the voltage W11C of the third sensor 420C occurs earlier than the voltage W11D of the fourth sensor 420D and the voltages W11A, W11B of the first and second sensors 420A, 420B are both smaller than the voltages W11C, W11D of the third and fourth sensors 420C, 420D, then the controller 430 is configured to determine in step S166 that the initial contact occurred on the right side of the roof R and to proceed to step S167 where the controller 430 is configured to operate/deploy the right curtain air bag 1B first. Then, in step S168, the controller 430 is configured to operate/deploy the left curtain air bag 1A after waiting for a prescribed amount of time.

In step S162, if the voltage W12A of the first sensor 420A and the voltage W12C of the third sensor 420C occur substantially simultaneously and with substantially equal voltage values and the voltage W12B of the second sensor 420B and the voltage W12D of the fourth sensor 420D also occur substantially simultaneously but at lower voltage and a later time than the voltages W12A and W12C, then the controller 430 is configured to determine in step S169 that the initial contact occurred at the center portion of the roof R and to proceed to step S170 where the controller 430 is configured to operate/deploy the left curtain air bag 1A and the right curtain air bag 1B simultaneously.

Thus, with the constituent features described above, the vehicle passenger restraining system in accordance with the ninth embodiment offers substantially the same operational effects as the sixth embodiment. More specifically, the deformation sensor unit 420 is arranged and configured to detect the deformation of the reinforcing member 10 that occurs when the vehicle M rolls over and the roof R contacts the ground, the deformation corresponding to the location on the roof R that makes contact with the ground. As a result, the controller 430 can detect the actual location on the roof R where the roof R contacts the ground in a rollover situation in a precise manner.

Based on the detected deformation location on the roof R, the controller 430 can operate a specific passenger restraining device or devices (i.e., one or both of the left curtain air bag 1A and the right curtain air bag 1B). As a result, the curtain air bag 1A or 1B that properly corresponds to the impact location can be operated earlier during a rollover event and the passenger restraining effect can be increased.

With the ninth embodiment, the first to fourth sensors 420A to 420D configured to detect pressure changes can be used as the deformation sensor unit 420 because the first to fourth airtight hollow members 15a to 15d forming closed space structures are arranged in the standalone portions 10An and 10Bn of the first and second front frame parts 10A1 and 10B1 and the first and second rear frame parts 10A2 and 10B2 of the first and second reinforcing frames 10A and 10B. Thus, by using piezoelectric elements or other sensors of simple construction for the first to fourth sensors 420A to 420D, the cost of the vehicle body upper structure can be reduced while enabling the electric signals to be outputted in a short amount of time, thereby enabling rapid detection of the contact location. As a result, the response with which the curtain air bags 1A and 1B are operated/deployed can be increased.

In the ninth embodiment too, the bending strength of the intersection joint section 10C is larger than the bending strength of the standalone portions of the first and second reinforcing frames 10A and 10B because the reinforcing rib 11 is provided. As a result, the first to fourth sensors 420A to 420D arranged in the intersection joint section 10C can detect the deformation of the first and second reinforcing frames 10A and 10B with good sensitivity, and thus, can deliver accurate output signals.

Tenth Embodiment

Referring now to FIGS. 58(A) to 62, a vehicle passenger restraining system in accordance with a tenth embodiment will now be explained. In view of the similarity between the sixth and tenth embodiments, the parts of the tenth embodiment that are identical to the parts of the sixth embodiment will be given the same reference numerals as the parts of the sixth embodiment. Moreover, the descriptions of the parts of the tenth embodiment that are identical to the parts of the sixth embodiment may be omitted for the sake of brevity.

Figure 60:
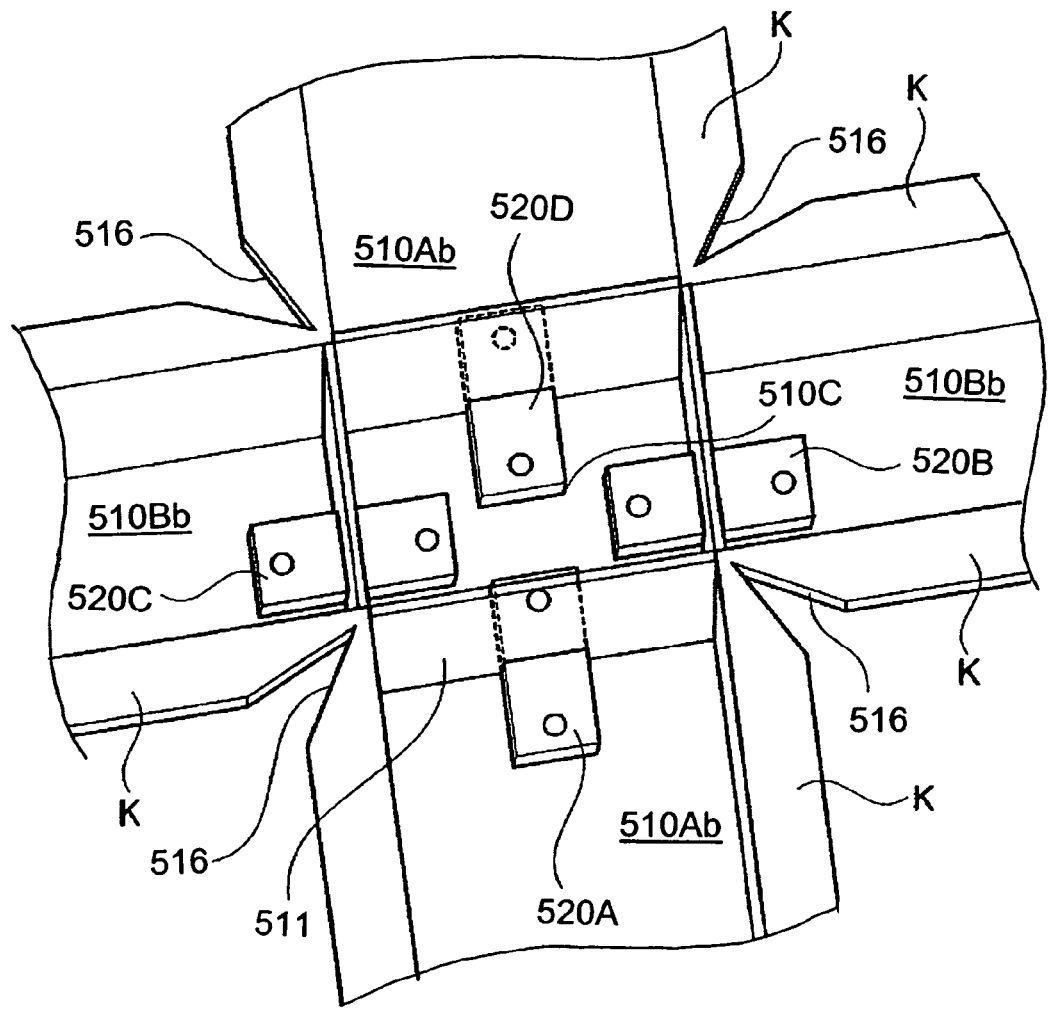
FIG. 60 is an enlarged, partial top perspective view of the reinforcing member illustrating the encircled portion H of FIG. 59 in accordance with the tenth embodiment of the present invention.

The vehicle passenger restraining system of the tenth embodiment differs from the vehicle passenger restraining system of the sixth embodiment in that a deformation sensor unit 520 including first, second, third and fourth sensors 520A, 520B, 520C and 520D is used instead of the deformation sensor unit 120 of the sixth embodiment. Moreover, in the tenth embodiment of the present invention, a reinforcing member 510 is used that has a structure that is different from the structure of the reinforcing member 10. In particular, as seen in FIGS. 59 and 60, the reinforcing member 510 is provided with a plurality of notches 516 near an intersection joint section 510C. Thus, other constituent features of a vehicle body upper structure in accordance with the tenth embodiment are the same as those of the sixth embodiment, except as otherwise noted and/or illustrated.

Figure 58A:
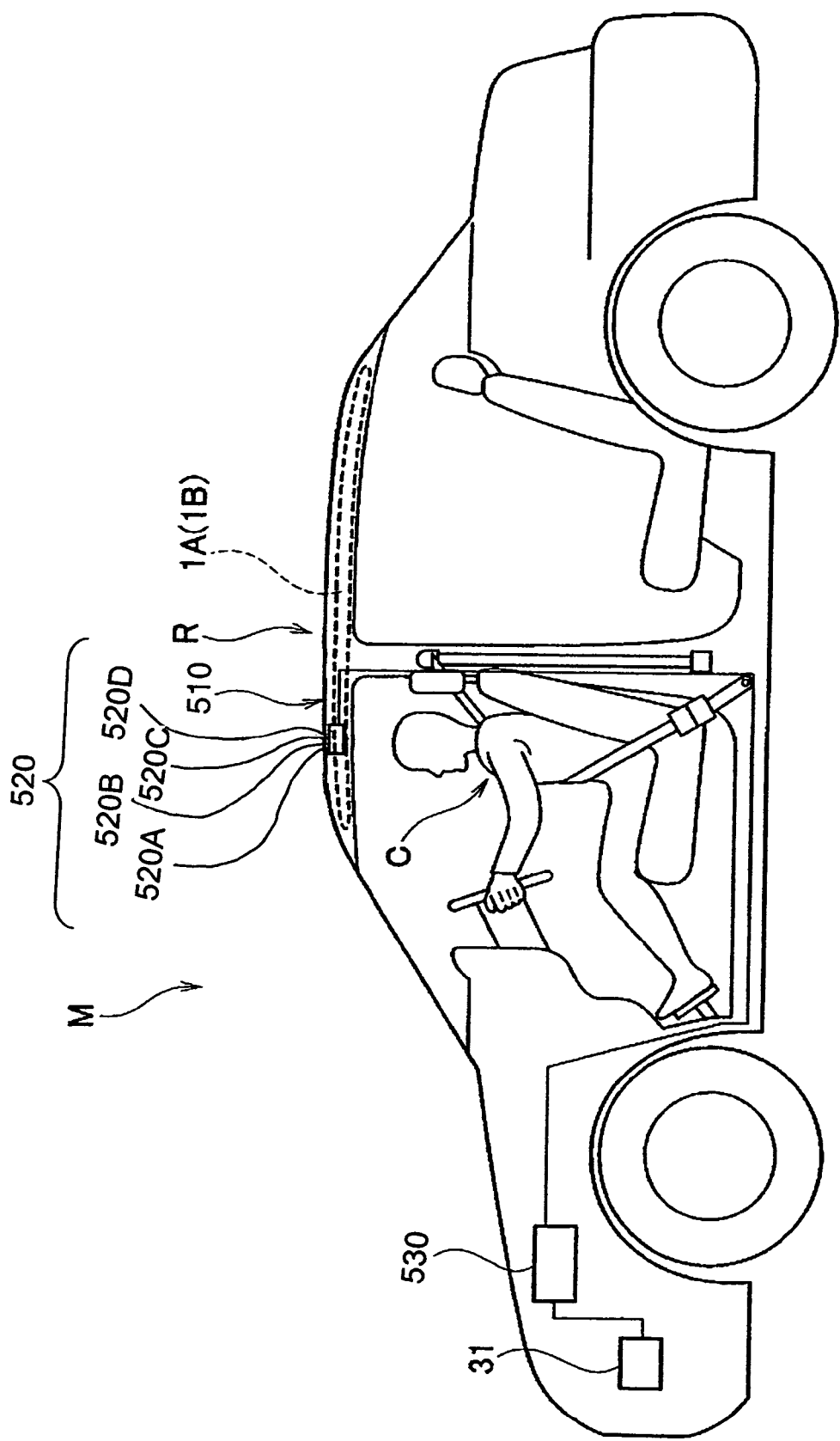
FIG. 58(A) is a schematic side elevational view of a vehicle body illustrating an arrangement of a deformation detecting device, a passenger restraining device, and a passenger restraining device operating unit of a vehicle passenger restraining system in accordance with a tenth embodiment of the present invention.

FIG. 58(A) is a schematic side view of a vehicle body illustrating an arrangement of the deformation sensor unit 520, the passenger restraining device (the curtain air bags 1A and 1B), and the passenger restraining device operating unit (a controller 530) of a vehicle passenger restraining system in accordance with a tenth embodiment of the present invention.

Figure 58B:
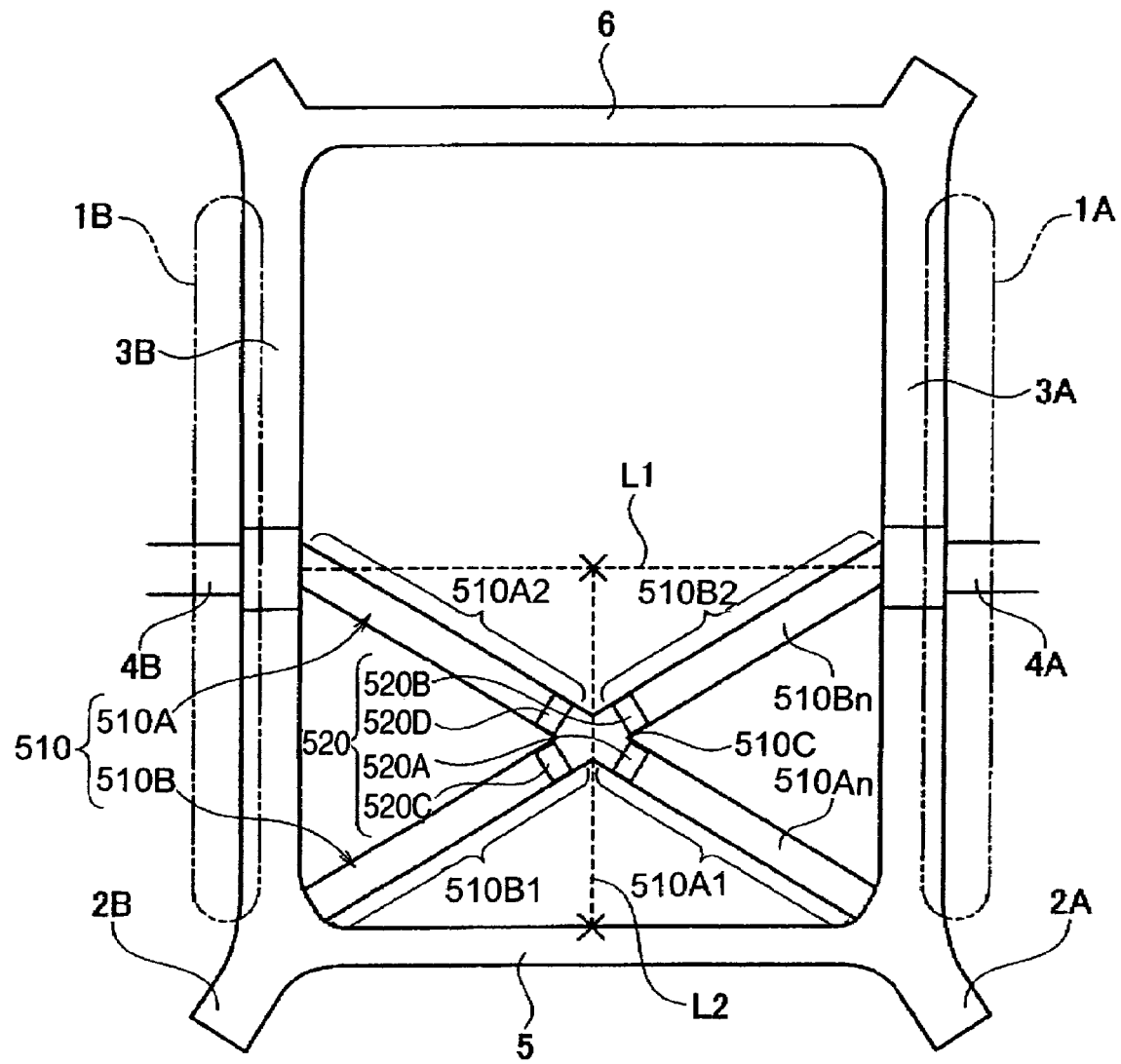
FIG. 58(B) is a top plan view of a roof structure of a vehicle body illustrating an arrangement of a reinforcing member used in the vehicle passenger restraining system in accordance with the tenth embodiment of the present invention.

FIG. 58(B) is a top plan view of a roof structure of a vehicle body illustrating an arrangement of a reinforcing member 510 used in the vehicle passenger restraining system in accordance with the tenth embodiment of the present invention More specifically, as shown in FIGS. 58(A) and 58(B), a vehicle body upper structure in accordance with the tenth embodiment has the reinforcing member 510 arranged in a region where the roof R will contact the ground in a rollover situation and a deformation sensor unit 520 (which replaces the deformation sensor unit 120) serving as a deformation detecting device that is arranged in an appropriate location on or in the reinforcing member 510 and configured to detect deformation of the reinforcing member 510. Also, as shown in FIG. 58(A), the vehicle body upper structure is provided with a controller 530 configured to detect a location on the roof R that contacts the ground in a rollover event based on information from the deformation sensor unit 520 and to operate a specific curtain air bag or air bags (i.e., one or both of the left curtain air bag 1A and the right curtain air bag 1B) in accordance with the location where deformation occurred. Additionally, the vehicle body upper structure is provided with a rollover detecting sensor 31 that is configured to detect if the vehicle M is rolling over.

Also, as shown in FIG. 58(B), the reinforcing member 510 comprises a first reinforcing member 510A extending between the upper end of the left front pillar 2A (front left top portion of vehicle) and the upper end of the right center pillar 4B (approximate longitudinal middle portion of top right edge of vehicle) and a second reinforcing member 510B extending between the upper end of the right front pillar 2B (front right top portion of vehicle) and the upper end of left center pillar 4A (approximate longitudinal middle portion of top left edge of vehicle). The first and second reinforcing frames 510A and 510B are joined together at the portions where they intersect each other and the resulting intersection joint section 510C is arranged in the approximate middle along the widthwise direction of the vehicle. The deformation sensor unit 520 is arranged in the intersection joint section 510C.

Similarly to the sixth embodiment, the first and second reinforcing frames 510A and 510B each have a generally linear shape and are arranged in an X-shaped structure and the intersection joint section 510C has a larger bending strength than the standalone portions 510An and 510Bn of the first and second reinforcing frames 510A and 510B that are disposed adjacent to the intersection joint section 510C.

FIG. 59 is an enlarged top perspective view of the reinforcing member 510 of the vehicle passenger restraining system in accordance with the tenth embodiment of the present invention. FIG. 60 is an enlarged top perspective view of the reinforcing member 510 illustrating the encircled portion H of FIG. 59 in accordance with the tenth embodiment of the present invention.

As shown in FIG. 59, the notches 516 (weak sections) are formed in a portion of each of the first and second front frame parts 510A1 and 510B1 and the first and second rear frame parts 510A2 and 510B2 of the first and second reinforcing frames 510A and 510B that is near the intersection joint section 510C. The deformation sensor unit 520 comprises first to fourth strain gauges 520A to 520D configured and arranged to measure the strain of the first and second reinforcing frames 510A and 510B. The first to fourth strain gauges 520A to 520D are arranged on the bottom surfaces of first and second front frame parts 510A1 and 510B1 and the first and second rear frame parts 510A2 and 510B2 to straddle across the portion where the notches 516 are formed as shown in FIG. 60.

More specifically, as shown in FIG. 60, the notches 516 are formed on the corner portions of the flanges K of the first and second front frame parts 510A1 and 510B1 and the first and second rear frame parts 510A2 and 510B2 where the flanges K join together at the intersection joint section 510C.

In the tenth embodiment too, a rectangular or diamond-shaped reinforcing rib 511 is joined to the inside of the intersection joint section 510C to form an enclosure along the internal shape of the intersecting joint section 510C. As a result, the bending strength of the intersection joint section 510C is larger than the bending strength of the standalone portions 510An and 510Bn of the first and second reinforcing frames 510A and 510B. The walls of the rib 511 are substantially aligned with the positions where the notches 516 are formed.

The first to fourth strain gauges 520A to 520D are mounted to the bottom surfaces 510Ab and 510Bb of the first and second front frame parts 510A1 and 510B1 and the first and second rear frame parts 510A2 and 510B2 (on the inside of the inverted hat-shaped cross section). The first to fourth strain gauges 520A to 520D are arranged to pass through the bottom portions of the four walls of the rib 511.

More specifically, the first strain gauge 520A is arranged to straddle between the front frame part 510A1 of the first reinforcing member 510A and the intersection joint section 510C, the second strain gauge 520B is arranged to straddle between the rear frame part 510B2 of the second reinforcing member 510B and the intersection joint section 510C, the third strain gauge 520C is arranged to straddle between the front frame part 510B1 of the second reinforcing member 510B and the intersection joint section 510C, and the fourth strain gauge 520D is arranged to straddle between the rear frame part 510A2 of the first reinforcing member 510A and the intersection joint section 510C.

Figure 61:
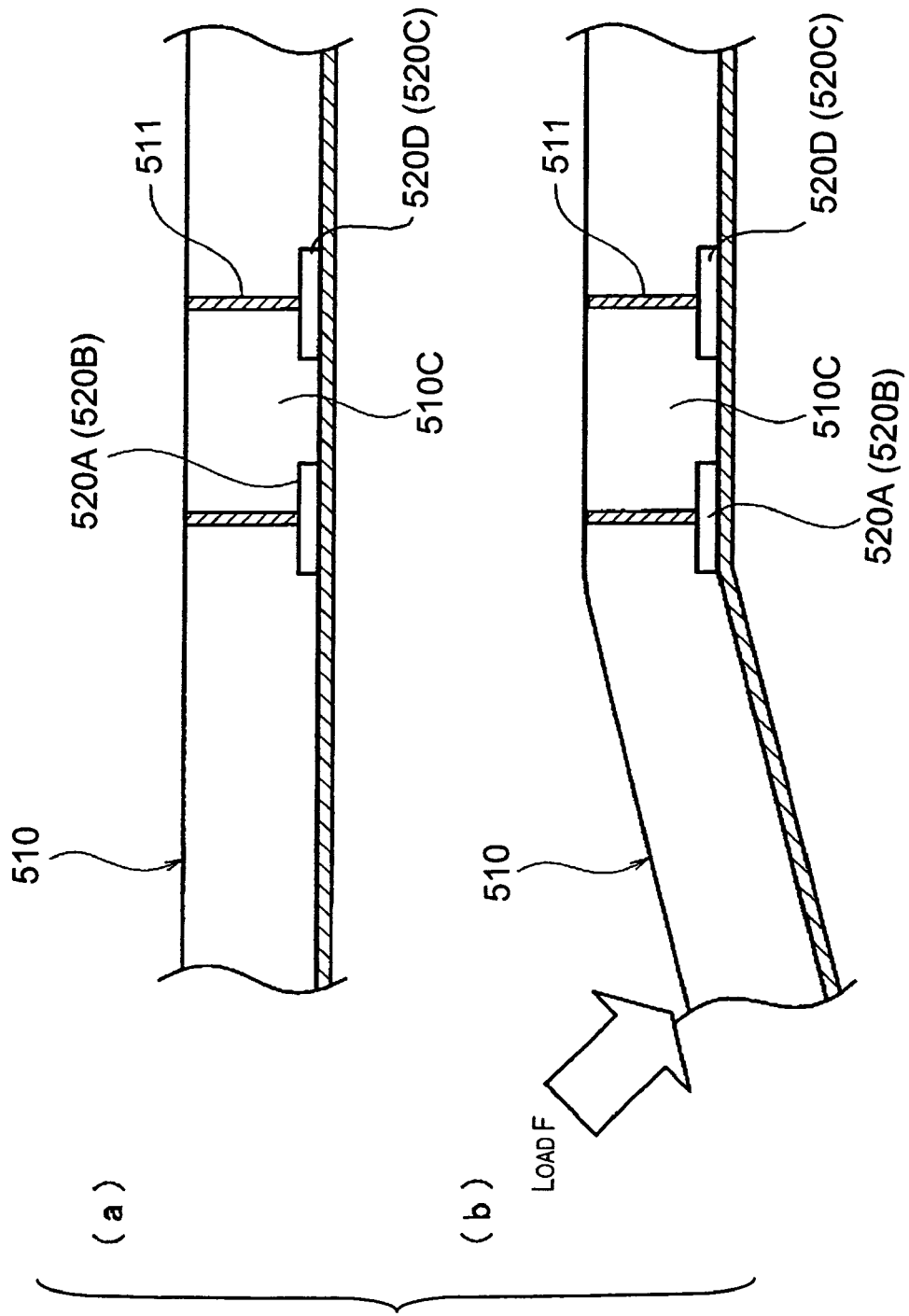
FIG. 61 is a pair of diagrams (a) and (b) in partial cross sectional views of the reinforcing member with the deformation detecting device illustrating sequential operating states of the deformation detecting device in accordance with the tenth embodiment of the present invention.

FIG. 61 is a pair of diagrams (a) and (b) in partial cross sectional views of the reinforcing member 510 with the first strain gauges 520A and 520D illustrating sequential operating states of the first strain gauge 520A in accordance with the tenth embodiment of the present invention. When a load F acts on an end of the reinforcing member 510 opposite the intersection joint section 510C while the first to fourth strain gauges 520A to 520D are mounted in the reinforcing member 510 (first and second reinforcing frames 510A and 510B) as shown in the diagram (a) of FIG. 61, the sections of the reinforcing member 510 where the first to fourth strain gauges 520A to 520D are mounted deform more readily than other sections, as shown in the diagram (b) of FIG. 61, due to the notches 516 provided on the flanges K near the intersection joint section 510C. The first to fourth strain gauges 520A to 520D are configured to detect the resulting strain and convert the deformation of the reinforcing member 510 into electric signals.

Figure 62:
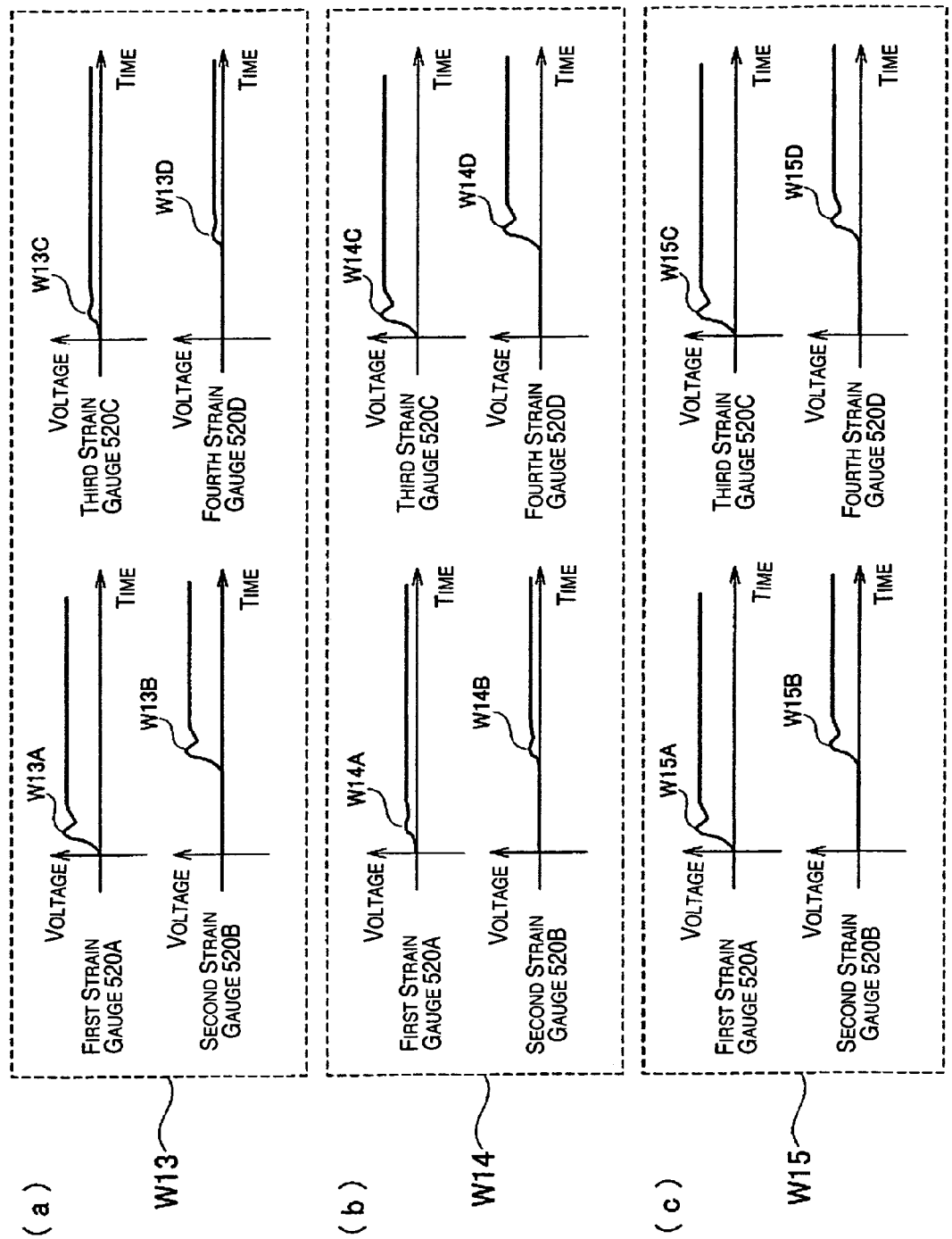
FIG. 62 is a series of diagrams (a) to (c) illustrating voltage waveforms issued from the deformation detecting device of the vehicle passenger restraining system in a case where the vehicle rolls over and makes initial contact with the ground on the left side of the roof (diagram (a)), in a case where the vehicle rolls over and makes initial contact on the right side of the roof (diagram (b)), and in a case where the vehicle rolls over and makes initial contact on the approximate center of the roof (diagram (c)) in accordance with the tenth embodiment of the present invention.

FIG. 62 shows the detection signals issued from the first to fourth strain gauges 520A to 520D in three different cases in which the vehicle M rolls over such that the roof R contacts the ground, the contact location being different in each case.

The diagram (a) of FIG. 62 shows the voltage waveforms W13 issued from the first to fourth strain gauges 520A to 520D in a first case in which the vehicle M rolls over and makes initial contact with the ground on the left side of the roof R. As shown in the diagram (a) of FIG. 62, the voltage W13A produced by the first strain gauge 520A occurs earlier than the voltage W13B produced by the second strain gauge 520B. Meanwhile, the voltage W13C of the third strain gauge 520C and the voltage W13D of the fourth strain gauge 520D are both significantly smaller than the voltage W13A of the first strain gauge 520A and the voltage W13B of the second strain gauge 520B.

The diagram (b) of FIG. 62 shows the voltage waveforms W14 issued from the first to fourth strain gauges 520A to 520D in a second case in which the vehicle M rolls over and makes initial contact with the ground on the right side of the roof R. As shown in the diagram (b) of FIG. 62, the voltage W14C produced by the third strain gauge 520C occurs earlier than the voltage W14D produced by the fourth strain gauge 520D. Meanwhile, the voltage W14A of the first strain gauge 520A and the voltage W14B of the second strain gauge 520B are both significantly smaller than the voltage W14C of the third strain gauge 520C and the voltage W14D of the fourth strain gauge 520D.

The diagram (c) of FIG. 62 shows the voltage waveforms W15 issued from the first to fourth strain gauges 520A to 520D in a third case in which the vehicle M rolls over and makes initial contact with the ground on a central portion of the roof R. As shown in the diagram (c) of FIG. 62, the voltage W15A produced by the first strain gauge 520A and the voltage W15C produced by the third strain gauge 520C occur substantially simultaneously and are substantially equal. Meanwhile, the voltage W15B produced by the second strain gauge 520B and the voltage W15D produced by the fourth strain gauge 520D also occur substantially simultaneously but at a lower voltage and a later time than the voltages W15A and W15C.

Figure 63:
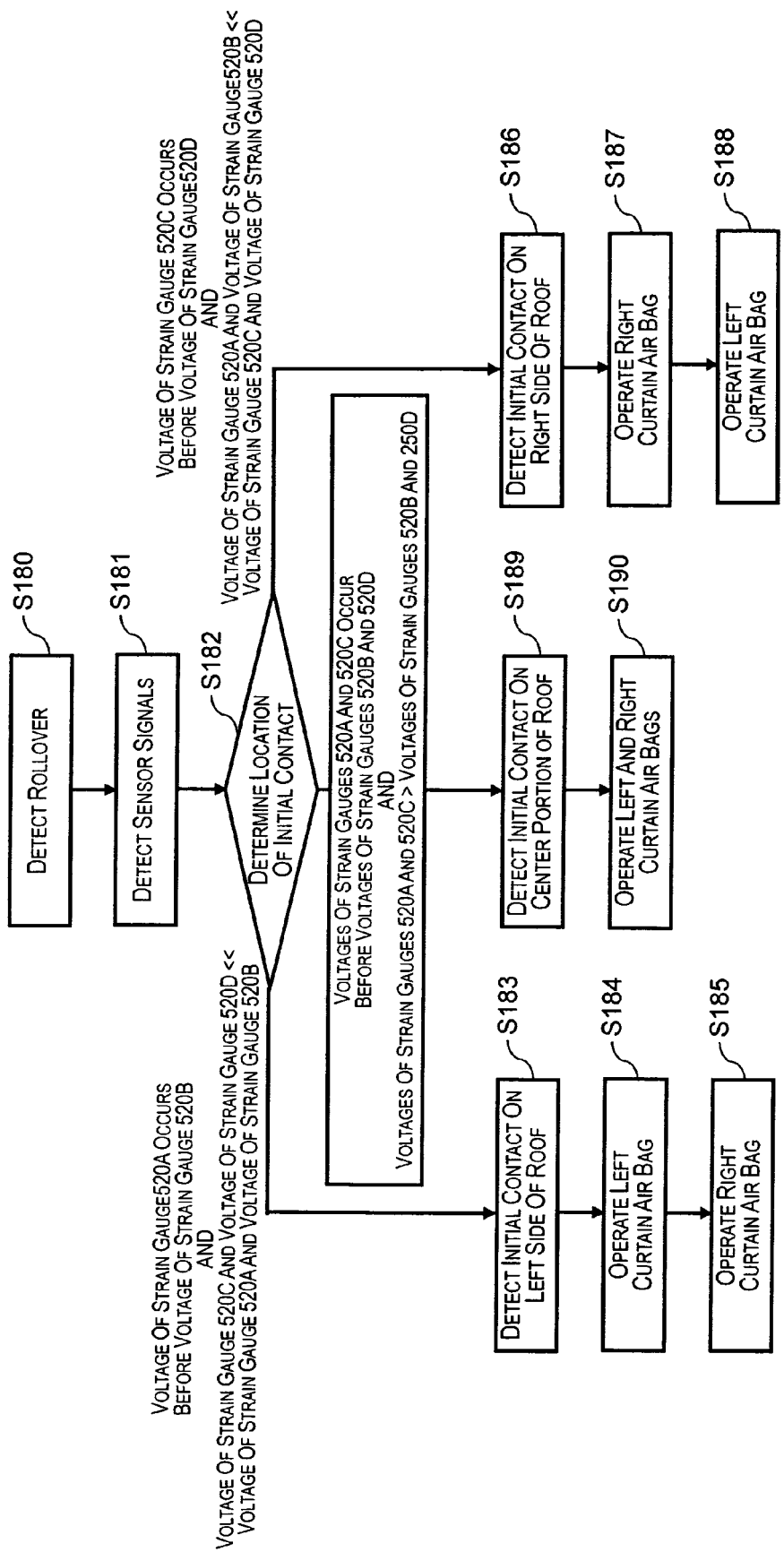
FIG. 63 is a flowchart illustrating a control algorithm for controlling from detection of a rollover event to operation of the passenger restraining devices executed in the vehicle passenger restraining system in accordance with the tenth embodiment of the present invention.

Thus, in the tenth embodiment too, by reading the voltage signal waveforms outputted from the first to fourth strain gauges 520A to 520D, it is possible to detect the portion (location) of the roof R that makes the initial contact with the ground during a rollover event. Then, the controller 530 is configured to select one of the left and right curtain air bags 1A and 1B (i.e., a specific curtain air bag or air bags among a plurality of the curtain air bags 1A and 1B) to be initially operated/deployed by following the control algorithm shown in FIG. 63. FIG. 63 is a flowchart illustrating the control algorithm for controlling from detection of a rollover event to operation of the passenger restraining devices executed in the vehicle passenger restraining system in accordance with the tenth embodiment of the present invention.

More specifically, in step S180 of the control algorithm of FIG. 63, the rollover detecting sensor 31 is configured to detect a rollover situation. When the roof R contacts the ground, in step S181, voltage signals are outputted from the first to fourth strain gauges 520A to 520D.

In step S182, the controller 530 is configured to receive the signals from the strain gauges 520A to 520D. If the voltage W13A of the first strain gauge 520A occurs earlier than the voltage W13B of the second strain gauge 520B and the voltages W13C, W13D of the third and fourth strain gauges 520C, 520D are both smaller than the voltages W13A, W13B of the first and second strain gauges 520A, 520B, then the controller 530 is configured to determine in step S183 that the initial contact occurred on the left side of the roof R and to proceed to step S184 where the controller 530 is configured to operate/deploy the left curtain air bag 1A first. Then, in step S185, the controller 530 is configured to operate/deploy the right curtain air bag 1B after waiting for a prescribed amount of time.

Meanwhile, in step S182, if the voltage W14C of the third strain gauge 520C occurs earlier than the voltage W14D of the fourth strain gauge 520D and the voltages W14A, W14B of the first and second strain gauges 520A, 520B are both smaller than the voltages W14C, W14D of the third and fourth strain gauges 520C, 520D, then the controller 530 is configured to determine in step S186 that the initial contact occurred on the right side of the roof R and to proceed to step S187 where the controller 530 is configured to operate/deploy the right curtain air bag 1B first. Then, in step S188, the controller 530 is configured to operate/deploy the left curtain air bag 1A after waiting for a prescribed amount of time.

In step S182, if the voltage W15A of the first strain gauge 520A and the voltage W15C of the third strain gauge 520C occur substantially simultaneously and with substantially equal voltage values and the voltage W15B of the second strain gauge 520B and the voltage W15D of the fourth strain gauge 520D also occur substantially simultaneously but at lower voltage and a later time than the voltages W15A and W15C, then the controller 530 is configured to determine in step S189 that the initial contact occurred at the center portion of the roof R and to proceed to step S190 where the controller 530 is configured to operate/deploy the left curtain air bag 1A and the right curtain air bag 1B simultaneously.

Thus, with the constituent features described above, the vehicle passenger restraining system in accordance with the tenth embodiment offers substantially the same operational effects as the sixth embodiment. More specifically, the deformation sensor unit 520 is arranged and configured to detect the deformation of the reinforcing member 510 that occurs when the vehicle M rolls over and the roof R contacts the ground, the deformation corresponding to the location on the roof R that makes contact with the ground. As a result, the controller 530 can detect the actual location on the roof R where the roof R contacts the ground in a rollover situation in a precise manner.

Based on the detected deformation location on the roof R, the controller 530 can operate specific passenger restraining devices (i.e. either the left curtain air bag 1A or the right curtain air bag 1B). As a result, the curtain air bag 1A or 1B that properly corresponds to the impact location can be operated earlier during a rollover event and the passenger restraining effect can be increased.

With the tenth embodiment, the first to fourth strain gauges 520A to 520D can be used as the deformation sensor unit 520 because the notches 516 are formed in a portion of each of the first and second front frame parts 510A1 and 510B1 and the first and second rear frame parts 510A2 and 510B2 of the first and second reinforcing frames 510A and 510B that is near the intersection joint section 510C and the first and section reinforcing frames 510A and 510B deform easily in the vicinity of the notches 516 in a rollover situation. Thus, by using sensors of simple construction (i.e., the first to fourth strain gauges 520A to 520D), the cost of the vehicle body upper structure can be reduced while enabling the electric signals to be outputted in a short amount of time, thereby enabling rapid detection of the contact location. As a result, the response with which the curtain air bags 1A and 1B are operated/deployed can be increased.

In the tenth embodiment too, the bending strength of the intersection joint section 510C is larger than the bending strength of the standalone portions of the first and second reinforcing frames 510A and 510B because the reinforcing rib 511 is provided. As a result, strain can be produced more efficiently between the intersection joint section 510C and the first and second front frame parts 510A1 and 510B1 and the first and second rear frame parts 510A2 and 510B2. Consequently, the first to fourth strain gauges 520A to 520D can detect the deformation of the first and second reinforcing frames 510A and 510B with good sensitivity and, thus, can deliver accurate output signals.

Eleventh Embodiment

Referring now to FIGS. 64(A) to 72, a vehicle passenger restraining system in accordance with an eleventh embodiment will now be explained. In view of the similarity between the sixth and eleventh embodiments, the parts of the eleventh embodiment that are identical to the parts of the eleventh embodiment will be given the same reference numerals as the parts of the eleventh embodiment. Moreover, the descriptions of the parts of the eleventh embodiment that are identical to the parts of the eleventh embodiment may be omitted for the sake of brevity.

The vehicle passenger restraining system of the eleventh embodiment differs from the vehicle passenger restraining system of the sixth embodiment in that a deformation sensor unit 620 is used instead of the deformation sensor unit 120 of the sixth embodiment, and a structure of a reinforcing member 610 is different from the structure of the reinforcing member 610 of the sixth embodiment. Thus, other constituent features of a vehicle body upper structure in accordance with the eleventh embodiment are basically the same as those of the sixth embodiment, except as otherwise noted and/or illustrated.

Figure 64A:
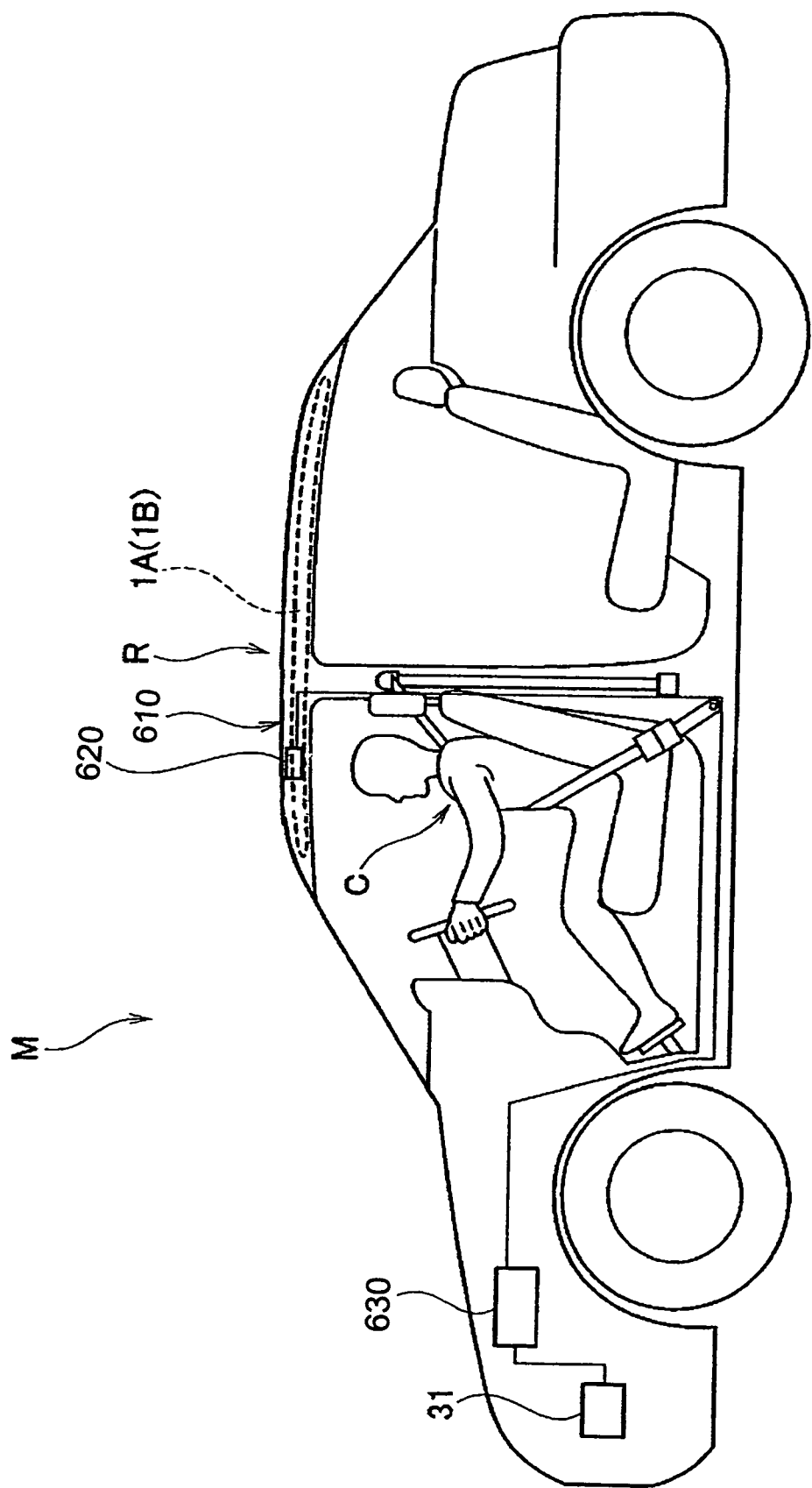
FIG. 64(A) is a schematic side elevational view of a vehicle body illustrating an arrangement of a deformation detecting device, a passenger restraining device, and a passenger restraining device operating unit of a vehicle passenger restraining system in accordance with an eleventh embodiment of the present invention.
Figure 64B:
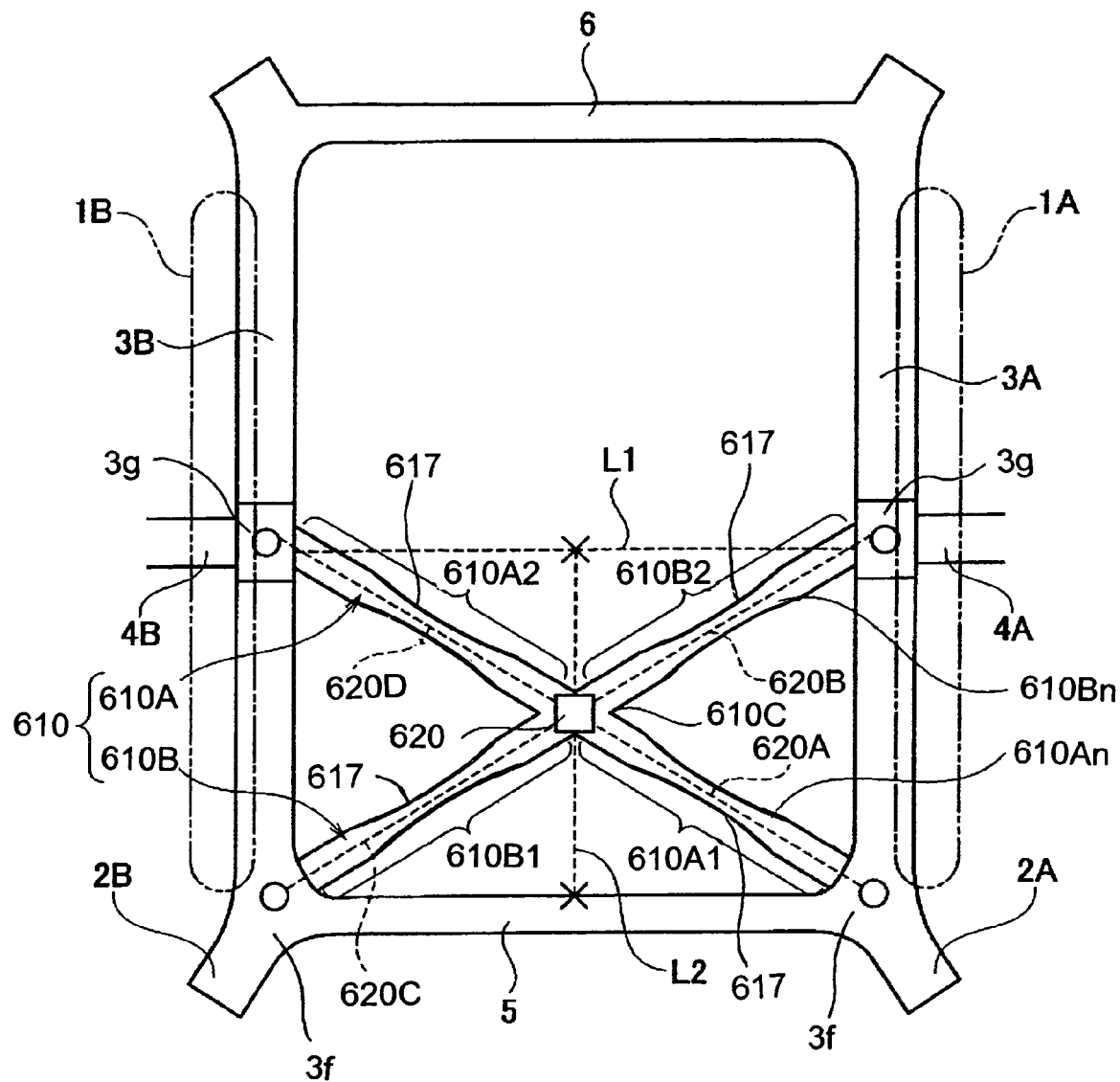
FIG. 64(B) is a top plan view of a roof structure of a vehicle body illustrating an arrangement of a reinforcing member used in the vehicle passenger restraining system in accordance with the eleventh embodiment of the present invention.

FIG. 64(A) is a schematic side view of a vehicle body illustrating an arrangement of the deformation sensor unit 620, the passenger restraining device (the curtain air bags 1A and 1B), and the passenger restraining device operating unit (a controller 630) of a vehicle passenger restraining system in accordance with a eleventh embodiment of the present invention. FIG. 64(B) is a top plan view of a roof structure of a vehicle body illustrating an arrangement of the reinforcing member 610 used in the vehicle passenger restraining system in accordance with the eleventh embodiment of the present invention.

More specifically, as shown in FIGS. 64(A) and 64(B), the vehicle passenger restraining system in accordance with the eleventh embodiment has the reinforcing member 610 arranged in a region where the roof R will contact the ground in a rollover situation and the deformation sensor unit 620 (which replaces the deformation sensor unit 120 of the sixth embodiment) serving as a deformation detecting device that is arranged in an appropriate location on or in the reinforcing member 610 and configured to detect deformation of the reinforcing member 610. Also, as shown in FIG. 64(A), the vehicle body upper structure is provided with the controller 630 that is configured to detect a location on the roof R that contacts the ground in a rollover event based on information from the deformation sensor unit 620 and to operate a specific curtain air bag or air bags (i.e., one or both of the left curtain air bag 1A and the right curtain air bag 1B) in accordance with the location where deformation occurred. Additionally, the vehicle body upper structure is provided with the rollover detecting sensor 31 configured to detect if the vehicle is rolling over.

Also, as shown in FIG. 64(B), the reinforcing member 610 comprises a first reinforcing frame 610A extending between the upper end of the left front pillar 2A (front left top portion of vehicle) and the upper end of the right center pillar 4B (approximate longitudinal middle portion of top right edge of vehicle) and a second reinforcing frame 610B extending between the upper end of the right front pillar 2B (front right top portion of vehicle) and the upper end of left center pillar 4A (approximate longitudinal middle portion of top left edge of vehicle). The first and second reinforcing frames 610A and 610B are joined together at the portions where they intersect each other and the resulting intersection joint section 610C is arranged in the approximate middle with respect to the widthwise direction of the vehicle. The deformation sensor unit 620 is arranged in the intersection joint section 610C.

Figure 65:
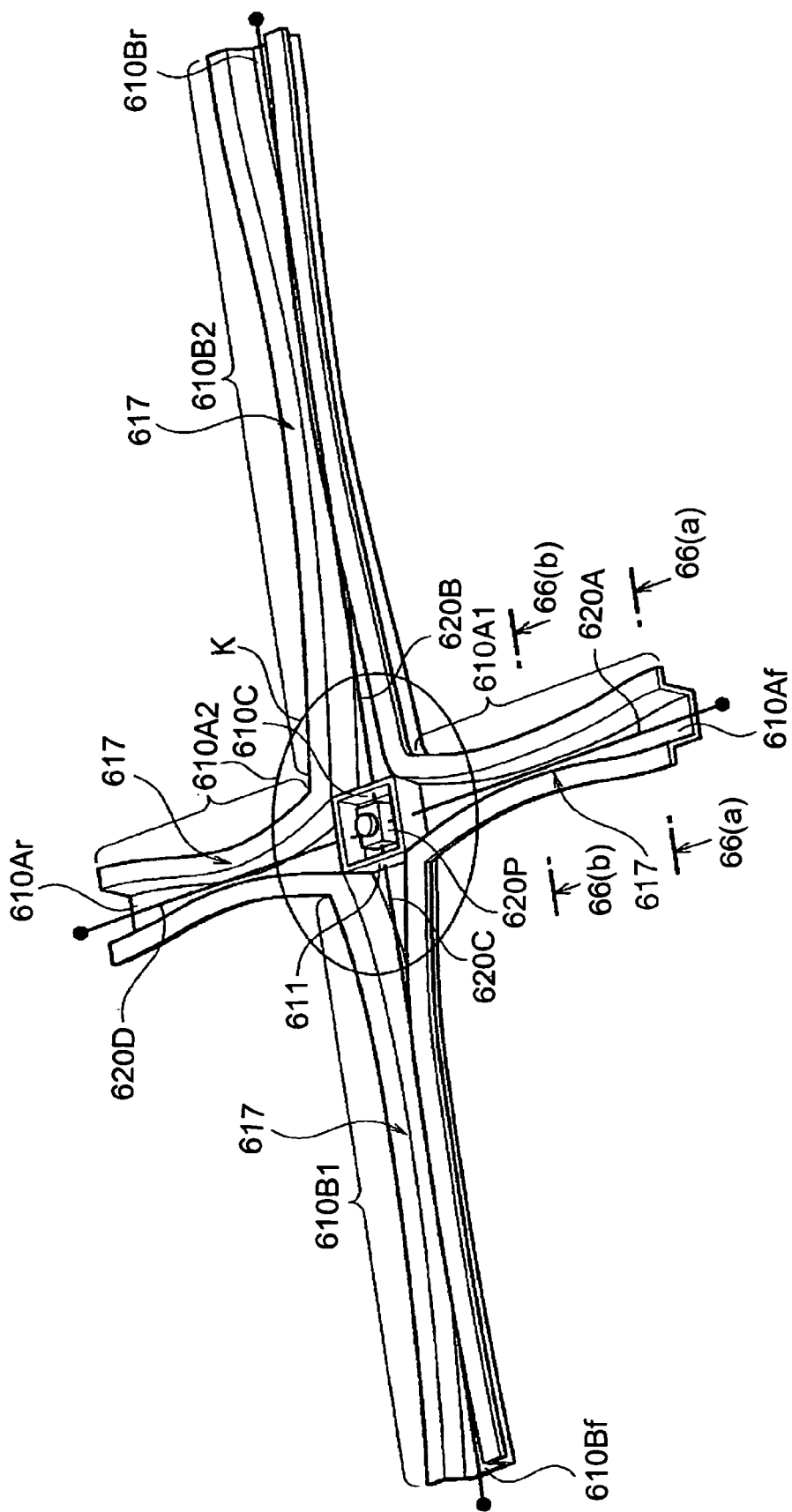
FIG. 65 is an enlarged, partial top perspective view of the reinforcing member of the vehicle passenger restraining system in accordance with the eleventh embodiment of the present invention.
Figure 66:
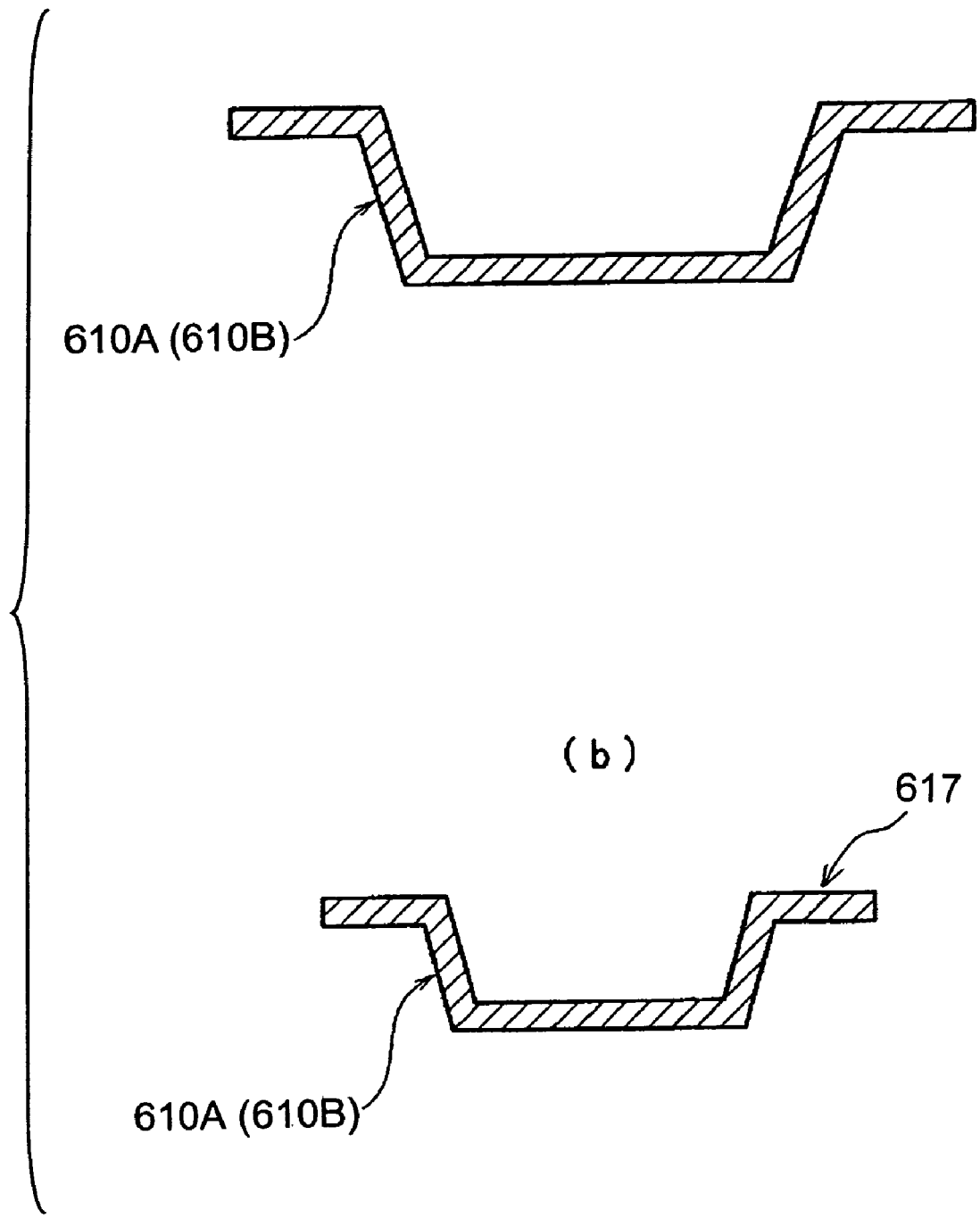
FIG. 66 is a pair of diagrams (a) and (b) illustrating partial cross sectional views the reinforcing member taken along a section line 66(a)-66(a) of FIG. 65 (diagram (a)) and a cross sectional view of the reinforcing member taken along a section line 66(b)-66(b) of FIG. 65 (diagram (b)) in accordance with the eleventh embodiment of the present invention.

Similarly to the sixth embodiment, the first and second reinforcing frames 610A and 610B each have a generally linear shape and are arranged in an X-shaped structure and the intersection joint section 610C has a larger bending strength than the standalone portions 610An and 610Bn of the first and second reinforcing frames 610A and 610B. FIG. 65 is an enlarged front perspective view of the reinforcing member 610 of the vehicle passenger restraining system in accordance with the eleventh embodiment of the present invention. FIG. 66 is a pair of diagrams (a) and (b) illustrating cross sectional views of the reinforcing member 610 taken along a section line 66(a)-66(a) of FIG. 65 (diagram (a)) and taken along a section line 66(b)-66(b) of FIG. 65 (diagram (b)) in accordance with the eleventh embodiment of the present invention.

As shown in FIG. 65, an easily deformable section 617 is provided in an approximate lengthwise middle portion of each of the first and second front frame parts 610A1 and 610B1 and the first and second rear frame parts 610A2 and 610B of the first and second reinforcing frames 610A and 610B. The deformation sensor unit 620 is arranged as a single potentiometer 620P that is arranged in the intersection joint section 610C and configured and arranged to detect a change in length of the first and second front frame parts 610A1 and 610B1 and the first and second rear frame parts 610A2 and 610B of the first and second reinforcing frames 610A and 610B.

As shown in FIG. 65, the easily deformable sections 617 are preferably formed by making the first and second reinforcing frames 610A and 610B such that the cross sectional area of each of the front frame parts 610A1 and 610B1 and each of the rear frame parts 610A2 and 610B2 tapers from both ends toward the middle thereof such that the cross sectional area at both ends (shown in the diagram (a) of FIG. 66) is larger than the cross sectional area in the middle (shown in the diagram (b) of FIG. 66).

In the eleventh embodiment too, a rectangular or diamond-shaped reinforcing rib 611 is joined to the inside of the intersection joint section 610C in such a manner as to form an enclosure along the internal shape of the intersecting joint section 610C. As a result, the bending strength of the intersection joint section 610C is larger than the bending strength of the standalone portions 610An and 610Bn of the first and second reinforcing frames 610A and 6101B.

The potentiometer 620P is configured and arranged to measure the distance between itself and four points and disposed inside the reinforcing rib 611 of the intersection joint section 610C such that the potentiometer 620P can measure changes in the lengths of the first and second front frame parts 610A1 and 610B1 and the first and second rear frame parts 610A2 and 610B2 of the first and second reinforcing frames 610A and 611B.

More specifically, the potentiometer 620P is provided with first to fourth wires 620A to 620D extending in four different directions from the potentiometer 620. The first to fourth wires 620A to 620D are capable of moving freely in and out of the potentiometer 620P. The potentiometer 620P is configured to generate a positive voltage when a wire 620A to 620D is pulled outward and a negative voltage when a wire 620A to 620D is pushed inward. Thus, changes in length in the first and second front frame parts 610A1 and 610B1 and the first and second rear frame parts 610A2 and 610B2 can be measured based on changes in the voltages outputted from the potentiometer 620P.

Figure 67:
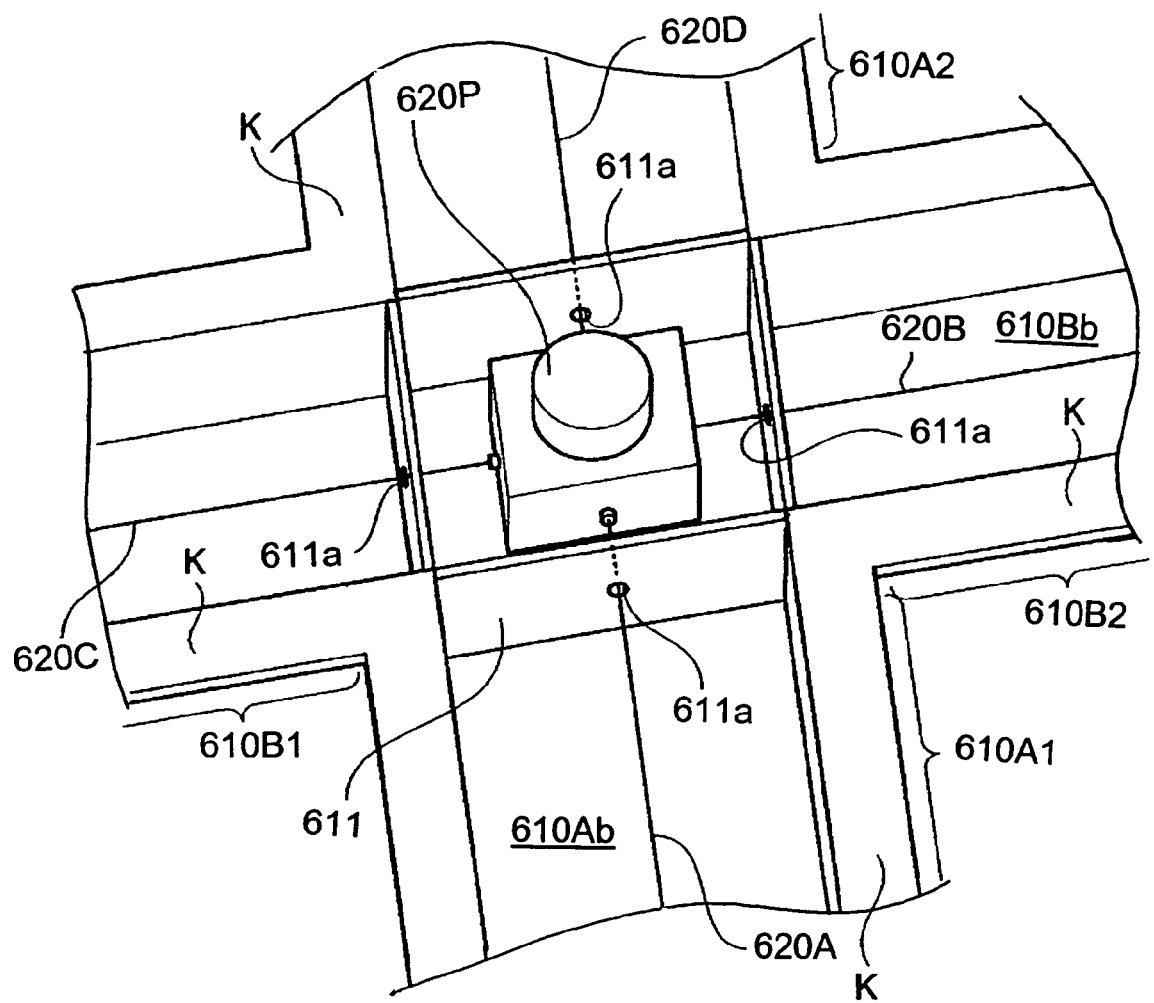
FIG. 67 is an enlarged, partial top perspective view of the reinforcing member with the deformation detecting device illustrating the encircled portion K of FIG. 65 in accordance with the eleventh embodiment of the present invention.

FIG. 67 is an enlarged perspective view of the reinforcing member 610 with the deformation sensor unit 620 illustrating the encircled portion K of FIG. 65 in accordance with the eleventh embodiment of the present invention. The first to fourth wires 620A to 620D are passed through four holes 611a formed in the four walls of the reinforcing rib 611 as shown in FIG. 67 and arranged along the insides of the first and second front frame parts 610A1 and 610B1 and the first and second rear frame parts 610A2 and 610B2 of the first and second reinforcing frames 610A and 610B.

As shown in FIGS. 64(B), 65 and 67, the first wire 620A is passed through the inside of the front frame part 610A1 of the first reinforcing frame 610A and the tip end thereof is connected to the left front pillar connecting part 3f such that the wire 620A is in a tensile state. The second wire 620B is passed through the inside of the rear frame part 610B2 of the second reinforcing frame 610B and the tip end thereof is connected to the left center pillar connecting part 3g such that the wire 620B is in a tensile state. The third wire 620C is passed through the inside of the front frame part 610B1 of the second reinforcing frame 610B and the tip end thereof is connected to the right front pillar connecting part 3f such that the wire 620C is in a tensile state. The fourth wire 620D is passed through the inside of the rear frame part 610A2 of the first reinforcing frame 610A and the tip end thereof is connected to the right center pillar connecting part 3g such that the wire 620D is in a tensile state.

Figure 68:
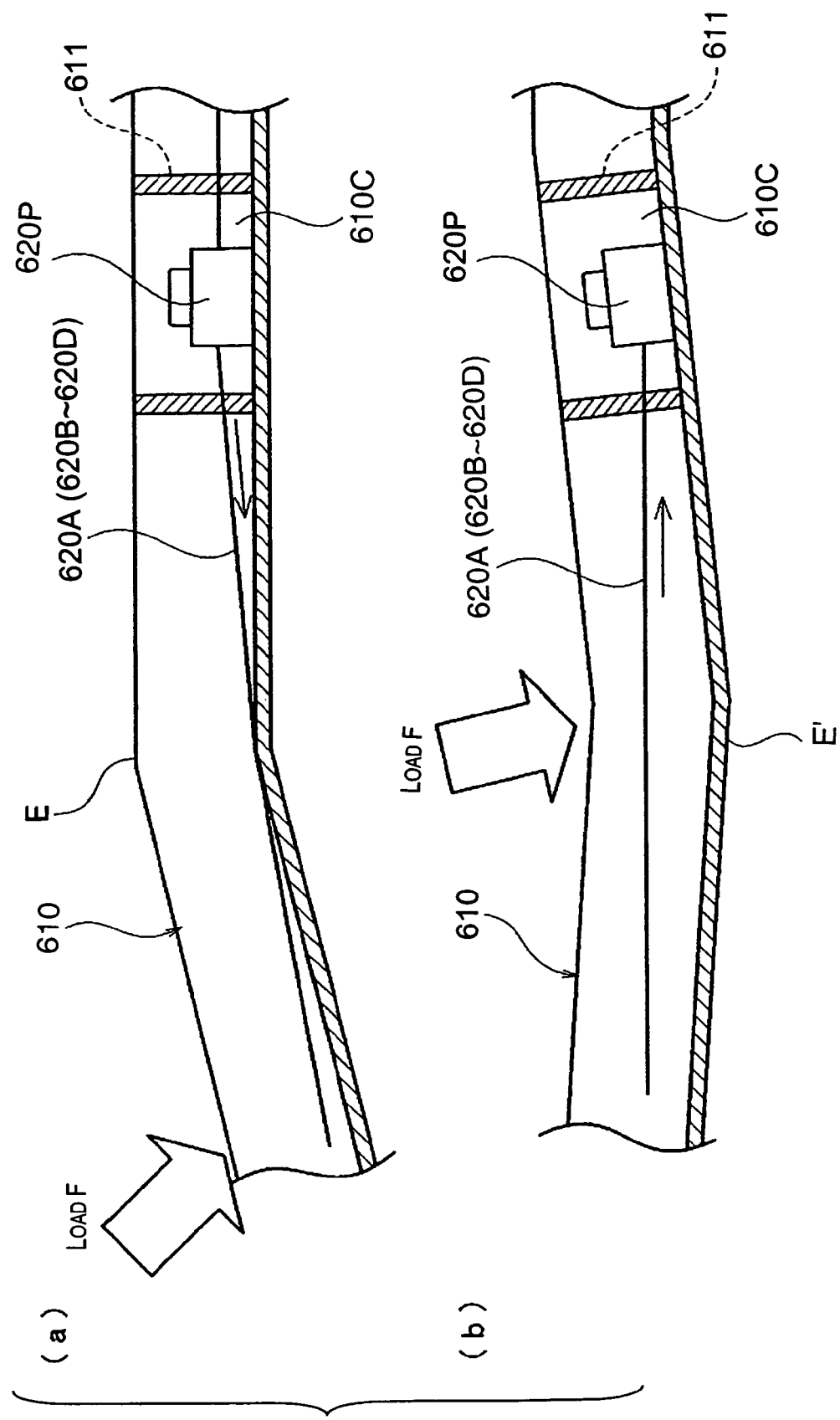
FIG. 68 is a pair of diagrams (a) and (b) in partial cross sectional views of the reinforcing member with the deformation detecting device illustrating operating states of the deformation detecting device in accordance with the eleventh embodiment of the present invention.

FIG. 68 is a pair of diagrams (a) and (b) in partial cross sectional views of the reinforcing member 610 with the potentiometer 620P being illustrated in two different operating states of the potentiometer 620P in accordance with the eleventh embodiment of the present invention. When a load F acts on an end of the reinforcing member 610 opposite the intersection joint section 610C, while the potentiometer 620P is mounted in the reinforcing member 610 (first and second reinforcing frames 610A and 610B) and when the reinforcing frame 610 deforms as shown in the diagram (a) of FIG. 68, the deformation of the reinforcing frame 610 causes an upward pointing fold E to be formed, thereby causing the wire 620A to 620D to be pulled outward from the potentiometer 620P. As a result, the potentiometer 620P generates a positive voltage.

Meanwhile, when a load F acts on a middle portion of the reinforcing frame 610 between an end thereof and the intersection joint section 610C and the reinforcing frame 610 deforms as shown in the diagram (b) of FIG. 68, the deformation of the reinforcing frame 610 causes an downward pointing fold E' to be formed, thereby causing the wire 620A to 620D to be drawn back into the potentiometer 620P. As a result, the potentiometer 620P generates a negative voltage. Thus, the potentiometer 620P can convert the deformation of the reinforcing member 610 into an electric signal and convert the deformation mode into the sign (plus or minus) of the electric signal.

Figure 69:
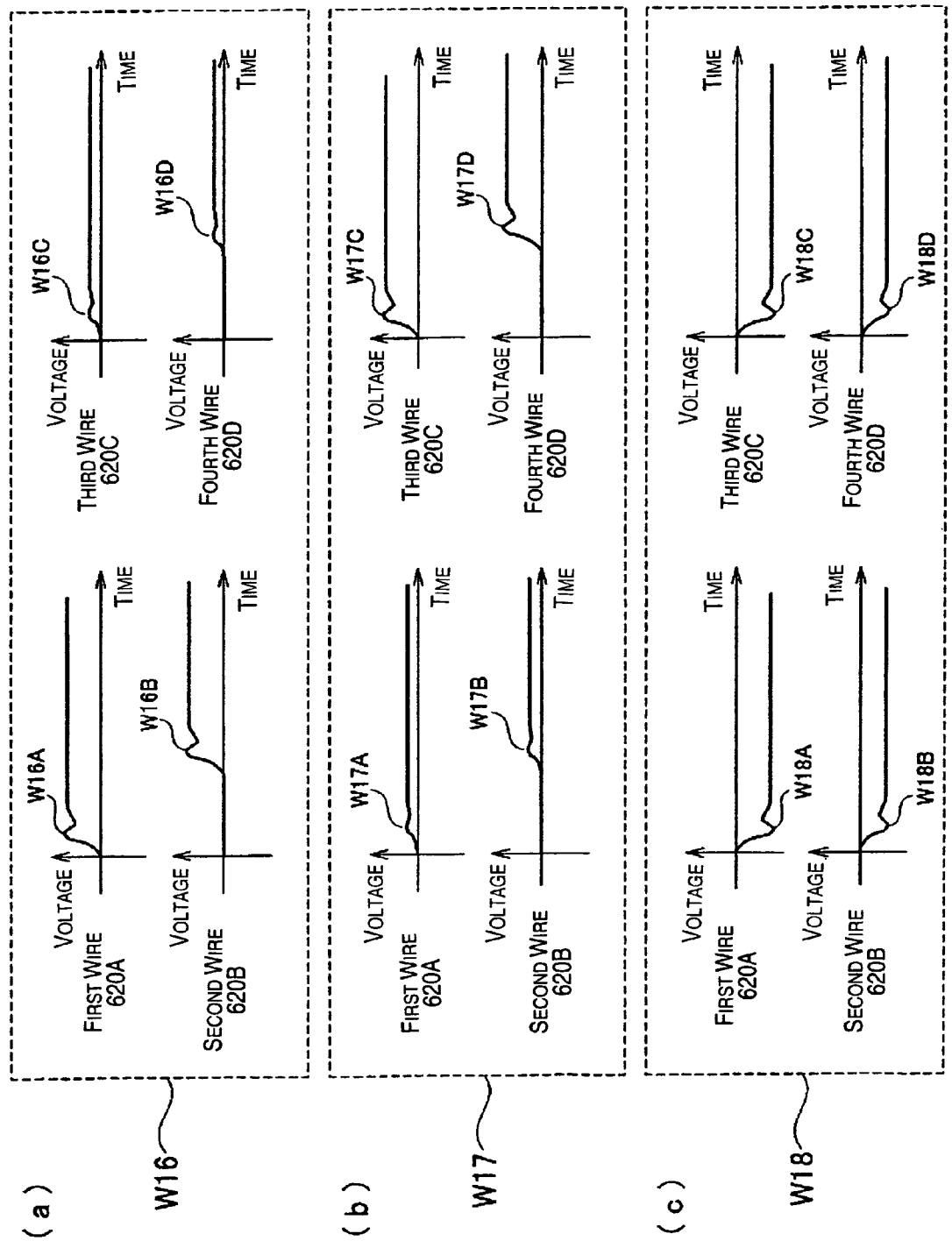
FIG. 69 is a series of diagrams (a) to (c) illustrating voltage waveforms issued from the deformation detecting device of the vehicle passenger restraining system in a case where the vehicle rolls over and makes initial contact with the ground on the left side of the roof (diagram (a)), in a case where the vehicle rolls over and makes initial contact on the right side of the roof (diagram (b)), and in a case where the vehicle rolls over and makes initial contact on the approximate center of the roof (diagram (c)) in accordance with the eleventh embodiment of the present invention.
Figure 70:
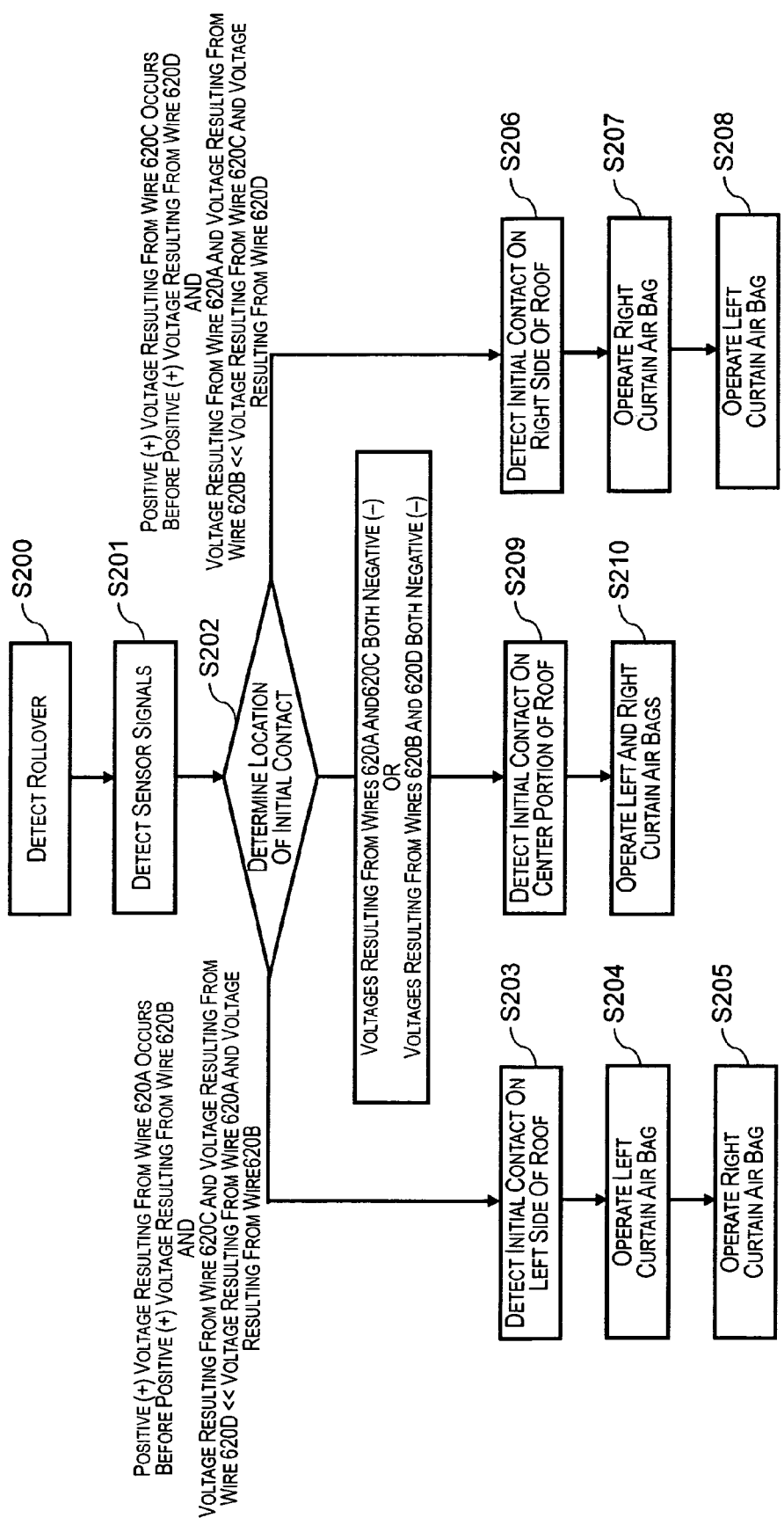
FIG. 70 is a flowchart illustrating a control algorithm for controlling from detection of a rollover event to operation of the passenger restraining devices executed in the vehicle passenger restraining system in accordance with the eleventh embodiment of the present invention.

FIG. 69 shows the detection signals obtained by the first to fourth wires 620A to 620D of the potentiometer 620P in three different cases in which the vehicle M rolls over such that the roof R contacts the ground, the contact location being different in each case.

The diagram (a) of FIG. 69 shows the voltage waveforms W16 issued from potentiometer 620P due to the movement of the first to fourth wires 620A to 620D in a first case in which the vehicle M rolls over and makes initial contact with the ground on the left side of the roof R. As shown in the diagram (a) of FIG. 69, the voltage W16A produced due to the first wire 620A occurs earlier than the voltage W16B produced due to the second wire 620B. Meanwhile, the voltage W16C produced due to the third wire 620C and the voltage W16D produced due to the fourth wire 620D are both significantly smaller than the voltage W16A produced due to the first wire 620A and the voltage W16B produced due to the second wire 620B.

The diagram (b) of FIG. 69 shows the voltage waveforms W17 issued from potentiometer 620P due to the movement of the first to fourth wires 620A to 620D in a second case in which the vehicle M rolls over and makes initial contact with the ground on the right side of the roof R. As shown in the diagram (b) of FIG. 69, the voltage W17C produced due to the third wire 620C occurs earlier than the voltage W17D produced due to the fourth wire 620D. Meanwhile, the voltage W17A produced due to the first wire 620A and the voltage W17B produced due to the second wire 620B are both significantly smaller than the voltage W17C produced due to the third wire 620C and the voltage W17D produced due to the fourth wire 620D.

The diagram (c) of FIG. 69 shows the voltage waveforms W18 issued from the potentiometer 620P due to the movement of the first to fourth wires 620A to 620D in a third case in which the vehicle M rolls over and makes initial contact with the ground on a central portion of the roof R. As shown in the diagram (c) of FIG. 69, the voltage W18A produced due to the first wire 620A and the voltage W18C produced due to the third wire 620C occur substantially simultaneously and are negative. Meanwhile, the voltage W18B produced due to the second wire 620B and the voltage W18D produced due to the fourth wire 620D are also negative and occur substantially simultaneously, but are smaller in magnitude than the voltages W18A and W18C.

Thus, in the eleventh embodiment too, by reading the voltage signal waveforms outputted from the potentiometer 620P due to the movement of the first to fourth wires 620A to 620D, it is possible to detect the portion (location) of the roof R that makes the initial contact with the ground during a rollover event. Then, the controller 630 is configured to select one or both of the left and right curtain air bags 1A and 1B (i.e., a specific curtain air bag or air bags among a plurality of the curtain air bags 1A and 1B) to be initially operated/deployed by following the control algorithm shown in FIG. 69.

More specifically, in step S200 of the control algorithm of FIG. 69, the rollover detecting sensor 31 is configured to detect a rollover situation. When the roof R contacts the ground, in step S201, voltage signals are outputted from the potentiometer 620P in response to the distance change detected due to the movement of the first to fourth wires 620A to 620D.

In step S202, the controller 630 is configured to receive the signals from the first to fourth wires 620A to 620D. If the positive voltage W16A produced due to the first wire 620A occurs earlier than the positive voltage W16B produced due to the second wire 620B and the positive voltages W16C, W16D produced due to the second and fourth wires 620C, 620D are both significantly smaller than the voltages W16A, W16B produced due to the first and second wires 620A, 620B, then the controller 630 is configured to determine in step S203 that the initial contact occurred on the left side of the roof R and to proceed to step S204 where the controller 630 is configured to operate/deploy the left curtain air bag 1A first. Then, in step S205, the controller 630 is configured to operate/deploy the right curtain air bag 1B after waiting for a prescribed amount of time.

Meanwhile, in step S202, if the positive voltage W17C produced due to the third wire 620C occurs earlier than the position voltage W17D produced due to the fourth wire 620D and the voltages W17A, W17B produced due to the first and second wires 620A, 620B are both significantly smaller than the voltages W17C, W17D produced due to the third and fourth wires 620C, 620D, then the controller 630 is configured to determine in step S206 that the initial contact occurred on the right side of the roof R and to proceed to step S207 where the controller 630 is configured to operate/deploy the right curtain air bag 1B first. Then, in step S208, the controller 630 is configured to operate/deploy the left curtain air bag 1A after waiting for a prescribed amount of time.

In step S202, if the voltage W18A produced due to the first wire 620A and the voltage W18C produced due to the third wire 620C are both negative or the voltage W18B produced due to the second wire 620B and the voltage W18D produced due to the fourth wire 620D are both negative, then the controller 630 is configured to determine in step S209 that the initial contact occurred at the center portion of the roof and to proceed to step S210 where the controller 30 is configured to operate/deploy the left curtain air bag 1A and the right curtain air bag 1B simultaneously.

Thus, with the constituent features described above, the vehicle passenger restraining system in accordance with the eleventh embodiment offers substantially the same operational effects as the sixth embodiment. More specifically, a potentiometer 620P is arranged and configured to detect the deformation of the reinforcing frame 610 that occurs when the vehicle M rolls over and the roof R contacts the ground, the deformation corresponding to the location on the roof R that makes contact with the ground. As a result, the controller 630 can detect the actual location on the roof R where the roof R contacts the ground in a rollover situation in a precise manner.

Based on the detected deformation location on the roof R, the controller 630 can operate specific passenger restraining devices (i.e. either the left curtain air bag 1A or the right curtain air bag 1B). As a result, the curtain air bag 1A or 1B that properly corresponds to the impact location can be operated earlier during a rollover event and the passenger restraining effect can be increased.

With the eleventh embodiment, the potentiometer 620P configured and arranged to detect a change in distance between two points can be used as the sensor for detecting the deformation of the reinforcing member 610 because an easily deformable section 617 is provided in an approximate lengthwise middle portion of each of the first and second front frame parts 610A1 and 610B1 and the first and second rear frame parts 610A2 and 610B of the first and second reinforcing frames 610A and 610B, thereby causing the middle portions of the front frame parts 610A1 and 610B1 and rear frame parts 610A2 and 610B2 to deform more readily.

Consequently, the deformation mode can be identified based on the signals issued from the potentiometer 620P and the deformation mode can be used in addition to the distinctive characteristics of the sensor signals. As a result, the contact location can be determined accurately and, thus, the curtain air bags 1A and 1B can be operated with a more appropriate timing in accordance with the location of the initial contact with the ground, thereby further improving the passenger restraining effect.

In the eleventh embodiment too, the bending strength of the intersection joint section 610C is larger than the bending strength of the standalone portions of the first and second reinforcing frames 610A and 610B because the reinforcing rib 611 is provided. As a result, deformation can be produced more efficiently between the intersection joint section 610C and the front frame parts 610A1 and 610B1 and rear frame parts 610A2 and 610B2. Consequently, the potentiometer 620P can detect the deformation of the first and second reinforcing frames 610A and 610B with good sensitivity and, thus, can deliver accurate output signals.

Figure 71:
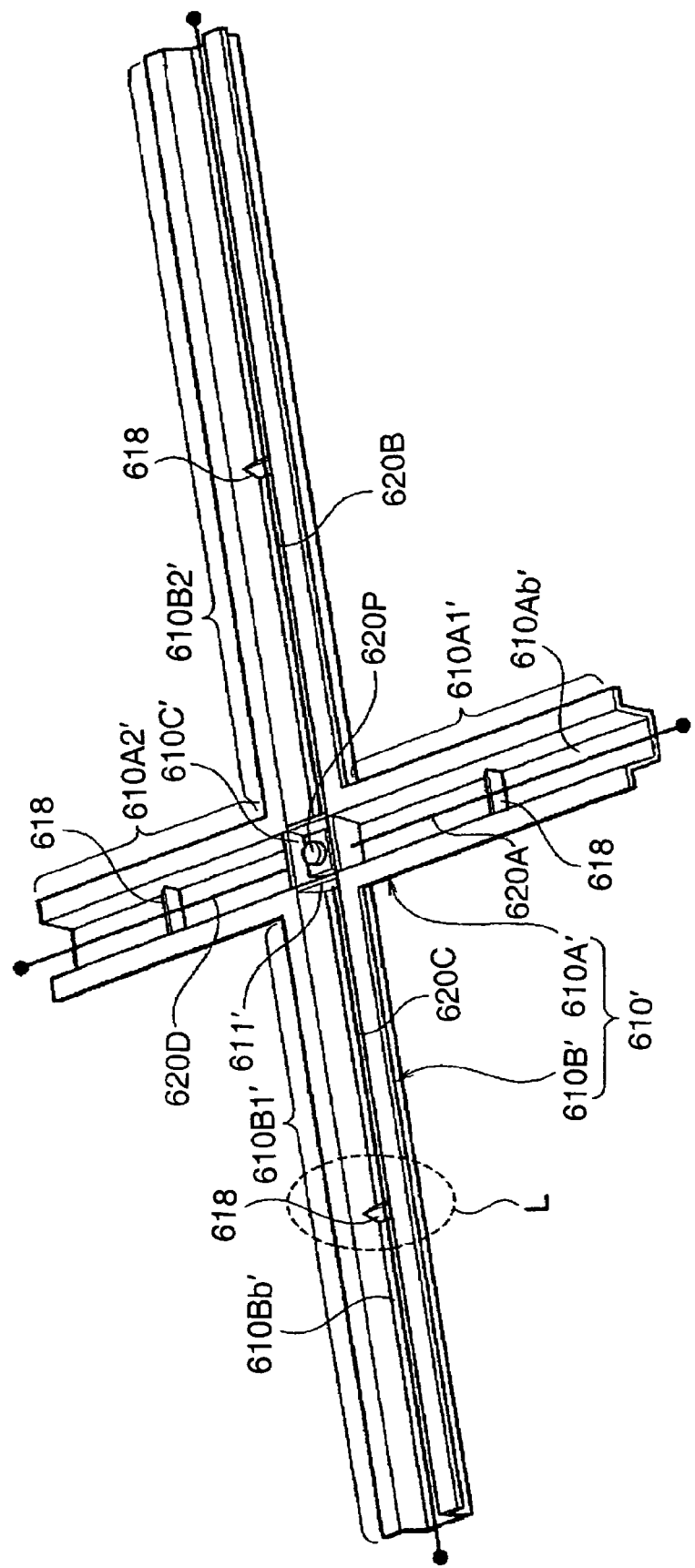
FIG. 71 is an enlarged, partial top perspective view of a reinforcing member of a vehicle passenger restraining system in accordance with a modified structure of the eleventh embodiment of the present invention.
Figure 72:
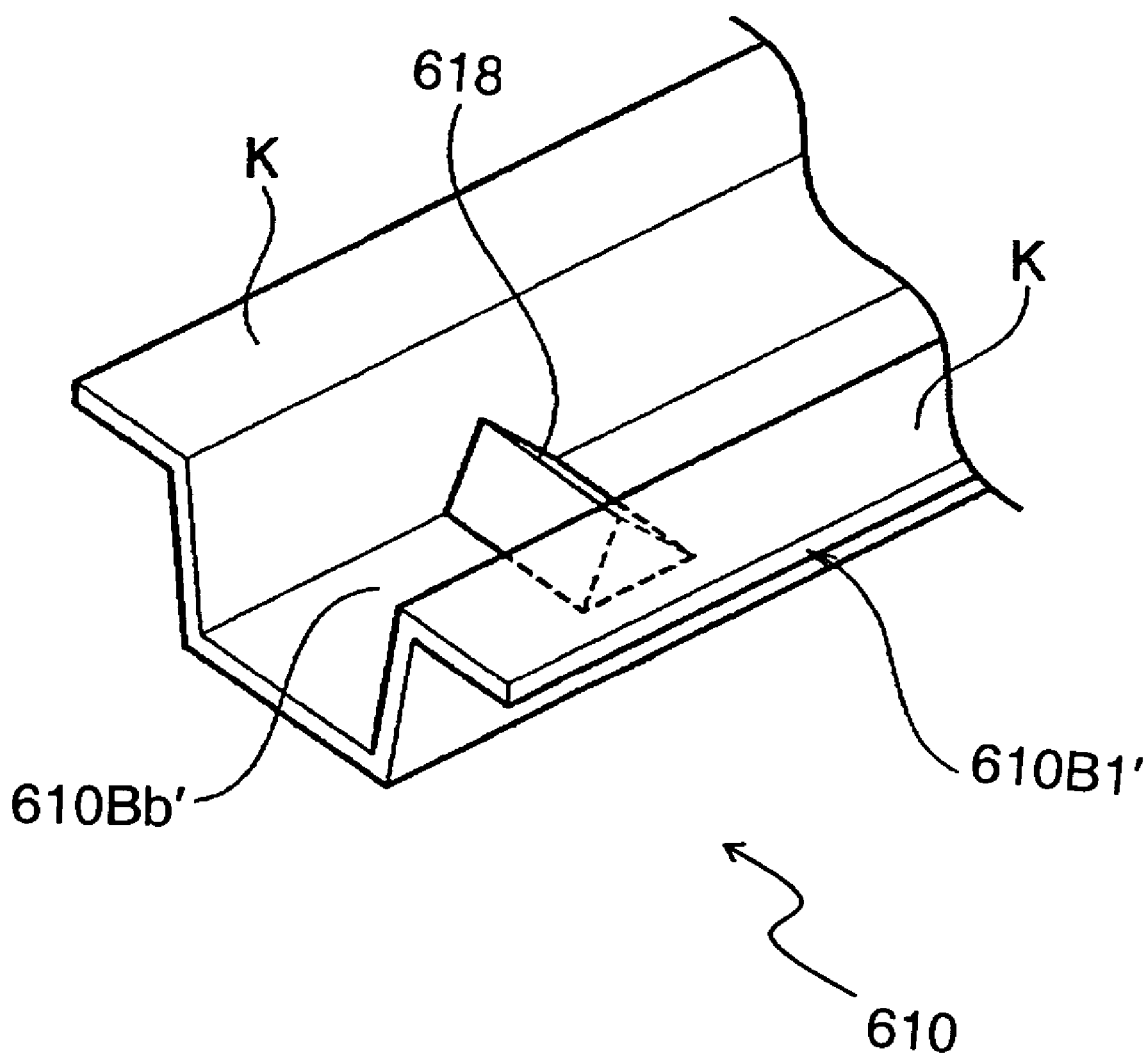
FIG. 72 is an enlarged, partial top perspective view of the reinforcing member of the vehicle passenger restraining system illustrating the encircled portion L of FIG. 71 in accordance with the modified structure of the eleventh embodiment of the present invention.

Alternatively, in the eleventh embodiment of the present invention, a modified reinforcing member 610' shown in FIGS. 71 and 72 can be used instead of the reinforcement member 610. FIG. 71 is an enlarged top perspective view of the reinforcing member 610', having first and second reinforcing frames 610A' and 610B' connected by an intersection joint section 610C' while FIG. 72 is a further enlarged top perspective view in the encircled portion L of FIG. 71. The intersection joint section 610C' has a reinforcing rib 611' surrounding the potentiometer 620P, similar to the reinforcing member 610. The modified reinforcing member 610' differs from the reinforcing member 610 in that a bead 618 is provided in each of the first and second front frame parts 610A1' and 610B1' and the first and second rear frame parts 610A2' and 610B1 to form the easily deformable sections. Thus, the modified reinforcing member 610' is the same as the reinforcing member 610, except as noted and/or illustrated.

As shown in FIG. 71, the beads 618 are formed in the bottom surfaces 610Ab' and 610Bb' of the first and second front frame parts 610A1' and 610B1' and the first and second rear frame parts 610A2' and 610B2' of the first and second reinforcing frames 610A' and 610B' and positioned at approximate lengthwise middle portions of each of the first and second front frame parts 610A1' and 610B1' and the first and second rear frame parts 610A2' and 610B2'.

The beads 618 are formed such that a portion of the bottom surface 610Ab' and 610Bb' of each of the first and second front frame parts 610A1' and 610B1' and the first and second rear frame parts 610A2' and 610B2' protrudes upward and spans widthwise across the respective one of the first and second frame parts 610A1' and 610B1' and the first and second rear frame parts 610A2' and 610B2'. When a load acts on the reinforcing member 610' due to a rollover impact, the bead 618 forms the fold E in the same manner as shown in FIG. 68. This modified reinforcing member 610' provides the same operational effects as the reinforcing member 610 of the eleventh embodiment.

Twelfth Embodiment

Referring now to FIGS. 73 to 78, a vehicle passenger restraining system in accordance with a twelfth embodiment will now be explained. In view of the similarity between the first and twelfth embodiments, the parts of the twelfth embodiment that are identical to the parts of the first embodiment will be given the same reference numerals as the parts of the first embodiment. Moreover, the descriptions of the parts of the twelfth embodiment that are identical to the parts of the first embodiment may be omitted for the sake of brevity.

Figure 73:
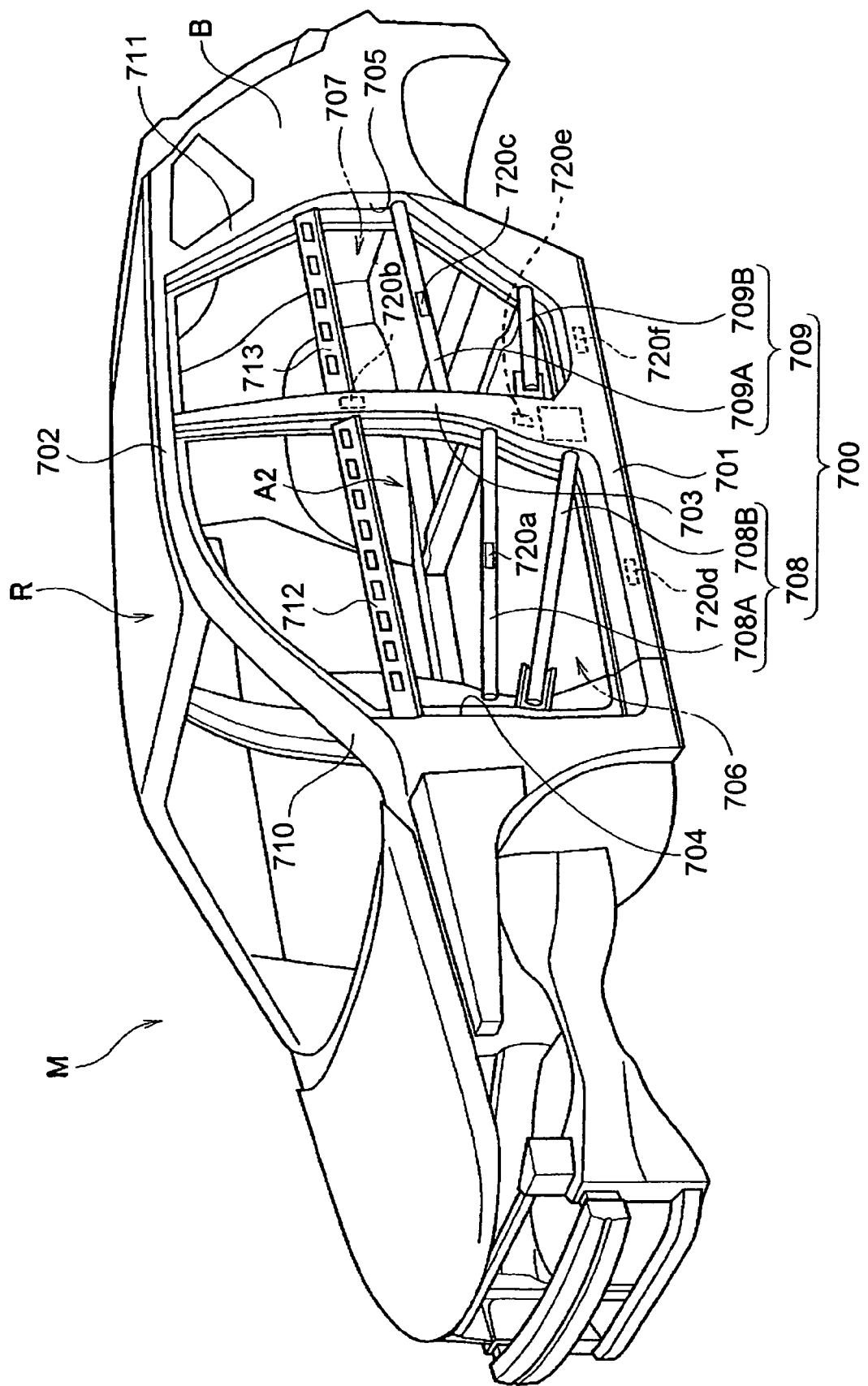
FIG. 73 is a front perspective view of a vehicle body illustrating a side structure thereof with a vehicle passenger restraining system in accordance with a twelfth embodiment of the present invention.

FIG. 73 is a front perspective view of a vehicle body illustrating a side structure thereof with a vehicle passenger restraining system in accordance with a twelfth embodiment of the present invention. In the vehicle passenger restraining system in the twelfth embodiment, a similar method utilized in the first embodiment to detect the impact location in a rollover event is applied to detect an impact location in a side collision of the vehicle M. Thus, in the twelfth embodiment of the present invention, the vehicle body is provided with a side reinforcing member 700 in an impact region A2 where the impact load of a side collision will be born as shown in FIG. 73. Moreover, first to a deformation sensor unit including first to sixth sensors 720a to 720f is provided in the side reinforcing member as deformation detecting device.

More specifically, as seen in FIG. 73, the side reinforcing member 700 comprises a side sill 701 (lower longitudinal member), a center pillar 703 (middle vertical member), and front and rear impact beams 708 and 709 (front and rear door internal members). The side sill 701 serves as a lower longitudinal member extending in the longitudinal direction of the vehicle M along a lower lateral side portion of the vehicle M. The center pillar 703 serves as a middle vertical member connecting an approximate longitudinal middle portion of the side sill 701 to an approximate longitudinal middle portion of a roof side rail 702, which serves as a vehicle upper end side edge. The front and rear impact beams 708 and 709 serve as front and rear door internal members. The front and rear impact beams 708 and 709 are coupled insides of a front door 706 and a rear door 707, respectively, with being spanning therethrough in the longitudinal direction of the vehicle M. The front and rear doors 706 and 707 are configured to coupled to a front opening 704 and a rear opening 705, respectively, existing in a lateral side of the vehicle M in a selectively openable and closable manner.

More specifically, in the side structure of the vehicle body B, a front pillar 710 and a rear pillar 711 are provided to the front and rear of the center pillar 703, each having a prescribed spacing with respect to the center pillar 703 as shown in FIG. 73. The front opening 704 comprises an area surrounded by the front pillar 710, the center pillar 703, the side sill 701, and the roof side rail 702 and the front door 706 is mounted in the front opening 704 such that the front door 706 can open and close freely. The rear opening 705 comprises an area surrounded by the center pillar 710, the rear pillar 711, the side sill 701, and the roof side rail 702 and the rear door 707 is mounted in the rear opening 705 such that the rear door 707 can open and close freely.

A front frame 712 is provided inside the front door 706 and arranged generally along a straight line joining the approximate vertical middle portions of the front pillar 710 and the center pillar 703 when the front door 706 is closed. A rear frame 713 is provided inside the rear door 707 and arranged generally along a straight line joining the approximate vertical middle portions of the center pillar 703 and the rear pillar 711 when the rear door 707 is closed.

The front impact beam 708 comprises an upper impact beam 708A and a lower impact beam 708B and both of the upper and lower impact beams 708A and 708B are arranged generally along the longitudinal direction of the vehicle M between the lower edge of the inside of the front door 706 and the front frame 712. Similarly, the rear impact beam 709 comprises an upper impact beam 709A and a lower impact beam 709B with both of the upper and lower impact beams 709A and 709B being arranged generally along the longitudinal direction of the vehicle between the lower edge of the inside of the front door 707 and the rear frame 713.

The structure of the right side of the vehicle body B is the same as the structure of the left side just described except that the structure of the right side of the vehicle body B is a mirror image of the structure of the left side of the vehicle body B.

Figure 74:
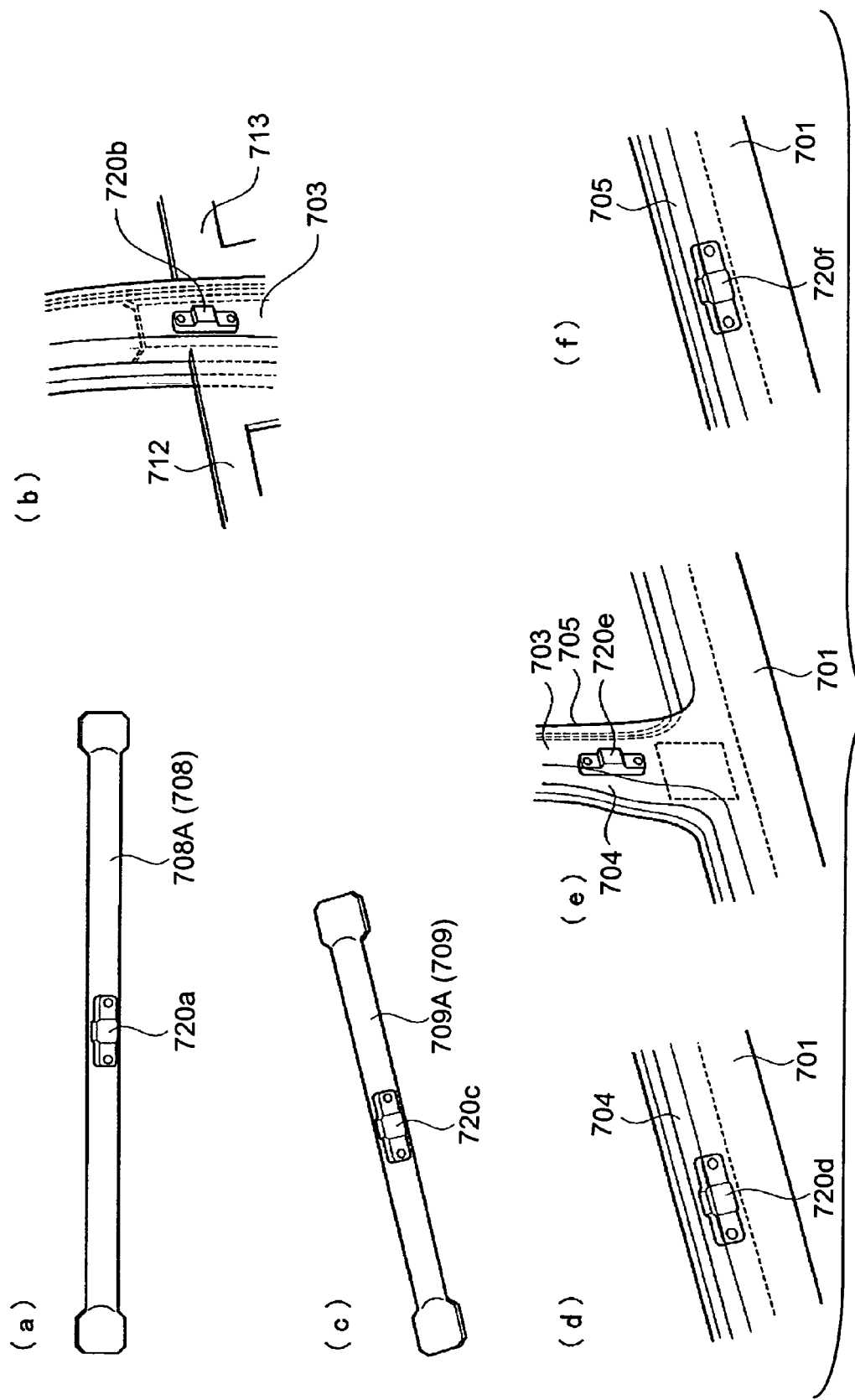
FIG. 74 is a series of diagrams (a) to (f) of perspective views of various parts of the side structure of the vehicle body shown in FIG. 73 illustrating locations where detecting sections of a deformation detecting device are mounted in accordance with the twelfth embodiment of the present invention.

FIG. 74 is a series of diagrams (a) to (f) in perspective views of various parts of the side reinforcing member 700 of the vehicle body B shown in FIG. 73 illustrating locations where the first to sixth sensors 720a to 720f are mounted in accordance with the twelfth embodiment of the present invention. The first sensor 720a is mounted to an approximate longitudinal middle portion of the upper impact beam 708A of the front impact beam 708, as shown in the diagram (a) of FIG. 74. The second sensor 720b is mounted to an approximate vertical middle of the inside of the center pillar 703, as shown in the diagram (b) of FIG. 74. The third sensor 720c is mounted to an approximate longitudinal middle portion of the upper impact beam 709A of the rear impact beam 709 as shown in the diagram (c) of FIG. 74. The fourth sensor 720d is mounted inside an approximate longitudinal middle portion of the front half of the side sill 701, as shown in the diagram (d) of FIG. 74. The fifth sensor 720e is mounted inside a lower portion of the center pillar 703, as shown in the diagram (e) of FIG. 74. The sixth sensor 720f is mounted inside an approximate longitudinal middle portion of the rear half of the side sill 701, as shown in the diagram (f) of FIG. 74.

Figure 75:
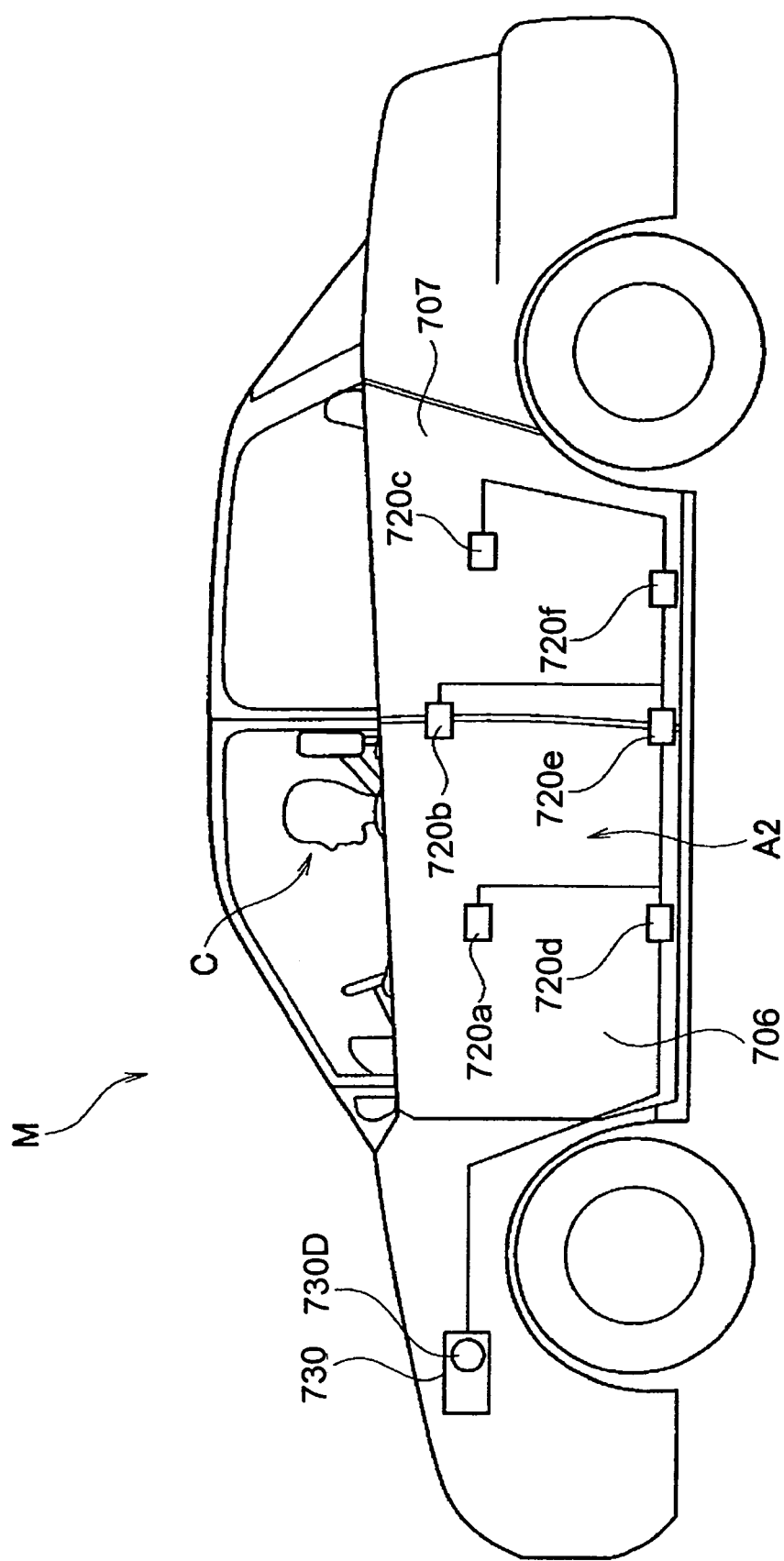
FIG. 75 is a schematic side elevational view of the vehicle illustrating a positional arrangement of the detecting sections of the deformation detecting device with respect to a side reinforcing member in accordance with the twelfth embodiment of the present invention.

FIG. 75 is a schematic side elevational view of the vehicle illustrating a positional arrangement of the first to sixth sensors 720a to 720f of the deformation sensor unit in accordance with the twelfth embodiment of the present invention. As shown in FIG. 75, the first to sixth sensor 720a to 720f are arranged in the impact region A2 on a portion of the side of the vehicle body corresponding to the space occupied by a passenger (in the case of FIG. 75, the passenger C). The first to sixth sensors 720a to 720f are arranged in two levels in the vertical direction (i.e., an upper level and a lower level) with three sensors (the first to third sensors 720a to 720c and the fourth to sixth sensors 720d to 720f) arranged along the longitudinal direction at each level. Another set of the first to sixth sensors 720a to 720f is arranged in the same manner on the other side (right side) of the vehicle M such that symmetrical arrangements of sensors 720a to 720f are provided on both sides of the vehicle M.

Figure 76:
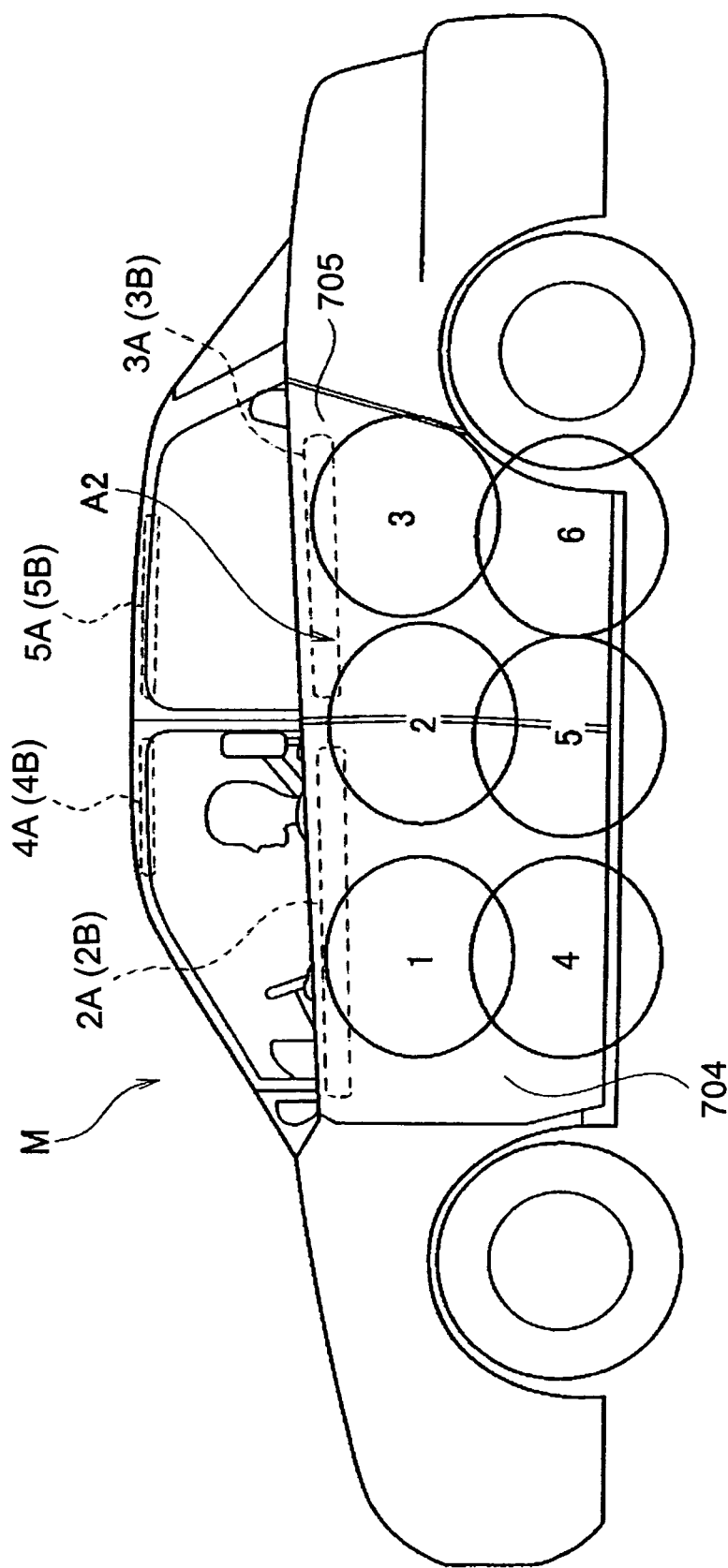
FIG. 76 is a schematic side elevational view of the vehicle illustrating regions 1 to 6 corresponding to side collision impact locations in accordance with the twelfth embodiment of the present invention.

As shown in FIG. 76, a prescribed area corresponding to the location where the first sensor unit 720a is arranged is called "Region 1", a prescribed area corresponding to the location where the second sensor 720b is arranged is called "Region 2", a prescribed area corresponding to the location where the third sensor 720c is arranged is called "Region 3", a prescribed area corresponding to the location where the fourth sensor 720d is arranged is called "Region 4", a prescribed area corresponding to the location where the fifth sensor 720e is arranged is called "Region 5", a prescribed area corresponding to the location where the sixth sensor 720f is arranged is called "Region 6".

Similarly to the sensors of the previous embodiments, the first to sixth sensors 720a to 720f of this embodiment are configured as stress/strain sensors that detect the change in stress/strain resulting from deformation of the side reinforcing member 700. More specifically, the sensors 720a to 720f are configured to output a voltage value resulting from changes in a magnetic field.

As seen in FIG. 76, in the twelfth embodiment, the vehicle M is provided with a plurality of passenger restraining devices including left and right front side air bags 2A and 2B for restraining the side of a passenger sitting in the front seat, left and right rear side air bags 3A and 3B for restraining the side of a passenger sitting in the back seat, left and right front head restraining air bags 4A and 4B for restraining the head of a passenger sitting in the front seat, and left and right rear head restraining air bags 5A and 5B for restraining the head of a passenger sitting in the back seat.

When the vehicle body B experiences a side collision and the impact region A2 undergoes a localized deformation, the deformation is detected by the first to sixth sensors 720a to 720f and voltage signals are outputted therefrom. In order to process the output voltage signals, the vehicle M is provided with a controller 730 that is configured to determine a location on the vehicle M where a collision impact occurred using an internal reference database 730D (shown in FIG. 75), and the controller 730 is configured to process the output signals in accordance with a prescribed algorithm. The controller 730 serves as a passenger restraining device operating unit configured to operate at least one of the air bags among the plurality of air bags in accordance with the location where a collision impact occurred.

The controller 730 is configure to process the output signals from the first to sixth sensors 720a to 720f with for example, the covariance function, and compare the processed signal waveforms in the reference database 730D stored in the controller 730 to detect such impact information as the impact location for the purpose of identifying specific air bags and the impact acceleration, impact velocity, and impact load input angles (angle of load input at impact location) for the purpose of controlling the operation of the passenger restraining devices.

Figure 77A:
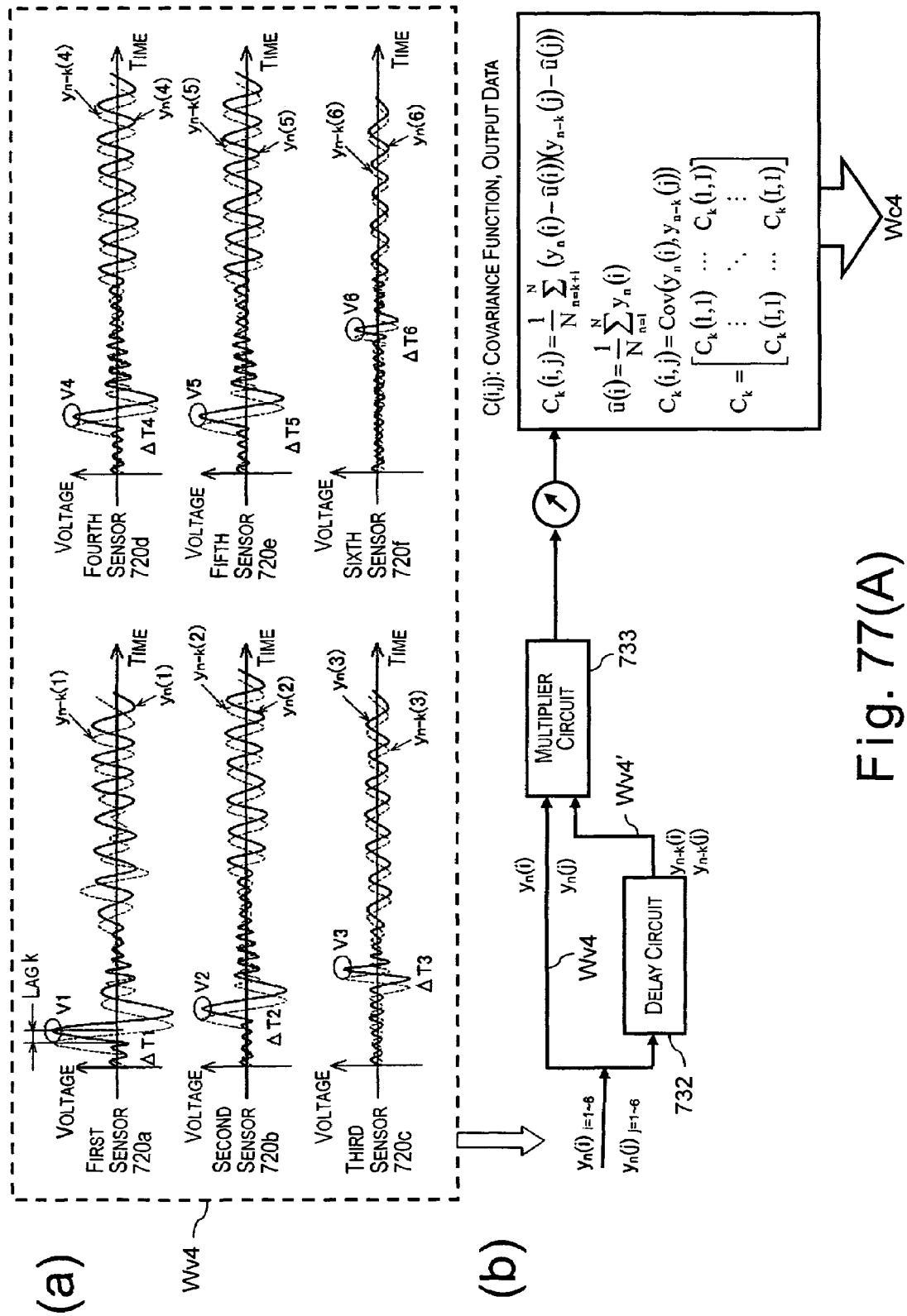
FIG. 77(A) is a pair of diagrams (a) and (b) illustrating voltage waveforms issued from the deformation detecting device in a case where the vehicle undergoes a side collision (diagram (a)) and a flow of computations used to process the voltage waveforms shown in the diagram (a) with a covariance function (diagram (b)) in accordance with the twelfth embodiment of the present invention.
Figure 77B:
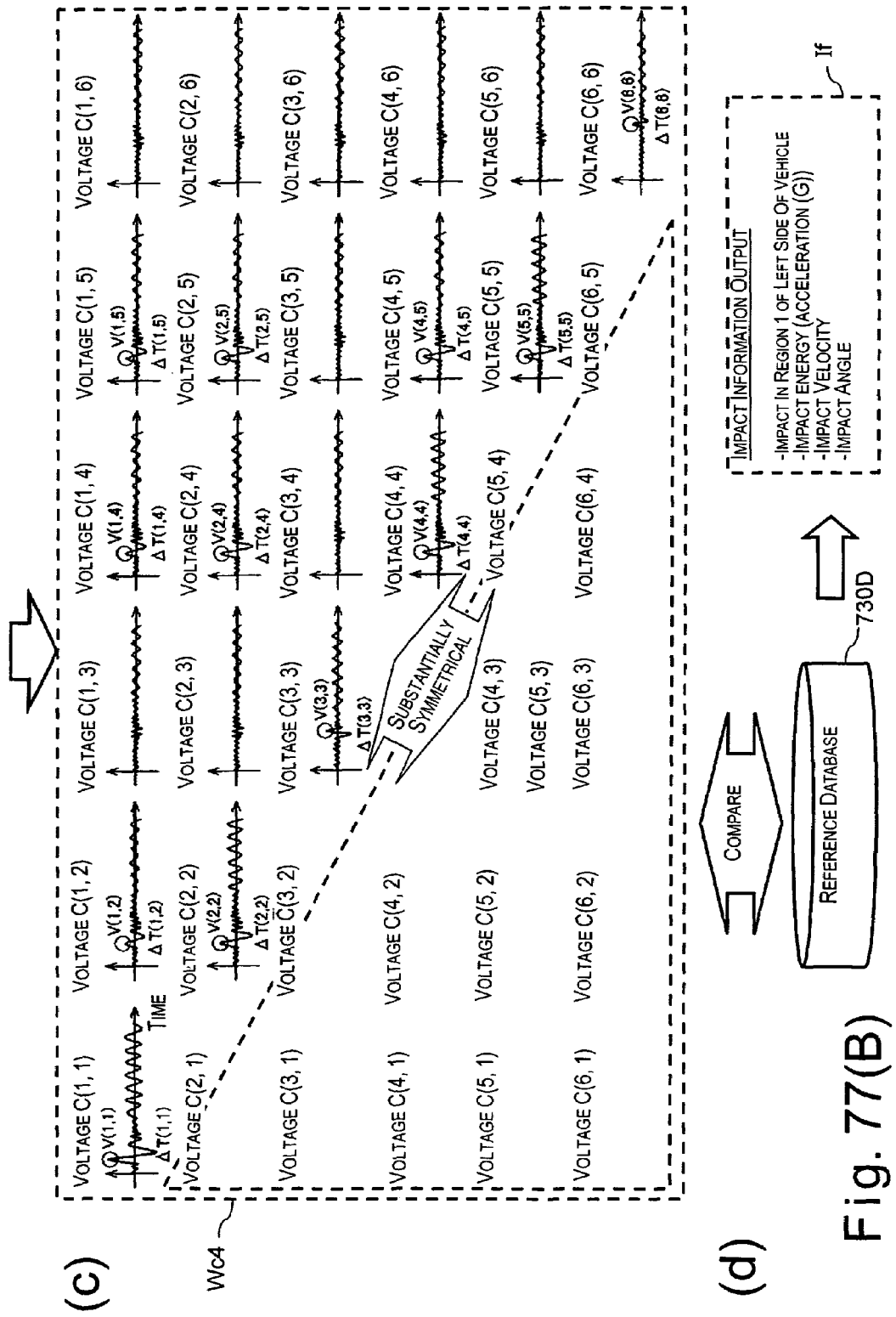
FIG. 77(B) is a pair of diagrams (c) and (d) illustrating signal waveforms that result when the voltage waveforms shown in the diagram (a) of FIG. 77(A) are processed with the covariance function shown in the diagram (b) of FIG. 77(A) (diagram (c)), and database used to obtain impact information based on the signal waveforms shown in the diagram (c) obtained from the covariance function processing shown in the diagram (b)(diagram (d)) in accordance with the twelfth embodiment of the present invention.

For example, FIGS. 77(A) and 77(B) illustrate a case in which the vehicle body B undergoes a side collision in the vicinity of Region 1 on the left or right side of the vehicle M (the processing is the same on either left or right side). The diagram (a) of FIG. 77(A) shows signal waveforms Wv4 outputted from the first to sixth sensors 720a to 720f in a case in which the impact occurs in the impact region A2. The signal of the first sensor unit 720a has a peak voltage V1 at a time ΔT1. The signal of the second sensor 720b has a peak voltage V2 at a time ΔT2. The signal of the third sensor 720c has a peak voltage V3 at a time ΔT3. The signal of the fourth sensor 720d has a peak voltage V4 at a time ΔT4. The signal of the fifth sensor 720e has a peak voltage V5 at a time ΔT5. The signal of the sixth sensor 720f has a peak voltage V6 at a time ΔT6.

As shown in the diagram (b) of FIG. 77(A), the signal waveforms Wv4 are fed into a delay circuit 732 and the resulting signal waveforms Wv4'(y(n−κ)), which have been delayed by a lag time κ, are multiplied by the original signal waveforms Wv4 (y(n)) using a multiplier circuit 733. The resulting products are used to obtain signal waveforms Wc4 that are given by a covariance function C(i, j).

As shown in the diagram (c) of FIG. 77, in addition to the signal waveforms C(1, 1), C(2, 2), C(3, 3), C(4, 4), C(5, 5), and C(6, 6) that result from processing the signals from the first to sixth sensors 720a to 720f with the covariance function, the signal waveforms Wc4 also include the signal waveforms C(1, 2) to C(1, 6), C(2, 1), C(2, 3) to C(2, 6), C(3, 1), C(3, 2), C(3, 4) to C(3, 6), C(4, 1) to C(4, 3), C(4, 5), C(4, 6), C(5, 1) to C(5, 4), C(5, 6), and C(6, 1) to C(6, 5), which express the mutual relationships of the output signals of the sensors 720a to 720f as signal waveforms that have been processed with the covariance function. The signal waveforms Wv4 are arranged in a matrix format as shown in the diagram (c) of FIG. 77(B).

Among the signal waveforms Wc4 obtained by processing with the covariance function, the processed signal waveform C(1, 1) of the first sensor unit 720a has a first peak voltage V(1, 1) at a time ΔT(1, 1). The processed signal waveform C(2, 2) of the second sensor 720b has a first peak voltage V(2, 2) at a time ΔT(2, 2). The processed signal waveform C(3, 3) of the third sensor 720c has a first peak voltage V(3, 3) at a time ΔT(3, 3), The processed signal waveform C(4, 4) of the fourth sensor 720d has a first peak voltage V(4, 4) at a time ΔT(4, 4); the processed signal waveform C(5, 5) of the fifth sensor 720e has a first peak voltage V(5, 5) at a time ΔT(5, 5). The processed signal waveform C(6, 6) of the sixth sensor 720f has a first peak voltage V(6, 6) at a time ΔT(6, 6).

Meanwhile, among the other signal waveforms, the signal waveform C(1, 2) has a peak voltage V(1, 2) at a time ΔT(1, 2), the signal waveform C(1, 4) has a peak voltage V(1, 4) at a time ΔT(1, 4), the signal waveform C(1, 5) has a peak voltage V(1, 5) at a time ΔT(1, 5), the signal waveform C(2, 4) has a peak voltage V(2, 4) at a time ΔT(2, 4), the signal waveform C(2, 5) has a peak voltage V(2, 5) at a time ΔT(2, 5), and the signal waveform C(4, 5) has a peak voltage V(4, 5) at a time ΔT(4, 5). The signal waveforms C(1, 3), C(2, 3), C(3, 4), C(3, 5), and C(1, 6) to C(5, 6) do not have a peak.

The following signal waveforms are substantially symmetrical with each other: C(2, 1) and C(1, 2), C(3, 1) and C(1, 3), C(3, 2) and C(2, 3), C(4, 1) and C(1, 4), C(4, 2) and C(2, 4), C(4, 3) and C(3, 4), C(5, 1) and C(1, 5), C(5, 2) and C(2, 5), C(5, 3) and C(3, 5), C(5, 4) and C(4, 5), C(6, 1) and C(1, 6), C(6, 2) and C(2, 6), C(6, 3) and C(3, 6), C(6, 4) and C(4, 6), C(6, 5) and C(5, 6).

As shown in the diagram (d) of FIG. 77, the covariance function processed waveforms Wc4 are compared to the pre-stored reference database 730D to output impact information If. Then, based on the impact information If, the controller 730 is configured to determine that a collision impact occurred in Region 1 of the impact region A2 of the left side of the vehicle M and obtains the energy (acceleration) of the side impact. The controller 730 is also configured to integrate the energy (acceleration) with respect to time in order to obtain the velocity of the side impact. The controller 730 is also configured to obtain the input angle of the impact.

Figure 78:
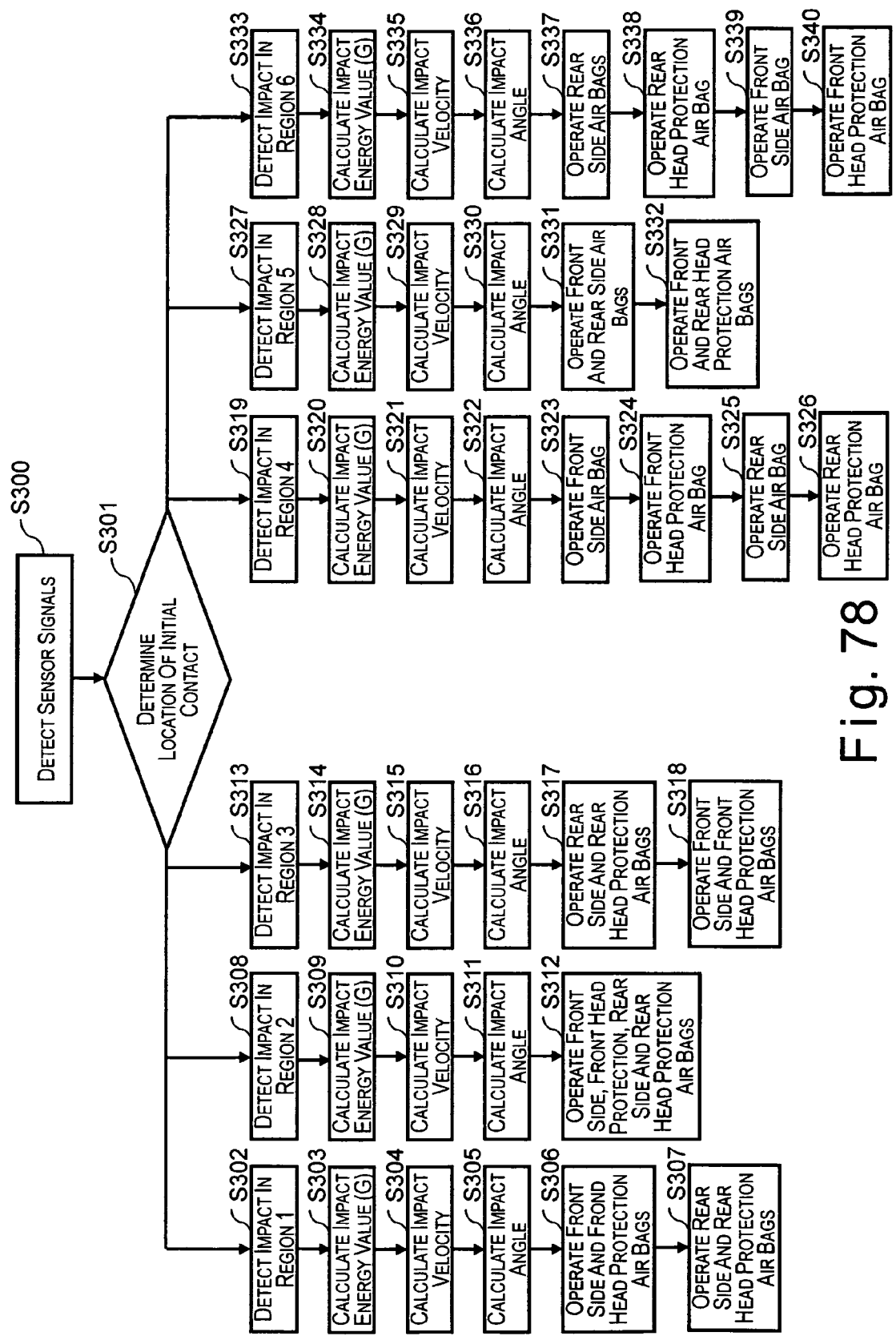
FIG. 78 is a flowchart illustrating a control algorithm for controlling from detection of a side collision to operation of the passenger restraining devices executed in the vehicle passenger restraining system in accordance with the twelfth embodiment of the present invention.

Thus, by reading the voltage signal waveforms Wv4 outputted from the first to sixth sensors 720a to 720f and obtaining the impact information If from the covariance function processed signal waveforms Wc4, the vehicle passenger restraining system can detect the location (one of Regions 1 to 6) on the side of the vehicle M where a side collision impact occurred. In the twelfth embodiment of the present invention, the vehicle passenger restraining system can then selectively operate/deploy a specific air bag or air bags among the front side air bags 2A and 2B, the rear side air bags 3A and 3B, the front head restraining air bags 4A and 4B, and the rear head restraining air bags 5A and 5B in accordance with the impact location by following the control algorithm shown in FIG. 78. FIG. 78 is a flowchart illustrating the control algorithm for controlling from detection of a side collision to operation of the passenger restraining devices executed in the vehicle passenger restraining system in accordance with the twelfth embodiment of the present invention.

More specifically, when a side collision occurs, in step S300 of the control algorithm of FIG. 78, the controller 730 is configured to detect signals from the first to sixth sensors 720a to 720f and to obtain the impact information If. In step S301, the controller 730 is configured to determine the impact location (one of Regions 1 to 6). If the controller 730 determines in step S301 that the impact occurred in Region 1 (see FIG. 76) of the side of the vehicle M, the controller 730 is configured to proceed to step S302, and then to step S303 where the controller 730 is configured to determine the impact energy (acceleration G) based on the information in the reference database 730D. Then, in step S304, the controller 730 is configured to determine the impact velocity based on the information in the reference database 730D, and in step S305, the controller is configured to determine the input angle of the impact based on the information in the reference database 730D. Then, in step S306, the controller 730 is configured to operate the front side air bag 2A and the front head restraining air bag 4A simultaneously in accordance with the impact energy, impact velocity, and impact angle. The controller 730 is then configured to proceed to step S307 where the controller 730 is configured to operate/deploy the rear side air bag 3A and the rear head restraining air bag 5A simultaneously after waiting for a prescribed amount of time.

Meanwhile, if the controller 730 determines in step S301 that the impact occurred in Region 2 (see FIG. 76) of the side of the vehicle M, the controller 730 is configured to proceed to step S308, and then to step S309 where the controller 730 is configured to determine the impact energy (acceleration G) based on the information in the reference database 730D. Then, the controller 730 is configured to proceed to step S310 where the controller 730 is configured to determine the impact velocity based on the information in the reference database 730D, and in step S311, the controller 730 is configured to determine the input angle of the impact based on the information in the reference database 730D. Then, in step S312, the controller 730 is configured to operate the front side air bag 2A, the front head restraining air bag 4A, the rear side air bag 3A, and the rear head restraining air bag 5A simultaneously in accordance with the impact energy, impact velocity, and impact angle.

In step S301, if the controller 730 determines that the impact occurred in Region 3 (see FIG. 76) of the side of the vehicle M, the controller 730 is configured to proceed to step S313, and then to step S314, where the controller 730 is configured to determine the impact energy (acceleration G) based on the information in the reference database 730D. Then, in step S315, the controller 730 is configured to determine the impact velocity based on the information in the reference database 730D, and in step S316, the controller 730 is configured to determine the input angle of the impact based on the information in the reference database 730D. Then, in step S317, the controller 730 is configured to operate the rear side air bag 3A and the rear head restraining air bag 5A simultaneously in accordance with the impact energy, impact velocity, and impact angle. The controller 730 is then configured to proceed to step S318 where the controller 730 is configured to operate/deploy the front side air bag 2A and the front head restraining air bag 4A simultaneously after waiting for a prescribed amount of time.

If the controller 730 determines in step S301 that the impact occurred in Region 4 (see FIG. 76) of the side of the vehicle M, the controller 730 is configured to proceed to step S319, and then to step S320 where the controller 730 is configured to determine the impact energy (acceleration G) based on the information in the reference database 730D. Then, in step S321, the controller 730 is configured to determine the impact velocity based on the information in the reference database 730D, and in step S322, the controller 730 is configured to determine the input angle of the impact based on the information in the reference database 730D. Then, in step S323, the controller 730 is configured to operate the front side air bag 2A in accordance with the impact energy, impact velocity, and impact angle. The controller 730 is then configured to proceed to step S324 where the controller 730 is configured to operate the front head restraining air bag after waiting for a prescribed amount of time, to step S325 where the controller 730 is configured to operate the rear side air bag 3A after waiting for a prescribed amount of time, and to step S326 where the controller 730 is configured to operate the rear head restraining air bag 5A after waiting for a prescribed amount of time.

If the controller 730 determines in step S301 that the impact occurred in Region 5 (see FIG. 76) of the side of the vehicle M, the controller 730 is configured to proceed to step S327, and then to step S328, where the controller 730 is configured to determine the impact energy (acceleration G) based on the information in the reference database 730D. Then, in step S329, the controller 730 is configured to determine the impact velocity based on the information in the reference database 730D, and in step S330, the controller 730 is configured to determine the input angle of the impact based on the information in the reference database 730D. Then, in step S331, the controller 730 is configured to operate the front side air bag 2A and the rear side air bag 3A simultaneously in accordance with the impact energy, impact velocity, and impact angle. The controller 730 is then configured to proceed to step S332 where the controller 730 is configured to operate/deploy the front head restraining air bag 4A and the rear head restraining air bag 5A simultaneously after waiting for a prescribed amount of time.

If the controller 730 determines in step S301 that the impact occurred in Region 6 (see FIG. 76) of the side of the vehicle M, the controller 730 is configured to proceed to step S333, and then to step S334, where the controller 730 is configured to determine the impact energy (acceleration G) based on the information in the reference database 730D. Then, in step S335, the controller 730 is configured to determine the impact velocity based on the information in the reference database 730D, and in step S336, the controller 730 is configured to determine the input angle of the impact based on the information in the reference database 730D. Then, in step S337, the controller 730 is configured to operate the rear side air bag 3A in accordance with the impact energy, impact velocity, and impact angle. The controller 730 is then configured to proceed to step S338 where the controller 730 is configured to operate the rear head restraining air bag 5A after waiting for a prescribed amount of time, to step S339 where the controller 730 is configured to operate the front side air bag 2A after waiting for a prescribed amount of time, and to step S340 where the controller 730 is configured to operate the front head restraining air bag 4A after waiting for a prescribed amount of time.

Thus, with the vehicle passenger restraining system in accordance with the twelfth embodiment (i.e., having the constituent features described heretofore), deformation occurring in the impact region A2 of the side of the vehicle during a side collision can be detected with the first to sixth sensors 720a to 720f and, based on the output signals of the sensors 720a to 720f, the controller 730 can detect the location where the deformation of the side of the vehicle occurred, i.e., whether the deformation occurred in Region 1, 2, 3, 4, 5, or 6. The controller 730 is configured to use a prescribed algorithm to detect the impact location incurred by the vehicle based on detection signals indicating the location where the vehicle body B actually undergoes deformation. Then, based on the detected impact location, the controller 730 can operate specific air bags in a manner that properly accommodates the impact location. As a result, the restraining performance with respect to a passenger inside the vehicle M can be improved.

Also, in the twelfth embodiment, the first to sixth sensors 720a to 720f serving to detect the deformation location on the side of the vehicle M are arranged in the side reinforcing member 700 provided in the impact region A2. As a result, the deformation location can be detected precisely through a member having high rigidity, i.e., the side reinforcing member 700.

In the twelfth embodiment, the side reinforcing member 700 comprises the upper impact beam 708A of the front impact beam 708 (in which the first sensor unit 720a is mounted), the center pillar 703 (in which the second sensor 720b and fifth sensor 720e are mounted), the upper impact beam 709A of the rear impact beam 709 (in which the third sensor 720c is mounted), and the side sill 701 (in which the fourth sensor 720d and the sixth sensor 720f are mounted). As a result, the deformation location can be detected precisely using existing structural members having high rigidities.

Additionally, since each of the first to sixth sensors 720a to 720f of the twelfth embodiment are configured as a stress/strain sensor that is configured to detect changes in stress/strain resulting from deformation of the side reinforcing member 700, axial stress and bending stress can be communicated easily by outputting the voltage values that result from changes in the magnetic fields of the first to sixth sensors 720a to 720f. As a result, the precision with which the deformation location is detected during a collision can be increased and the deformation location can be determined distinctly based on the outputted voltage signal waveforms.

Although the control algorithm of the twelfth embodiment uses the covariance function to determine the impact information If, the invention is not limited to using the covariance function. It will be apparent to those skilled in the art from this disclosure that it is also acceptable to find the impact information one of or a combination of the fast Fourier transform, the zero crossing analysis, the autocorrelation function, and the covariance function in the similar manner as explained in the first to fifth embodiments above.

Thirteenth Embodiment

Referring now to FIGS. 79 to 84, a vehicle passenger restraining system in accordance with a thirteenth embodiment will now be explained. In view of the similarity between the first and thirteenth embodiments, the parts of the thirteenth embodiment that are identical to the parts of the first embodiment will be given the same reference numerals as the parts of the first embodiment. Moreover, the descriptions of the parts of the thirteenth embodiment that are identical to the parts of the first embodiment may be omitted for the sake of brevity.

Figure 79:
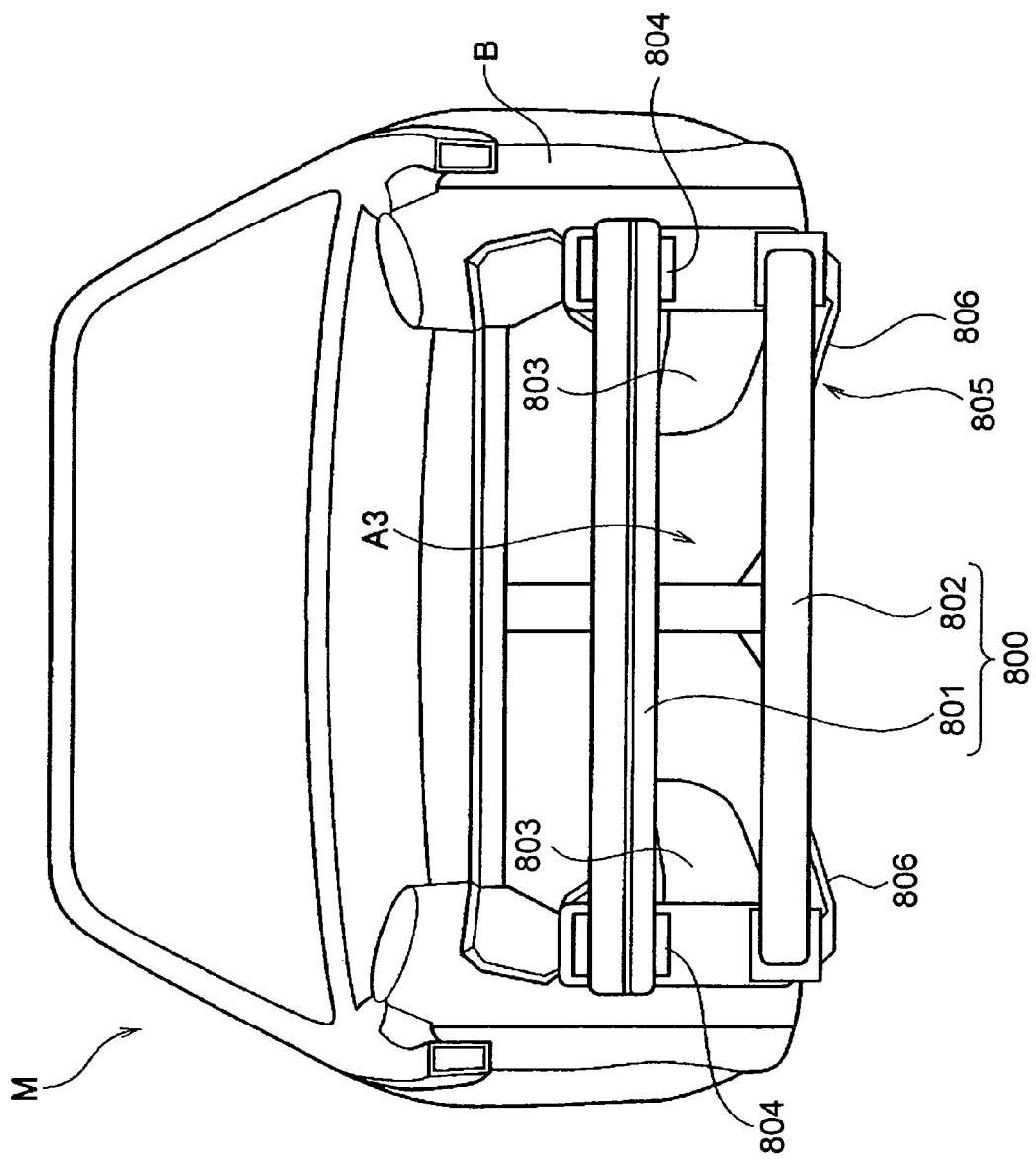
FIG. 79 is a schematic front elevational view of a front structure of a vehicle body with a vehicle passenger restraining system in accordance with a thirteenth embodiment of the present invention.

FIG. 79 is a schematic front elevational view of a front structure of a vehicle body with a vehicle passenger restraining system in accordance with the thirteenth embodiment of the present invention. In the vehicle passenger restraining system in the thirteenth embodiment, a similar method utilized in the first embodiment to detect the impact location in a rollover event is applied to detect an impact location in a front collision of the vehicle M. Thus, the vehicle M of the thirteenth embodiment is provided with a front reinforcing member 800 in an impact region A3 where the impact load of a front collision will be born and a deformation sensor unit including first to sixth sensors 820a to 820f is provided in the front reinforcing member 800 as deformation detecting device.

As shown in FIG. 79, the front reinforcing member 800 includes a bumper reinforcement 801 and a front cross member 802. The bumper reinforcement 801 serves as an upper transverse member arranged to extend in the widthwise direction of the vehicle M along an upper portion of the front end of the vehicle M. The front cross member 802 serves as a lower transverse member arranged to extend in the widthwise direction of the vehicle M along a lower portion of the front end of the vehicle M. The first to sixth sensors 820a to 820f are arranged in a transversely middle portion of and on both transverse ends of the bumper reinforcement 801 and the front cross member 802.

The front structure of the vehicle body B is configured such that, as shown in FIG. 79, the bumper reinforcement 801 is connected across the front ends of a pair of left and right front side members 803 with a pair of bumper stays 804 disposed therebetween. The front side members 803 are arranged to extend in the longitudinal direction (direction perpendicular to the plane of the paper in FIG. 79) on both sides of the vehicle M.

The front cross member 802 is a component part of a suspension member (or subframe) 805 that is connected to the bottoms of the two front side members 803 and has the general form of four overlapping members provided in a substantially rectangular arrangement. The front cross member 802 is connected across the front ends of a pair of left and right side frames 806 that are arranged to extend in the longitudinal direction of the vehicle M in general alignment with the front side members 803.

FIG. 80 is a pair of diagrams (a) and (b) in perspective views of the bumper reinforcement 801 and the front cross member 802, respectively, of the front structure of the vehicle body illustrating locations where the first to sixth sensors 820*a* to 820*f* are mounted in accordance with the thirteenth embodiment of the present invention. As shown in the diagram (a) of FIG. 80, the first sensor 820*a* is mounted on the top surface of the right-hand end of the bumper reinforcement 801, the second sensor 820*b* is mounted on the top surface of the middle portion of the bumper reinforcement 801, and the third sensor 820*c* is mounted on the top surface of the left-hand end of the bumper reinforcement 801.

As shown in the diagram (b) of FIG. 80, the fourth sensor 820*d* is mounted on the top surface of the right-hand end of the front cross member 802, the fifth sensor 820*e* is mounted on the top surface of the middle portion of the front cross member 802, and the sixth sensor 820*f* is mounted on the top surface of the left-hand end of the front cross member 802.

Figure 81:
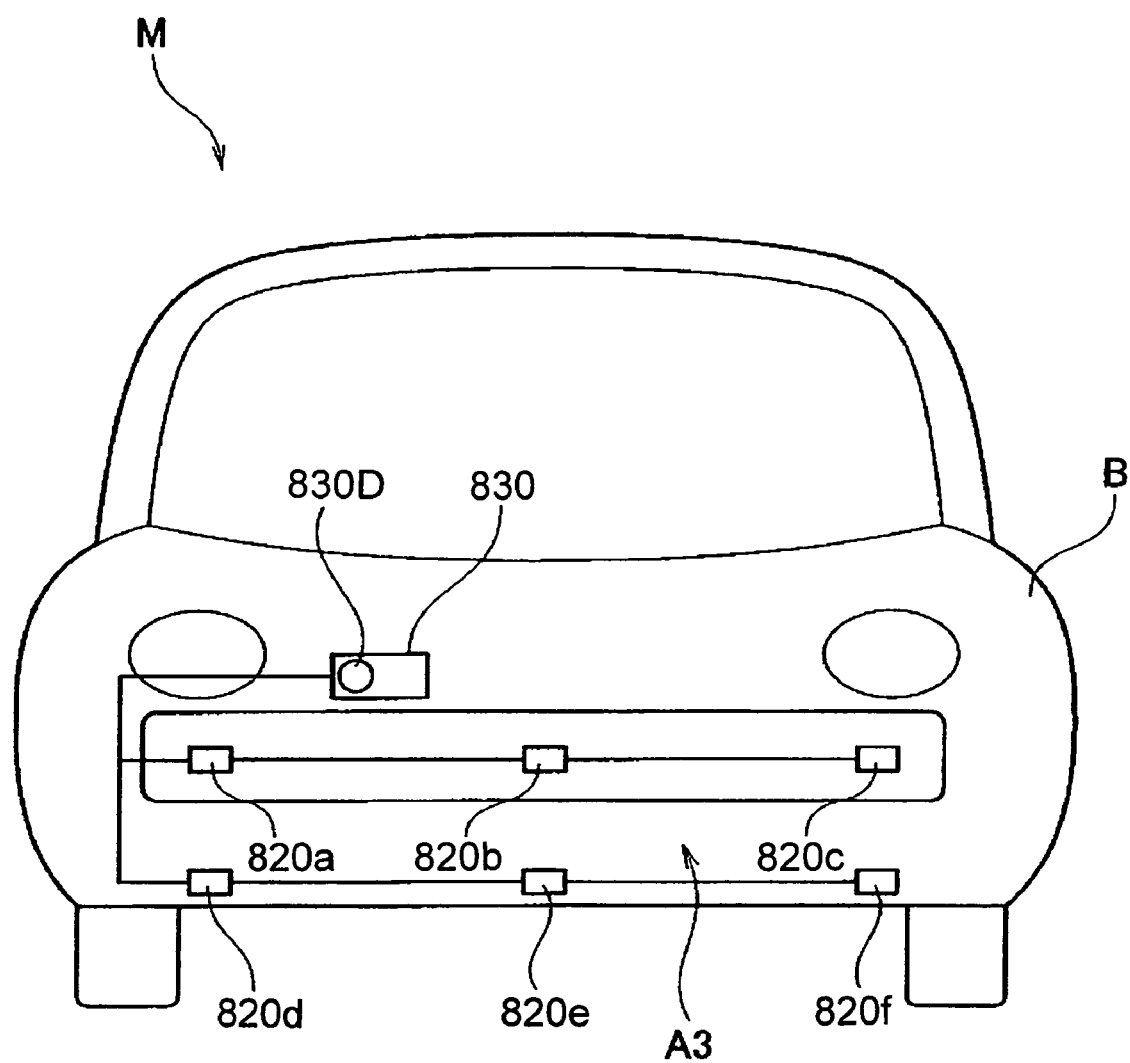
FIG. 81 is a schematic front elevational view of the vehicle body illustrating a positional arrangement of the detecting sections of the deformation detecting device in accordance with the thirteenth embodiment of the present invention.

FIG. 81 is a schematic front elevational view of the vehicle body illustrating a positional arrangement of the first to sixth sensors 820*a* to 820*f* of the deformation sensor unit in accordance with the thirteenth embodiment of the present invention. As shown in FIG. 81, the first to sixth sensors 820*a* to 820*f* are arranged in the impact region A3 on the front of the vehicle M in two vertical levels, i.e., an upper level and a lower level, with three sensors arranged along the longitudinal direction at each level.

Figure 82:
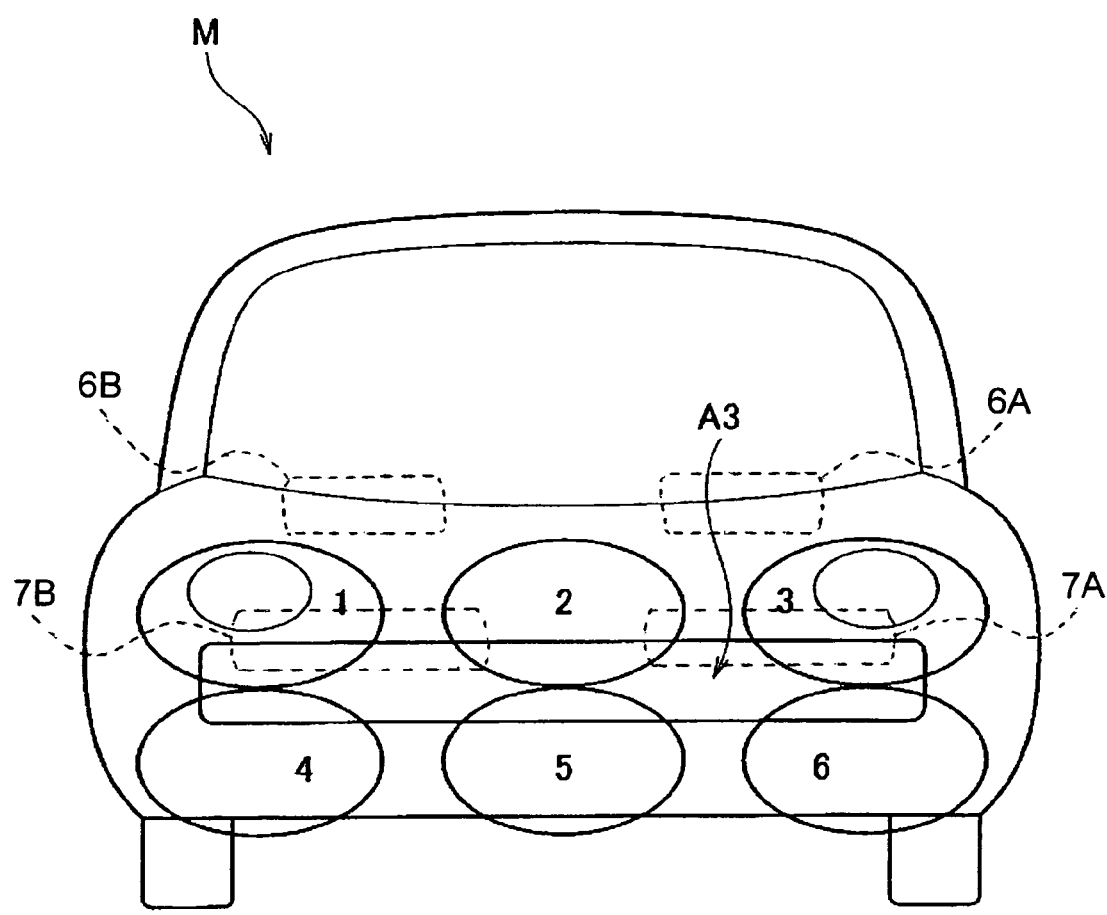
FIG. 82 is a schematic front elevational view of the vehicle body illustrating regions 1 to 6 corresponding to front collision impact locations in accordance with the thirteenth embodiment of the present invention.

As shown in FIG. 82, a prescribed area corresponding to the location where the first sensor 820*a* is arranged is called "Region 1", a prescribed area corresponding to the location where the second sensor 820*b* is arranged is called "Region 2", a prescribed area corresponding to the location where the third sensor 820*c* is arranged is called "Region 3", a prescribed area corresponding to the location where the fourth sensor 820*d* is arranged is called "Region 4", a prescribed area corresponding to the location where the fifth sensor 820*e* is arranged is called "Region 5", a prescribed area corresponding to the location where the sixth sensor 820*f* is arranged is called "Region 6".

Similarly to the sensors of the previous embodiments, each of the first to sixth sensors 820*a* to 820*f* of the thirteenth embodiment is configured as a stress/strain sensor that is configured to detect the change in stress/strain resulting from deformation of the front reinforcing member 800. More specifically, the first to sixth sensors 820*a* to 820*f* are configured to output a voltage value resulting from changes in a magnetic field.

As seen in FIG. 82, in the thirteenth embodiment, the vehicle M is provided with a plurality of passenger restraining devices including left and right front seat front collision air bags 6A and 6B for restraining individual passengers sitting in the left and right front seats during a frontal collision, and left and right front seat knee air bags 7A and 7B for restraining the knees of individual passengers sitting in the left and right front seats.

When the vehicle body B experiences a front collision and the impact region A3 undergoes a localized deformation, the deformation is detected by the first to sixth sensors 820*a* to 820*f* and voltage signals are outputted therefrom. In order to process the output voltage signals, the vehicle M is provided with a controller 830 that is configure to determine a location (one of Regions 1 to 6) on the vehicle M where a collision impact occurred using an internal reference database 830D (shown in FIG. 81), and the controller 830 is configured to process the output signals in accordance with a prescribed algorithm. The controller 830 serves as a passenger restraining device operating unit configured to operate specific air bags among the plurality of air bags in accordance with the impact location where a collision impact occurred.

The controller 830 is configured to process the output signals from the first to sixth sensors 820*a* to 820*f* with for example, a covariance function, and to compare the processed signal waveforms in the reference database 830D stored in the controller 830 to detect such impact information as the impact location for the purpose of identifying specific air bags and the impact acceleration, impact velocity, and impact load input angles (angle of load input at impact location) for the purpose of controlling the operation of the passenger restraining devices.

Figure 83A:
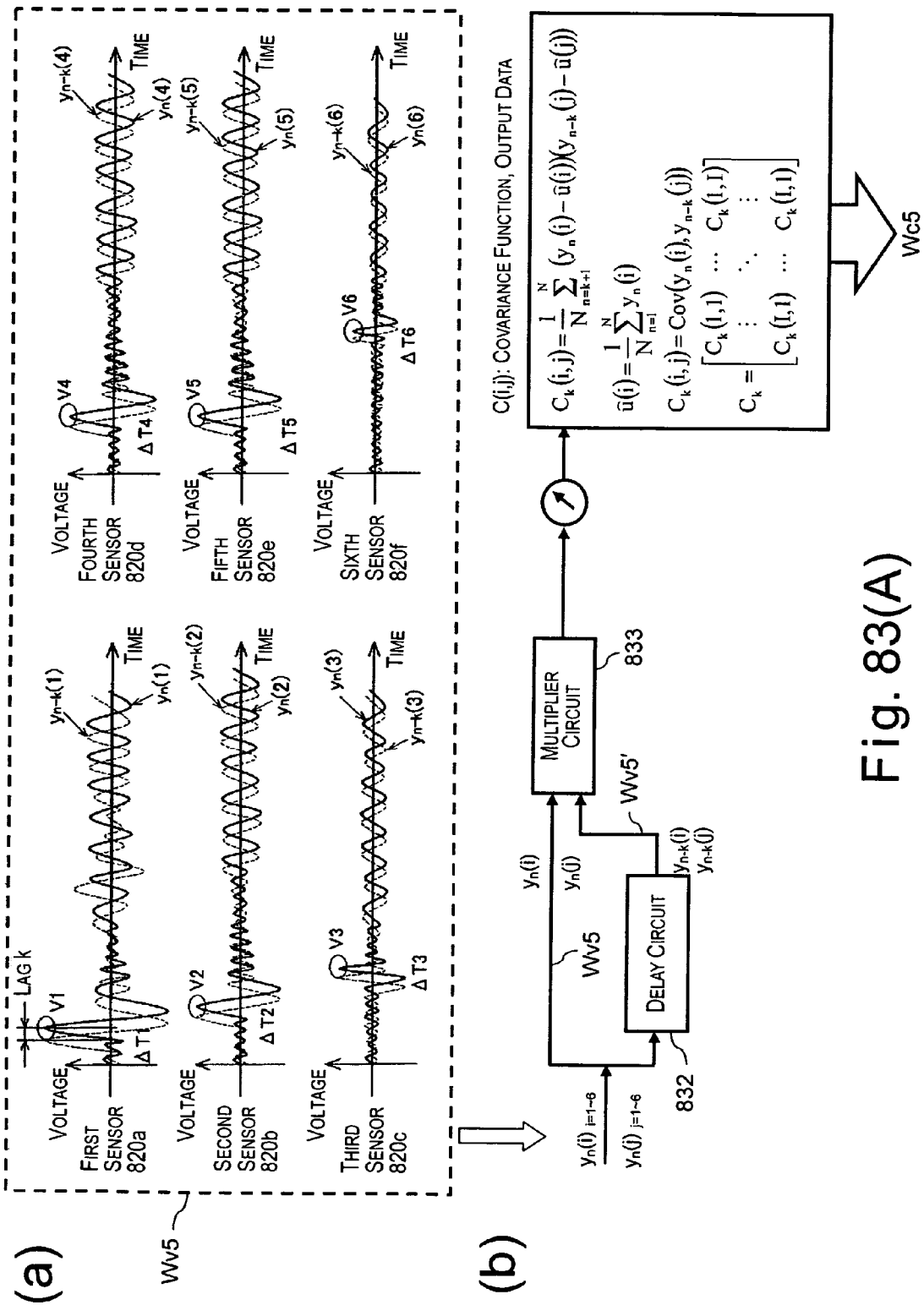
FIG. 83(A) is a pair of diagrams (a) and (b) illustrating voltage waveforms issued from the deformation detecting device in a case where the vehicle undergoes a front collision (diagram (a)), and a flow of computations used to process the voltage waveforms shown in the diagram (a) with a covariance function in accordance with the thirteenth embodiment of the present invention.
Figure 83B:
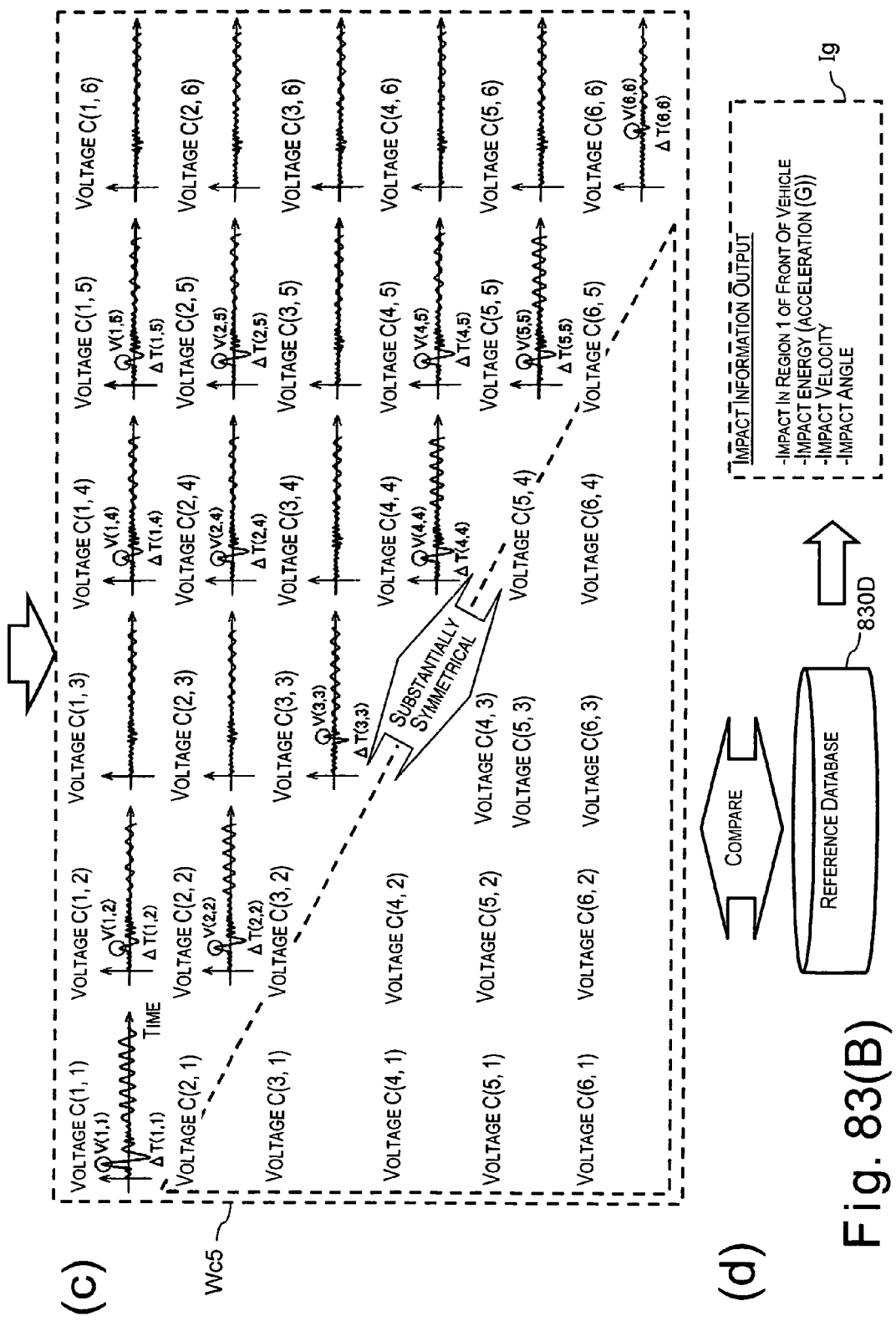
FIG. 83(B) is a pair of diagrams (c) and (d) illustrating signal waveforms that result when the voltage waveforms shown in the diagram (a) of FIG. 83(A) are processed with the covariance function shown in the diagram (b) of FIG. 83(A) (diagram (c)), and database used to obtain impact information based on the signal waveforms shown in the diagram (c) obtained from the covariance function processing shown in the diagram (b) (diagram (d)) in accordance with the thirteenth embodiment of the present invention.

For example, FIGS. 83(A) and 83(B) illustrate when the vehicle M undergoes a frontal collision in which the impact occurs in the vicinity of one of Region 1 in the impact region A3. In such case, the first to sixth sensors 820*a* to 820*f* output signal waveforms Wv5 as shown in the diagram (a) of FIG. 83(A). As shown in the diagram (b) of FIG. 83(A), the signal waveforms Wv5 are fed into a delay circuit 832 and the resulting signal waveforms Wv5'(y(n−κ)), which have been delayed by a lag time κ, are multiplied by the original signal waveforms Wv5 (y(n)) using a multiplier circuit 833. The resulting products are used to obtain signal waveforms Wc5 that are given by a covariance function C(i, j).

The diagram (c) of FIG. 83(B) shows the signal waveforms Wc5 resulting from processing the signals from the first to sixth sensors 820*a* to 820*f* with the covariance function. As shown in the diagram (d) of FIG. 83(B), the covariance function processed waveforms Wc5 are compared to the prestored reference database 830D to output impact information Ig. Then, based on the impact information Ig, the controller 830 is configured to determine that a collision impact occurred in Region 1 in the impact region A3 on the front of the vehicle M and to obtain the impact energy (acceleration) of the front impact. The controller 830 is also configured to integrate the energy (acceleration) with respect to time in order to obtain the velocity of the side impact. The controller 830 is also configured to obtain the input angle of the impact.

The distinctive characteristics of the signal waveforms Wv5 of the first to sixth sensors 820*a* to 820*f* shown in the diagram (a) of FIG. 83(A) are substantially the same as the distinctive characteristics of the signal waveforms Wv4 shown in the diagram (a) of FIG. 77(A) regarding the twelfth embodiment. Likewise, the distinctive characteristics of the signal waveforms Wc5 shown in the diagram (c) of FIG. 83(B) resulting from processing the signal waveforms Wv5 of the first to sixth sensors 820*a* to 820*f* with the covariance function are substantially the same as the signal waveforms Wc4 shown in the diagram (c) of FIG. 77(B) regarding the twelfth embodiment. Thus, descriptions of the signals Wv5 and Wc5 are omitted here for the sake of brevity.

Figure 84:
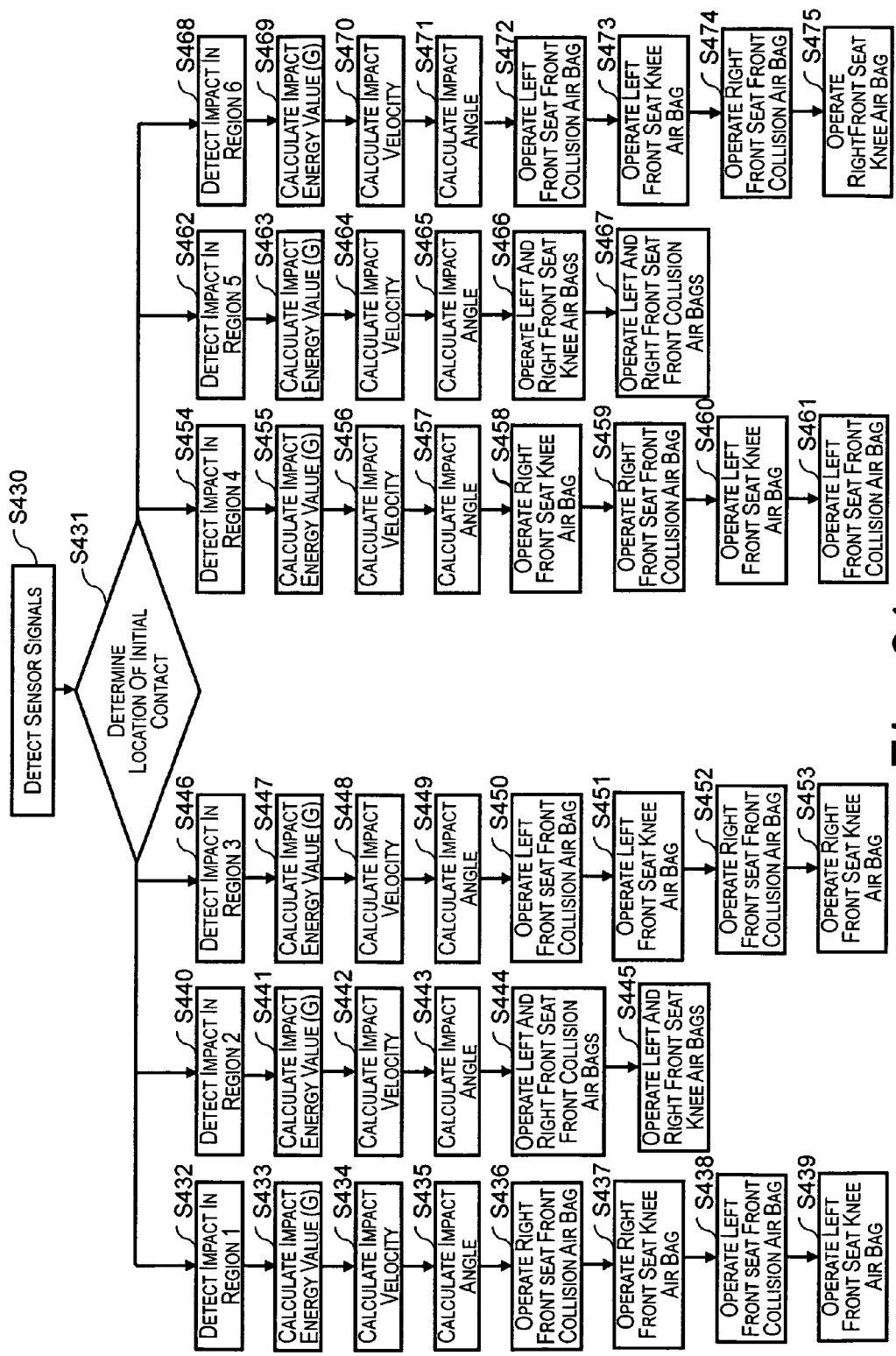
FIG. 84 is a flowchart illustrating a control algorithm for controlling from detection of a front collision to operation of the passenger restraining devices executed in the vehicle passenger restraining system in accordance with the thirteenth embodiment of the present invention.

Thus, by reading the voltage signal waveforms Wv5 outputted from the first to sixth sensors 820*a* to 820*f* and obtaining the impact information Ig from the covariance function processed signal waveforms Wc5, the vehicle passenger restraining system can detect the location (one of Regions 1 to 6) on the front of the vehicle M where a front collision impact occurred. In the thirteenth embodiment, the vehicle passenger restraining system can then selectively operate/deploy a specific air bag or air bags among left and right front seat front collision air bags 6A and 6B and left and right front seat knee air bags 7A and 7B in accordance with the impact location by following the control algorithm shown in FIG. 84. FIG. 84 is a flowchart illustrating the control algorithm for controlling from detection of a front collision to operation of the passenger restraining devices executed in the vehicle passenger restraining system in accordance with the thirteenth embodiment of the present invention.

More specifically, when a front collision occurs, in step S430 of the control algorithm of FIG. 84, the controller 830 is configured to detect signals from the first to sixth sensors 820a to 820f and to obtain the impact information Ig. In step S431, the controller 830 is configured to determine the impact location. If the controller 830 determines in step S431 that the impact occurred in Region 1 (see FIG. 820) of the front of the vehicle M, the controller 830 is configured to proceed to step S432, and then to step S433 where the controller 830 is configured to determine the impact energy (acceleration G) based on the information in the reference database 830D. Then, in step S434, the controller 830 is configured to determine the impact velocity based on the information in the reference database 830D, and in step S435, the controller 830 is configured to determine the input angle of the impact based on the information in the reference database 830D. Then, in step S436, the controller 830 is configured to operate the right front seat front collision air bag 6B in accordance with the impact energy, impact velocity, and impact angle. The controller 830 is then configured to proceed to step S437 where the controller 830 is configured to operate the right front seat knee air bag 7B after waiting for a prescribed amount of time, to step S438 where the controller 830 is configured to operate the left front seat front collision air bag 6A after waiting for a prescribed amount of time, and to step S439 where the controller 830 is configured to operate the left front seat knee air bag 7A after waiting a prescribed amount of time.

Meanwhile, if the controller 830 determines in step S431 that the impact occurred in Region 2 (see FIG. 82) of the front of the vehicle M, the controller 830 is configured to proceed to step S440, and then to step S441 where the controller 830 is configured to determine the impact energy (acceleration G) based on the information in the reference database 830D. Then, in step S442, the controller 830 is configured to determine the impact velocity based on the information in the reference database 830D, and in step S443, the controller 830 is configured to determine the input angle of the impact based on the information in the reference database 830D. Then, in step S444, the controller 830 is configured to operate the left and right front seat front collision air bags 6A and 6B simultaneously in accordance with the impact energy, impact velocity, and impact angle. The controller 830 is then configured to proceed to step S445 where the controller 830 is configured to operate the left and right front seat knee air bags 7A and 7B after waiting for a prescribed amount of time.

If the controller 830 determines in step S431 that the impact occurred in Region 3 (see FIG. 82) of the front of the vehicle M, the controller 830 is configured to proceed to step S446, and then to step S447 where the controller 830 is configured to determine the impact energy (acceleration G) based on the information in the reference database 830D. Then, in step S448, the controller 830 is configured to determine the impact velocity based on the information in the reference database 830D, and in step S449, the controller 830 is configured to determine the input angle of the impact based on the information in the reference database 830D. Then, in step S450, the controller 830 is configured to operate the left front seat front collision air bag 6A in accordance with the impact energy, impact velocity, and impact angle. The controller 830 is then configured to proceed to step S451 where the controller 830 is configured to operate the left front seat knee air bag 7A after waiting for a prescribed amount of time, to step S452 where the controller 830 is configured to operate the right front seat front collision air bag 6B after waiting for a prescribed amount of time, and to step S453 where the controller 830 is configured to operate the right front seat knee air bag 7B after waiting for a prescribed amount of time.

If the controller 830 determines in step S431 that the impact occurred in Region 4 (see FIG. 82) of the front of the vehicle M, the controller 830 is configured to proceed to step S454, and then to step S455 where the controller 830 is configured to determine the impact energy (acceleration G) based on the information in the reference database 830D. Then, in step S456, the controller 830 is configured to determine the impact velocity based on the information in the reference database 830D, and in step S457, the controller 830 is configured to determine the input angle of the impact based on the information in the reference database 830D. Then, in step S458, the controller 830 is configured to operate the right front seat knee air bag 7B in accordance with the impact energy, impact velocity, and impact angle. The controller 830 is then configured to proceed to step S459 where the controller 830 is configured to operate the right front seat front collision air bag 6B after waiting for a prescribed amount of time, to step S460 where the controller 830 is configured to operate the left front seat knee air bag 7A after waiting for a prescribed amount of time, and to step S461 where the controller 830 is configured to operate the left front seat front collision air bag 6A after waiting for a prescribed amount of time.

If the controller 830 determines in step S431 that the impact occurred in Region 5 (see FIG. 82) of the front of the vehicle M, the controller 830 is configured to proceed to step S462, and then to step S463 where the controller 830 is configured to determine the impact energy (acceleration G) based on the information in the reference database 830D. Then, in step S464, the controller 830 is configured to determine the impact velocity based on the information in the reference database 830D, and in step S465, the controller 830 is configured to determine the input angle of the impact based on the information in the reference database 830D. Then, in step S466, the controller 830 is configured to operate the left and right front seat knee air bags 7A and 7B in accordance with the impact energy, impact velocity, and impact angle. The controller 830 is then configured to proceed to step S467 where the controller 830 is configured to operate the left and right front seat front collision air bags 6A and 6B after waiting for a prescribed amount of time.

If the controller 830 determines in step S431 that the impact occurred in Region 6 (see FIG. 82) of the front of the vehicle M, the controller 830 is configured to proceed to step S468, and then to step S469, where the controller 830 is configured to determine the impact energy (acceleration G) based on the information in the reference database 830D. Then, in step S470, the controller 830 is configured to determine the impact velocity based on the information in the reference database 830D, and in step S471 the controller 830 is configured to determine the input angle of the impact based on the information in the reference database 830D. Then, in step S472, the controller 830 is configured to operate the left front seat knee bag 7A in accordance with the impact energy, impact velocity, and impact angle. The controller 830 is then configured to proceed to step S473 where the controller 830 is configured to operate the left front seat front collision air bag 6A after waiting for a prescribed amount of time. Next, the controller 830 proceeds to step S474 where the controller 830 is configured to operate the right front seat knee air bag 7B after waiting for a prescribed amount of time, and then to step S475 where the controller 830 is configured to operate the right front seat front collision air bag 6B after waiting for a prescribed amount of time.

Thus, with the vehicle passenger restraining system in accordance with the thirteenth embodiment (i.e., having the constituent features described heretofore), deformation occurring in the impact region A3 of the front of the vehicle M during a front collision can be detected with the first to sixth sensors 820a to 820f and, based on the output signals of the sensors 820a to 820f, the controller 830 can detect the location where the deformation of the front of the vehicle M occurred, i.e., whether the deformation occurred in Region 1, 2, 3, 4, 5, or 6. The controller 830 is configured to use a prescribed algorithm to detect the impact location incurred by the vehicle M based on detection signals indicating the location where the vehicle body actually undergoes deformation. Then, based on the detected impact location, the controller 830 can operate specific air bags in a manner that properly accommodates the impact location. As a result, the restraining performance with respect to a passenger inside the vehicle M can be improved.

Also, in the thirteenth embodiment, the first to sixth sensors 820a to 820f serving to detect the deformation location on the front of the vehicle M are arranged in the front reinforcing member 800 provided in the impact region A3. As a result, the deformation location can be detected precisely through a member having high rigidity, i.e., the front reinforcing member 800.

In the thirteenth embodiment, the front reinforcing member 800 comprises the bumper reinforcement 801 (in which the first to third sensors 820a to 820c are mounted) and the front cross member 802 (in which the fourth to sixth sensors 820d to 820f are mounted). As a result, the deformation location can be detected precisely using existing structural members having high rigidities.

Additionally, since each of the first to sixth sensors 820a to 820f of this embodiment are configured as a stress/strain sensor that is configured to detect changes in stress/strain resulting from deformation of the front reinforcing member 800, axial stress and bending stress can be communicated easily by outputting the voltage values that result from changes in the magnetic fields of the first to sixth sensors 820a to 820f. As a result, the precision with which deformation is detected during a collision can be increased and the deformation location can be determined distinctly based on the outputted voltage signal waveforms.

Although the control algorithm of the thirteenth embodiment uses the covariance function to determine the impact information Ig, the invention is not limited to using the covariance function. It will be apparent to those skilled in the art from this disclosure that it is also acceptable to find the impact information using one of or a combination of the fast Fourier transform, the zero crossing analysis, the autocorrelation function, and the covariance function in the similar manner as explained in the first to fifth embodiments above.

In the first to thirteenth embodiment explained above, the air bags (i.e., the curtain airbags 1A and 1B, the front side air bags 2A and 2B, the rear side air bags 3A and 3B, the front head restraining air bags 4A and 4B, the rear head restraining air bags 5A and 5B, the front seat front collision air bags 6A and 6B, and the front seat knee air bags 7A and 7B) are used as examples of the passenger restraining device. However, it will be apparent to those skilled in the art from this disclosure that the passenger restraining device is not limited to the air bags. For example, the passenger restraining devices of the present invention can include seatbelts and other devices serving to restrain a passenger inside the vehicle M.

Accordingly, with the vehicle passenger restraining system in accordance with the present invention, when the vehicle M undergoes a rollover event or experiences a front or side collision, the passenger restraining devices corresponding to the locations where the impact is imparted to the vehicle M can be operated properly and the passenger restraining performance can be improved.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle passenger restraining system comprising:
   a plurality of passenger restraining devices configured and arranged to restrain a passenger inside a vehicle;
   a deformation detecting device including at least one deformation sensor coupled to a single location of a vehicle body of the vehicle with the deformation sensor being configured and arranged to detect a deformation condition of the vehicle body; and
   a passenger restraining device operating unit configured to process an output signal from the deformation sensor to obtain a processed signal waveform, to identify an impact location among a plurality of locations of the vehicle body as impact information by comparing the processed signal waveform to a reference database with the impact information being different for each of the plurality of locations depending upon the impact location, and to selectively operate at least one of the passenger restraining devices in accordance with the impact information.

2. The vehicle passenger restraining system as recited in claim 1, wherein
the deformation detecting device is further configured and arranged to detect the deformation condition of the vehicle body by detecting a deformation location on the vehicle body where the vehicle body is deformed.

3. The vehicle passenger restraining system as recited in claim 2, further comprising
a top reinforcing member disposed in an impact region of the vehicle body where a roof of the vehicle will contact the ground in a rollover event with the deformation detecting device being coupled to a top sensor mounting portion of the top reinforcing member.

4. The vehicle passenger restraining system as recited in claim 2, wherein
the passenger restraining device operating unit is further configured to process the output signal from the deformation detecting device using fast Fourier transformation and to use a processed output signal and the reference database to determine the impact information including the impact location and an impact acceleration, the passenger restraining device operating unit being further configured to select the at least one of the passenger restraining devices to be initially operated in accordance with the impact location and to operate the at least one of the passenger restraining devices in accordance with the impact acceleration.

5. The vehicle passenger restraining system as recited in claim 2, wherein
the passenger restraining device operating unit is further configured to process the output signal from the deformation detecting device using zero crossing analysis and to used a processed output signal and the reference database to determine the impact information including the impact location, an impact acceleration and an impact velocity, the passenger restraining device operating unit being further configured to select the at least one of the passenger restraining devices to be initially operated in accordance with the impact location and to operate the at least one of the passenger restraining devices in accordance with the impact acceleration and the impact velocity.

6. The vehicle passenger restraining system as recited in claim 2, wherein
the passenger restraining device operating unit is further configured to process the output signal from the deformation detecting device using an autocorrelation function and to use a processed output signal and the reference database to determine the impact information including the impact location, an impact acceleration and an impact velocity, the passenger restraining device operating unit being further configured to select the at least one of the passenger restraining devices to be initially operated in accordance with the impact location and to operate the at least one of the passenger restraining devices in accordance with the impact acceleration and the impact velocity.

7. The vehicle passenger restraining system as recited in claim 2, wherein
the passenger restraining device operating unit is further configured to process the output signal from the deformation detecting device using a covariance function and to use a processed output signal and the reference database to determine the impact information including the impact location, an impact acceleration, an impact velocity and an impact load input angle, the passenger restraining device operating unit being further configured to select the at least one of the passenger restraining devices to be initially operated in accordance with the impact location and to operate the at least one of the passenger restraining devices in accordance with the impact acceleration, the impact velocity, and the impact load input angle.

8. The vehicle passenger restraining system as recited in claim 2, wherein
the passenger restraining device operating unit is further configured to process the output signal from the deformation detecting device using a combination of fast Fourier transformation, zero crossing analysis, an autocorrelation function and a covariance function and to use a processed output signal and the reference database to determine the impact information including the impact location, an impact acceleration, an impact velocity and an impact load input angle, the passenger restraining device operating unit being further configured to select the at least one of the passenger restraining devices to be initially operated in accordance with the impact location and to operate the at least one of the passenger restraining devices in accordance with the impact acceleration, the impact velocity, and the impact load input angle.

9. The vehicle passenger restraining system as recited in claim 2, wherein
the at least one deformation sensor of the deformation detecting device includes a stress/strain sensor configured and arranged to detect a change in stress or strain resulting from deformation of the vehicle body.

10. The vehicle passenger restraining system as recited in claim 1, further comprising
a side reinforcing member disposed in an impact region of the vehicle body where a collision load will be imparted during a side collision with the deformation detecting device being coupled to the side reinforcing member.

11. The vehicle passenger restraining system recited in claim 10, wherein
the side reinforcing member includes
a lower longitudinal member extending in a longitudinal direction of the vehicle along a lower lateral side portion of the vehicle, the lower longitudinal member having a first mounting section formed in a longitudinally forward portion thereof and a second mounting section formed in a longitudinally rearward portion thereof,
a middle vertical member connecting an approximate longitudinal middle portion of the lower longitudinal member to an approximate longitudinal middle portion of a vehicle upper end side edge, the middle vertical member having a third mounting section formed in a vertically middle portion thereof and a forth mounting section formed in a vertically lower portion thereof,
a front door internal member spanning through inside of a front door member in the longitudinal direction of the vehicle with the front door member being coupled to a front opening formed in a front portion of a lateral side of the vehicle to selectively close and open the front opening, the front door internal member having a fifth mounting section, and
a rear door internal member spanning through inside of a rear door member in the longitudinal direction of the vehicle with the rear door member being coupled to a rear opening formed in a rear portion of a lateral side of the vehicle to selectively close and open the rear opening the rear door internal member having a sixth mounting section, and the deformation detecting device includes first to sixth detecting sections mounted to the first to sixth mounting sections of the side reinforcing member, respectively.

12. The vehicle passenger restraining system as recited in claim 1, further comprising
a front reinforcing member disposed in an impact region of the vehicle body where a collision load will be imparted during a front collision with the deformation detecting device being mounted to the front reinforcing member.

13. The vehicle passenger restraining system recited in claim 12, wherein
the front reinforcing member includes
an upper transverse member arranged extending in a widthwise direction of the vehicle along an upper portion of a front end of the vehicle, the upper transverse member having a first mounting section in a transversely middle portion thereof and second and third mounting sections on both transverse ends thereof, respectively, and
a lower transverse member extending in the widthwise direction of the vehicle along an lower portion of the front end of the vehicle, the lower transverse member having a fourth mounting section in a transversely middle portion thereof and fifth and sixth mounting sections on both transverse ends thereof, respectively, and
the deformation detecting device includes first to sixth detecting sections mounted to the first to sixth mounting sections of the front reinforcing member.

14. The vehicle passenger restraining system recited in claim 3, wherein
the top reinforcing member includes
a first reinforcing frame extending between a front left top portion of the vehicle and an approximate longitudinal middle portion of a top right edge of the vehicle, and
a second reinforcing frame extending between a front right top portion of the vehicle and an approximate longitudinal middle portion of a top left edge of the vehicle,
the first and second reinforcing frames being coupled together at portions where the first and second reinforcing frames intersect each other to form the top sensor mounting portion with the top sensor mounting portion being disposed in an approximate center portion with respect to a widthwise direction of the vehicle, the first and second reinforcing frames being configured and arranged such that a bending strength of the top sensor mounting portion being larger than a bending strength of peripheral portions of the first and second reinforcing frames disposed adjacent to the top sensor mounting portion.

15. A vehicle passenger restraining method comprising:
detecting a deformation condition by using a deformation detecting device including at least one deformation sensor coupled to a single location of a vehicle body;
processing an output signal from the deformation sensor to obtain a processed signal waveform;
identifying an impact location among a plurality of locations of the vehicle body as impact information of the vehicle by comparing the processed signal waveform to a reference database with the impact information being different for each of the plurality of locations depending upon the impact location; and
selectively operating at least one of a plurality of passenger restraining devices in accordance with the impact information.

16. The vehicle passenger restraining method as recited in claim 15, wherein
the detecting of the deformation condition includes detecting the deformation condition of an impact region of the vehicle body where a collision load will be imparted to deform the vehicle body during a collision.

17. A vehicle passenger restraining system comprising:
deformation detecting means coupled to a single location of a vehicle body for detecting a deformation condition the vehicle body;
signal processing means for processing an output signal from the deformation detecting means to obtain a processed signal waveform;
impact information determining means for identifying an impact location among a plurality of locations of the vehicle body as impact information of a vehicle by comparing the processed signal waveform to a reference database with the impact information being different for each of the plurality of locations depending upon the impact location; and
restraining device operating means for selectively operating at least one of a plurality of passenger restraining devices in accordance with the impact information.

18. A vehicle comprising:
a vehicle body structure;
a plurality of passenger restraining devices configured and arranged to restrain a passenger inside the vehicle;
a deformation detecting device including at least one deformation sensor coupled to a single location of the vehicle body structure with the deformation detecting device being configured and arranged to detect a deformation condition of the vehicle body structure; and
a passenger restraining device operating unit configured to process an output signal from the deformation sensor to obtain a processed signal waveform, to identify an impact location among a plurality of locations of the vehicle body as impact information of the vehicle body structure by comparing the processed signal waveform to a reference database with the impact information being different for each of the plurality of locations depending upon the impact location, and to selectively operate at least one of the passenger restraining devices in accordance with the impact information.

* * * * *